United States Patent
Ishida

(10) Patent No.: US 8,854,500 B2
(45) Date of Patent: Oct. 7, 2014

(54) IMAGING APPARATUS, IMAGE PROCESSING APPARATUS, IMAGE PROCESSING METHOD, AND PROGRAM

(75) Inventor: Minoru Ishida, Tokyo (JP)

(73) Assignee: Sony Corporation, Tokyo (JP)

( * ) Notice: Subject to any disclaimer, the term of this patent is extended or adjusted under 35 U.S.C. 154(b) by 733 days.

(21) Appl. No.: 12/929,984

(22) Filed: Mar. 1, 2011

(65) Prior Publication Data

US 2011/0234852 A1 Sep. 29, 2011

(30) Foreign Application Priority Data

Mar. 29, 2010 (JP) ................. P2010-074088

(51) Int. Cl.
 *H04N 5/76* (2006.01)
 *H04N 5/222* (2006.01)
 *H04N 5/225* (2006.01)
(52) U.S. Cl.
 CPC ................... *H04N 5/225* (2013.01); *H04M 2250/52* (2013.01)
 USPC ............. 348/231.99; 348/231.2; 348/333.01
(58) Field of Classification Search
 CPC ................................................. H04N 5/23293
 USPC ............................ 348/231.99, 240.2, 240.99
 See application file for complete search history.

(56) References Cited

U.S. PATENT DOCUMENTS

| | | | | |
|---|---|---|---|---|
| 6,693,524 | B1 * | 2/2004 | Payne | 340/463 |
| 7,764,309 | B2 | 7/2010 | Deguchi | |
| 2002/0061127 | A1 * | 5/2002 | Bacus et al. | 382/128 |
| 2006/0134719 | A1 * | 6/2006 | Takeda et al. | 435/23 |

FOREIGN PATENT DOCUMENTS

| | | | |
|---|---|---|---|
| JP | 03145878 | * | 6/1991 |
| JP | 2007-166317 | | 6/2007 |

\* cited by examiner

*Primary Examiner* — Joel Fosselman
(74) *Attorney, Agent, or Firm* — Sony Corporation

(57) ABSTRACT

An imaging apparatus includes: an image generation section that generates at least one of a first captured image having a predetermined size and a second captured image having an aspect ratio different from that of the first captured image; a recording control section that, when an instruction operation to record the generated captured image is received, records the generated captured image based on the instruction operation; and a display control section that, when a captured image to be displayed at the time of displaying the recorded captured image on a display section is the second captured image, displays the second captured image and an enlarged image of a specific region in the second captured image are displayed on the display section in a correlated manner.

12 Claims, 101 Drawing Sheets

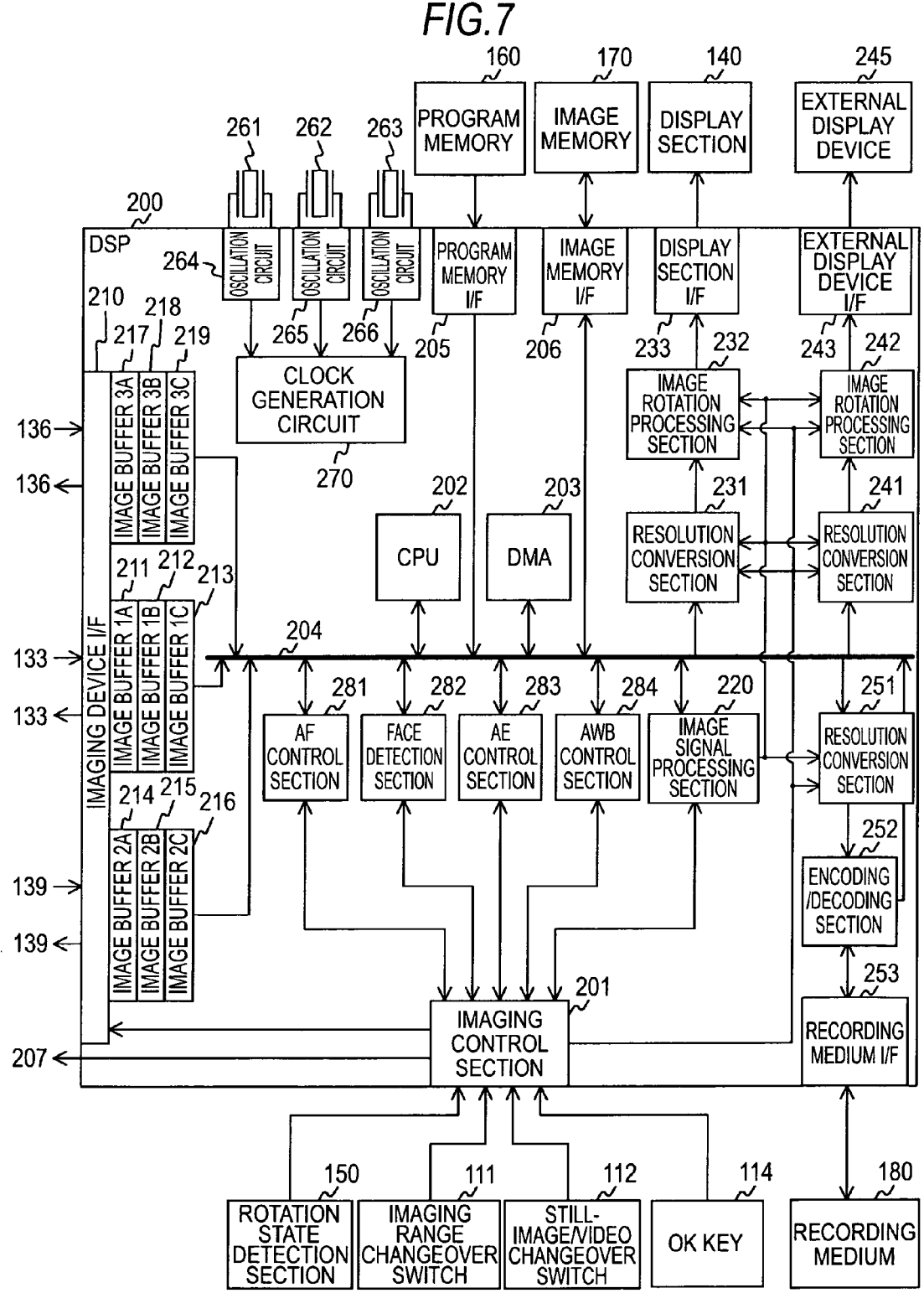

FIG.24A
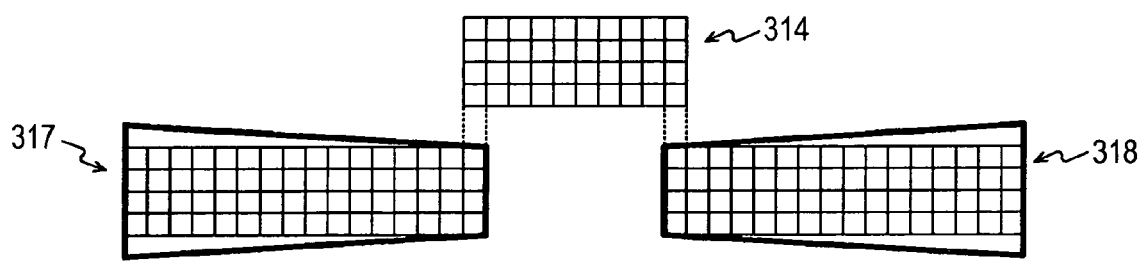
FIG.24B
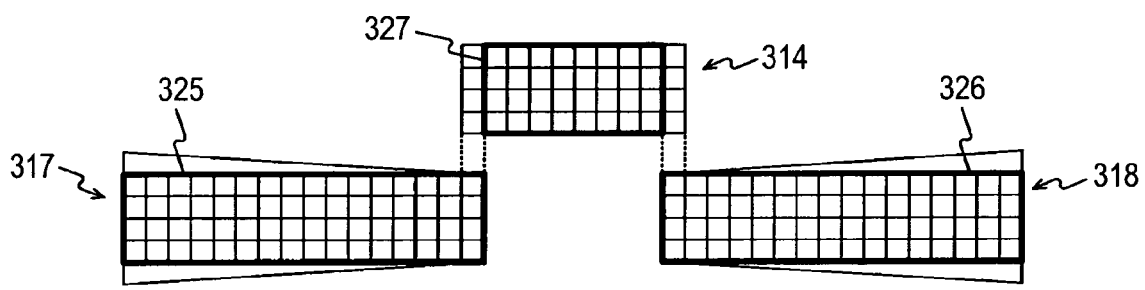
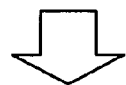
FIG.24C
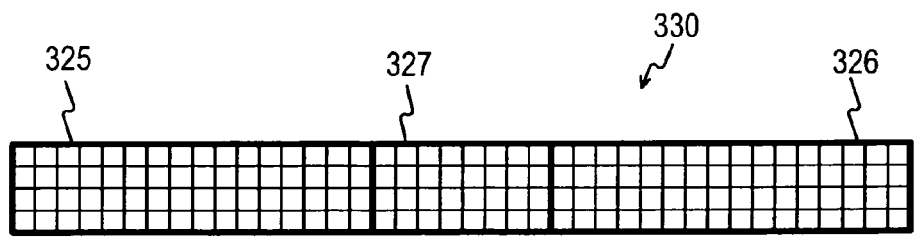

FIG.25A
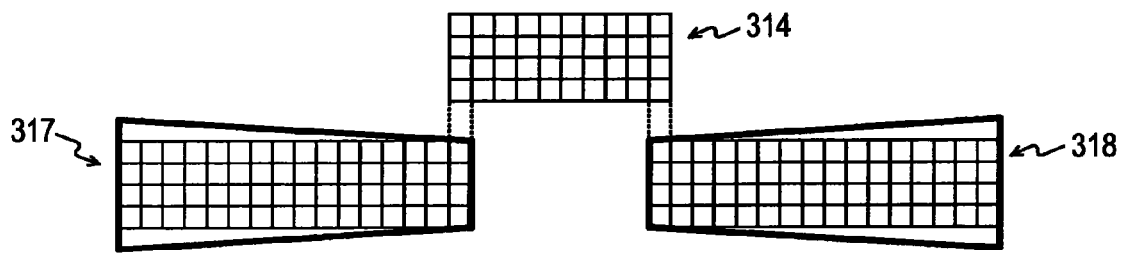
FIG.25B
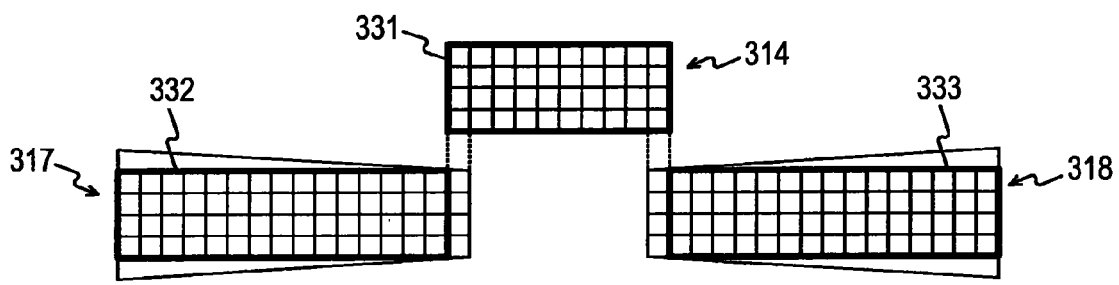
FIG.25C
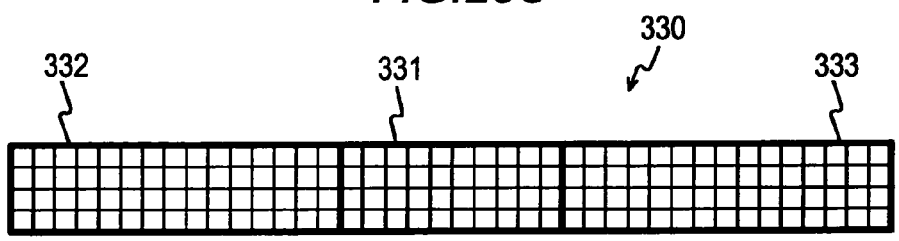

FIG.26A
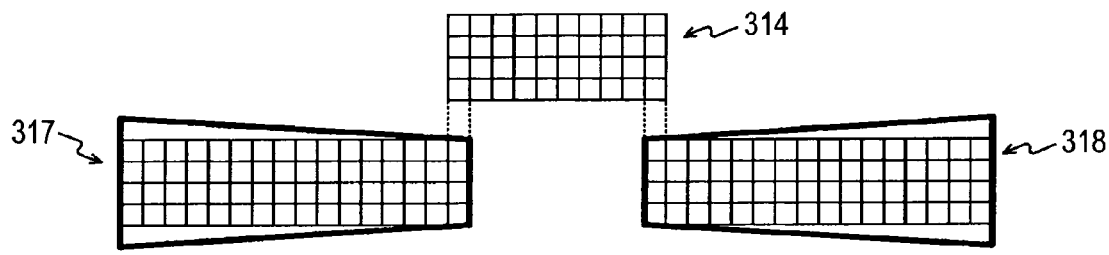
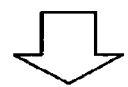
FIG.26B
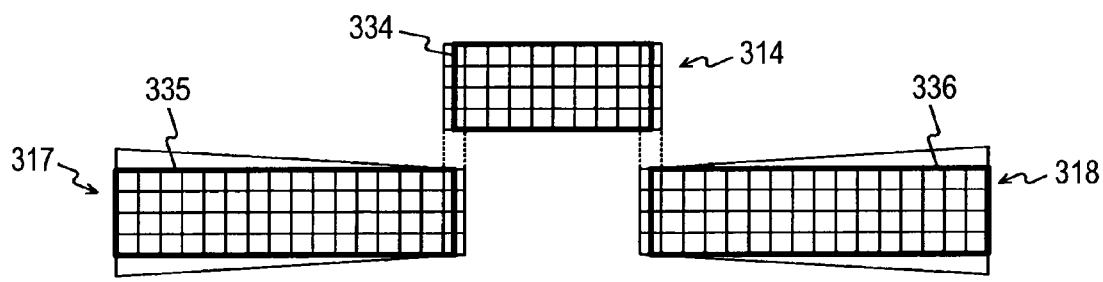
FIG.26C
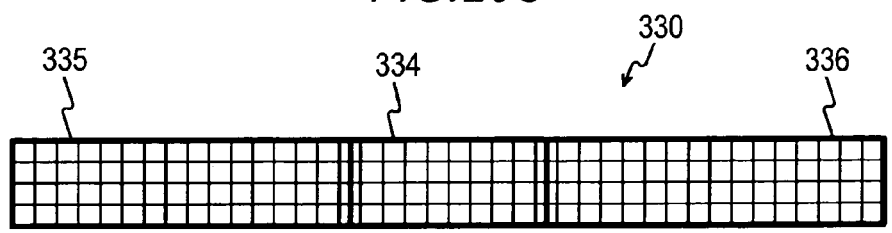

FIG.49A
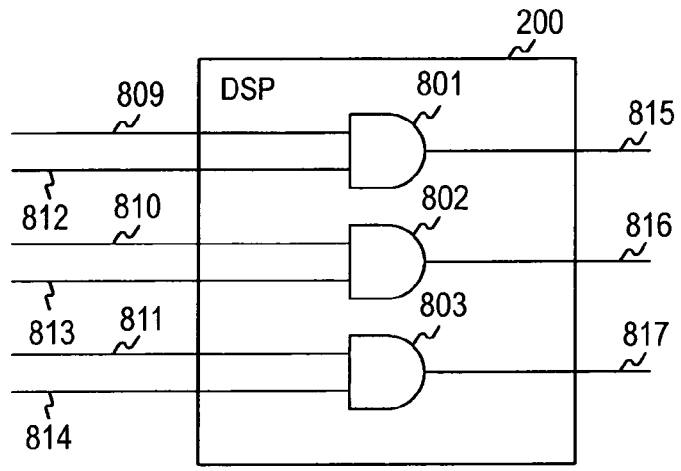
FIG.49B
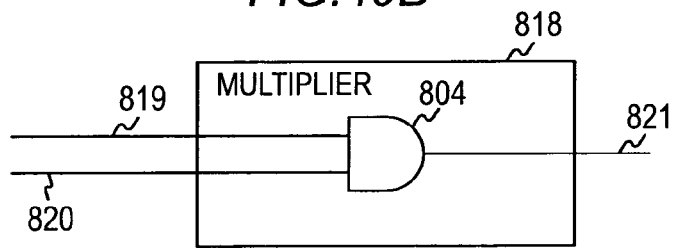
FIG.49C
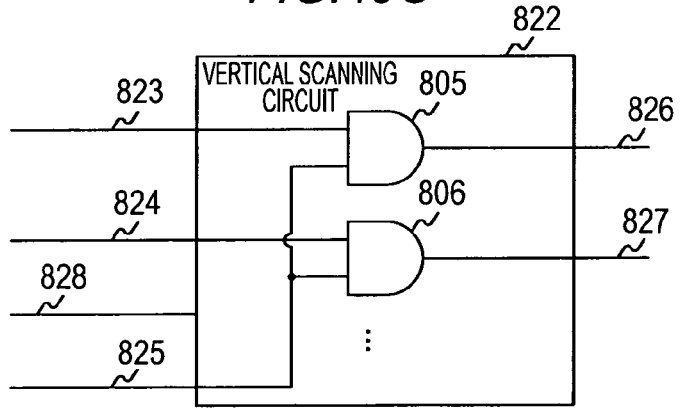
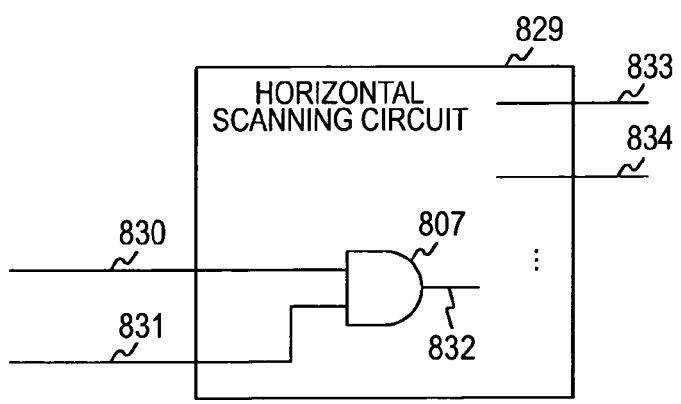

FIG.50

| CONTROL LINE NAME | CONTROL TARGET | CONTROL METHOD 1 | CONTROL METHOD 2 | CONTROL METHOD 3 | CONTROL METHOD 4 | CONTROL METHOD 5 |
|---|---|---|---|---|---|---|
| POWER ON/OFF CONTROL LINE | CENTRAL IMAGING SYSTEM | ON | ON | ON | ON | ON |
| | LEFT AND RIGHT IMAGING SYSTEM | OFF | ON | ON | ON | ON |
| CLOCK SIGNAL LINE | CENTRAL IMAGING SYSTEM | | SUPPLY | SUPPLY | SUPPLY | SUPPLY |
| | LEFT AND RIGHT IMAGING SYSTEM | | DO NOT SUPPLY | SUPPLY | SUPPLY | SUPPLY |
| RESET SIGNAL LINE | CENTRAL IMAGING SYSTEM | | | DISABLE | DISABLE | DISABLE |
| | LEFT AND RIGHT IMAGING SYSTEM | | | DO NOT DISABLE | DISABLE | DISABLE |
| IMAGING ON/OFF CONTROL LINE | CENTRAL IMAGING SYSTEM | | | | ON | ON |
| | LEFT AND RIGHT IMAGING SYSTEM | | | | OFF | ON |
| VERTICAL AND HORIZONTAL SYNCHRONIZATION SIGNAL | CENTRAL IMAGING SYSTEM | | | | | TOGGLE |
| | LEFT AND RIGHT IMAGING SYSTEM | | | | | H FIXED OR L FIXED |

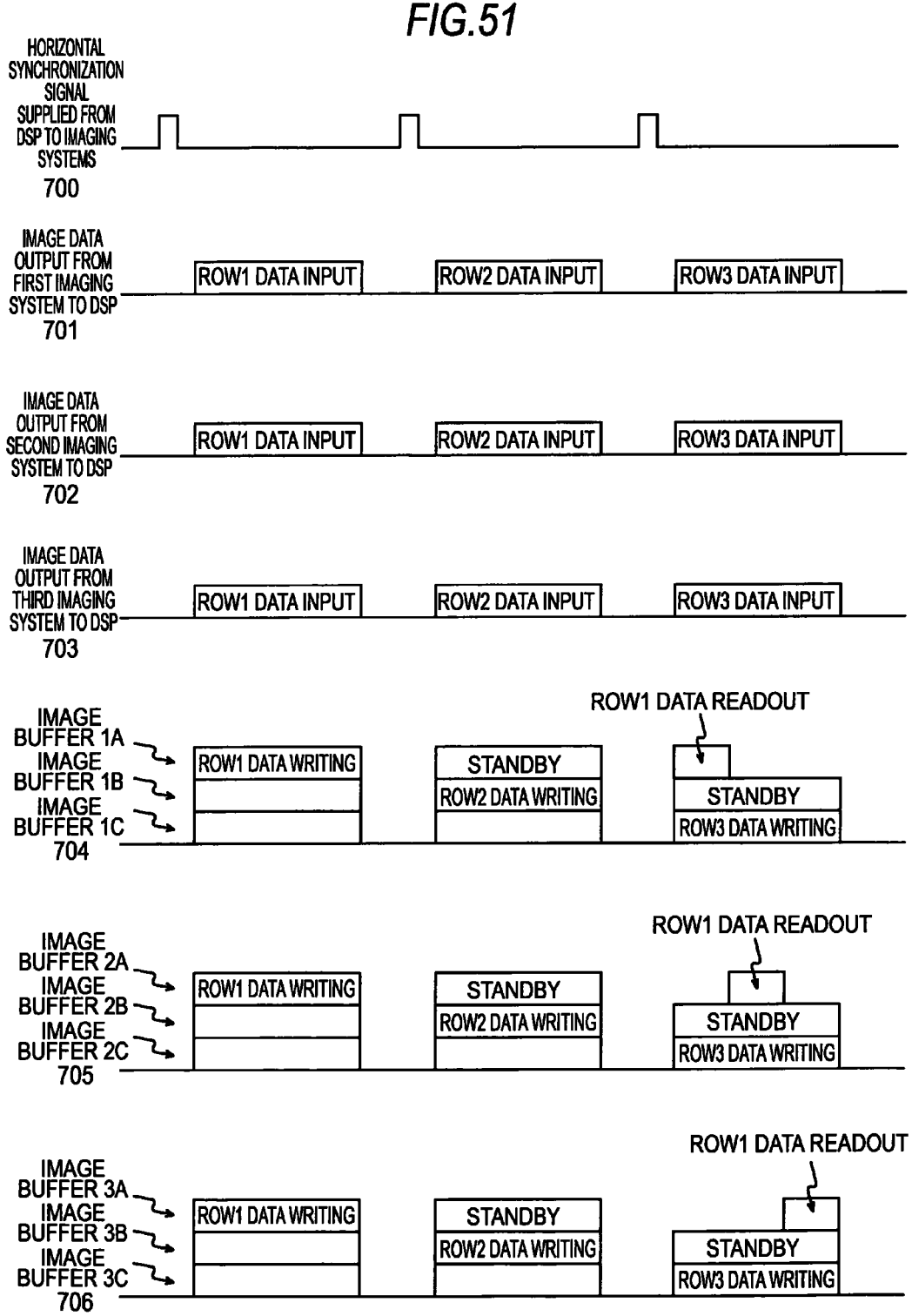

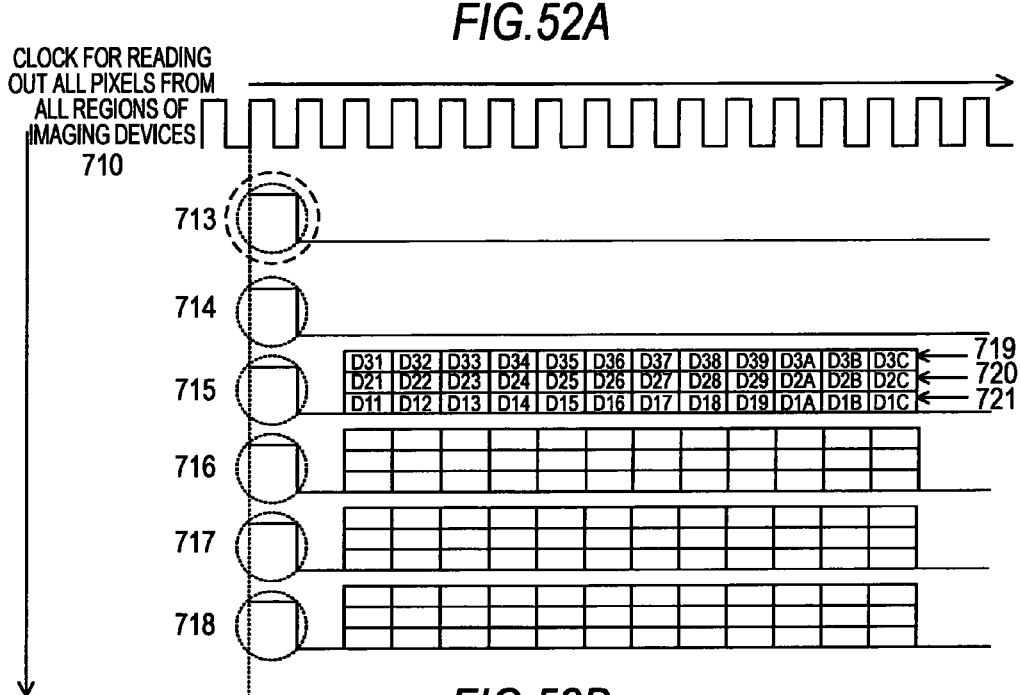
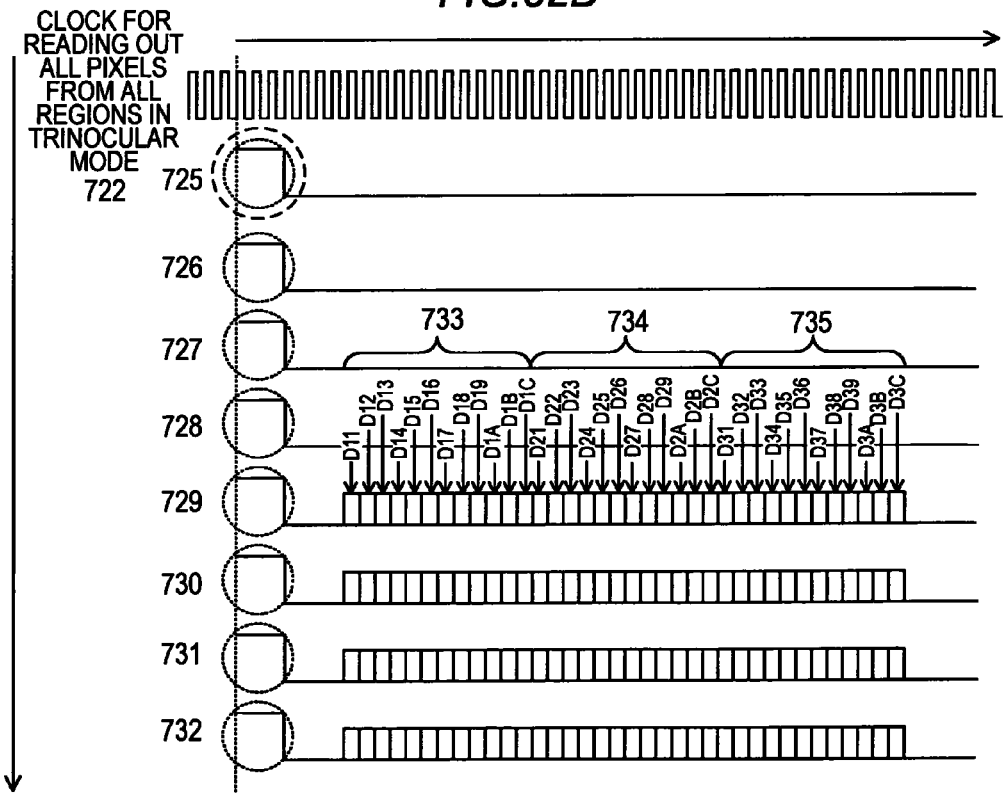

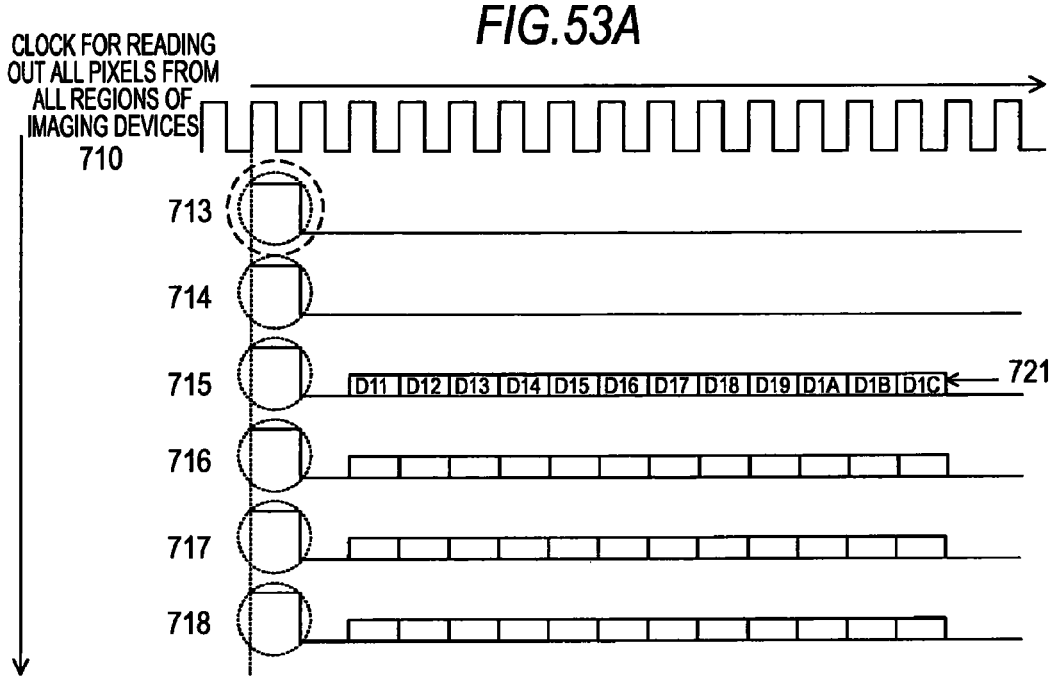
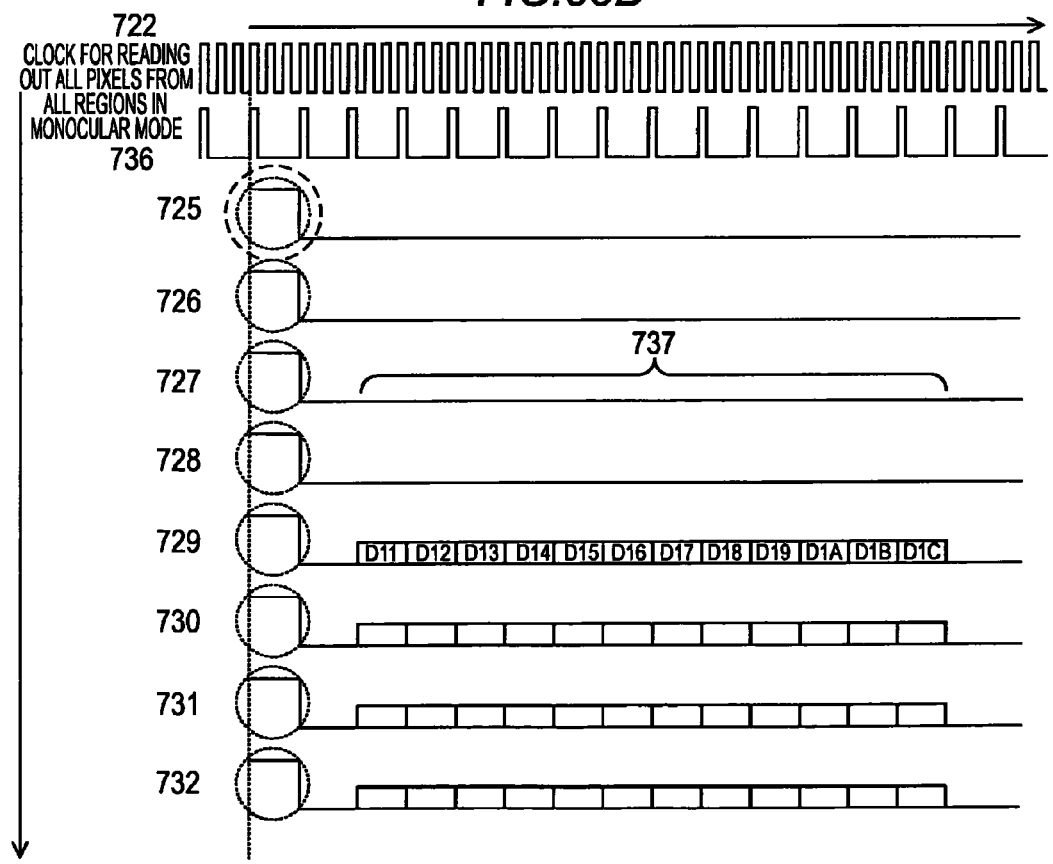

FIG.57

| DISPLAY DEVICE ORIENTATION | IMAGING OPERATION | | IMAGE SIZE | BEFORE H (PIXEL) DECIMATION | BEFORE V (PIXEL) DECIMATION | R | B (bit) | F (fps) | K | D (bit) | Fclk min | Fclk max |
|---|---|---|---|---|---|---|---|---|---|---|---|---|
| HORIZONTAL | IMAGE RECORDING OPERATION | | TRINOCULAR HORIZONTAL WIDE-ANGLE | H1sr | V1sr | R1sr | B1sr | F1sr | K1sr | D1sr | Fclk_min=(H×V×R×B×F×K×1.0)/(D-Dmoolb) | Fclk_max=(H×V×R×B×F×K×2.0)/(D-Dmoolb) |
| | | | TRINOCULAR HORIZONTAL NARROW-ANGLE | H2sr | V2sr | R2sr | B2sr | F2sr | K2sr | D2sr | | |
| | | | MONOCULAR HORIZONTAL | H3sr | V3sr | R3sr | B3sr | F3sr | K3sr | D3sr | | |
| | | | MONOCULAR VERTICAL LARGE-AREA | H4sr | V4sr | R4sr | B4sr | F4sr | K4sr | D4sr | | |
| | | | MONOCULAR VERTICAL SMALL-AREA | H5sr | V5sr | R5sr | B5sr | F5sr | K5sr | D5sr | | |
| | MONITORING OPERATION | | TRINOCULAR HORIZONTAL WIDE-ANGLE | H1sm | V1sm | R1sm | B1sm | F1sm | K1sm | D1sm | | |
| | | | TRINOCULAR HORIZONTAL NARROW-ANGLE | H2sm | V2sm | R2sm | B2sm | F2sm | K2sm | D2sm | | |
| | | | MONOCULAR HORIZONTAL | H3sm | V3sm | R3sm | B3sm | F3sm | K3sm | D3sm | | |
| | | | MONOCULAR VERTICAL LARGE-AREA | H4sm | V4sm | R4sm | B4sm | F4sm | K4sm | D4sm | | |
| | | | MONOCULAR VERTICAL SMALL-AREA | H5sm | V5sm | R5sm | B5sm | F5sm | K5sm | D5sm | | |
| VERTICAL | IMAGE RECORDING OPERATION | | TRINOCULAR HORIZONTAL NARROW-ANGLE | H6sr | V6sr | R6sr | B6sr | F6sr | K6sr | D6sr | | |
| | | | MONOCULAR HORIZONTAL | H7sr | V7sr | R7sr | B7sr | F7sr | K7sr | D7sr | | |
| | | | MONOCULAR VERTICAL LARGE-AREA | H8sr | V8sr | R8sr | B8sr | F8sr | K8sr | D8sr | | |
| | | | MONOCULAR VERTICAL SMALL-AREA | H9sr | V9sr | R9sr | B9sr | F9sr | K9sr | D9sr | | |
| | MONITORING OPERATION | | TRINOCULAR HORIZONTAL NARROW-ANGLE | H6sm | V6sm | R6sm | B6sm | F6sm | K6sm | D6sm | | |
| | | | MONOCULAR HORIZONTAL | H7sm | V7sm | R7sm | B7sm | F7sm | K7sm | D7sm | | |
| | | | MONOCULAR VERTICAL LARGE-AREA | H8sm | V8sm | R8sm | B8sm | F8sm | K8sm | D8sm | | |
| | | | MONOCULAR VERTICAL SMALL-AREA | H9sm | V9sm | R9sm | B9sm | F9sm | K9sm | D9sm | | |

FIG.58

| DISPLAY DEVICE ORIENTATION | IMAGING OPERATION | IMAGE SIZE | BEFORE H (PIXEL) DECIMATION | BEFORE V (PIXEL) DECIMATION | BEFORE PIXEL COUNT (M.PIXEL) DECIMATION | R | AFTER H (PIXEL) DECIMATION | AFTER V (PIXEL) DECIMATION | AFTER PIXEL COUNT (M.PIXEL) DECIMATION | B (bit) | F (fps) | K | D (bit) | Fclk min | Fclk max |
|---|---|---|---|---|---|---|---|---|---|---|---|---|---|---|---|
| HORIZONTAL | IMAGE RECORDING OPERATION | TRINOCULAR HORIZONTAL WIDE-ANGLE | 5280 | 1440 | 7.60 | 1 | 5760 | 1440 | 7.60 | 12 | 30 | 12 | 128 | 273.7 | 547.4 |
| | | TRINOCULAR HORIZONTAL NARROW-ANGLE | 1920 | 1440 | 2.76 | 1 | 1920 | 1440 | 2.76 | 12 | 30 | 12 | 128 | 99.5 | 199.1 |
| | | MONOCULAR HORIZONTAL | 1440 | 1080 | 1.56 | 1 | 1920 | 1440 | 1.56 | 12 | 30 | 12 | 128 | 56.0 | 112.0 |
| | | MONOCULAR VERTICAL LARGE-AREA | 1440 | 1920 | 2.76 | 1 | 1080 | 1440 | 2.76 | 12 | 30 | 12 | 128 | 99.5 | 199.1 |
| | | MONOCULAR VERTICAL SMALL-AREA | 480 | 640 | 0.31 | 1 | 480 | 640 | 0.31 | 12 | 30 | 12 | 128 | 11.1 | 22.1 |
| | MONITORING OPERATION | TRINOCULAR HORIZONTAL WIDE-ANGLE | 5280 | 1440 | 7.60 | 0.0313 | 660 | 360 | 0.24 | 10 | 30 | 6 | 128 | 3.4 | 6.8 |
| | | TRINOCULAR HORIZONTAL NARROW-ANGLE | 1920 | 1440 | 2.76 | 0.0625 | 480 | 360 | 0.17 | 10 | 30 | 6 | 128 | 2.5 | 4.9 |
| | | MONOCULAR HORIZONTAL | 1440 | 1080 | 1.56 | 0.0625 | 360 | 270 | 0.10 | 10 | 30 | 6 | 128 | 1.4 | 2.8 |
| | | MONOCULAR VERTICAL LARGE-AREA | 1440 | 1920 | 2.76 | 0.125 | 720 | 480 | 0.35 | 10 | 30 | 6 | 128 | 4.9 | 9.9 |
| | | MONOCULAR VERTICAL SMALL-AREA | 480 | 640 | 0.31 | 1 | 480 | 640 | 0.31 | 10 | 30 | 6 | 128 | 4.4 | 8.8 |
| VERTICAL | IMAGE RECORDING OPERATION | TRINOCULAR HORIZONTAL NARROW-ANGLE | 1920 | 1440 | 2.76 | 1 | 1920 | 1440 | 2.76 | 12 | 30 | 12 | 128 | 99.5 | 199.1 |
| | | MONOCULAR HORIZONTAL | 1440 | 1080 | 1.56 | 1 | 1920 | 1440 | 1.56 | 12 | 30 | 12 | 128 | 56.0 | 112.0 |
| | | MONOCULAR VERTICAL LARGE-AREA | 1440 | 1920 | 2.76 | 1 | 1080 | 1440 | 2.76 | 12 | 30 | 12 | 128 | 99.5 | 199.1 |
| | | MONOCULAR VERTICAL SMALL-AREA | 480 | 640 | 0.31 | 1 | 480 | 640 | 0.31 | 12 | 30 | 12 | 128 | 11.1 | 22.1 |
| | MONITORING OPERATION | MONOCULAR HORIZONTAL | 1440 | 1080 | 1.56 | 0.25 | 480 | 360 | 0.17 | 10 | 30 | 6 | 128 | 2.5 | 4.9 |
| | | MONOCULAR VERTICAL LARGE-AREA | 1440 | 1920 | 2.76 | 0.25 | 720 | 540 | 0.39 | 10 | 30 | 6 | 128 | 5.6 | 11.1 |
| | | MONOCULAR VERTICAL LARGE-AREA | 1440 | 1920 | 2.76 | 0.25 | 720 | 960 | 0.69 | 10 | 30 | 6 | 128 | 9.9 | 19.7 |
| | | MONOCULAR VERTICAL SMALL-AREA | 480 | 640 | 0.31 | 1 | 480 | 640 | 0.31 | 10 | 30 | 6 | 128 | 4.4 | 8.8 |

FIG.61

| DISPLAY DEVICE ORIENTATION | IMAGING OPERATION | | IMAGE SIZE | BEFORE H (PIXEL) DECIMATION | BEFORE V (PIXEL) DECIMATION | BEFORE PIXEL COUNT (MPIXEL) DECIMATION | R | AFTER H (PIXEL) DECIMATION | AFTER V (PIXEL) DECIMATION | AFTER PIXEL COUNT (MPIXEL) DECIMATION | B (bit) | F (fps) | K | D (bit) | Fclk min | Fclk max |
|---|---|---|---|---|---|---|---|---|---|---|---|---|---|---|---|---|
| HORIZONTAL | STILL IMAGE RECORDING OPERATION | | TRINOCULAR HORIZONTAL WIDE-ANGLE | 5280 | 1440 | 7.60 | 1 | 5760 | 1440 | 7.60 | 12 | 1 | 12 | 128 | 9.1 | 18.2 |
| | | | TRINOCULAR HORIZONTAL NARROW-ANGLE | 1920 | 1440 | 2.76 | 1 | 1920 | 1440 | 2.76 | 12 | 1 | 12 | 128 | 3.3 | 6.6 |
| | | | MONOCULAR HORIZONTAL | 1440 | 1080 | 1.56 | 1 | 1920 | 1440 | 1.56 | 12 | 1 | 12 | 128 | 1.9 | 3.7 |
| | | | MONOCULAR VERTICAL LARGE-AREA | 1440 | 1920 | 2.76 | 1 | 1080 | 1440 | 2.76 | 12 | 1 | 12 | 128 | 3.3 | 6.6 |
| | | | MONOCULAR VERTICAL SMALL-AREA | 480 | 640 | 0.31 | 1 | 480 | 640 | 0.31 | 12 | 1 | 12 | 128 | 0.4 | 0.7 |
| | MONITORING OPERATION | | TRINOCULAR HORIZONTAL WIDE-ANGLE | 5280 | 1440 | 7.60 | 0.0313 | 660 | 360 | 0.24 | 10 | 30 | 6 | 128 | 3.4 | 6.8 |
| | | | TRINOCULAR HORIZONTAL NARROW-ANGLE | 1920 | 1440 | 2.76 | 0.0625 | 480 | 360 | 0.17 | 10 | 30 | 6 | 128 | 2.5 | 4.9 |
| | | | MONOCULAR HORIZONTAL | 1440 | 1080 | 1.56 | 0.0625 | 360 | 270 | 0.10 | 10 | 30 | 6 | 128 | 1.4 | 2.8 |
| | | | MONOCULAR VERTICAL LARGE-AREA | 1440 | 1920 | 2.76 | 0.125 | 720 | 480 | 0.35 | 10 | 30 | 6 | 128 | 4.9 | 9.9 |
| | | | MONOCULAR VERTICAL SMALL-AREA | 480 | 640 | 0.31 | 1 | 480 | 640 | 0.31 | 10 | 30 | 6 | 128 | 4.4 | 8.8 |
| VERTICAL | STILL IMAGE RECORDING OPERATION | | TRINOCULAR HORIZONTAL NARROW-ANGLE | 1920 | 1440 | 2.76 | 1 | 1920 | 1440 | 2.76 | 12 | 1 | 12 | 128 | 3.3 | 6.6 |
| | | | MONOCULAR HORIZONTAL | 1440 | 1080 | 1.56 | 1 | 1920 | 1440 | 1.56 | 12 | 1 | 12 | 128 | 1.9 | 3.7 |
| | | | MONOCULAR VERTICAL LARGE-AREA | 1440 | 1920 | 2.76 | 1 | 1080 | 1440 | 2.76 | 12 | 1 | 12 | 128 | 3.3 | 6.6 |
| | | | MONOCULAR VERTICAL SMALL-AREA | 480 | 640 | 0.31 | 1 | 480 | 640 | 0.31 | 12 | 1 | 12 | 128 | 0.4 | 0.7 |
| | MONITORING OPERATION | | TRINOCULAR HORIZONTAL NARROW-ANGLE | 1920 | 1440 | 2.76 | 0.0625 | 480 | 360 | 0.17 | 10 | 30 | 6 | 128 | 2.5 | 4.9 |
| | | | MONOCULAR HORIZONTAL | 1440 | 1080 | 1.56 | 0.25 | 720 | 540 | 0.39 | 10 | 30 | 6 | 128 | 5.6 | 11.1 |
| | | | MONOCULAR VERTICAL LARGE-AREA | 1440 | 1920 | 2.76 | 0.25 | 720 | 960 | 0.69 | 10 | 30 | 6 | 128 | 9.9 | 19.7 |
| | | | MONOCULAR VERTICAL SMALL-AREA | 480 | 640 | 0.31 | 1 | 480 | 640 | 0.31 | 10 | 30 | 6 | 128 | 4.4 | 8.8 |

FIG.62

| DISPLAY DEVICE ORIENTATION | IMAGING OPERATION | IMAGE SIZE | BEFORE H (PIXEL) DECIMATION | BEFORE V (PIXEL) DECIMATION | BEFORE PIXEL COUNT (M.PIXEL) DECIMATION | R | AFTER H (PIXEL) DECIMATION | AFTER V (PIXEL) DECIMATION | AFTER PIXEL COUNT (M.PIXEL) DECIMATION | B (bit) | F (fps) | K | D (bit) | Fclk min | Fclk max |
|---|---|---|---|---|---|---|---|---|---|---|---|---|---|---|---|
| HORIZONTAL | VIDEO RECORDING OPERATION | TRINOCULAR HORIZONTAL WIDE-ANGLE | 5280 | 1440 | 7.60 | 0.25 | 2640 | 720 | 1.90 | 10 | 30 | 12 | 128 | 57.0 | 114.0 |
| | | TRINOCULAR HORIZONTAL NARROW-ANGLE | 1920 | 1440 | 2.76 | 1 | 1920 | 1440 | 2.76 | 10 | 30 | 12 | 128 | 82.9 | 165.9 |
| | | MONOCULAR HORIZONTAL | 1440 | 1080 | 1.56 | 1 | 1440 | 1440 | 1.56 | 10 | 30 | 12 | 128 | 46.7 | 93.3 |
| | | MONOCULAR VERTICAL LARGE-AREA | 1440 | 1920 | 2.76 | 1 | 1080 | 1440 | 2.76 | 10 | 30 | 12 | 128 | 82.9 | 165.9 |
| | | MONOCULAR VERTICAL SMALL-AREA | 480 | 640 | 0.31 | 1 | 480 | 640 | 0.31 | 10 | 30 | 12 | 128 | 9.2 | 18.4 |
| | MONITORING OPERATION | TRINOCULAR HORIZONTAL WIDE-ANGLE | 5280 | 1440 | 7.60 | 0.0313 | 660 | 360 | 0.24 | 10 | 30 | 6 | 128 | 3.4 | 6.8 |
| | | TRINOCULAR HORIZONTAL NARROW-ANGLE | 1920 | 1440 | 2.76 | 0.0625 | 480 | 360 | 0.17 | 10 | 30 | 6 | 128 | 2.5 | 4.9 |
| | | MONOCULAR HORIZONTAL | 1440 | 1080 | 1.56 | 0.0625 | 360 | 270 | 0.10 | 10 | 30 | 6 | 128 | 1.4 | 2.8 |
| | | MONOCULAR VERTICAL LARGE-AREA | 1440 | 1920 | 2.76 | 0.125 | 720 | 480 | 0.35 | 10 | 30 | 6 | 128 | 4.9 | 9.9 |
| | | MONOCULAR VERTICAL SMALL-AREA | 480 | 640 | 0.31 | 1 | 480 | 640 | 0.31 | 10 | 30 | 6 | 128 | 4.4 | 8.8 |
| VERTICAL | VIDEO RECORDING OPERATION | TRINOCULAR HORIZONTAL NARROW-ANGLE | 1920 | 1440 | 2.76 | 1 | 1920 | 1440 | 2.76 | 10 | 30 | 12 | 128 | 82.9 | 165.9 |
| | | MONOCULAR HORIZONTAL | 1440 | 1080 | 1.56 | 1 | 1920 | 1440 | 1.56 | 10 | 30 | 12 | 128 | 46.7 | 93.3 |
| | | MONOCULAR VERTICAL LARGE-AREA | 1440 | 1920 | 2.76 | 1 | 1080 | 1440 | 2.76 | 10 | 30 | 12 | 128 | 82.9 | 165.9 |
| | | MONOCULAR VERTICAL SMALL-AREA | 480 | 640 | 0.31 | 1 | 480 | 640 | 0.31 | 10 | 30 | 12 | 128 | 9.2 | 18.4 |
| | MONITORING OPERATION | TRINOCULAR HORIZONTAL NARROW-ANGLE | 1920 | 1440 | 2.76 | 0.0625 | 480 | 360 | 0.17 | 10 | 30 | 6 | 128 | 2.5 | 4.9 |
| | | MONOCULAR HORIZONTAL | 1440 | 1080 | 1.56 | 0.25 | 720 | 540 | 0.39 | 10 | 30 | 6 | 128 | 5.6 | 11.1 |
| | | MONOCULAR VERTICAL LARGE-AREA | 1440 | 1920 | 2.76 | 0.25 | 720 | 960 | 0.69 | 10 | 30 | 6 | 128 | 9.9 | 19.7 |
| | | MONOCULAR VERTICAL SMALL-AREA | 480 | 640 | 0.31 | 1 | 480 | 640 | 0.31 | 10 | 30 | 6 | 128 | 4.4 | 8.8 |

DISPLAY EXAMPLE WHEN SECOND CASING IS IN HORIZONTAL STATE

DISPLAY EXAMPLE WHEN SECOND CASING IS IN HORIZONTAL STATE

DISPLAY EXAMPLE WHEN SECOND CASING IS IN VERTICAL STATE

DISPLAY EXAMPLE WHEN SECOND CASING IS IN HORIZONTAL STATE

DISPLAY EXAMPLE WHEN SECOND CASING IS IN VERTICAL STATE

DISPLAY EXAMPLE WHEN SECOND CASING IS IN HORIZONTAL STATE

DISPLAY EXAMPLE WHEN SECOND CASING IS IN VERTICAL STATE

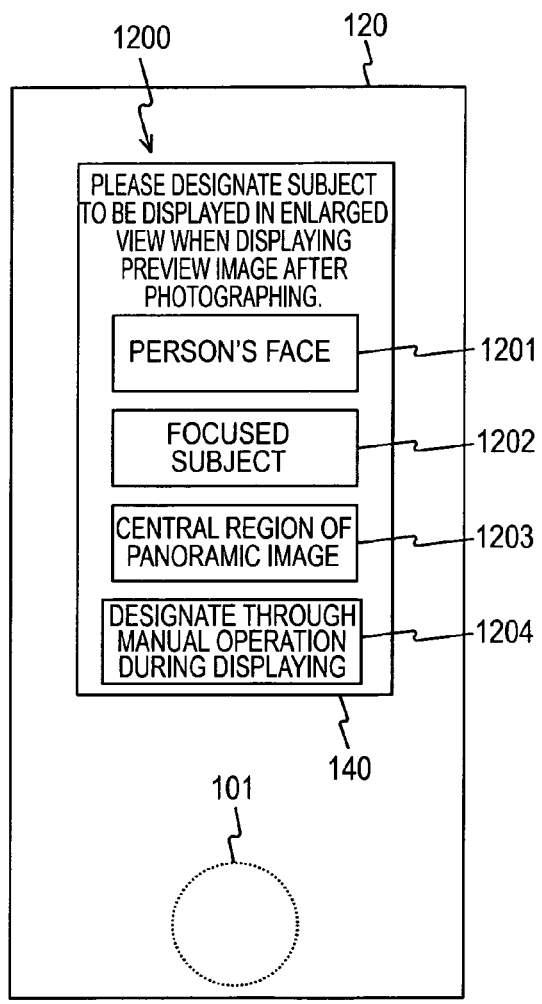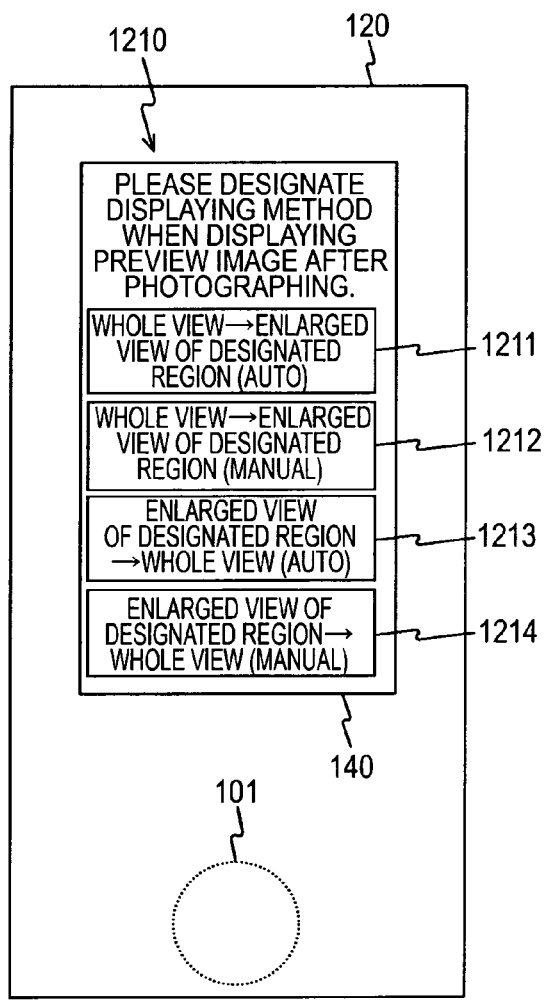

FIG.78A
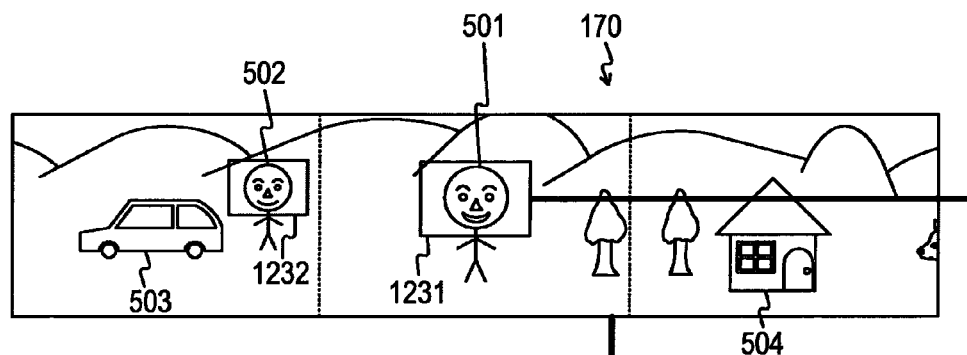
FIG.78B
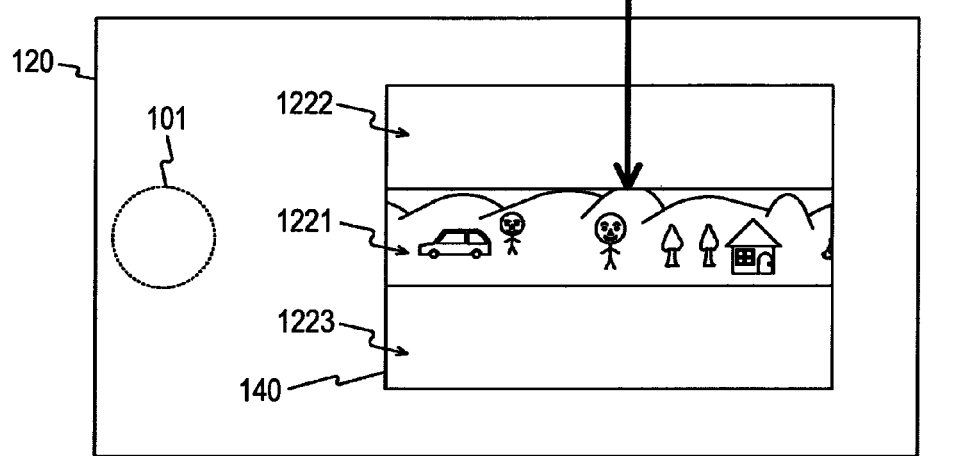
FIG.78C ⬇ AFTER PREDETERMINED PERIOD HAS ELAPSED
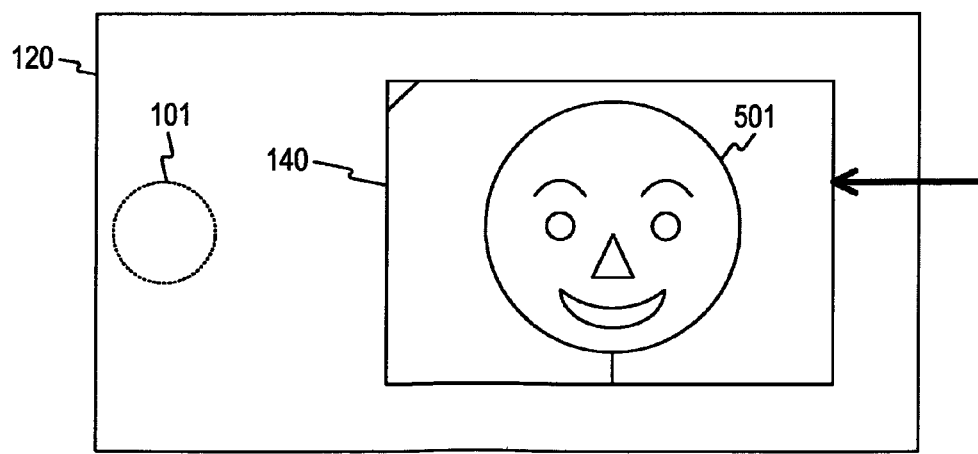

FIG. 79A
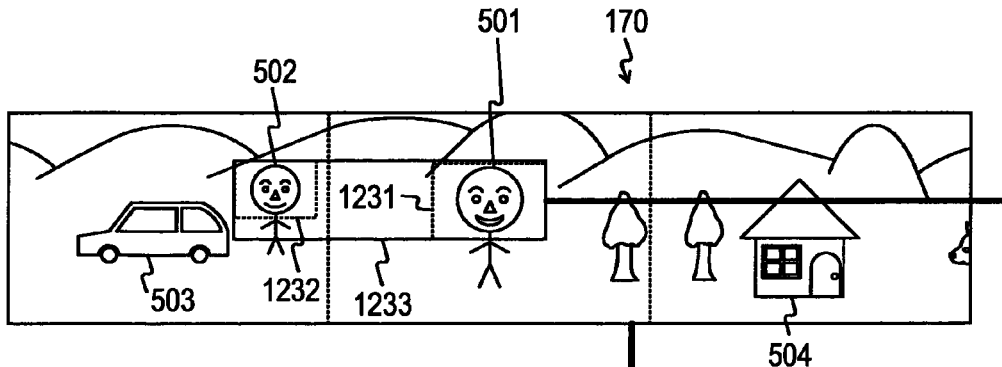
FIG. 79B
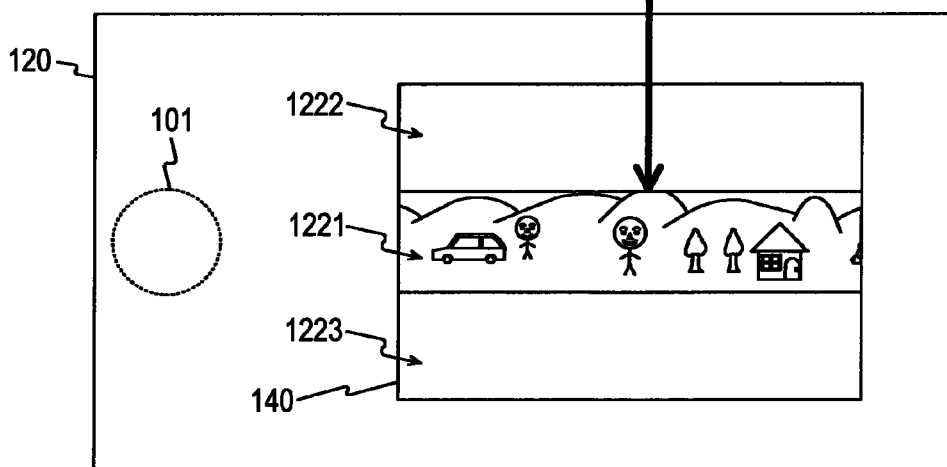
FIG. 79C ⇩ AFTER PREDETERMINED PERIOD HAS ELAPSED
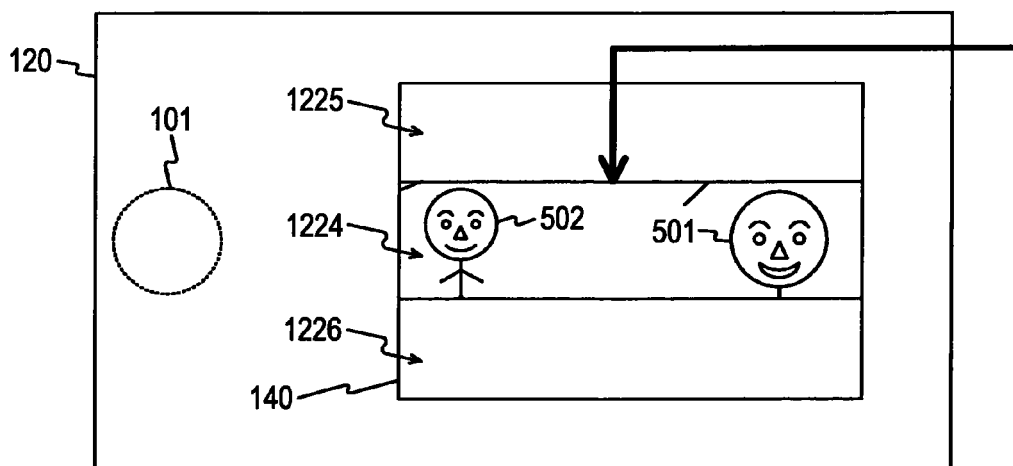

AFTER PREDETERMINED PERIOD HAS ELAPSED

AFTER PREDETERMINED PERIOD HAS ELAPSED

FIG.83A
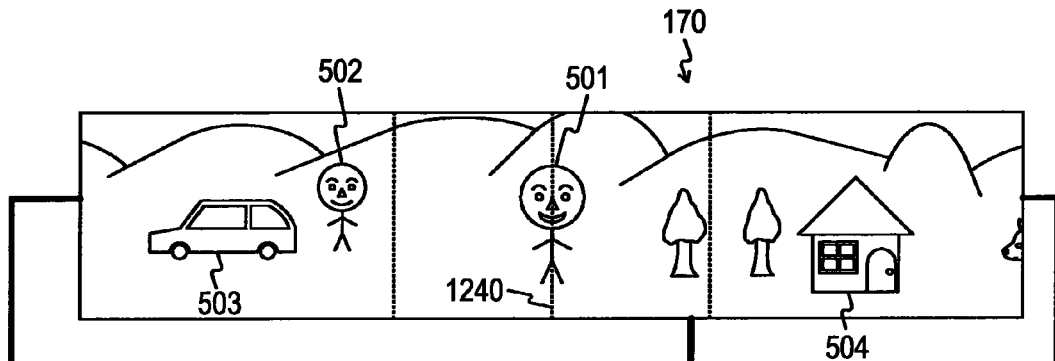
FIG.83B
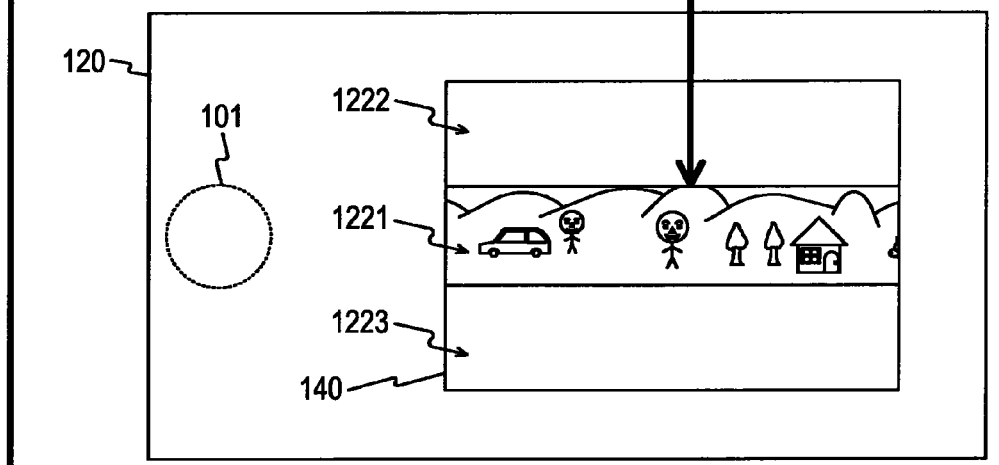
FIG.83C  ⬇ AFTER PREDETERMINED PERIOD HAS ELAPSED
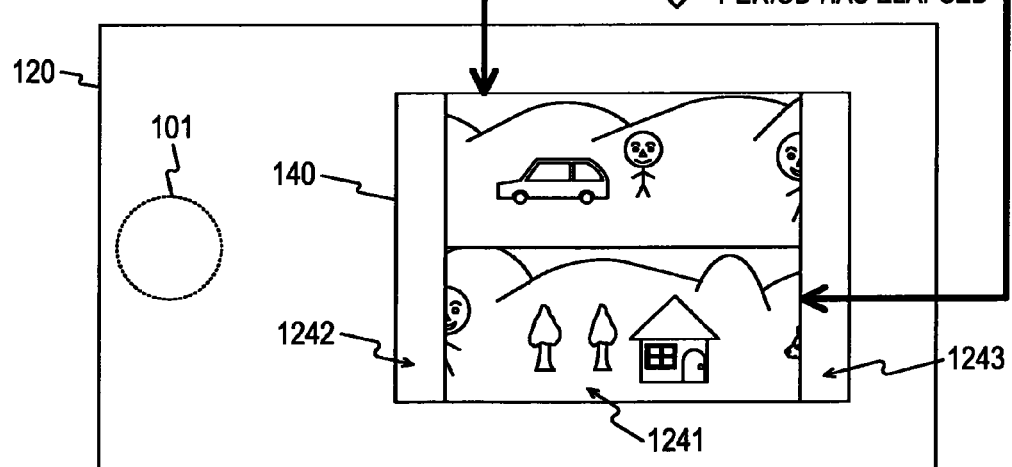

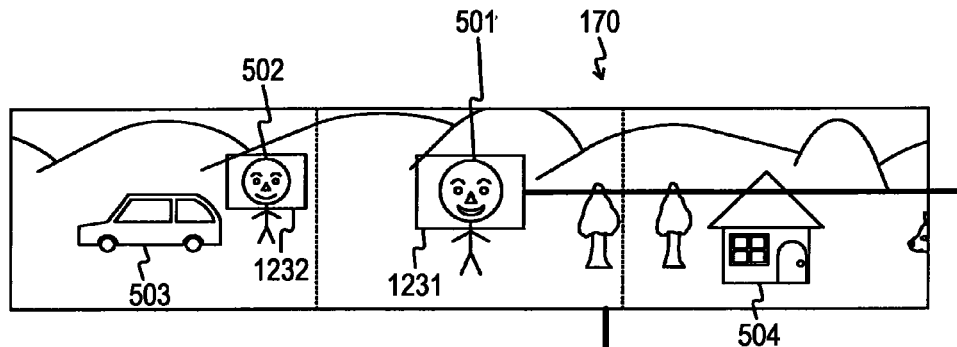
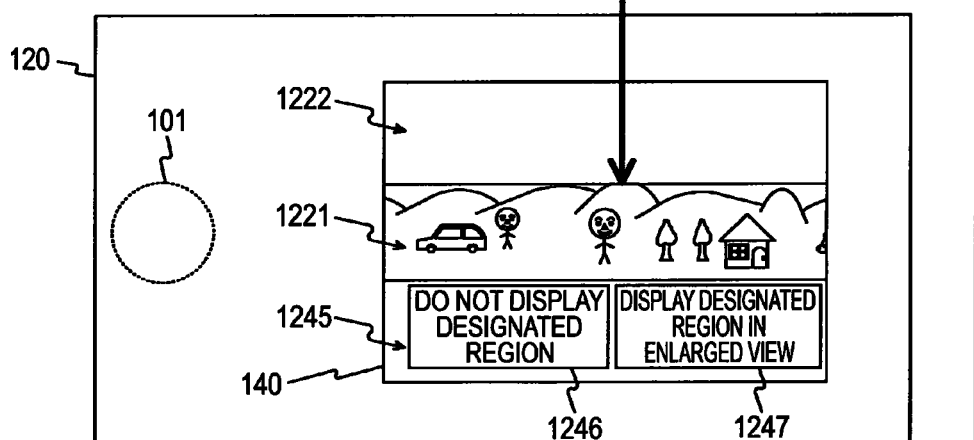
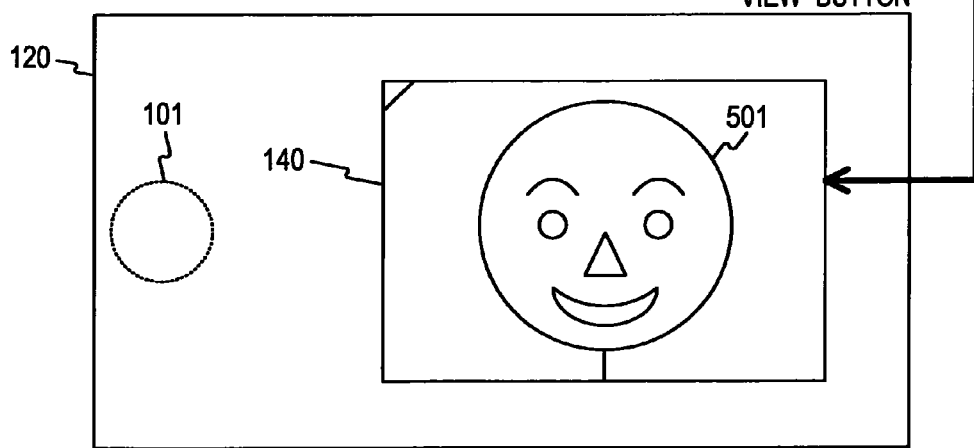

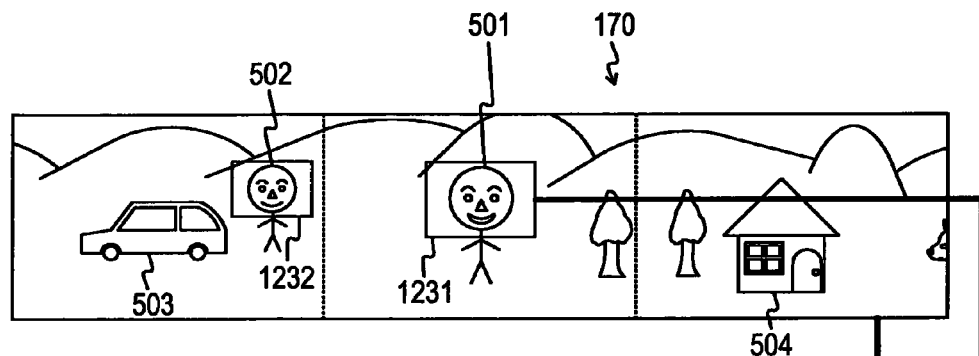
FIG.85A
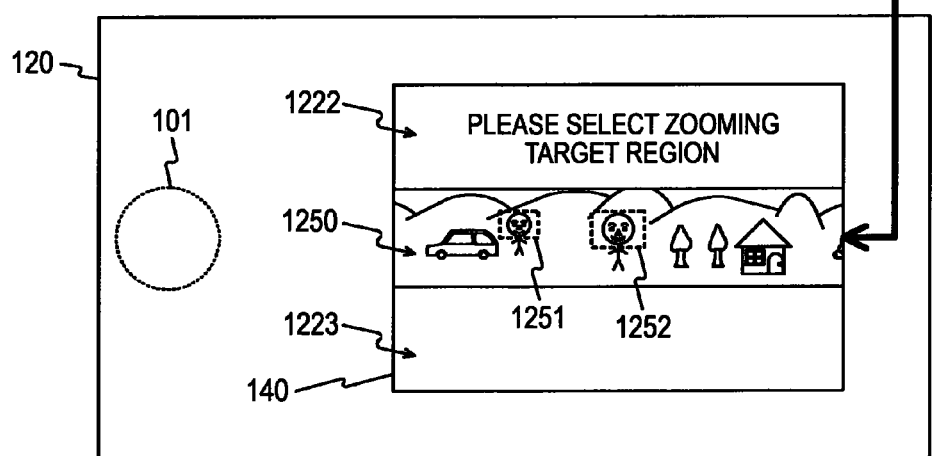
FIG.85B
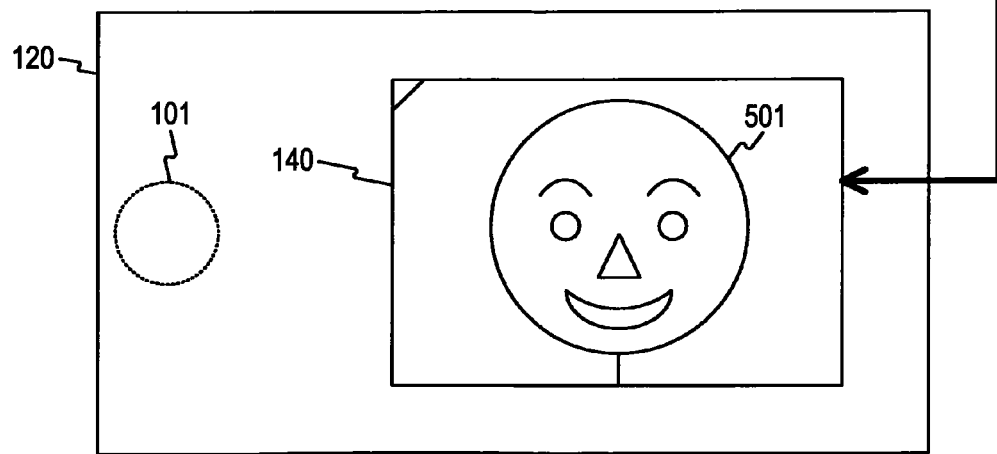
FIG.85C  AFTER MARK 1252 IS SELECTED

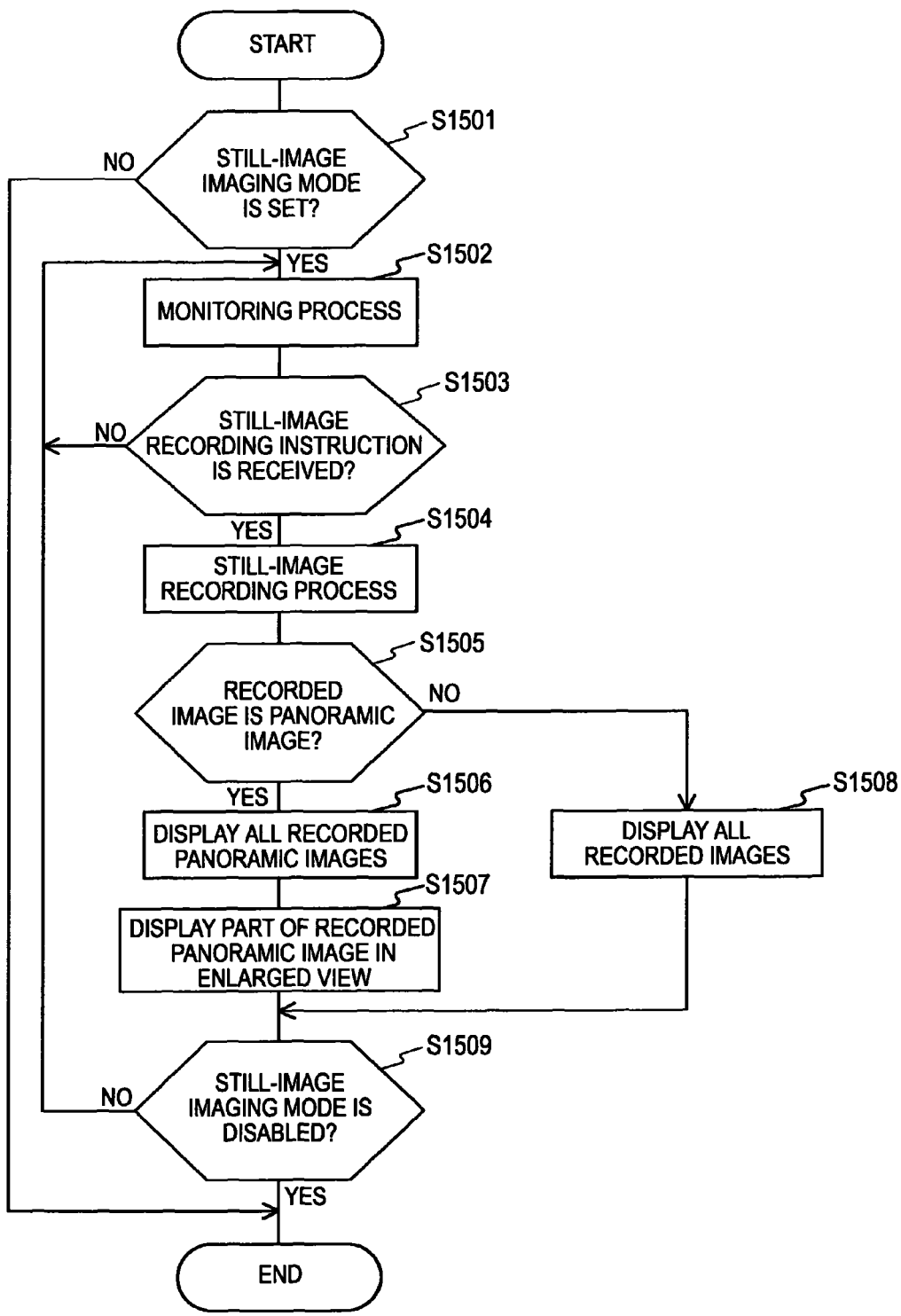

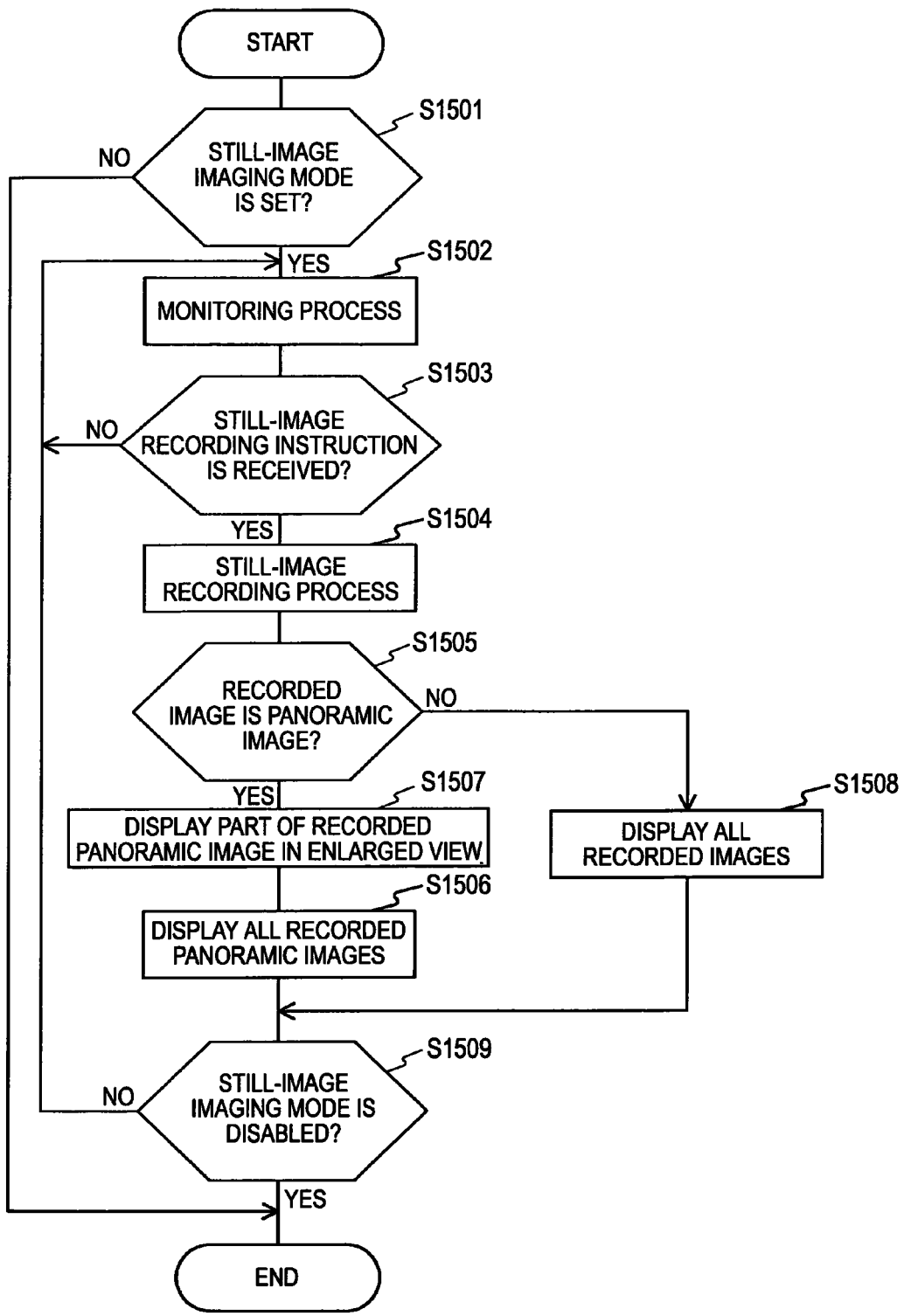

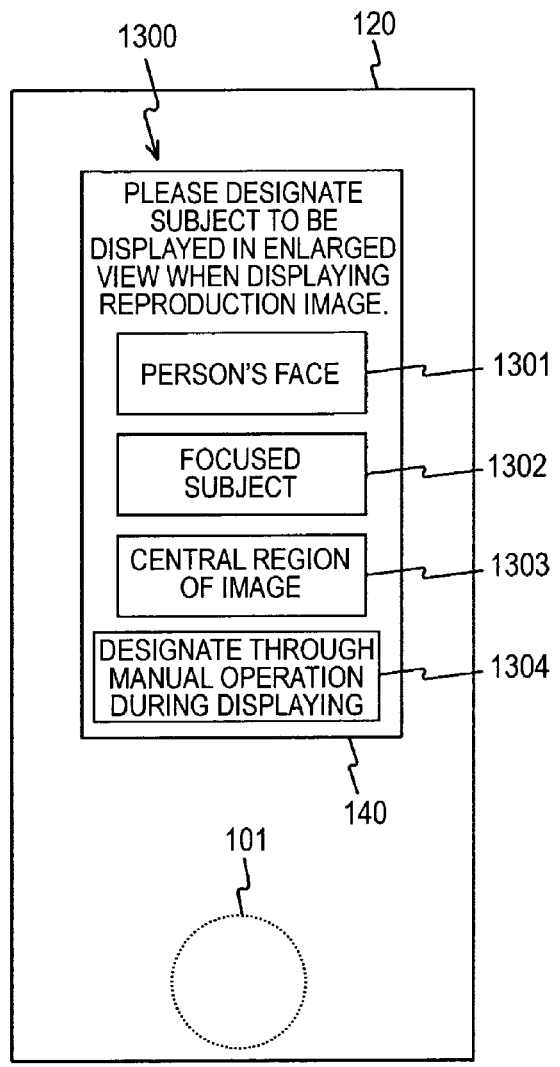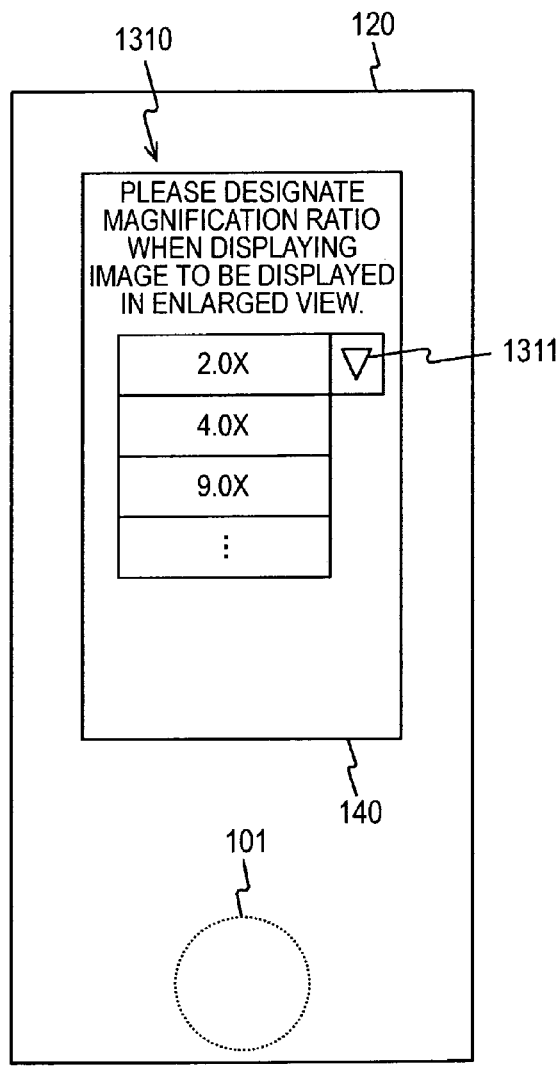

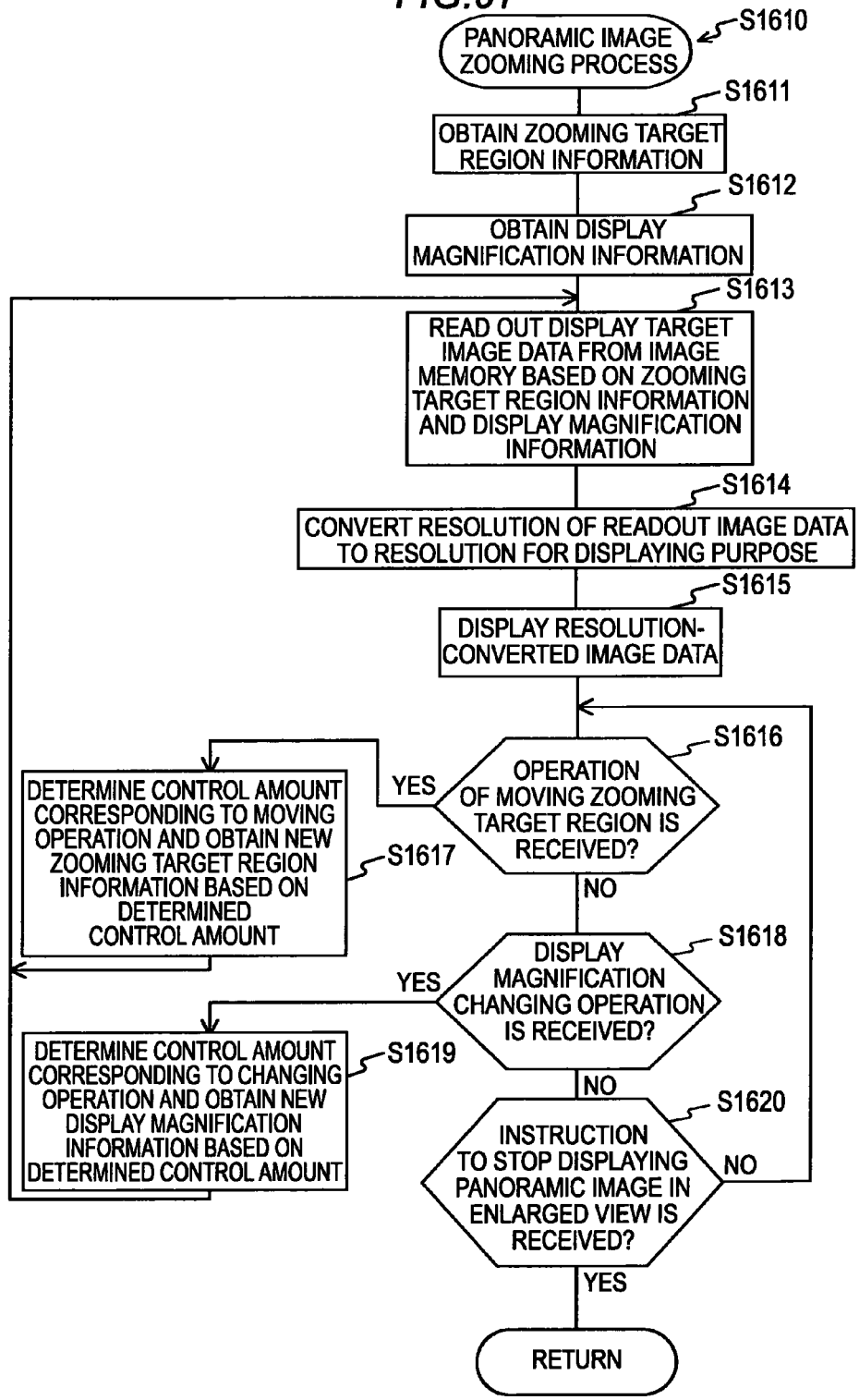

IMAGING APPARATUS, IMAGE PROCESSING APPARATUS, IMAGE PROCESSING METHOD, AND PROGRAM

BACKGROUND OF THE INVENTION

1. Field of the Invention

The present invention relates to an imaging apparatus, and more particularly, to an imaging apparatus for displaying images, an image processing apparatus, a processing method in these apparatuses, and a program for causing a computer to execute the method.

2. Description of the Related Art

In recent years, imaging apparatuses such as digital still cameras or digital video cameras (for example, camcorders) which include an imaging system for imaging a subject such as a person and which record images (captured images) generated by the imaging system as image files have become popularized.

Moreover, imaging apparatuses capable of generating an image (for example, a panoramic image) in which an imaging range is relatively widened in a particular direction by combining a plurality of captured images together have been proposed. For example, an imaging apparatus which includes three imaging systems and which generates a panoramic image by arranging images output from the respective imaging systems in a line and combining the images together has been proposed (for example, see FIG. 6 of JP-A-2007-166317).

SUMMARY OF THE INVENTION

According to the related art technique described above, a panoramic image can be photographed easily. Therefore, for example, when photographing a scene in a tourist site at a travel destination in which plural persons dotted about in front of a famous building are included as a structural outline, a panoramic image including these respective persons can be photographed easily. The photographed panoramic image can be viewed by displaying the same panoramic image on a display section immediately after the photographing.

The panoramic image is an image which is long in a particular direction as compared to a normal captured image. Therefore, the whole structural outline can be viewed by reducing the panoramic image to a size smaller than a normal captured image. However, when the panoramic image is displayed in such a reduced size, subjects included in the panoramic image are displayed in a small size. Therefore, the faces of the respective persons included in the panoramic image are also reduced, and it is difficult to view the looks, appearance, and the like of the respective faces.

For example, as described above, when a scene is photographed in a tourist site at a travel destination, since the subject persons may move, it is important to photograph at the right time. Moreover, it is also important to view the structural outline and the desired subject as quick as possible after the panoramic image is photographed. Furthermore, the interest of a user may be further increased if the whole structural outline and the desired subject can be viewed in a correlated manner when the panoramic image is displayed.

Therefore, it is desirable to provide an appropriate representation in accordance with the kind of a captured image.

According to one embodiment of the present invention, there is provided an imaging apparatus, a processing method in the apparatus, and a program causing a computer to perform the method, the imaging apparatus including: an image generation section that generates at least one of a first captured image having a predetermined size and a second captured image having an aspect ratio different from that of the first captured image; a recording control section that, when an instruction operation to record the generated captured image is received, records the generated captured image based on the instruction operation; and a display control section that, when a captured image to be displayed at the time of displaying the recorded captured image on a display section is the second captured image, displays the second captured image and an enlarged image of a specific region in the second captured image on the display section in a correlated manner. With this configuration, when an instruction operation to record the generated captured image is received, the generated captured image is recorded based on the instruction operation; and when a captured image to be displayed at the time of displaying the recorded captured image on a display section is the second captured image, the second captured image and an enlarged image of a specific region in the second captured image are displayed in a correlated manner.

In this embodiment of the invention, when the captured image to be displayed is the second captured image, the display control section may sequentially display the second captured image and the enlarged image of the specific region in the second captured image on the display section in a predetermined order. With this configuration, when the captured image to be displayed is the second captured image, the second captured image and the enlarged image of the specific region in the second captured image are sequentially displayed in a predetermined order.

In this embodiment of the invention, when the captured image to be displayed is the second captured image, the display control section may display the second captured image and the enlarged image of the specific region in the second captured image on the display section at the same time. With this configuration, when the captured image to be displayed is the second captured image, the second captured image and the enlarged image of the specific region in the second captured image are displayed at the same time.

In this embodiment of the invention, the imaging apparatus may further include an operation receiving section that receives a designation operation to designate the specific region in the second captured image displayed on the display section, and, when the captured image to be displayed is the second captured image, the display control section may display the second captured image on the display section and then enlarges the image of the designated specific region to be displayed on the display section as the enlarged image. With this configuration, when the captured image to be displayed is the second captured image, the second captured image is displayed on the display section, and then, the image of the designated specific region is enlarged and displayed.

In this embodiment of the invention, the specific region may be a region in which a specific target object in the generated captured image is included. With this configuration, an enlarged image of a region in which a specific target object is included is displayed as the enlarged image of the specific region.

In this embodiment of the invention, the specific region may be a region in which a subject corresponding to a focusing position of the generated captured image is included. With this configuration, an enlarged image of a region in which a subject corresponding to a focusing position of the captured image is included is displayed as the enlarged image of the specific region.

In this embodiment of the invention, the display control section may display a captured image, which is recorded by a recording process after the recording control section finishes an operation of recording captured images, on the display section as the captured image to be displayed. With this configuration, a captured image which is recorded by a recording process after the recording control section finishes an operation of recording captured images is displayed.

In this embodiment of the invention, when the captured image to be displayed is the first captured image, the display control section may display only the first captured image on the display section. With this configuration, when the captured image to be displayed is the first captured image, only the first captured image is displayed.

In this embodiment of the invention, when the captured image to be displayed is the first captured image, and a predetermined operation is received after the first captured image is displayed on the display section, the display control section may display the first captured image and an enlarged image of a specific region in the first captured image on the display section in a correlated manner. With this configuration, when the captured image to be displayed is the first captured image, and a predetermined operation is received after the first captured image is displayed on the display section, the first captured image and an enlarged image of a specific region in the first captured image are displayed in a correlated manner.

In this embodiment of the invention, the display control section may set a magnification ratio of an enlarged image of a specific region in the second captured image displayed on the display section when the captured image to be displayed is the second captured image so as to be larger than a magnification ratio of an enlarged image of a specific region in the first captured image displayed on the display section when the captured image to be displayed is the first captured image. With this configuration, a magnification ratio of an enlarged image of a specific region when the captured image to be displayed is the second captured image is set to be larger than a magnification ratio of an enlarged image of a specific region when the captured image to be displayed is the first captured image.

In this embodiment of the invention, the image generation section may generate the first captured image using one imaging device and generate the second captured image by combining a plurality of captured images generated using a plurality of imaging devices. With this configuration, the first captured image is generated using one imaging device, and the second captured image is generated by combining a plurality of captured images generated using a plurality of imaging devices.

In this embodiment of the invention, the image generation section may generate a captured image having approximately the same aspect ratio as a display region of the display section as the first captured image. With this configuration, a captured image having approximately the same aspect ratio as a display region of the display section is generated as the first captured image.

According to another embodiment of the present invention, there is provided an image processing apparatus, a processing method in the apparatus, and a program causing a computer to perform the method, the image processing apparatus including: an operation receiving section that receives an instruction operation to display a desired captured image on a display section with respect to a first captured image having a predetermined size or a second captured image having an aspect ratio different from that of the first captured image; and a display control section that, when a captured image to be displayed on the display section based on the instruction operation is the second captured image, displays the second captured image and an enlarged image of a specific region in the second captured image on the display section in a correlated manner. With this configuration, when an instruction operation to display a desired captured image with respect to a first captured image or a second captured image, and a captured image to be displayed at the time of displaying the captured image based on the instruction operation is the second captured image, the second captured image and an enlarged image of a specific region in the second captured image are displayed in a correlated manner.

According to the embodiments of the present invention, it is possible to obtain an excellent effect that an appropriate representation can be provided in accordance with the kind of a captured image.

BRIEF DESCRIPTION OF THE DRAWINGS

FIG. 7 is a block diagram showing an internal configuration example of a DSP 200 according to the first embodiment of the present invention.

FIGS. 24A to 24C are diagrams schematically showing the flow of combination when the image combination processing section 224 generates a combined image according to the first embodiment of the present invention.

FIGS. 25A to 25C are diagrams schematically showing the flow of combination when the image combination processing section 224 generates a combined image according to the first embodiment of the present invention.

FIGS. 26A to 26C are diagrams schematically showing the flow of combination when the image combination processing section 224 generates a combined image according to the first embodiment of the present invention.

FIGS. 49A to 49C are block diagrams showing a functional configuration example of the mobile phone unit 100 according to the first embodiment of the present invention.

FIG. 50 is a diagram showing the relationship between a control method for stopping the operation of the imaging systems and the states of respective signal lines according to the first embodiment of the present invention.

FIG. 51 is a timing chart schematically showing output timings of the imaging devices and written states of image buffers according to the first embodiment of the present invention.

FIGS. 52A and 52B are diagrams showing the relationship between the clock frequencies for reading out respective pixels of the imaging devices and writing image data to image buffers and the clock frequencies for reading out image data from the image buffers according to the first embodiment of the present invention.

FIGS. 53A and 53B are diagrams showing the relationship between the clock frequencies for reading out respective pixels of the imaging devices and writing image data to image buffers and the clock frequencies for reading out image data from the image buffers according to the first embodiment of the present invention.

FIG. 57 is a diagram showing the parameters for determining the operation frequency of the data bus 204 for each imaging operation of the mobile phone unit 100 according to the first embodiment of the present invention.

FIG. 58 is a diagram showing an example of the parameters for determining the operation frequency of the data bus 204 for each imaging operation of the mobile phone unit 100 according to the first embodiment of the present invention.

FIG. 61 is a diagram showing an example of the parameters for determining the operation frequency of the data bus 204 for a still-image recording operation of the mobile phone unit 100 according to the first embodiment of the present invention.

FIG. 62 is a diagram showing an example of the parameters for determining the operation frequency of the data bus 204 for a video recording operation of the mobile phone unit 100 according to the first embodiment of the present invention.

FIGS. 77A and 77B are diagrams showing a display example of a setting screen for a postview operation of the display section 140 according to the first embodiment of the present invention.

FIGS. 78A to 78C are diagrams showing a display transition example of a postview image displayed on the display section 140 according to the first embodiment of the present invention.

FIGS. 79A to 79C are diagrams showing a display transition example of a postview image displayed on the display section 140 according to the first embodiment of the present invention.

FIGS. 83A to 83C are diagrams showing a display transition example of a postview image displayed on the display section 140 according to the first embodiment of the present invention.

FIGS. 84A to 84C are diagrams showing a display transition example of a postview image displayed on the display section 140 according to the first embodiment of the present invention.

FIGS. 85A to 85C are diagrams showing a display transition example of a postview image displayed on the display section 140 according to the first embodiment of the present invention.

FIG. 86 is a flowchart showing an example of the processing procedures of a postview image display process by the mobile phone unit 100 according to the first embodiment of the present invention.

FIG. 87 is a flowchart showing an example of the processing procedures of a postview image display process by the mobile phone unit 100 according to the first embodiment of the present invention.

FIGS. 91A and 91B are diagrams showing a display example of a setting screen for an image zooming operation of the display section 140 according to a second embodiment of the present invention.

FIG. 97 is a flowchart showing an example of a panoramic image zooming process among the processing procedures of the image display process by the mobile phone unit 100 according to the second embodiment of the present invention.

DESCRIPTION OF THE PREFERRED EMBODIMENTS

Hereinafter, modes for carrying out the present invention (hereinafter referred to as embodiments) will be described. The description will be given in the following order.

Figure 1A:
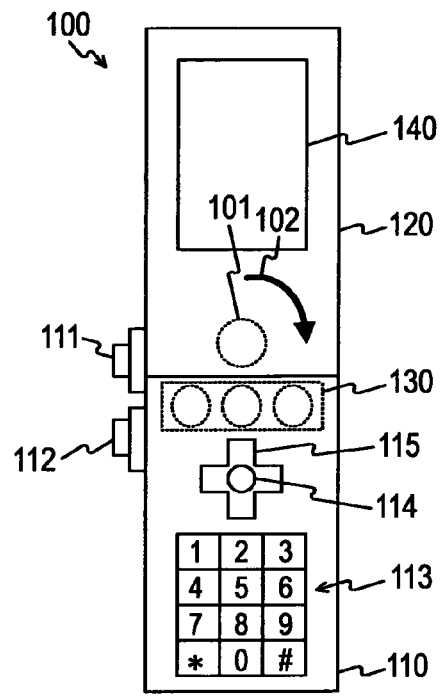
FIGS. 1A to 1D are diagrams showing an external configuration example of a mobile phone unit 100 according to a first embodiment of the present invention.
Figure 1B:
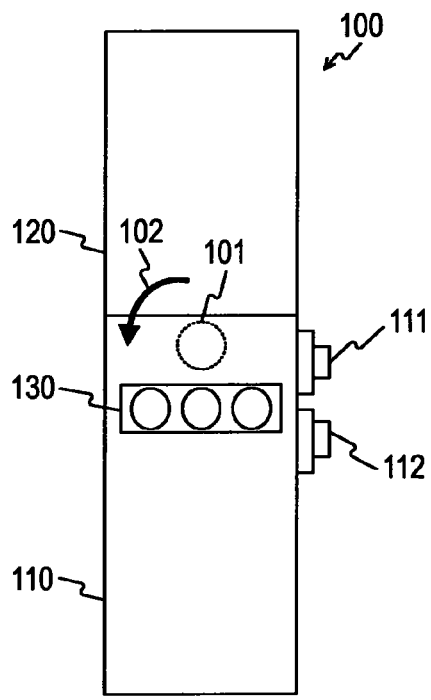
Figure 1C:
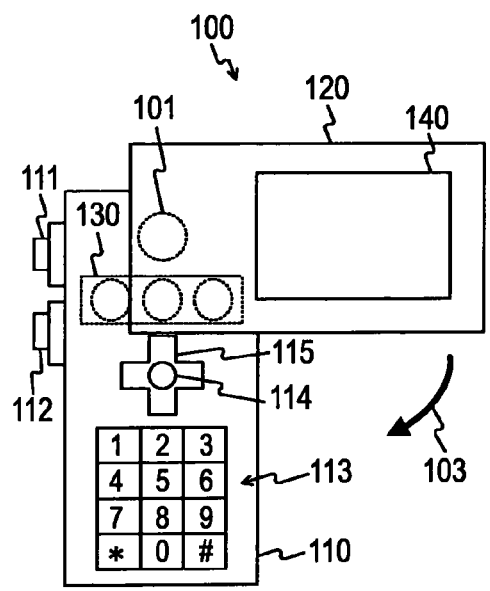
Figure 1D:
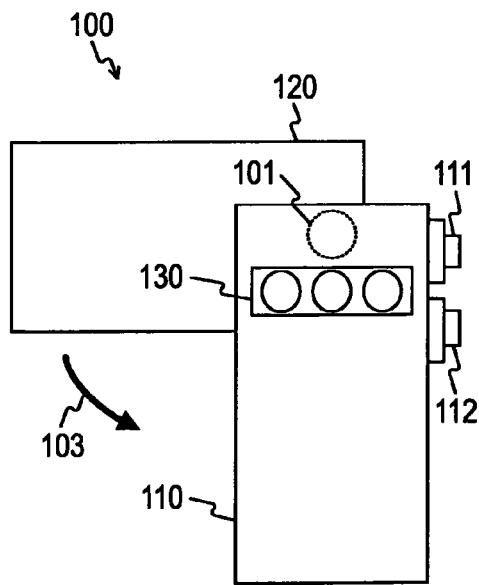

1. First Embodiment (Display Control: Example of Performing Postview Operation in Mobile Phone Unit;

2. Second Embodiment (Display Control: Example of Changing Representation State of Enlarged Image in Mobile Phone Unit); and 3. Modification 1. First Embodiment External Configuration Example of Mobile Phone Unit FIGS. 1A to 1D are diagrams showing an external configuration example of a mobile phone unit 100 according to a first embodiment of the present invention. FIG. 1A shows a front surface side in one state of using the mobile phone unit 100 and FIG. 1B shows a rear surface side in the same state. FIG. 1C shows a front surface side in another state of using the mobile phone unit 100 and FIG. 1D shows a rear surface side in the same state.

The mobile phone unit 100 includes a first casing 110 and a second casing 120. The first and second casings 110 and 120 are connected so as to be rotatable about a pivot member 101. The mobile phone unit 100 is realized by a plurality of mobile phone units (so-called camera-equipped mobile phone units) having imaging capability, for example. FIGS. 1A to 1D show a simplified view of the mobile phone unit 100 in order to make the description easily understood, and the illustration of a power switch and the like provided on the outer side surfaces of the mobile phone unit 100 is omitted.

The first casing 110 includes an imaging range changeover switch 111, a still-image/video changeover switch 112, a number pad 113, an OK key 114, a cross key 115, and an imaging section 130. When a user uses the mobile phone unit 100 while holding it with a hand, the user has to grasp any portion of the mobile phone unit 100 with the hand. For example, in normal cases, the user generally uses mobile phone unit 100 with the hand holding on any portion of the first casing 110 (so-called body casing).

The imaging range changeover switch 111 is an operation member for changing an imaging range when generating image data with the imaging section 130, and the imaging range is sequentially changed whenever it is pressed by a user operation. The details of changeover of the imaging range will be described with reference to FIGS. 28A and 28B to FIGS. 42A to 42C.

The still-image/video changeover switch 112 is an operation member used when changing an imaging mode between a still-imaging mode for recording still-images and a video imaging mode for recording videos. The imaging range changeover switch 111 and the still-image/video changeover switch 112 are so-called toggle switches.

The number pad 113 is an operation member for inputting numbers, symbols, and the like.

The OK key 114 is an operation member which is pressed when the users sets various kinds of functions. For example, if the OK key 114 pressed when the still-imaging mode is set, it functions as a shutter button.

The cross key 115 is an operation key which is pressed when changing a selection state of respective items displayed on a display screen and when moving an object displayed on the display screen in vertical and horizontal directions.

The imaging section 130 images a subject to generate image data. In FIG. 1A, the position on the front surface side corresponding to the imaging section 130 shown in FIG. 1B is depicted by a dotted line. Moreover, circles in the imaging section 130 shown in FIG. 1B schematically show respective lenses of a plurality of imaging systems provided in the imaging section 130. That is, in the first embodiment of the present invention, the imaging section 130 in which three groups of lenses are arranged in a specific direction will be described as an example. Here, the specific direction may be a horizontal direction when the longitudinal direction of the first casing 110 is made identical to the vertical direction, for example.

The second casing 120 includes a display section 140. The display section 140 is a display device that displays various kinds of images. On the display section 140, an image generated by an imaging operation is displayed as a monitoring image, for example. As for the display section 140, an LCD (Liquid Crystal Display) panel, an organic EL (Electro Luminescence) panel, and the like can be used, for example. In many cases, the horizontal-to-vertical ratio of a display device provided in a camera-equipped mobile phone unit or a general imaging apparatus is 4:3 or 16:9. In the first embodiment of the present invention, a case where the horizontal-to-vertical ratio of the display section 140 when the longitudinal direction of the second casing 120 is made identical to the horizontal direction is 4:3 will be described as an example.

As described above, the first and second casings 110 and 120 are rotatably connected. That is, the second casing 120 can be rotated with respect to the first casing 110 about the pivot member 101 (depicted by dotted line). With this configuration, a relative positional relation of the second casing 120 to the first casing 110 can be changed. For example, FIGS. 1C and 1D show a state in which the second casing 120 is rotated by 90° in the direction of the arrow 102 shown in FIGS. 1A and 1B.

The mobile phone unit 100 shown in FIGS. 1C and 1D is the same as the example shown in FIGS. 1A and 1B except that the second casing 120 is rotated by 90° with respect to the first casing 110 about the pivot member 101. When the second casing 120 is further rotated by 90° in the direction of the arrow 103 in the state shown in FIGS. 1C and 1D, the mobile phone unit 100 enters a non-use state (so-called closed state). In this way, by rotating the second casing 120 with respect to the first casing 110, at least two positional relations can be achieved as the relative positional relation of the second casing 120 to the first casing 110. The second casing 120 is also rotatable about the pivot member 101 in a direction opposite to the direction of the arrow 102. However, in the first embodiment of the present invention, the illustration and description of these respective states will be omitted.

Here, a state in which the longitudinal direction of the first casing 110 is identical to the longitudinal direction of the second casing 120, and the display section 140 and the number pad 113 face each other with the pivot member 101 disposed therebetween as shown in FIGS. 1A and 1B will be referred to as a vertical state of the second casing 120. In addition, an imaging operation performed in this state with the longitudinal directions of the first and second casings 110 and 120 made identical to the vertical direction will be referred to as a vertical imaging operation.

Moreover, a state in which the longitudinal direction of the first casing 110 is approximately perpendicular to the longitudinal direction of the second casing 120 as shown in FIGS. 1C and 1D will be referred to as a horizontal state of the second casing 120. In addition, an imaging operation performed in this state with the longitudinal direction of the first casing 110 made identical to the vertical direction and the longitudinal direction of the second casing 120 made identical to the horizontal direction will be referred to as a horizontal imaging operation.

[Internal Configuration Example of Mobile Phone Unit]

Figure 2:
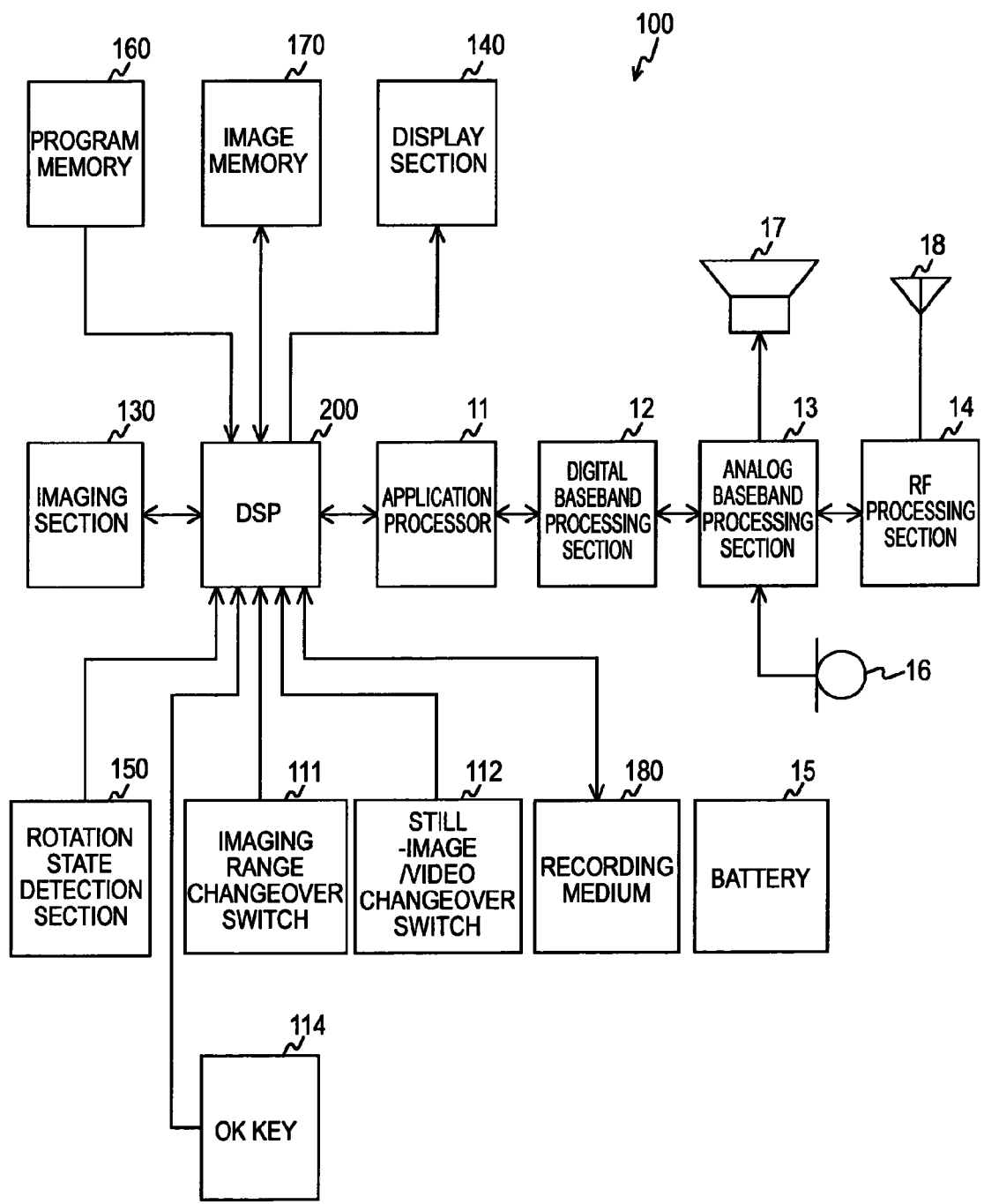
FIG. 2 is a diagram showing an internal configuration example of the mobile phone unit 100 according to the first embodiment of the present invention.

FIG. 2 is a diagram showing an internal configuration example of the mobile phone unit 100 according to the first embodiment of the present invention. The mobile phone unit 100 includes an application processor 11, a digital baseband processing section 12, an analog baseband processing section 13, and an RF (Radio Frequency) processing section 14. Moreover, the mobile phone unit 100 includes a battery 15, a microphone 16, a speaker 17, an antenna 18, the imaging range changeover switch 111, the still-image/video changeover switch 112, the OK key 114, the imaging section 130, and the display section 140. Furthermore, the mobile phone unit 100 includes a rotation state detection section 150, a program memory 160, an image memory 170, a recording medium 180, and a DSP (Digital Signal Processor) 200. The antenna 18 is provided in the RF processing section 14, and the microphone 16 and the speaker 17 are provided in the analog baseband processing section 13.

The application processor 11 controls respective sections of the mobile phone unit 100 based on various kinds of programs stored in an internal memory. The application processor 11 is configured to include a CPU (Central Processing Unit), a ROM (Read Only Memory), and a RAM (Random Access Memory), for example.

For example, when receiving a call, electric waves received by the antenna 18 are demodulated by the digital baseband processing section 12 after passing through the RF processing section 14 and the analog baseband processing section 13. The results of demodulation by the digital baseband processing section 12 are output from the speaker 17 after passing through the analog baseband processing section 13.

Moreover, when sending a call, voices input from the microphone 16 are demodulated by the digital baseband processing section 12 after passing through the analog baseband processing section 13. The demodulated voice data are transmitted from the antenna 18 after passing through the analog baseband processing section 13 and the RF processing section 14.

When the user inputs an instruction operation to start an imaging operation, the mobile phone unit 100 performs the imaging operation. For example, when the user inputs a capture start instruction, the application processor 11 instructs respective sections (the imaging section 130, the DSP 200, and the like) responsible for the imaging operation to start the imaging operation and activates these respective sections. Then, the respective activated sections perform the imaging operation to generate an image, and the generated image is displayed on the display section 140. Here, when the user inputs an image record instruction, the generated image is recorded in the recording medium 180. Moreover, when the user inputs an instruction operation to transmit an image wirelessly, the generated image is transmitted wirelessly. For example, the generated image data are demodulated by the digital baseband processing section 12 and transmitted from the antenna 18 after passing through the analog baseband processing section 13 and the RF processing section 14. The battery 15 is a battery that supplies power to the mobile phone unit 100.

The details of the switches 111 and 112, the OK key 114, the imaging section 130, the display section 140, the rotation state detection section 150, the program memory 160, the image memory 170, the recording medium 180, and the DSP 200 will be described with reference to FIGS. 3 and 7 and other drawings.

[Internal Configuration Example of Imaging Section]

Figure 3:
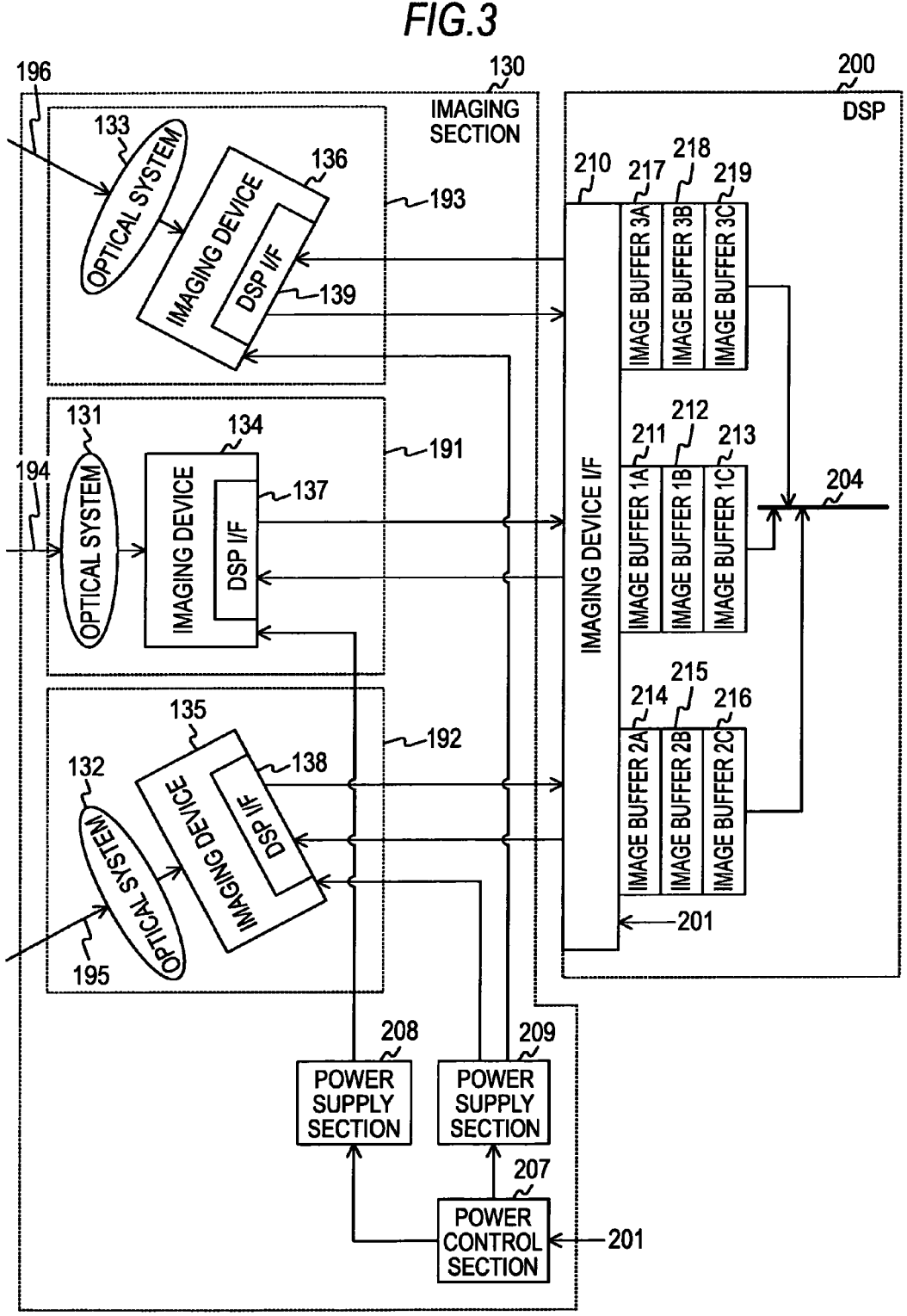
FIG. 3 is a diagram showing an internal configuration example of an imaging section 130 according to the first embodiment of the present invention.

FIG. 3 is a diagram showing an internal configuration example of an imaging section 130 according to the first embodiment of the present invention. In FIG. 3, a part of the DSP 200 connected to the imaging section 130 is shown. The whole configuration of the DSP 200 will be described in detail with reference to FIGS. 7 and 8.

The imaging section 130 includes three imaging systems (the first to third imaging systems 191 to 193), a power control section 207, and power supply sections 208 and 209. The three imaging systems are arranged in a line in a specific direction. That is, the first imaging system 191 is disposed at the center, and the first and second imaging systems 192 and 193 are disposed on either side of the first imaging system 191.

The first imaging system 191 includes an optical system 131, an imaging device 134, and a DSP I/F (interface) 137. The second imaging system 192 includes an optical system 132, an imaging device 135, and a DSP I/F 138. The third imaging system 193 includes an optical system 133, an imaging device 136, and a DSP I/F 139. Since the first to third imaging systems 191 to 193 have approximately the same configuration, in this example, only the configuration of the first imaging system 191 will be described, and the description of the second and third imaging systems 192 and 193 will be omitted.

The optical system 131 includes a plurality of lenses (including a zoom lens and a focus lens) that collect light from a subject. The amount of light passing theses respective lenses (i.e., exposure) is adjusted by a diaphragm (not shown). The collected light from the subject enters the imaging device 134.

The imaging device 134 is an imaging device that images a subject image entering through the optical system 131 to generate an image signal. That is, the imaging device 134 receives light from a subject entering through the optical system 131 and performs photoelectric conversion on the subject light, thus generating an analog image signal corresponding to the amount of received light. The analog image signal generated by the imaging device 134 is supplied to the DSP 200 through the DSP I/F 137. As for the imaging device, solid-state imaging devices of the types CCD (Charge Coupled Device), CMOS (Complementary Metal Oxide Semiconductor), and the like can be used, for example.

The DSP I/F 137 is an interface for connecting the imaging device 134 and the DSP 200.

The power control section 207 controls the power supply sections 208 and 209 based on an instruction on power control from an imaging control section 201 (see FIG. 7) of the DSP 200. That is, upon receiving an instruction on power control from the imaging control section 201, the power control section 207 creates a signal so that the amplitude and the rates of rise and decay of the signal are compliant with the input specifications of a control signal as required by the power supply sections 208 and 209. Then, the power control section 207 outputs the created signal to the power supply sections 208 and 209 and controls the power supply sections 208 and 209. If the output signal of the imaging control section 201 is compliant with the input specifications of the control signal to the power supply sections 208 and 209, the output signal of the imaging control section 201 may be directly input to the power supply sections 208 and 209.

The power supply section 208 supplies power to the first imaging system 191 based on the control of the power control section 207. The power supply section 209 supplies power to the second and third imaging systems 192 and 193 based on the control of the power control section 207. The power supply sections 208 and 209 are realized, for example, by a power IC (Integrated Circuit) which is commercially available on the market.

The first to third imaging systems 191 to 193 each are connected to the DSP 200 through one data line and seven signal lines. Here, the one data line connecting the first imaging system 191 and the DSP 200 will be denoted as L1, and the seven signal lines will be denoted as L2 to L8. The data line and signal lines of the second and third imaging systems 192 and 193 are approximately the same as the data line and signal lines of the first imaging system 191. Therefore, in this example, only the data line and signal lines of the first imaging system 191 will be described, and the description of the second and third imaging systems 192 and 193 will be omitted.

The data line L1 is a data line for transmitting image data from the imaging device 134 to the DSP 200. The data line L1 is preferably made up of a plurality of data lines in order to increase the transmission rate of image data, for example. Moreover, in order to increase the transmission rate of image data and increase noise tolerance on a transmission path, high-speed differential transmission lines are preferably used as the data line L1. For example, LVDS (Low Voltage Differential Signaling) lines are preferably used as the data line L1.

The signal line L2 is a communication line for bidirectional communication between the imaging device 134 and the DSP 200, and a 4-wire serial communication line can be used, for example. The signal line L2 is used when inputting various kinds of setting values necessary for using the imaging device 134 from the DSP 200 side. As an example, a setting value for decimating and outputting the image data output from the imaging device 134 to the DSP 200 is written from the DSP 200 to registers 370 and 380 (see FIG. 12) through the signal line L2.

The signal line L3 is a clock signal line for supplying a clock signal from the DSP 200 to the imaging device 134. The imaging device 134 performs an imaging operation of one pixel for one clock cycle using the clock signal supplied through the signal line L3. A frequency multiplier may be mounted in the imaging device 134 so that the clock signal supplied from the DSP 200 is multiplied in the imaging device 134, and the imaging device 134 performs an imaging operation of one pixel for one cycle of the multiplied clock signal.

The signal line L4 is a reset signal line for supplying a reset signal from the DSP 200 to the imaging device 134.

The signal line L5 is a signal line for controlling the ON/OFF of the imaging operation of the imaging device 134 from the DSP 200 side. That is, the signal line L5 is a signal line for sending an instruction to stop and start an operation from the DSP 200 to the respective imaging devices. For example, when the user inputs an instruction to select an imaging mode wherein only one imaging device of the three imaging devices is used, by stopping the imaging operations of the other two imaging devices that are not used, it is possible to decrease power consumption.

The signal line L6 is a vertical synchronization signal line. That is, the signal line L6 is a signal line for sending a synchronization signal indicating an imaging timing for one frame from the DSP 200 to the imaging device 134.

The signal line L7 is a horizontal synchronization signal line. That is, the signal line L7 is a signal line for sending a synchronization signal indicating an imaging timing for one line during one frame from the DSP 200 to the imaging device 134.

The signal line L8 is a shutter signal line. For example, when the user presses an operation member (for example, the OK key 114) for instructing to record a captured image of the mobile phone unit 100, a shutter signal corresponding to the pressing is sent from the DSP 200 to the imaging device 134.

[Arrangement Configuration Example of Imaging Device]

Figure 4A:
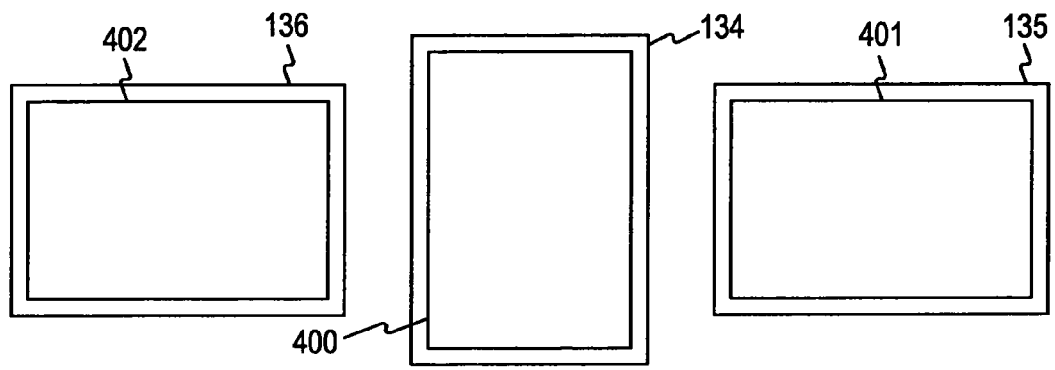
FIGS. 4A to 4C are diagrams showing an arrangement configuration example of imaging devices 134 to 136 that form the imaging section 130 according to the first embodiment of the present invention.
Figure 4B:
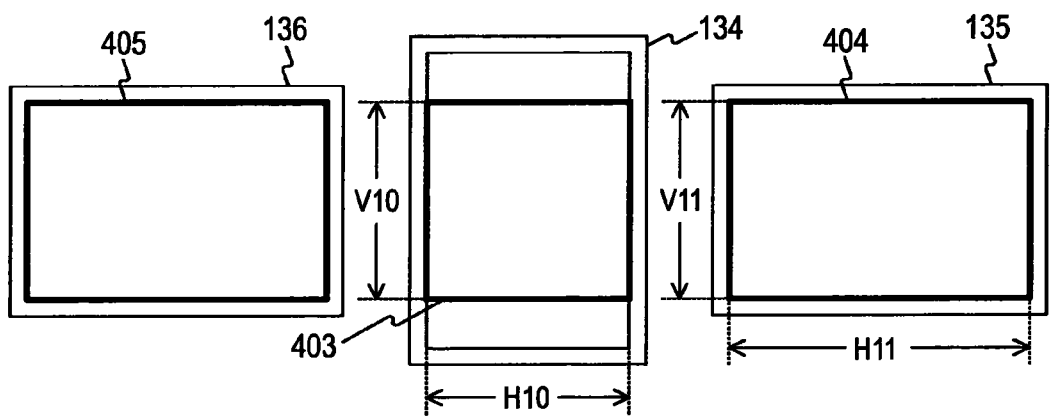
Figure 4C:
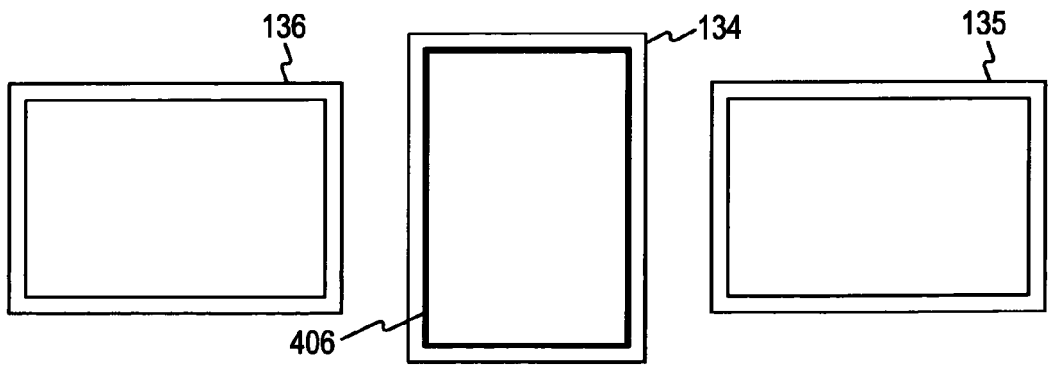

FIGS. 4A to 4C are diagrams showing an arrangement configuration example of imaging devices 134 to 136 that form the imaging section 130 according to the first embodiment of the present invention. FIG. 4A shows an arrangement configuration of the imaging devices 134 to 136. In general, a region where pixels are arranged, in a light receiving surface of an imaging device, is approximately rectangular. Therefore, in the following description, the imaging devices 134 to 136 will be schematically depicted by rectangles.

FIG. 4A shows an arrangement configuration example when the longitudinal direction of the first casing 110 is made identical to the vertical direction so that the pivot member 101 is on the upper side. Specifically, the imaging device 134 is disposed at the center, and the imaging devices 135 and 136 are disposed on either side of the imaging device 134. Moreover, the imaging device 134 at the center is disposed so that the longitudinal direction thereof is identical to a direction perpendicular to an arrangement direction. On the other hand, the imaging devices 135 and 136 on either side of the imaging device 134 are disposed so that the longitudinal directions are identical to the arrangement direction. Moreover, the central positions of the imaging devices 134 to 136 are disposed on the same plane. That is, in the arrangement direction, the imaging devices 135 and 136 are disposed horizontally, and the imaging device 134 is disposed vertically. In FIG. 4A, pixel data readable regions 400 to 402 in which the respective pixels can be read out are schematically depicted by rectangles in the imaging devices 134 to 136. For example, a first captured image of which the longitudinal direction is identical to a specific direction of a subject is generated by the imaging device 134. Moreover, a second captured image of which the longitudinal direction is identical to a perpendicular direction perpendicular to the specific direction, and which includes a subject adjacent on one side in the perpendicular direction of a subject included in the first captured image is generated by the imaging device 135. Furthermore, a third captured image of which the longitudinal direction is identical to the perpendicular direction and which includes a subject adjacent on the other side in the perpendicular direction of the subject included in the first captured image is generated by the imaging device 136. As described above, in the first embodiment of the present invention, the aspect ratio (horizontal/vertical) of the central imaging device 134 is set to be smaller than the aspect ratios of the imaging devices 135 and 136 on either side thereof. With this configuration, sufficient resolution can be maintained even when a vertical image is generated using only the imaging device 134, for example. On the other hand, when a wide-angle image (for example, a panoramic image) is generated using the imaging devices 134 to 136, the picture frame of the imaging device 134 can be effectively used.

FIG. 4B shows an example of a pixel data readout region when image data are generated with the second casing 120 in the horizontal state. The pixel data readout regions 403 to 405 are examples of regions of the pixel data readable regions 400 to 402 in which respective pixels are read out at the time of generating image data used for displaying or recording, and the outlines thereof are depicted by bold lines in FIG. 4B. The pixel data readout regions 404 and 405 may be the same as the pixel data readable regions 401 and 402, for example. Moreover, the pixel data readout region 403 may be configured so that the vertical length V10 thereof is the same as the vertical length V11 of the pixel data readable regions 401 and 402, and the horizontal length H10 thereof is the same as the horizontal length of the pixel data readable region 400.

FIG. 4C shows an example of a pixel data readout region when image data are generated with the second casing 120 in the vertical state. This example shows a pixel data readout region 406 when image data are generated by only the imaging device 134 of the imaging devices 134 to 136. The pixel data readout region 406 is an example of regions of the pixel data readable regions 400 to 402 in which respective pixels are read out at the time of generating a combined image used for displaying or recording, and the outline thereof is depicted by a bold line in FIG. 4C. The pixel data readout region 406 may be the same as the pixel data readable region 400, for example. The details of these image generation examples will be described with reference to FIGS. 28A and 28B to FIGS. 42A to 42C.

Here, an imaging apparatus in which the imaging devices 134 to 136 are arranged so that the respective longitudinal directions of the imaging devices 134 to 136 are identical to the specific direction will be considered. That is, a case in which the imaging device 134 is rotated by 90° to be disposed in the state shown in FIG. 4A and the longitudinal directions of the imaging devices 134 to 136 are identical to the arrangement direction will be considered. In this case, when photographing a general vertical still image, although the pixel count in the vertical direction is maximum, only the number of pixels in the short-side direction of the imaging device 134 are taken. Moreover, the angle of view in the vertical direction is limited to a region in which light enters in the short-side direction of the imaging device 134. Therefore, in order to perform imaging with a large angle of view in the vertical direction and a large number of pixels in the vertical direction, the user needs to perform photographing by rotating the imaging apparatus by 90°.

In contrast, according to the first embodiment of the present invention, even when photographing a general vertical still image, it is possible to perform photographing with the same number of pixels and the same angle of view as a case where the user performs photographing by horizontally tilting a mobile phone unit having one imaging system. Therefore, the user does not need to horizontally tilt the imaging apparatus.

Next, a readout method of reading out one line of data in the imaging devices 134 to 136 will be described. For example, the following two methods can be used as a data readout method of reading out one line of data in the imaging devices 134 to 136.

Figure 6A:
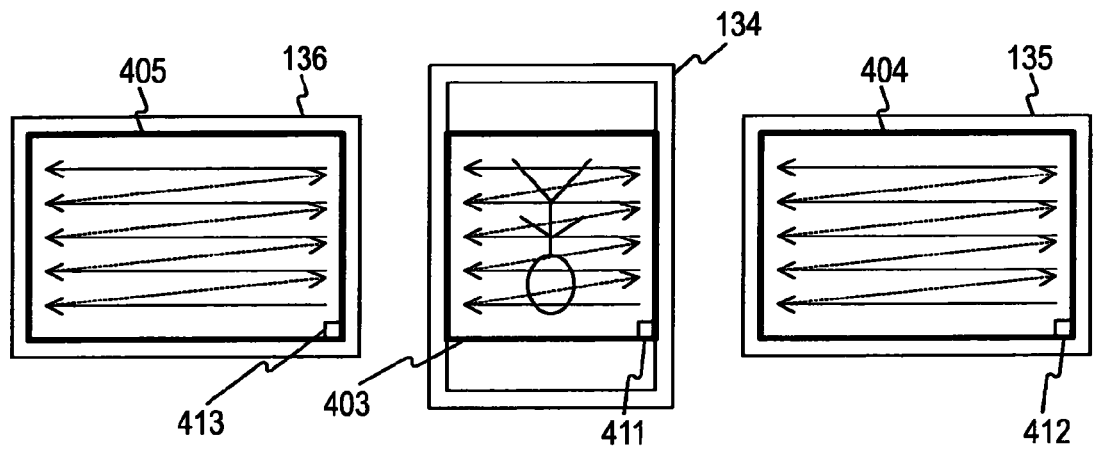
FIGS. 6A to 6C are diagrams showing the relationship between an image imaged on the imaging devices 134 to 136 and an image data readout method according to the first embodiment of the present invention.

The first data readout method is a method in which, when reading out one line of data in the imaging device 134, the direction of one line is the short-side direction of a rectangular region corresponding to the imaging device 134. In the first data readout method, when reading out one line of data in the imaging devices 135 and 136, the direction of one line is the long-side direction of a rectangular region corresponding to the imaging devices 135 and 136. This example is shown in FIG. 6A. In the first data readout method, the image data read out from the three imaging devices 134 to 136 can be written into the image memory 170 in the readout order. Moreover, since the data can be read out in the same order when the data are read out and subjected to image signal processing, writing and reading out of data into/from a memory can be performed easily. However, since the direction of reading out a line of data in an imaging device is generally the long-side direction, it is necessary to prepare a new imaging device in which the readout line direction is the short-side direction.

The second data readout method is a method in which, when reading out one line of data in the imaging device 134, the direction of one line is the long-side direction similarly to the imaging devices 135 to 136. In this case, it is not necessary to prepare a new imaging device in which the readout direction is the short-side direction. However, the readout direction of the imaging device 134 reading out the image data is rotated by 90° from the readout direction of the imaging devices 135 and 136 reading out the image data. Therefore, when performing image signal processing using the image data readout from the imaging device 134, it is preferable to rotate the image by 90° to be oriented in the same direction as the image generated by the imaging devices 135 and 136 and then to perform image signal processing. In the first embodiment of the present invention, an example of using the first data readout method will be described. That is, in the following description, an example in which the line direction at the time of reading out one line of pixel data in the imaging device 134 is identical to the arrangement direction of the imaging devices 134 to 136 will be described. Moreover, an example in which the line direction at the time of reading out one line of pixel data in the imaging devices 135 and 136 is identical to the arrangement direction of the imaging devices 134 to 136 will be described.

FIGS. 5 and 6A to 6C are diagrams showing the relationship between an image imaged on the imaging devices 134 to 136 and an image data readout method according to the first embodiment of the present invention. In general, a so-called reversed image is imaged on an imaging device.

Figure 5:
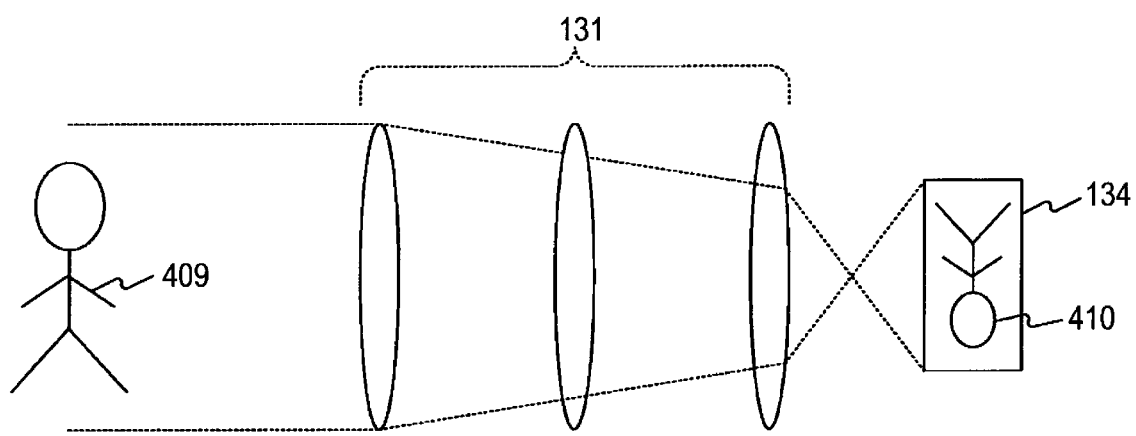
FIG. 5 is a diagram showing the relationship between an image imaged on the imaging devices 134 to 136 and an image data readout method according to the first embodiment of the present invention.

FIG. 5 schematically shows the relationship among a subject 409, the optical system 131, and a captured image 410 imaged on the imaging device 134 when a reversed image is generated as an image imaged on an imaging device. As shown in FIG. 5, light from the subject 409 entering through the optical system 131 is imaged on the imaging device 134, whereby the captured image 410 is generated. In this case, the up-to-down direction of the subject 409 is reverse to the up-to-down direction of the captured image 410.

FIG. 6A schematically shows readout start positions 411 to 413 and the readout direction when pixel data are read out from the imaging devices 134 to 136. This example shows an example where pixel data are read out from the pixel data readout regions 403 to 405 shown in FIG. 4B. In the following description, the readout start position in the pixel data readout region will be schematically depicted as a rectangle. For example, the readout sequentially starts from the readout start positions 411 to 413 on the right-bottom corners of the pixel data readout regions 403 to 405, and the pixel data are read out in the direction indicated by arrow. For example, in the pixel data readout region 403, the readout of pixel data starts from the readout start position 411, and the readout of the pixel data is sequentially performed while shifting in the direction indicated by arrow by a distance of one pixel. When a pixel positioned at the end (the left end in the pixel data readout region 403 shown in FIG. 6A) of one horizontal line is read out, a readout target line is shifted upward by one pixel, and a pixel positioned at another end is read out. Thereafter, the readout of pixels is sequentially performed in the same manner. When a pixel positioned at the end of the uppermost line in the pixel data readout region 403 is read out, the readout process of the imaging device 134 ends. Moreover, the readout process of the imaging devices 135 and 136 is performed at the same time as the imaging device 134.

Figure 6B:
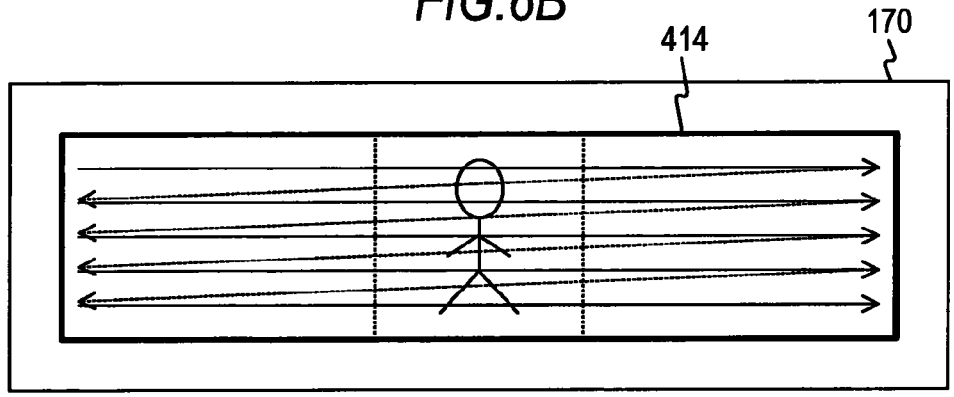

FIG. 6B schematically shows a combined image 414 on the image memory 170 when the pixel data read out from the imaging devices 134 to 136 are combined. This example shows an example where pixel data read out by the readout method shown in FIG. 6A are combined. The direction indicated by arrow in the combined image 414 is the arrangement direction of the image data on the image memory 170.

Figure 6C:
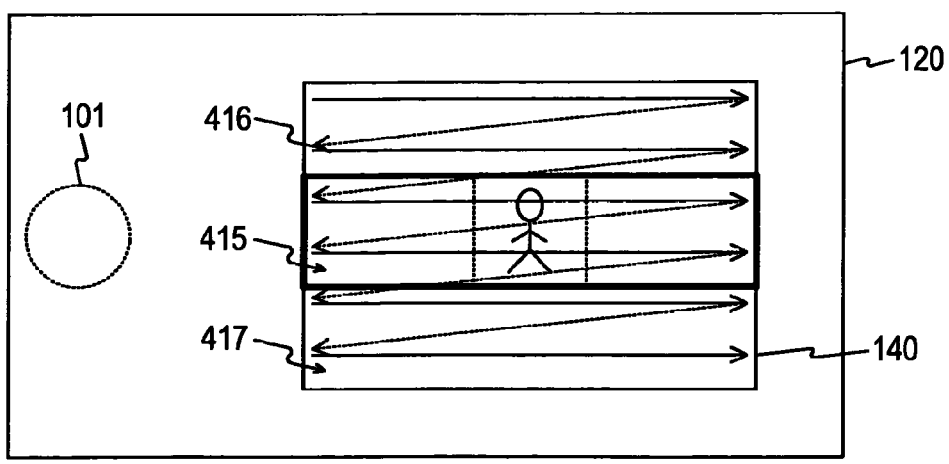

FIG. 6C shows a display example of a combined image when the pixel data read out from the imaging devices 134 to 136 are displayed on the display section 140. This example shows an example where the combined image 414 shown in FIG. 6B is displayed. For example, the combined image 414 is displayed in a captured image display region 415, and a single-color image (for example, a black or white image) is displayed in blank image display regions 416 and 417 which are disposed above and below the captured image display region 415. The direction indicated by arrow in the display section 140 is the scanning direction in the display section 140.

[Configuration Example of DSP]

FIG. 7 is a block diagram showing an internal configuration example of the DSP 200 according to the first embodiment of the present invention. The DSP 200 includes an imaging control section 201, a CPU 202, a DMA (Direct Memory Access) controller 203, a data bus 204, a program memory I/F 205, and an image memory I/F 206. Moreover, the DSP 200 includes an imaging device I/F 210, image buffers 211 to 219, an image signal processing section 220, resolution conversion sections 231, 241, and 251, and image rotation processing sections 232 and 242. Furthermore, the DSP 200 includes a display section I/F 233, an external display device I/F 243, an encoding/decoding section 252, a recording medium I/F 253, oscillation circuits 264 to 266, and a clock generation circuit 270. Furthermore, the DSP 200 includes an AF (Auto Focus) control section 281 and a face detection section 282. Furthermore, the DSP 200 includes an AE (Automatic Exposure) control section 283 and an AWB (Auto White Balance) control section 284. The data bus 204 is connected to the CPU 202, the DMA controller 203, the image memory I/F 206, the image buffers 211 to 219, the image signal processing section 220, and the like. Moreover, the imaging control section 201 receives respective signals from the imaging range changeover switch 111, the still-image/video changeover switch 112, the OK key 114, and the rotation state detection section 150.

The rotation state detection section 150 detects the rotation state of the second casing 120 with respect to the first casing 110 and outputs the detection results to the imaging control section 201. The rotation state detection section 150 detects an angle between the first and second casings 110 and 120, for example, as the rotation state of the second casing 120 with respect to the first casing 110, and outputs the detection results to the imaging control section 201. For example, an angle detection switch which is pressed only when the rotation angle of the second casing 120 with respect to the first casing 110 is equal to or larger than a predetermined value is provided in a predetermined portion of the pivot member 101. The rotation state detection section 150 detects the angle between the first and second casings 110 and 120 using the angle detection switch.

The imaging control section 201 controls respective sections responsible for the imaging process. For example, the imaging control section 201 determines the rotation state of the second casing 120 with respect to the first casing 110 based on the detection results from the rotation state detection section 150 and controls the imaging process of the respective sections based on the determination results. For example, the imaging control section 201 determines the range of images to be displayed or recorded among the image data generated by the imaging devices 134 to 136 based on the determination results. Moreover, the imaging control section 201 controls the imaging process of the respective sections based on input signals from the imaging range changeover switch 111, the still-image/video changeover switch 112, and the OK key 114. The details of these imaging control operations will be described with reference to FIGS. 28A and 28B to FIGS. 42A to 42C and other drawings.

In the first embodiment of the present invention, the user can preset an imaging mode (image size and the like) when recording images generated by the imaging section 130. For example, a menu screen for setting an imaging mode is displayed on the display section 140, and the user inputs desired setting contents on the menu screen using the OK key 114 and the cross key 115. The imaging mode includes, for example, the number of imaging devices used for imaging and the vertical and horizontal image size for recording. Moreover, the imaging mode includes, for example, vertical back and front porches indicating the spaces between an effective image region and a vertical synchronization signal and horizontal back and front porches indicating the spaces between an effective image region and a horizontal synchronization signal. The imaging control section 201, the respective sections in the DSP 200, and the imaging devices 134 to 136 include registers that store the imaging mode.

When the user sets an imaging mode, the imaging control section 201 informs the respective sections in the DSP 200 and the imaging devices 134 to 136 of the set imaging mode to be stored in the registers provided in the respective sections. In this way, by storing the setting contents of the imaging mode set by the user in the registers of the respective sections, the user can easily change and use a plurality of photographic conditions.

The imaging control section 201 informs the respective sections in the DSP 200 and the imaging devices 134 to 136 of the vertical and horizontal synchronization signals and the clock signals based on the setting contents of the imaging mode stored in an internal register, for example. Moreover, the imaging control section 201 informs the respective sections in the DSP 200 responsible for displaying and the display section 140 of the vertical and horizontal synchronization signals and the clock signals based on the setting contents of the imaging mode stored in an internal register, for example. Furthermore, the imaging control section 201 outputs a power ON/OFF control signal to the power control section 207, for example.

The CPU 202 controls the overall operation of the DSP 200 based on various kinds of programs stored in the program memory 160. The details of the control will be described with reference to FIG. 76.

The DMA controller 203 controls transmission of data between respective memories based on the control of the CPU 202.

The program memory I/F 205 is an interface for connecting the program memory 160 and the DSP 200.

The image memory I/F 206 is an interface for connecting the image memory 170 and the DSP 200.

The imaging device I/F 210 is an interface for connecting the imaging devices 134 to 136 and the DSP 200. That is, the image data generated by the imaging devices 134 to 136 are input to the imaging device I/F 210. For example, if the data line L1 for transmitting image data from the imaging devices 134 to 136 uses a small-amplitude LVDS method, the image data from the imaging devices 134 to 136 are converted to GND or power-supply potential in the DSP I/Fs 137 to 139. Moreover, three sets of image buffers 211 to 219 corresponding to the imaging devices 134 to 136 are provided at the succeeding stage of the imaging device I/F 210.

The image buffers 211 to 219 are image buffers for storing the image data output from the imaging devices 134 to 136, and the stored image data are written to the image memory 170 through the data bus 204. For example, three image buffers are provided for each imaging device, and the respective image buffers are connected to the data bus 204. For example, three image buffers 211 to 213 are provided to the imaging device 134. Three image buffers 214 to 216 are provided to the imaging device 135. Three image buffers 217 to 219 are provided to the imaging device 136. In the first embodiment of the present invention, since the image data are written to the image memory 170, new image data input from the imaging devices 134 to 136 are sequentially stored even when the image data are being read out from the image buffers 211 to 219. Therefore, it is preferable that two or more image buffers are provided for each of the imaging devices 134 to 136 as the image buffers 211 to 219.

It is preferable that the image buffers 211 to 219 each have a capacity larger than the bit width of the data bus 204. For example, it is preferable that when the data bus 204 has a bit width of 128 bits, each image buffer has a capacity of 128 bits or more. Moreover, it is more preferable that the image buffers 211 to 219 each have a capacity that is at least twice the bit width of the data bus 204. For example, it is more preferable that when the data bus 204 has a bit width of 128 bits, each image buffer has a capacity of 256 bits or more.

On the other hand, the image buffers 211 to 219 each may have a capacity equal to or smaller than the data quantity of one image generated by one imaging device. For example, it is preferable that the image buffers 211 to 219 each have a capacity equal to or smaller than the data quantity of image data generated by one line of pixels of the imaging device 134.

In the first embodiment of the present invention, the bit width of the data line connecting the imaging devices 134 to 136 and the DSP 200 is 12 bits, for example. Moreover, for example, the bit width of the data bus 204 of the DSP 200 is 128 bits, and the image buffers 211 to 219 each have a capacity of 128 bits.

The image signal processing section 220 performs various image signal processings on the image data input through the image buffers 211 to 219 and the data bus 204 based on the control of the imaging control section 201. The internal configuration of the image signal processing section 220 will be described in detail with reference to FIG. 8.

The resolution conversion section 231 converts the resolution for displaying respective images on the display section 140 based on the control of the imaging control section 201 or the CPU 202 and outputs resolution-converted image data to the image rotation processing section 232.

The resolution conversion section 241 converts the resolution for displaying respective images on an external display device 245 based on the control of the imaging control section 201 or the CPU 202 and outputs resolution-converted image data to the image rotation processing section 242.

The image rotation processing section 232 rotates the resolution-converted image data based on the control of the imaging control section 201 or the CPU 202 and outputs the rotated image data to the display section I/F 233.

The image rotation processing section 242 rotates the resolution-converted image data based on the control of the imaging control section 201 or the CPU 202 and outputs the rotated image data to the external display I/F 243.

The display section I/F 233 is an interface for connecting the display section 140 and the DSP 200.

The external display device I/F 243 is an interface for connecting the external display device 245 and the DSP 200. The external display device 245 is a television, for example.

The resolution conversion section 251 converts the resolution of respective images for recording purposes based on the control of the imaging control section 201 or the CPU 202 and outputs the resolution-converted image data to the encoding/decoding section 252. For example, the resolution conversion section 251 performs resolution conversion processing for converting the resolution to a recording image size desired by the user and resolution conversion processing for generating thumbnail images.

The encoding/decoding section 252 performs an encoding process for compressing the image data output from the resolution conversion section 251 based on the control of the imaging control section 201 or the CPU 202 and outputs the encoded image data to the recording medium I/F 253. Moreover, when displaying the image data recorded in the recording medium 180 on the display section 140, the encoding/decoding section 252 reads out the image data recorded in the recording medium 180 through the recording medium I/F 253 and decodes the image data. The decoded image data are stored in the image memory 170.

The recording medium I/F 253 is an interface for connecting the recording medium 180 and the DSP 200.

The recording medium 180 is a recording medium that records the image data supplied through the recording medium I/F 253. The recording medium 180 may be incorporated into the mobile phone unit 100, and may be removably attached to the mobile phone unit 100. As for the recording medium 180, tapes (for example, magnetic tapes) and optical discs (for example, recordable DVD (Digital Versatile Discs) can be used, for example. Moreover, as for the recording medium 180, magnetic disks (for example, hard disks), semiconductor memories (for example, memory cards), and optomagnetic discs (for example, MD (MiniDisc)) can be used, for example. The image data recorded in the recording medium 180 will be described in detail with reference to FIG. 75.

The oscillation circuits 264 to 266 and the clock generation circuit 270 will be described in detail with reference to FIGS. 9 to 11.

The AF control section 281 performs a focusing control on the image data input through the image buffers 211 to 219 and the data bus 204 so that the focusing lens focuses on a predetermined region of the image (captured image). The predetermined region may be, for example, a central region of the captured image, a region designated by the user, and a region including the position of the face detected by the face detection section 282. Moreover, if there is a plurality of predetermined regions, the focusing control is performed for the respective predetermined regions. Then, information on the positions (focusing positions) at which the focusing lens focuses on the captured image is output to the CPU 202 and the imaging control section 201. Moreover, the information on the focusing positions is stored in the AF control section 281.

The face detection section 282 detects the face of a person included in the image (captured image) of the image data input through the image buffers 211 to 219 and the data bus 204 and outputs the detection results to the CPU 202 and the imaging control section 201. Moreover, the face detection section 282 may detect the face of a person included in the image of the image data read out from the recording medium 180. As for a method of detecting the face included in an image, a face detection method (for example, see JP-A-2004-133637) based on matching between a detection target image and a template in which luminance distribution information of a face is recorded can be used. Moreover, a face detection method based on a characteristic amount of a flesh-colored portion or a human's face included in an image can be used. By these face detection methods, it is possible to calculate the position and size of a person's face in the image. The face detection results are stored in the face detection section 282.

The AE control section 283 is an automatic exposure control section for automatically adjusting a shutter speed and an aperture value with respect to the image data input through the image buffers 211 to 219 and the data bus 204 and outputs the detection results to the CPU 202 and the imaging control section 201.

The AWB control section 284 performs auto white balance adjustment or the like on the image data input through the image buffers 211 to 219 and the data bus 204 and outputs the detection results to the CPU 202 and the imaging control section 201.

[Internal Configuration Example of Image Signal Processing Section 220]

Figure 8:
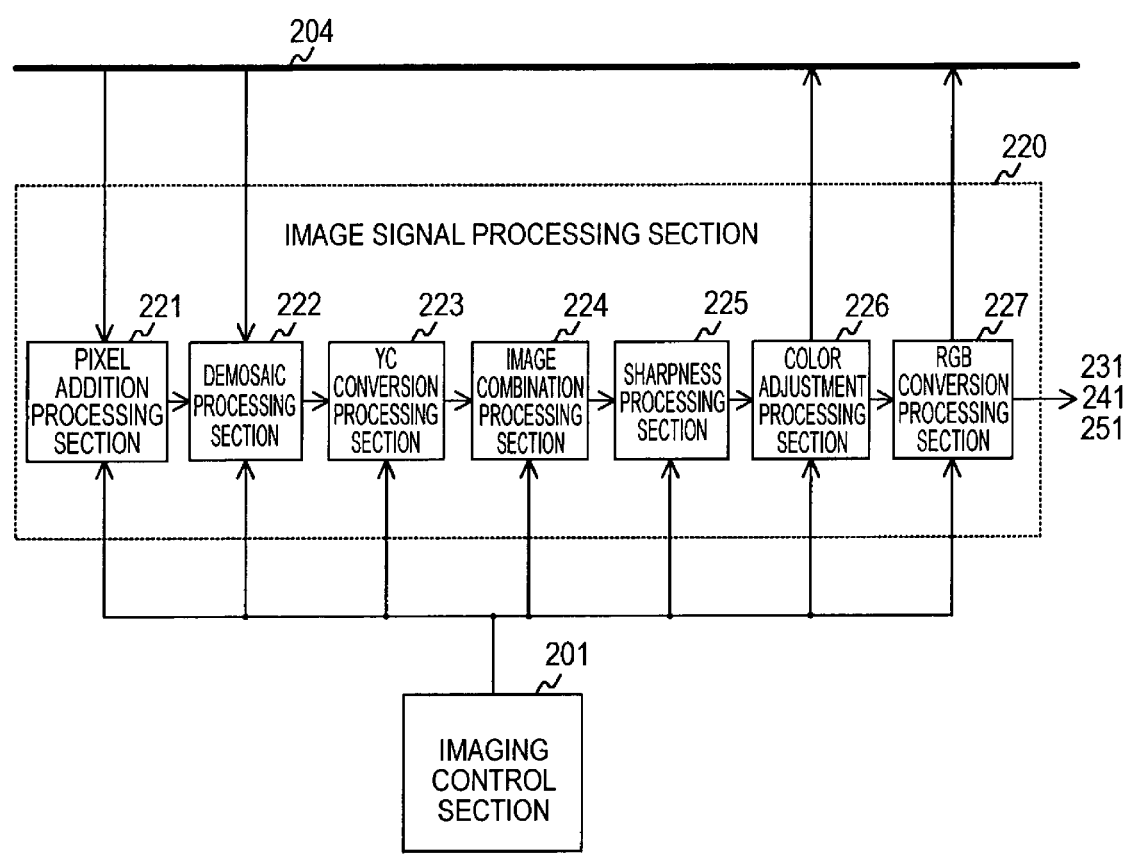
FIG. 8 is a block diagram showing an internal configuration example of an image signal processing section 220 according to the first embodiment of the present invention.

FIG. 8 is a block diagram showing an internal configuration example of an image signal processing section 220 according to the first embodiment of the present invention. The image signal processing section 220 includes a pixel addition processing section 221, a demosaic processing section 222, a YC conversion processing section 223, an image combination processing section 224, a sharpness processing section 225, a color adjustment processing section 226, and an RGB conversion processing section 227.

The pixel addition processing section 221 performs pixel addition and decimation processing on the image data generated by the imaging devices 134 to 136. The details of the pixel addition processing section 221 will be described with reference to FIG. 43 and other drawings.

The demosaic processing section 222 performs demosaic processing (interpolation processing) so that the intensities of all of the R, G, and B channels are equalized at the respective pixel positions of the image data (mosaic images) generated by the imaging devices 134 to 136. The demosaic processing section 222 supplies the RGB images having been subjected to demosaic processing to the YC conversion processing section 223. That is, the demosaic processing section 222 interpolates Bayer data having only pixel data corresponding to one color for one pixel to calculate pixel data of the three colors RGB for one pixel.

The YC conversion processing section 223 performs YC matrix processing on the RGB images generated by the demosaic processing section 222 and performs processing of limiting the bandwidth of the chromaticity components, thus generating a luminance signal (Y) and a color-difference signal (Cr, Cb). The generated luminance signal (Y image) and color-difference signal (C image) are supplied to the image combination processing section 224.

The image combination processing section 224 performs image combination processing on the image data generated by the YC conversion processing section 223 and outputs the combined image data to the sharpness processing section 225. The details of the image combination processing will be described with reference to FIG. 18 to FIGS. 26A to 26C.

The sharpness processing section 225 performs sharpness processing (processing of enhancing the outline of a subject) of detecting and enhancing portions of the image data generated by the image combination processing section 224, in which signals change greatly. The sharpness processing section 225 supplies the image data having been subjected to the sharpness processing to the color adjustment processing section 226.

The color adjustment processing section 226 adjusts the hue and saturation of the image data having been subjected to the sharpness processing by the sharpness processing section 225.

The RGB conversion processing section 227 converts the format of the image data of which the hue and saturation have been adjusted by the color adjustment processing section 226 from YCbCr data to RGB data.

Here, the flow of the image data by the signal processing of the image signal processing section 220 will be described. For example, a case in which the respective signal processing sections of the image signal processing section 220 read in the image data directly from the image memory 170 through the data bus 204 and write the processed image data to the image memory 170 through the data bus 204 will be considered. In this case, it is advantageous in that the image signal processing section 220 can read in image data at a desired position among the image data at a desired timing. However, since the quantity of data that need to be transmitted through the data bus 204 increases, it is necessary to increase the operation frequency of the data bus 204. Therefore, there is a problem in that the design of the data bus 204 is difficult and the power consumption increases.

Moreover, for example, a case in which the respective signal processing sections of the image signal processing section 220 receive the image data from a preceding signal processing section without through the data bus 204 and transfer the processed image data a succeeding signal processing section without through the data bus 204 will be considered. In this case, it is advantageous in that, since the data bus 204 is not used, the design of an LSI is easy and the power consumption can be decreased. However, there is a problem in that the respective signal processing sections are unable to read in image data at a desire position among the image data at a desired timing.

Therefore, in the first embodiment of the present invention, in order to decrease the operation frequency and power consumption of the data bus 204, the image data are directly transferred between the respective signal processing sections from the demosaic processing section 222 to the color adjustment processing section 226 in which the image size is approximately constant. Moreover, an example in which, when a signal processing section at a preceding stage of a signal processing section that uses a large amount of image data as in the case of performing resolution conversion writes in image data to the image memory 170 and performs resolution conversion, desired image data are read out from the image memory 170 will be described.

[Configuration Example of Clock Generation Circuit]

Figure 9:
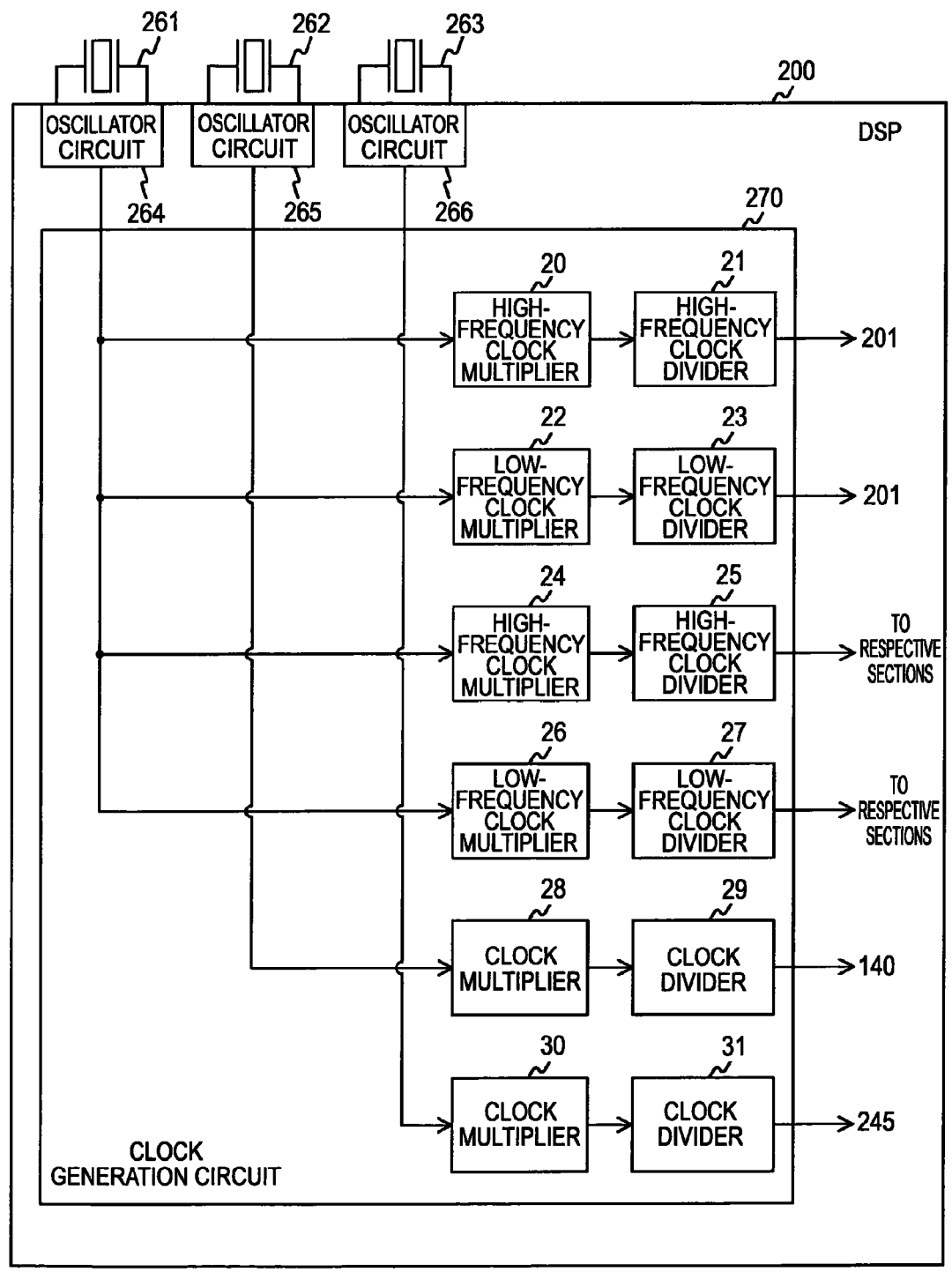
FIG. 9 is a block diagram showing an internal configuration example of a clock generation circuit 270 according to the first embodiment of the present invention.

FIG. 9 is a block diagram showing an internal configuration example of the clock generation circuit 270 according to the first embodiment of the present invention. The clock generation circuit 270 includes high-frequency clock multipliers 20 and 24, high-frequency clock dividers 21 and 25, low-frequency clock multipliers 22 and 26, and low-frequency clock dividers 23 and 27. The clock generation circuit 270 also includes clock multipliers 28 and 30 and clock dividers 29 and 31. The respective multipliers multiply the frequency of input clocks. The respective dividers divide the frequency of input clocks with a division ratio of 1/n (n is an arbitrary integer). This example shows an example in which the clock generation circuit 270 generates at least 6 kinds of clocks in accordance with the connection destination of the respective sections of the DSP 200 shown in FIG. 7.

Oscillators 261 to 263 are oscillation sources for generating clock signals supplied to the internal sections of the DSP 200, and a crystal oscillator is used, for example.

The oscillation circuits 264 to 266 generate clock signals supplied to the internal sections of the DSP 200 and output the generated clock signals to the clock generation circuit 270.

Two of the 6 kinds of clocks generated by the clock generation circuit 270 are the clocks supplied to the imaging devices 134 to 136. One of the two clocks supplied to the imaging devices 134 to 136 is a relatively high-frequency clock for generating an image with a relatively large pixel count. This clock is generated when the clock output from the oscillation circuit 264 is input and multiplied by the high-frequency clock multiplier 20, and the multiplied clock is input and divided by the high-frequency clock divider 21. The other one of the two clocks is a relatively low-frequency clock for generating an image with a relatively small pixel count. This clock is generated when the clock output from the oscillation circuit 264 is input and multiplied by the low-frequency clock multiplier 22, and the multiplied clock is input and divided by the low-frequency clock divider 23. The clocks multiplied by the high-frequency clock divider 21 and the low-frequency clock divider 23 are output as the clocks generated by the clock generation circuit 270 and are supplied to the imaging devices 134 to 136 through the internal sections of the DSP 200. Here, the clocks supplied to the imaging devices 134 to 136 are not limited to the two kinds of clocks shown in this example, but it is preferable to generate and use a larger number of kinds of clocks in accordance with the size of an image generated by the imaging operation.

The other two of the 6 kinds of clocks generated by the clock generation circuit 270 are the clocks used by the internal sections of the DSP 200. One of the two clocks used by the internal sections of the DSP 200 is a relatively high-frequency clock for generating an image with a relatively large pixel count. This clock is generated when the clock output from the oscillation circuit 264 is input and multiplied by the high-frequency clock multiplier 24, and the multiplied clock is input and divided by the high-frequency clock divider 25. The other one of the two clocks is a relatively low-frequency clock for generating an image with a relatively small pixel count. This clock is generated when the clock output from the oscillation circuit 264 is input and multiplied by the low-frequency clock multiplier 26, and the multiplied clock is input and divided by the low-frequency clock divider 27. The clocks divided by the high-frequency clock divider 25 and the low-frequency clock divider 27 are output as the clocks generated by the clock generation circuit 270 and are supplied to the internal sections of the DSP 200. Here, the clocks used by the internal sections of the DSP 200 are not limited to the two kinds of clocks shown in this example, but it is preferable to generate and use a larger number of kinds of clocks in accordance with the size of an image generated by the imaging operation.

The remaining two of the 6 kinds of clocks generated by the clock generation circuit 270 are the pixel clock for displaying images on the display section 140 and the pixel clock for displaying images on a display device (for example, the external display device 245) outside the mobile phone unit 100. The pixel clock for displaying images on the display section 140 is generated when the clock output from the oscillation circuit 265 is input and multiplied by the clock multiplier 28, and the multiplied clock is input and divided by the clock divider 29. Moreover, the pixel clock for displaying images on the display device outside the mobile phone unit 100 is generated when the clock output from the oscillation circuit 266 is input and multiplied by the clock multiplier 30, and the multiplied clock is input and divided by the clock divider 31. The clock divided by the clock divider 29 is output as the clock generated by the clock generation circuit 270 and is supplied to the display section 140 through the internal sections of the DSP 200. Moreover, the clock divided by the clock divider 31 is output as the clock generated by the clock generation circuit 270 and is supplied to the display device outside the mobile phone unit 100 through the internal sections of the DSP 200. Here, the clocks for displaying the images are not limited to the two kinds of clocks shown in this example, but it is preferable to generate and use a larger number of kinds of clocks in accordance with the specifications of a connected display device.

Figure 10:
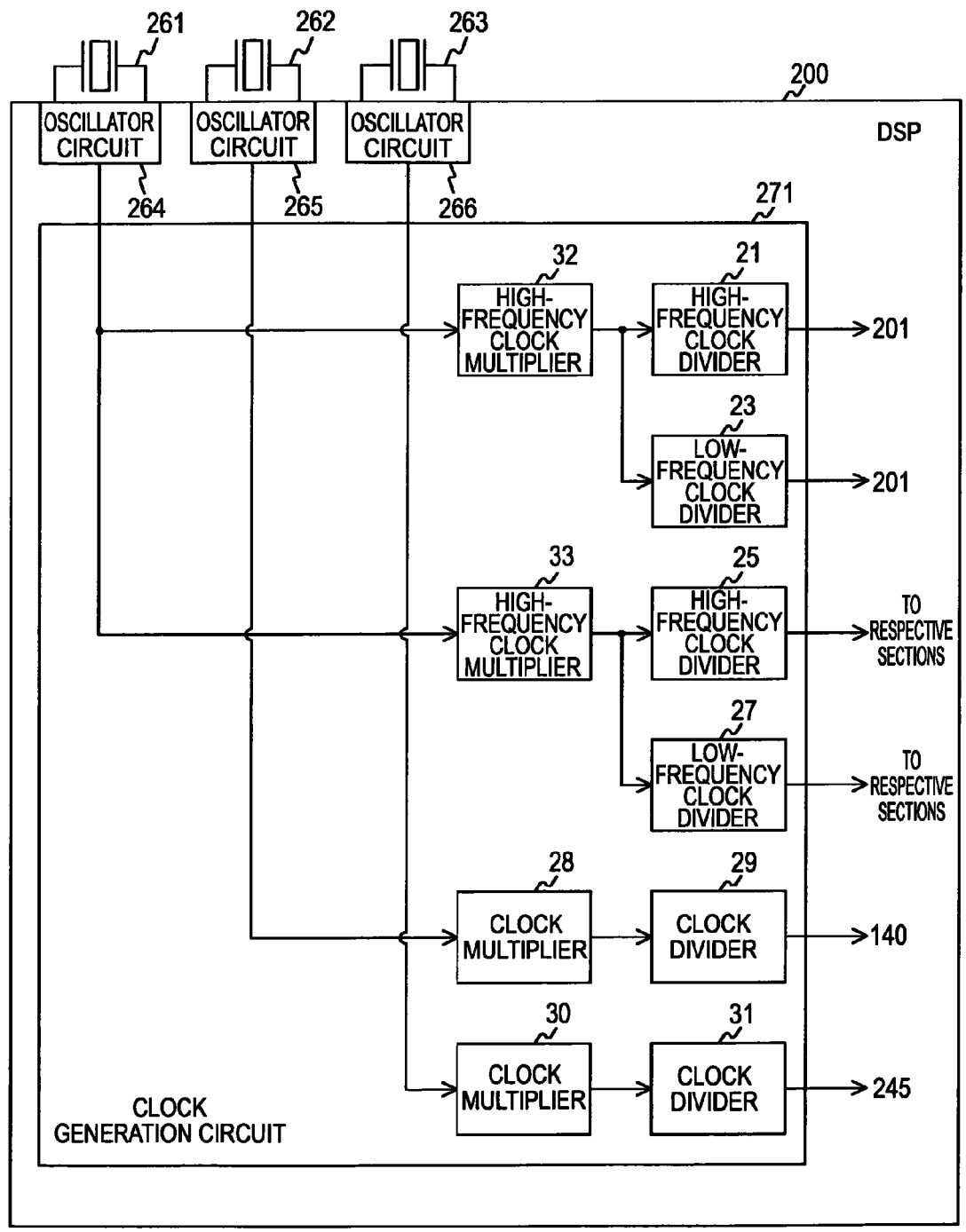
FIG. 10 is a block diagram showing a modification of the clock generation circuit 270 according to the first embodiment of the present invention.
Figure 11:
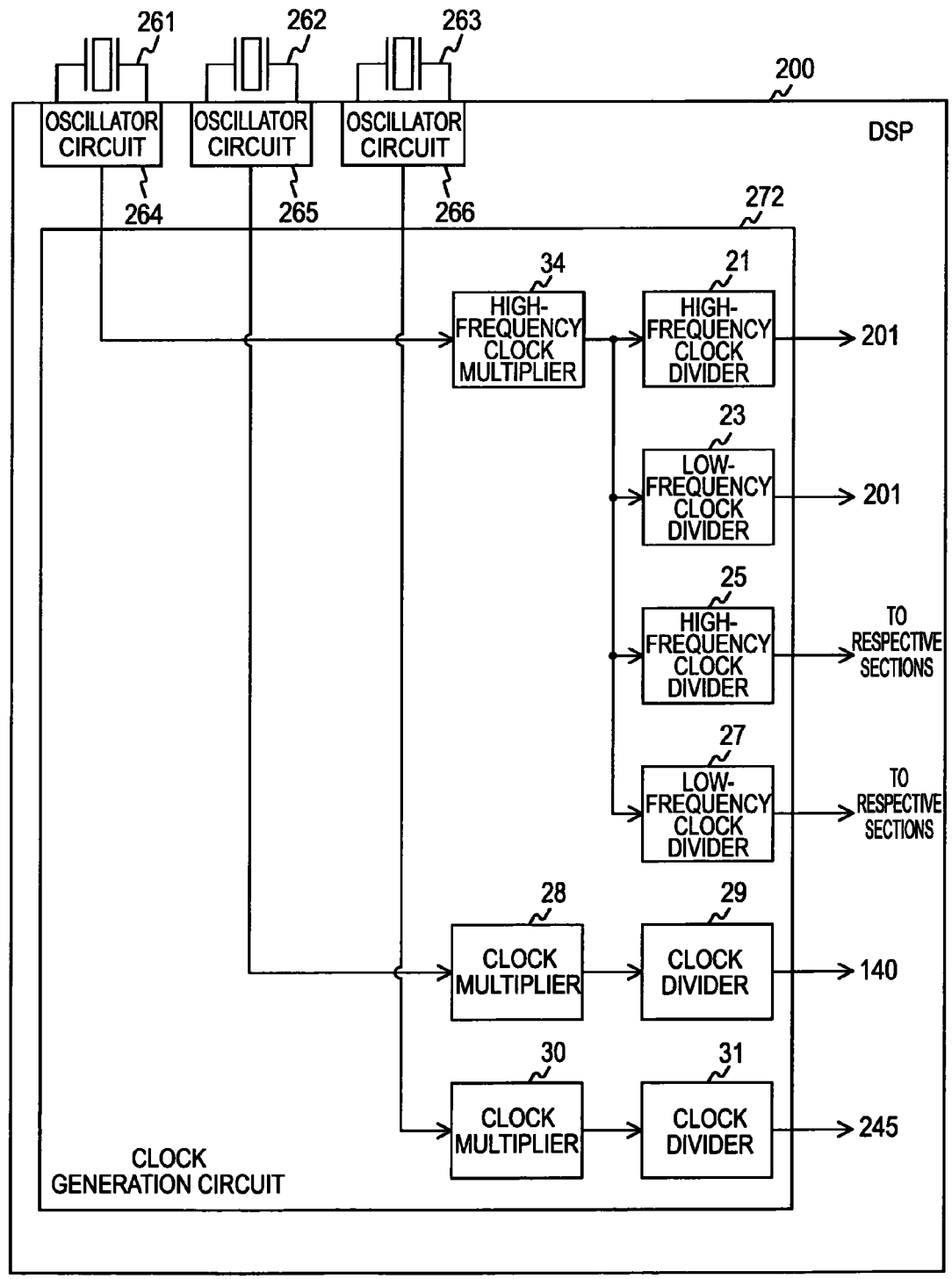
FIG. 11 is a block diagram showing another modification of the clock generation circuit 270 according to the first embodiment of the present invention.

FIGS. 10 and 11 are block diagrams showing a modification of the clock generation circuit 270 according to the first embodiment of the present invention.

FIG. 10 shows an example in which the two clocks supplied to the imaging devices 134 to 136 share one multiplier (the clock multiplier 32), and the two clocks supplied to the internal sections of the DSP 200 share one multiplier (the clock multiplier 33).

FIG. 11 shows an example in which the plurality of clocks supplied to the imaging devices 134 to 136 and the plurality of clocks supplied to the internal sections of the DSP 200 share one multiplier (the clock multiplier 34).

[Configuration Example of Imaging Device and Pixel Readout Example]

Figure 12:
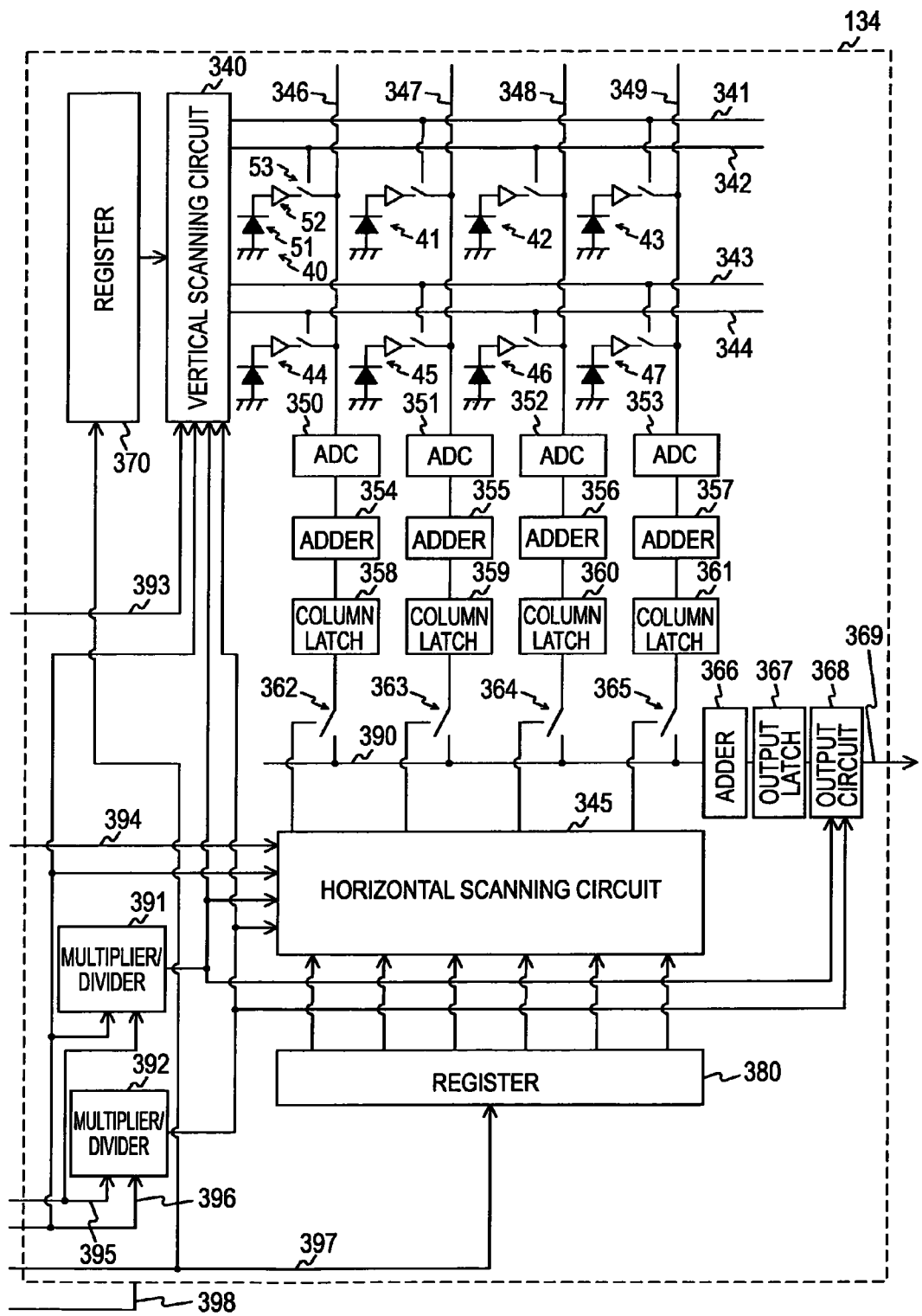
FIG. 12 is a diagram showing an internal configuration example of an imaging device according to the first embodiment of the present invention.

FIG. 12 is a diagram showing an internal configuration example of an imaging device according to the first embodiment of the present invention. Here, since the internal configurations of the imaging devices 134 to 136 are approximately the same, only the imaging device 134 is shown in FIG. 12, and the illustrations and description of the other imaging devices are omitted. Moreover, in FIG. 12, a CMOS imaging device will be described as an example of the imaging device 134.

The imaging device 134 includes pixels 40 to 47, a vertical scanning circuit 340, and a horizontal scanning circuit 345. Moreover, the imaging device 134 includes ADCs (A/D (Analog/Digital) Converter) 350 to 353, adders 354 to 357 and 366, column latches 358 to 361. Furthermore, the imaging device 134 includes switches 362 to 365, an output latch 367, an output circuit 368, registers 370 and 380, and multipliers/dividers 391 and 392. In general, a vertical line of the imaging devices is referred to as a column and a horizontal line of the imaging devices is referred to as a row. Therefore, in the following description, the notations columns and rows will be appropriately used. In this example, some pixels (the pixels 40 to 47) of the imaging device 134 and respective sections associated to the pixels will be illustrated as a representative example, and the illustrations and description of the other configurations will be omitted.

In the imaging device 134, vertical control lines 341 to 344 are laid out in the row direction, every other pixels on the same line are connected to the same vertical control line. Moreover, data readout lines 346 to 349 are laid out in the column direction, and the pixels on the same line share one readout line.

The vertical scanning circuit 340 turns ON/OFF the switches between the pixels 40 to 47 and the data readout lines 346 to 349 using the vertical control lines 341 to 344 laid out in the row direction. That is, in the respective pixels in the row direction, every other pixel among the pixels on the same line of the row direction is simultaneously turned ON/OFF by one vertical control line. Moreover, the image data of the pixels 40 to 47 are output to the data readout lines 346 to 349 through the switches between the respective pixels and the corresponding data readout lines.

The horizontal scanning circuit 345 turns ON/OFF the switches 362 to 365 between the column latches 358 to 361 and an output data line 369. Through the selection of the ON/OFF of the switches by the vertical scanning circuit 340 and the ON/OFF of the switches 362 to 365 by the horizontal scanning circuit 345, the respective pixels are sequentially selected and the whole pixel signals can be read out in a time-divided manner. Here, the output data line 369 is an output data line for outputting the output results of the respective columns from the imaging device 134.

Here, the pixels 40 to 47 are arranged in a two-dimensional square grid form in the imaging device 134. Since the configurations of the pixels 40 to 47 are the same, the pixel 40 will be described as an example. The pixel 40 includes a photodiode 51 which is a light receiving portion, an amplifier 52, and a switch 53. The photodiode 51 converts light entering the pixel to charge corresponding to the light intensity. The amplifier 52 is an amplifier that amplifies the charge signal converted by the photodiode 51. The switch 53 is a switch that controls the transfer of the charge in the pixel 40 in accordance with the ON/OFF of the vertical control line 342.

Moreover, to each column, the ADCs 350 to 353, the adders 354 to 357, and the column latches 358 to 361 are provided. In the following description, the ADC 350, adder 354, and column latch 358 connected to the data readout line 346 will be described as an example.

The ADC 350 is an AD converter that converts image data from the respective pixels, which are analog values, into digital data (digital values).

The adder 354 adds new converted digital data to digital data stored in the column latch 358 whenever digital data are converted by the ADC 350.

The column latch 358 is a column latch that sequentially stores the digital data converted by the ADC 350. Here, the column latch represents a data storage circuit that stores the AD-converted digital data. As for the data storage circuit, in addition to a latch configured by a linear circuit, various circuit capable of storing digital data such as flip-flops configured by a synchronization circuit can be used.

For example, the image data output from the pixel 40 are output to an output data line 390 after passing through the ADC 350, the adder 354, the column latch 358, and the switch 362 connected to the data readout line 346. Here, in the first embodiment of the present invention, similarly to the data readout lines of the respective columns, the output data line 390 also includes an adder 366 and an output latch 367, and addition and storage of the image data are performed. Moreover, the image data stored in the output latch 367 are output to the output data line 369 through the output circuit 368. The image data from the output data line 369 are output to the data line L1 described above.

The multipliers/dividers 391 and 392 multiply or divide the frequency of an input clock based on the control of the DSP 200. The multipliers/dividers 391 and 392 supply the generated clock to the vertical scanning circuit 340, the horizontal scanning circuit 345, and the output circuit 368.

A signal line 393 is a vertical synchronization signal line for supplying a vertical synchronization signal from the DSP 200. A signal line 394 is a horizontal synchronization signal line for supplying a horizontal synchronization signal from the DSP 200.

Moreover, a signal line 395 is a clock signal line for supplying a clock signal from the DSP 200. A signal line 396 is a signal line for controlling the ON/OFF of the imaging operation from the DSP 200 and a signal line for controlling the pixel decimation. A signal line 397 is a communication line for bidirectional communication between the imaging device 134 and the DSP 200. A signal line 398 is a power supply line.

Figure 13A:
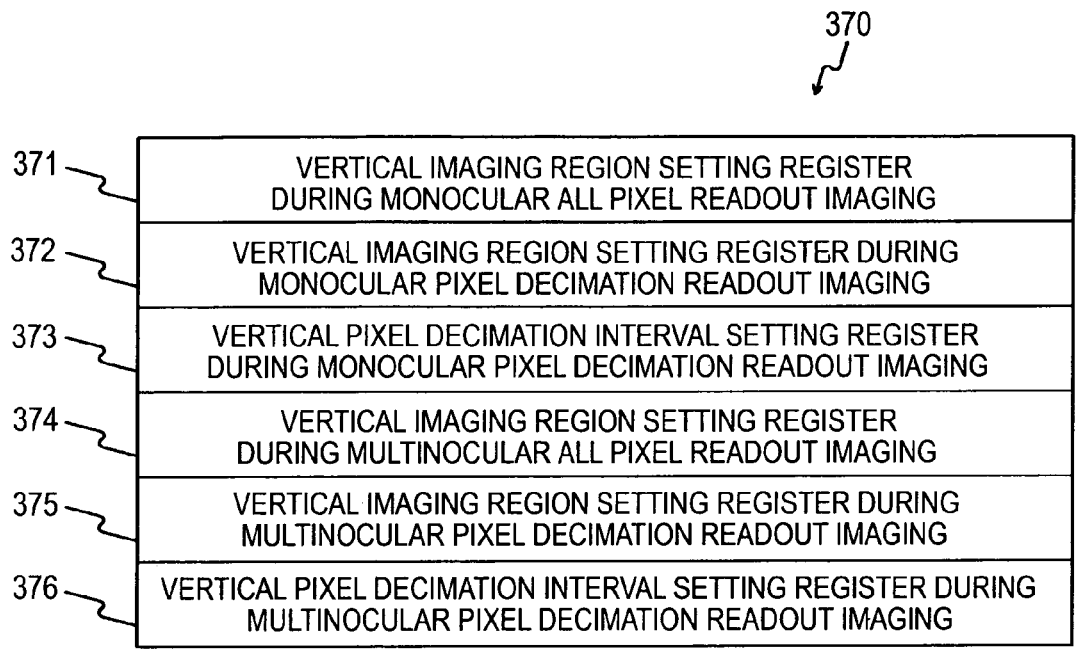
FIGS. 13A and 13B are diagrams schematically showing the contents stored in registers 370 and 380 provided in the imaging device 134 according to the first embodiment of the present invention.
Figure 13B:
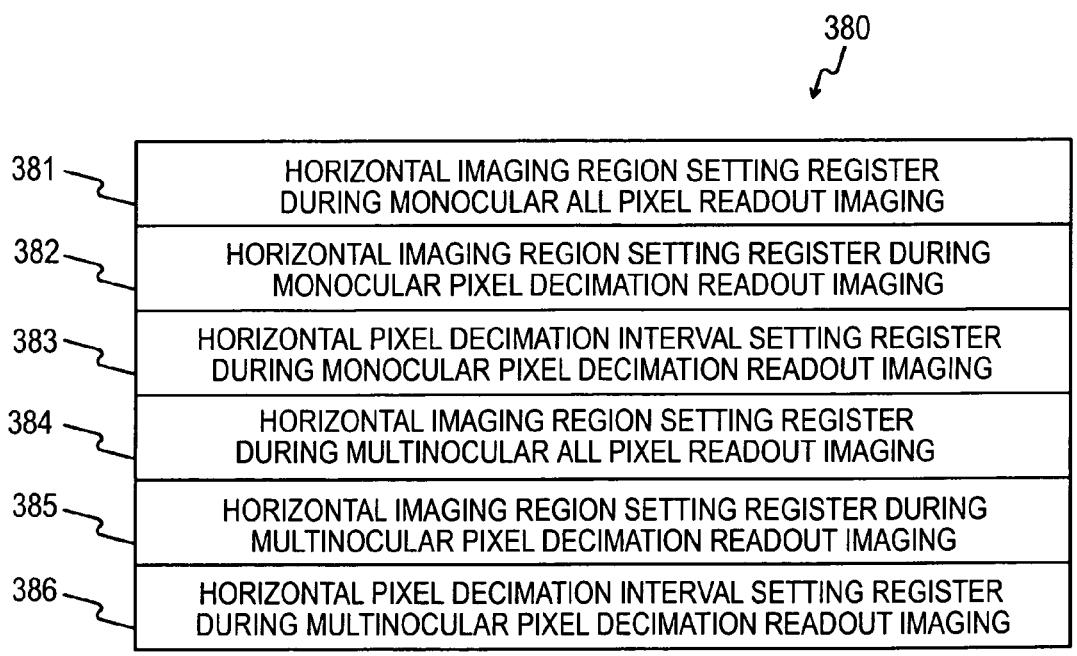

The registers 370 and 380 are registers in which respective setting values concerning the imaging operation are stored, and an example of the stored contents is shown in FIGS. 13A and 13B.

FIGS. 13A and 13B are diagrams schematically showing the contents stored in the registers 370 and 380 provided in the imaging device 134 according to the first embodiment of the present invention. In the registers 370 and 380, the respective setting values concerning the imaging operation are stored and are supplied to the vertical scanning circuit 340 and the horizontal scanning circuit 345. These setting values may be changed by the user operation. These stored contents and the imaging operation performed based on them will be described in detail with reference to FIGS. 28A and 28B and FIGS. 42A to 42C.

Figure 14:
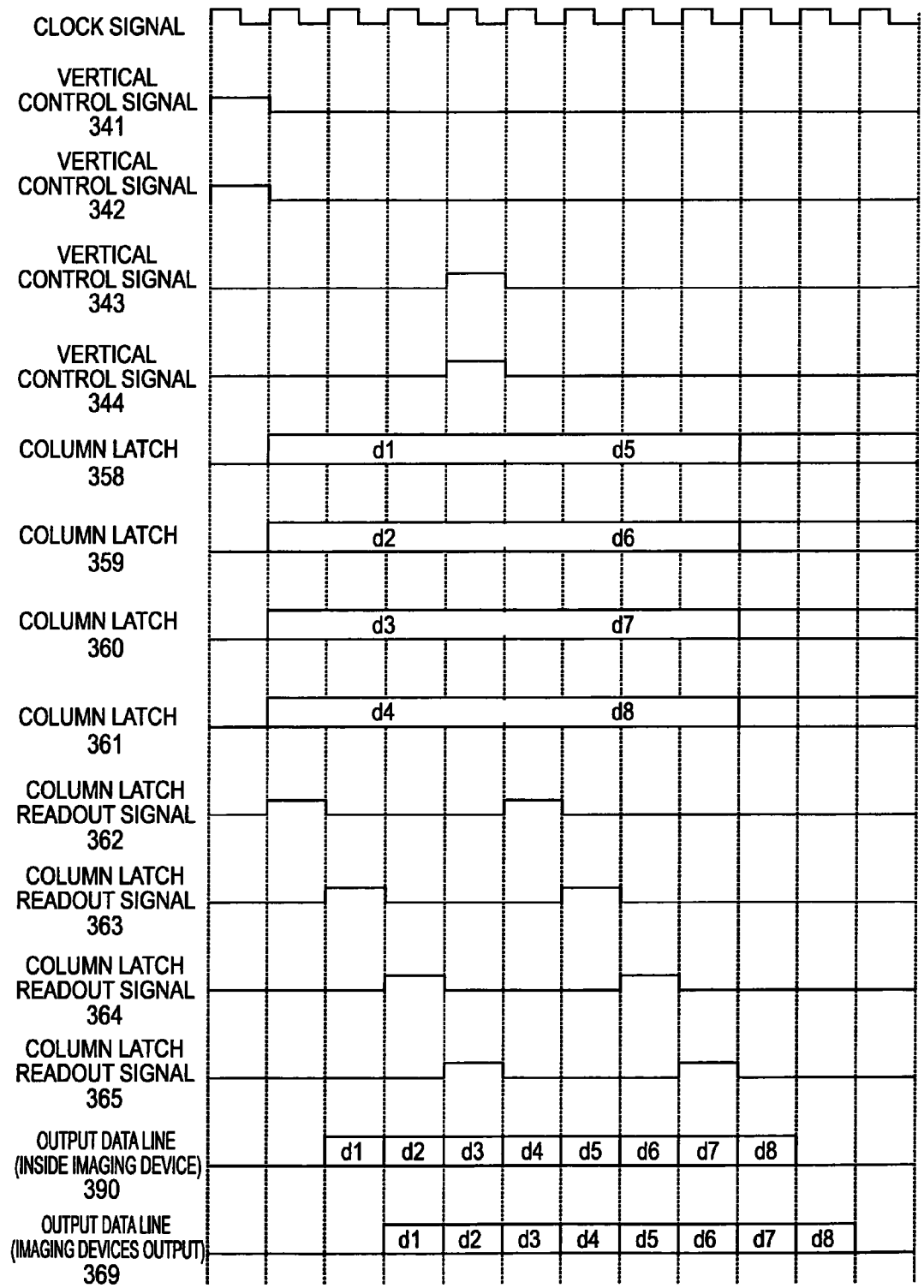
FIG. 14 is a timing chart schematically showing control signals supplied to respective pixels of the imaging device 134 and data output from the respective pixels according to the first embodiment of the present invention.
Figure 15:
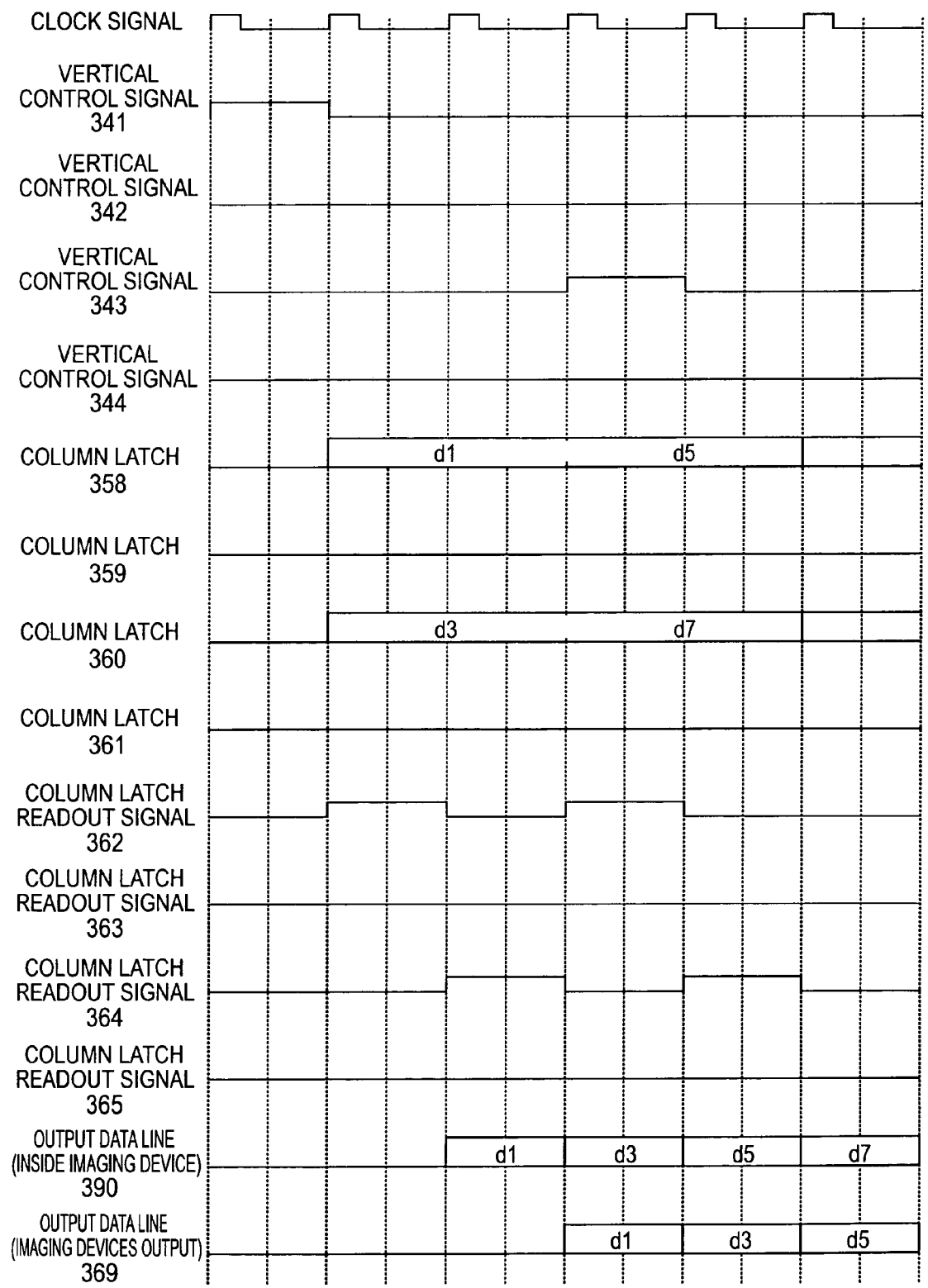
FIG. 15 is a timing chart schematically showing control signals supplied to respective pixels of the imaging device 134 and data output from the respective pixels according to the first embodiment of the present invention.
Figure 16:
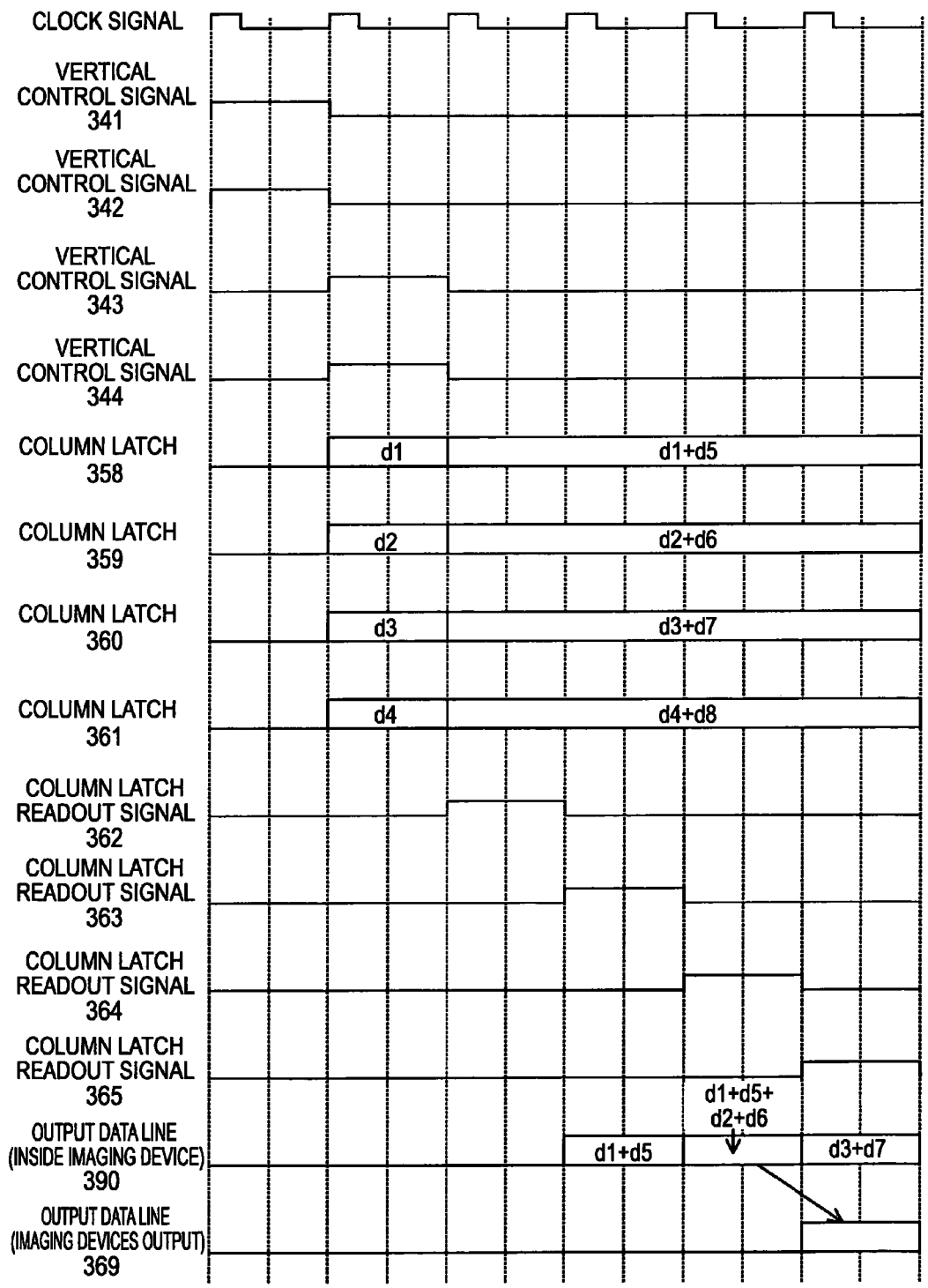
FIG. 16 is a timing chart schematically showing control signals supplied to respective pixels of the imaging device 134 and data output from the respective pixels according to the first embodiment of the present invention.

FIGS. 14 to 16 are timing charts schematically showing control signals supplied to respective pixels of the imaging device 134 and data output from the respective pixels according to the first embodiment of the present invention. The horizontal axes shown in FIGS. 14 to 16 are time axes. Moreover, the vertical control lines 341 to 344 and column latches 358 to 361 shown in FIGS. 14 to 16 will be denoted by the same reference numerals as the corresponding ones in FIG. 12. Moreover, the column latch readout signals shown in FIGS. 14 to 16 will be denoted by the same reference numerals as the corresponding switches 362 to 365 in FIG. 12.

In the example shown in FIG. 14, an imaging operation when all pixels of the respective pixels of the imaging device 134 are read out will be described.

All pixel data of the imaging device 134 connected to a certain row (for example, the line of the pixels 40 to 43) are output to the data readout lines 346 to 349 of the respective columns using the vertical control lines 341 to 344. Subsequently, the pixel data output to the data readout lines 346 to 349 are AD-converted by the ADCs 350 to 353 of the respective columns. Subsequently, the outputs of the ADCs 350 to 353 are stores in the column latches 358 to 361 of the respective columns. For example, pixel data d1 to d4 are stored in the column latches 358 to 361 shown in FIG. 14. Subsequently, the horizontal scanning circuit 345 sequentially turns ON the readout switches 362 to 365 controlling the readout of image data from the column latches 358 to 361 to the output data line 390 on a column-by-column basis. In this way, the respective pixel data in one line can be sequentially read out. For example, after the pixel data d1 is output to the output data line 390 shown in FIG. 14, the pixel data d2 and d3 are sequentially output.

Thereafter, similarly, whenever readout of one horizontal line of data ends, the vertical scanning circuit 340 sequentially turns ON the readout switches controlling the readout of image data from the respective pixels to the vertical signal line on a row-by-row basis. In this way, the respective pixel data of each row are input to the ADCs 350 to 353. The input pixel data are AD-converted by the ADCs 350 to 353, and the respective converted pixel data are stored in the column latches 358 to 361 of the respective columns. For example, pixel data d5 to d8 are stored in the column latches 358 to 361 shown in FIG. 14. Subsequently, the horizontal scanning circuit 345 sequentially turns ON the readout switches 362 to 365 controlling the readout of image data from the column latches 358 to 361 to the output data line 390 on a column-by-column basis and sequentially reads out the respective pixel data in one line. For example, the pixel data d5 to d8 are sequentially output to the output data line 390 shown in FIG. 14.

In the example shown in FIG. 15, an imaging operation when horizontal decimation readout is performed as an example of pixel decimation readout with respect to the respective pixels of the imaging device 134 will be described.

The vertical scanning circuit 340 turns ON only the readout switches on a desired column, the switches controlling the readout of image data from the respective pixels to the vertical signal lines 346 to 349. In this way, only the pixel data on a specific row are input to the ADCs 350 to 353 and are AD-converted by the ADCs 350 to 353. The outputs of the ADCs 350 to 353 are stored in the column latches 358 to 361 of the respective columns. For example, by turning ON the readout switches connected to the vertical control lines 342 and 344, the pixel data d1 and d3 are stored in the column latches 358 and 360 shown in FIG. 15. For example, after the readout of one row of image data ends, the readout switches connected to the vertical control lines 342 and 344 are turned ON, whereby the pixel data d5 and d7 are stored in the column latches 358 and 360 shown in FIG. 15.

Moreover, the horizontal scanning circuit 345 turns ON only the readout switches on a desired column, the switches controlling the readout of image data from the column latches 358 to 361 to the output data line 390. In this way, only specific pixel data in one line can be sequentially read out.

For example, when one pixel data from among N pixel data is readout in the horizontal direction, this is 1/N decimation readout in the horizontal direction. For example, when one pixel data from among two pixel data is read out, this is 1/2 decimation readout in the horizontal direction; and when one pixel data from among four pixel data is read out, this is 1/4 decimation readout in the horizontal direction.

A decimation operation in the vertical direction (namely, the column direction) can be performed at the same time as the deviation-corrected output in the horizontal direction (namely, the row direction). For example, when one line of pixel data from among M lines of image data are read out in the vertical direction, this is 1/M decimation readout in the vertical direction. For example, when one row of pixel data from among two rows of image data are read out, this is 1/2 decimation readout in the vertical direction; and when one row of pixel data from among four rows of image data are read out, this is 1/4 decimation readout in the vertical direction.

In the example shown in FIG. 16, an imaging operation when pixel addition readout is performed with respect to the respective pixels of the imaging device 134 will be described. In this example, an imaging operation when 1/2 pixel addition readout in the horizontal direction and 1/2 pixel addition readout in the vertical direction are performed as an example of pixel addition readout will be described.

Similarly to the case of performing all pixel readout, all image data of the imaging device 134 connected to a certain, row are output to the data readout lines of the respective columns using the vertical control lines and are AD-converted and stored in the column latches. In this example, unlike the case of performing all pixel readout, all image data of the imaging device 134 connected to another row are output to the data readout lines of the respective columns using another vertical control line and are AD-converted. The converted image data are added to the image data stored the column latches using an adder. Using this method, the values of the respective pixel data corresponding to a desired number in the vertical direction are added, and the added data are stored in the respective column latches. For example, pixel data d1+d5, d2+d6, d3+d7, and d4+d8 are stored in the column latches 358 to 361. In this way, after N pixel data in the vertical direction are added, the addition results are output as one pixel data, whereby 1/N pixel addition readout in the vertical direction is realized.

Subsequently, the horizontal scanning circuit 345 sequentially turns ON the readout switches controlling the readout of image data from the column latches to the output data line 390 on a column-by-column basis. In this case, the data read out from the respective column latches to the output data line 390 are added by the adder 366 of the output data line 390 and stored in the output latch 367. The addition processing is repeated for a desired number of columns in the horizontal direction, and the added data are output to the imaging device 134. For example, data d1+d5+d2+d6 which are the results of the addition of pixel data d1+d5 and pixel data d2+d6 are output to the imaging device 134 through the output data line 369. In this way, by adding the pixel data on M rows in the horizontal direction, 1/M pixel addition readout in the horizontal direction is realized. By performing the above-described processing, the addition processing in the horizontal direction (the row direction) and the addition processing in the vertical direction (the column direction) can be performed.

Here, when the decimation readout shown in FIG. 15 and the pixel addition readout shown in FIG. 16 are performed, it is preferable to operate the imaging device so as to correspond to a plurality of decimation ratios and pixel addition ratios. In the following description, a scanning circuit which operates the imaging device so as to correspond to a plurality of decimation ratios and pixel addition ratios will be described.

Figure 17A:
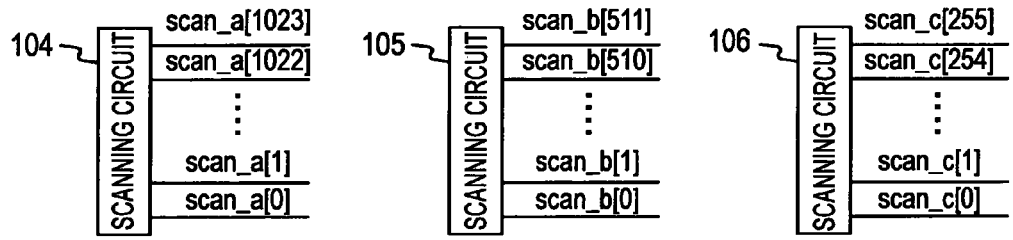
FIGS. 17A and 17B are diagrams schematically showing an example of a scanning circuit for performing decimation of the pixels of the imaging device 134 according to the first embodiment of the present invention.
Figure 17B:
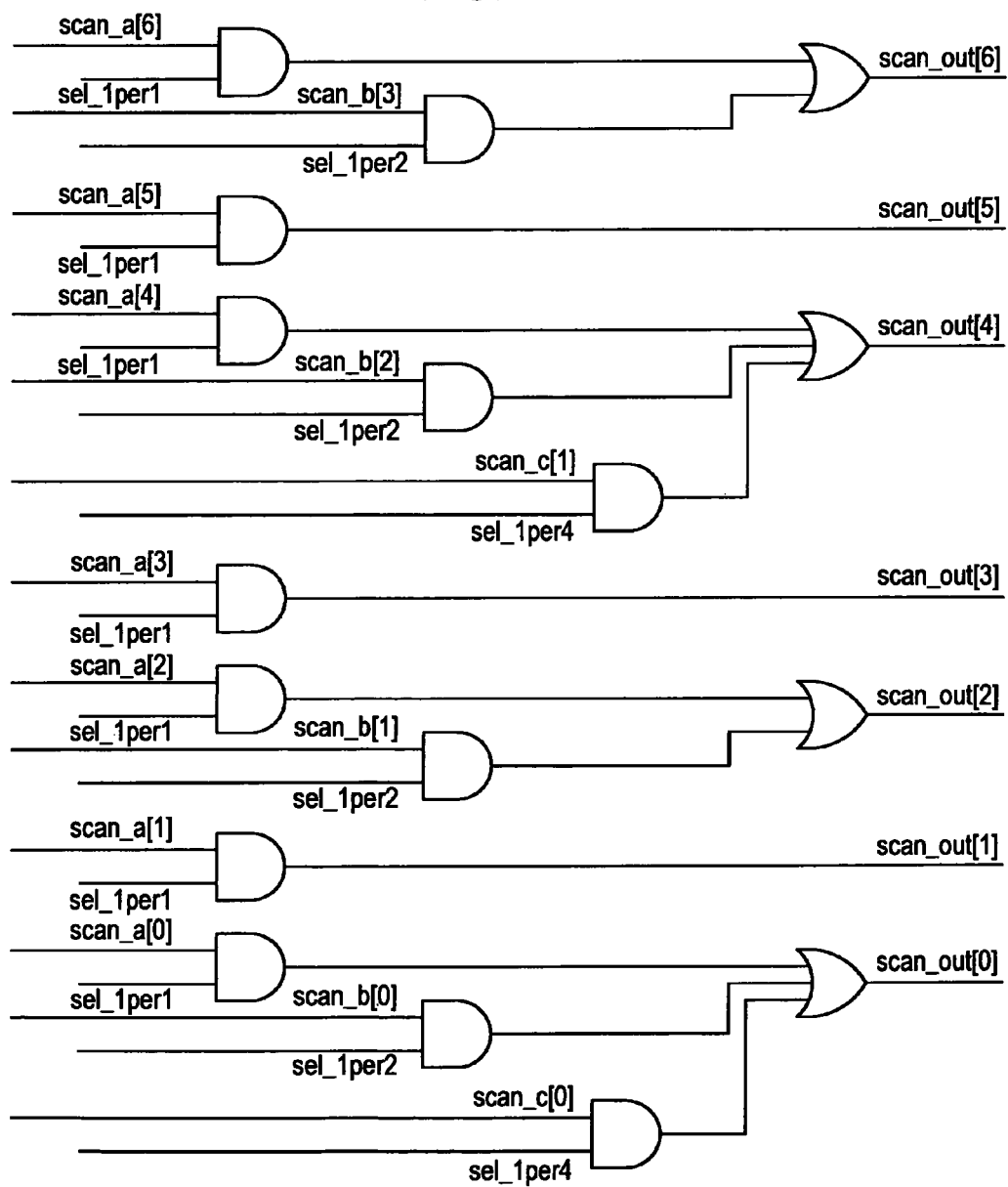

FIGS. 17A and 17B are diagrams schematically showing an example of a scanning circuit for performing decimation of the pixels of the imaging device 134 according to the first embodiment of the present invention. FIG. 17A shows three kinds of scanning circuits 104 to 106, and FIG. 17B shows a configuration example of a 1/N decimation scanning circuit. In the example shown in FIGS. 17A and 17B, a case in which the imaging device has scanning circuits for coping with three pixel decimation ratios: all pixel readout; 1/2 decimation readout; and 1/4 decimation readout, and the horizontal pixel count of the imaging device is 1024 will be described.

As shown in FIG. 17A, the scanning circuit 104 is a 1024-to-1 scanning circuit which includes 1024 output signal lines (scan_a[n]) ($0 \leq n \leq 1023$; where n is an integer) and which enables the respective signal lines one by one and then disables the enabled signal line. Moreover, the scanning circuit 105 is a 512-to-1 scanning circuit which includes 512 output signal lines (scan_b[n]) ($0 \leq n \leq 511$; where n is an integer) and which enables the respective signal lines one by one and then disables the enabled signal line. Furthermore, the scanning circuit 106 is a 256-to-1 scanning circuit which includes 256 output signal lines (scan_c[n]) ($0 \leq n \leq 255$; where n is an integer) and which enables the respective signal lines one by one and then disables the enabled signal line.

As shown in FIG. 17B, signal lines corresponding to the multiples of 4 among the 1024 output signal lines of the scanning circuit 104 are connected to the output signal lines of the scanning circuit 105, the output signal lines of the scanning circuit 106, and three control lines respectively indicating the selected one of the three pixel decimation ratios. The three control lines are control lines corresponding to all pixel readout (sel_1per1), 1/2 decimation readout (sel_1per2), and 1/4 decimation readout (sel_1per4).

Moreover, signal lines corresponding to the multiples of 2, but not the multiples of 4, among the 1024 output signal lines of the scanning circuit 104 are connected to the output signal lines of the scanning circuit 105 and two control lines respectively indicating the selected one of the two pixel decimation ratios. The two control lines are control lines corresponding to all pixel readout and 1/2 decimation readout.

Moreover, signal lines except the above-described signal lines among the 1024 output signal lines of the scanning circuit 104 are connected to a control line indicating whether all pixel readout is selected or not.

By the outputs (scan_out[n]) ($0 \leq n \leq 1023$; where n is an integer) from the scanning circuit shown in FIG. 17B, it is possible to perform decimation processing of each of all pixel readout, 1/2 decimation readout, and 1/4 decimation readout in the imaging device 134.

[Arrangement Configuration Example of Imaging System]

Figure 18:
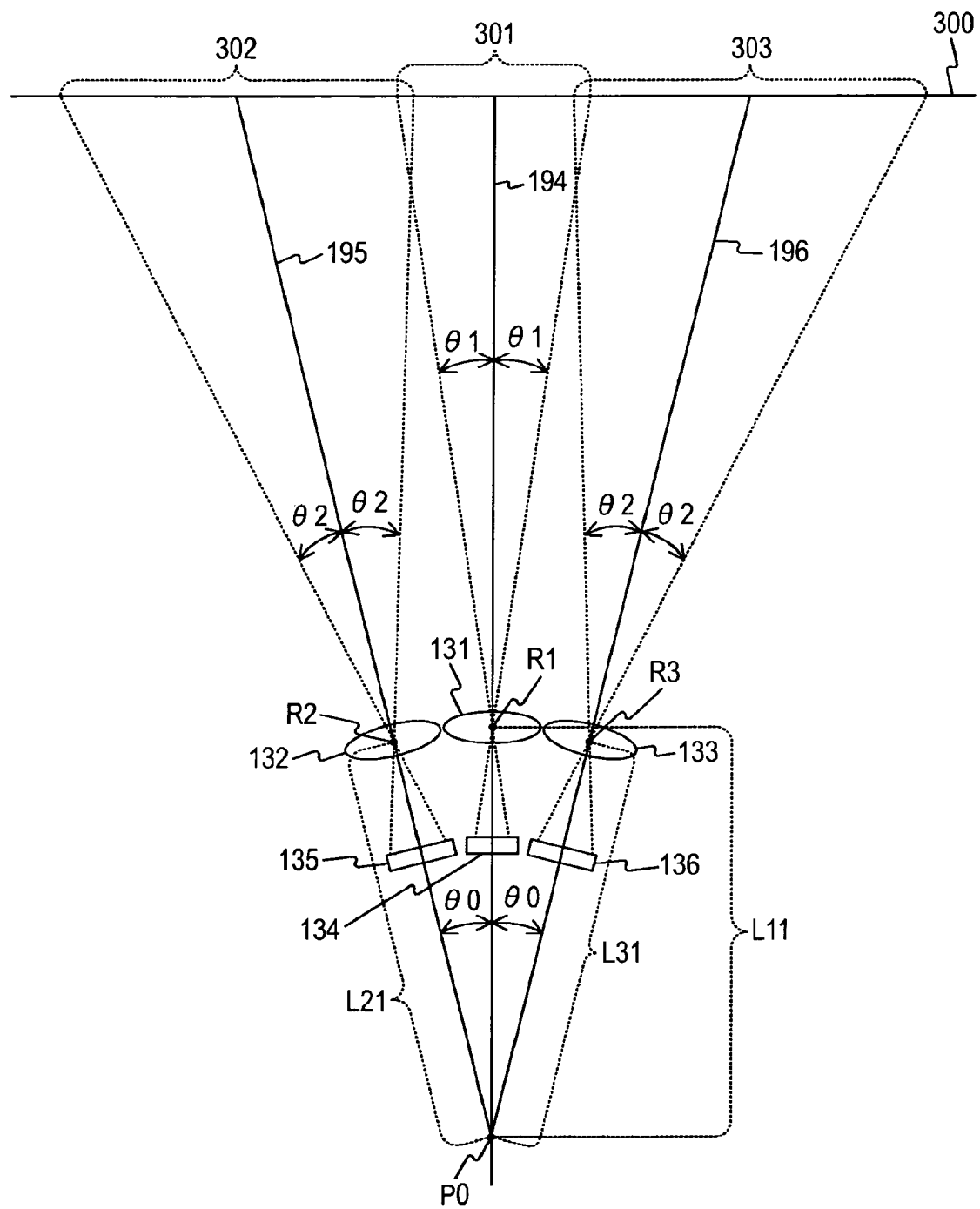
FIG. 18 is a diagram showing the relationship between a subject and the imaging section 130 according to the first embodiment of the present invention.

FIG. 18 is a diagram showing the relationship between a subject and the imaging section 130 according to the first embodiment of the present invention. In FIG. 18, only the optical systems 131 to 133 and imaging devices 134 to 136 among the first to third imaging systems 191 to 193 of the imaging section 130 shown in FIG. 3 are illustrated, and the other configurations are omitted. Moreover, FIG. 18 schematically shows a case in which, when a subject serving as an imaging target is a subject surface 300, the mobile phone unit 100 is disposed so that an optical axis 194 of the first imaging system 191 is perpendicular to the subject surface 300.

In the imaging section 130, the angle between the optical axis 194 of the first imaging system 191 and the optical axis 195 of the second imaging system 192 is assumed to be $\theta 0$. Similarly, the angle between the optical axis 194 of the first imaging system 191 and the optical axis 196 of the third imaging system 193 is assumed to be $\theta 0$. Moreover, the third imaging system 193 is disposed to be linearly symmetrical to the second imaging system 192 with the optical axis 194 of the first imaging system 191 disposed therebetween.

Moreover, in the first imaging system 191, the angle between the optical axis 194 and the outermost lines of the path of light entering the imaging device 134 is assumed to be $\theta 1$. Moreover, in the second imaging system 192, the angle between the optical axis 195 and the outermost lines of the path of light entering the imaging device 135 is assumed to be $\theta 2$. Similarly, in the third imaging system 193, the angle between the optical axis 196 and the outermost lines of the path of light entering the imaging device 136 is assumed to be $\theta 2$. For example, as shown in FIG. 18, the horizontal width of the light receiving surface of the imaging device 134 is smaller than the horizontal width of the light receiving surface of each of the imaging devices 135 and 136. Therefore, the angle of view $2 \times \theta 1$ of light entering the imaging device 134 is smaller than the angle of view $2 \times \theta 2$ of light entering the imaging devices 135 and 136.

An imaging range 301 of the subject surface 300 is specified by the angle of view $2 \times \theta 1$ of light entering the imaging device 134. Similarly, an imaging range 302 of the subject surface 300 is specified by the angle of view $2 \times \theta 2$ of light entering the imaging device 135, and an imaging range 303 of the subject surface 300 is specified by the angle of view $2 \times \theta 2$ of light entering the imaging device 136. In the first embodiment of the present invention, the images generated by the imaging devices 134 to 136 are combined to generate a panoramic image. Therefore, the angles between the respective optical axes are set so that the imaging range 301 of the subject surface 300 partially overlaps with the imaging range 302 of the subject surface 300. Specifically, the angle $\theta 0$ between the optical axis 194 of the first imaging system 191 and the optical axis 195 of the second imaging system 192 and the angle $\theta 0$ between the optical axis 194 of the first imaging system 191 and the optical axis 196 of the third imaging system 193 are set so that the imaging ranges 301 and 302 partially overlap with each other. The optical axes 194 to 196 are included in the same plane. Moreover, the first to third imaging systems 191 to 193 are disposed so that the optical axes 194 and 196 meet at one point (intersection P0).

Here, the lens center of the first imaging system 191 is assumed to be R1, the lens center of the second imaging system 192 is assumed to be R2, and the lens center of the third imaging system 193 is assumed to be R3. Moreover, the distance between the lens center R1 and the intersection P0 is assumed to be L11, the distance between the lens center R2 and the intersection P0 is assumed to be L21, and the distance between the lens center R3 and the intersection P0 is assumed to be L31. In this case, it is preferable that the first to third imaging systems 191 to 193 are disposed so that the distances L11, L21, and L31 are equal.

[Correction Example of Trapezoidal Deformation]

Figure 19:
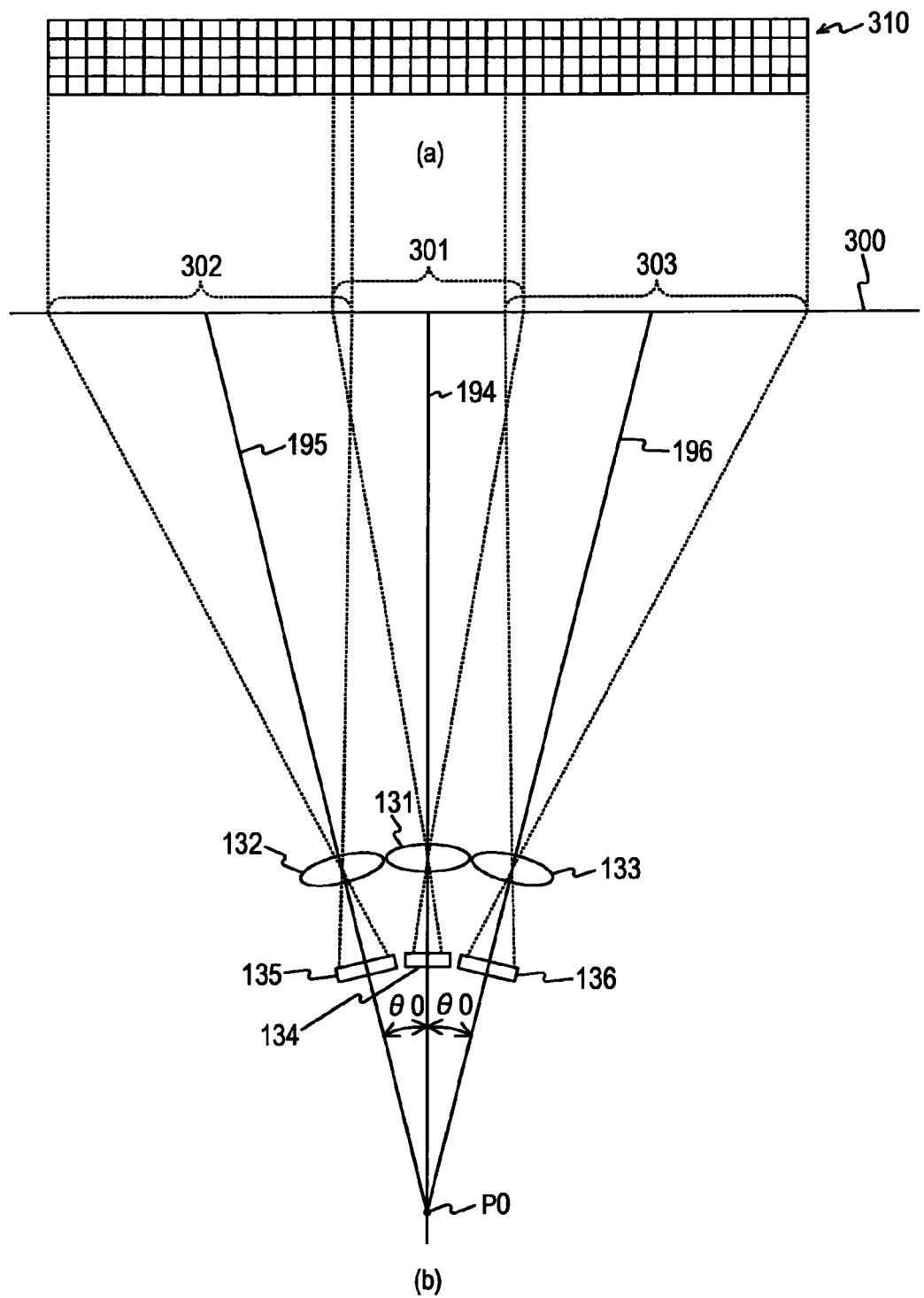
FIG. 19 is a diagram schematically showing the relationship between imaging systems of the imaging section 130 and a subject serving as an imaging target of these imaging systems according to the first embodiment of the present invention.
Figure 20:
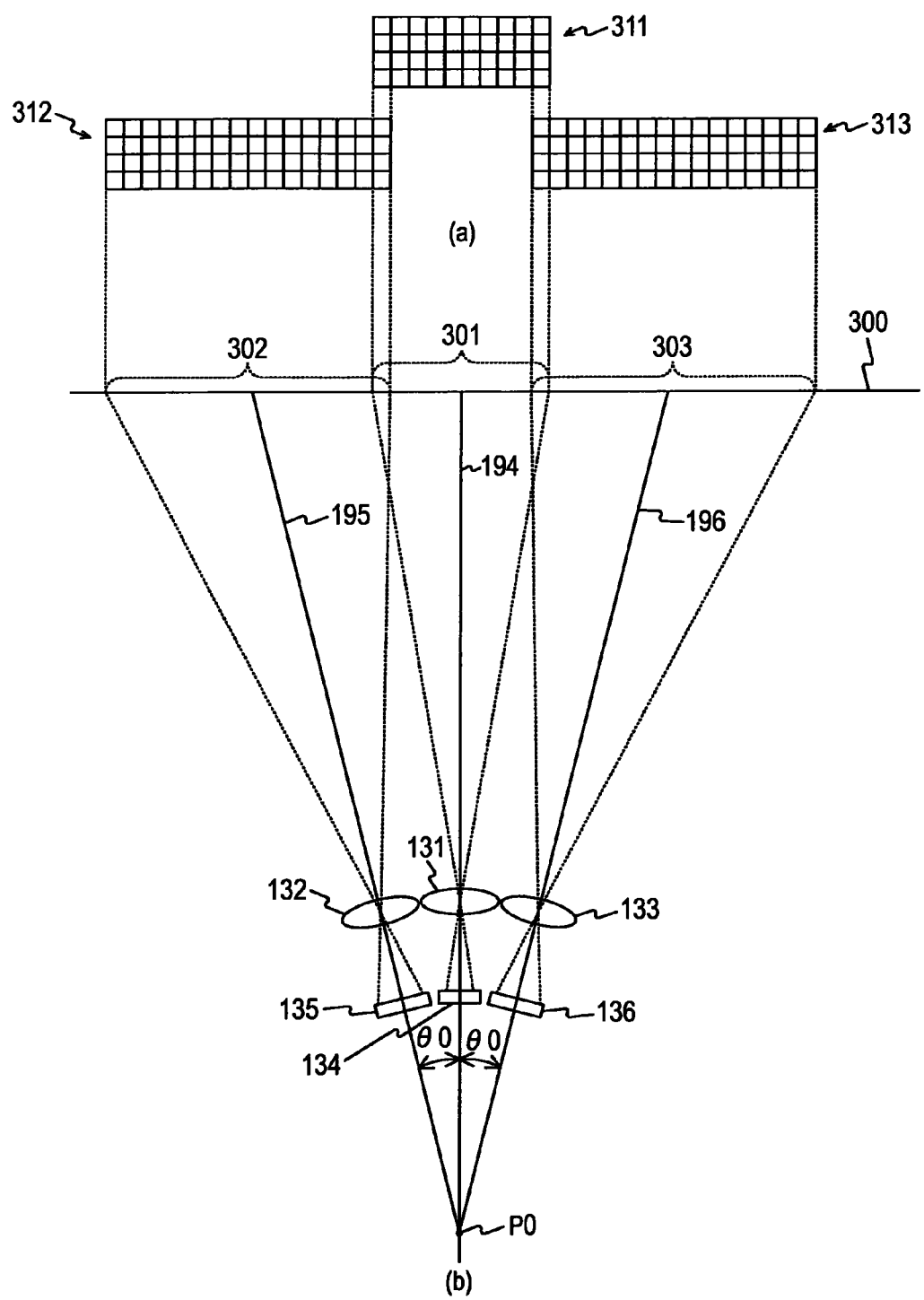
FIG. 20 is a diagram schematically showing the relationship between imaging systems of the imaging section 130 and a subject serving as an imaging target of these imaging systems according to the first embodiment of the present invention.

FIG. 19 and FIG. 20 are diagrams schematically showing the relationship between imaging systems of the imaging section 130 and a subject serving as an imaging target of these imaging systems according to the first embodiment of the present invention. (a) in FIG. 19 schematically shows a subject 310 serving as an imaging target of the imaging section 130. This subject 310 is assumed to be a subject corresponding to the subject surface 300 shown in FIG. 18. Moreover, a range corresponding to the subject 310 is depicted by a rectangle, and the inside of the rectangle is schematically illustrated in a grid form.

(a) in FIG. 20 schematically shows subjects 311 to 313 serving as imaging targets of the imaging section 130. The subject 311 is assumed to be a subject which corresponds to the first imaging system 191 and which is included in the subject 310 shown in (a) in FIG. 19. Similarly, the subject 312 is assumed to be a subject which corresponds to the second imaging system 192 and which is included in the subject 310, and the subject 313 is assumed to be a subject which corresponds to the third imaging system 193 and which is included in the subject 310. Moreover, among the subjects 311 to 313, both ends in the horizontal direction of the subject 311 and one end in the horizontal direction of each of the subjects 312 and 313 overlap with each other.

(b) in FIGS. 19 and 20 show the imaging systems of the imaging section 130. The examples shown in (b) in FIGS. 19 and 20 are the same as the example shown in FIG. 18, except that reference numerals and the like are omitted.

Figure 21:
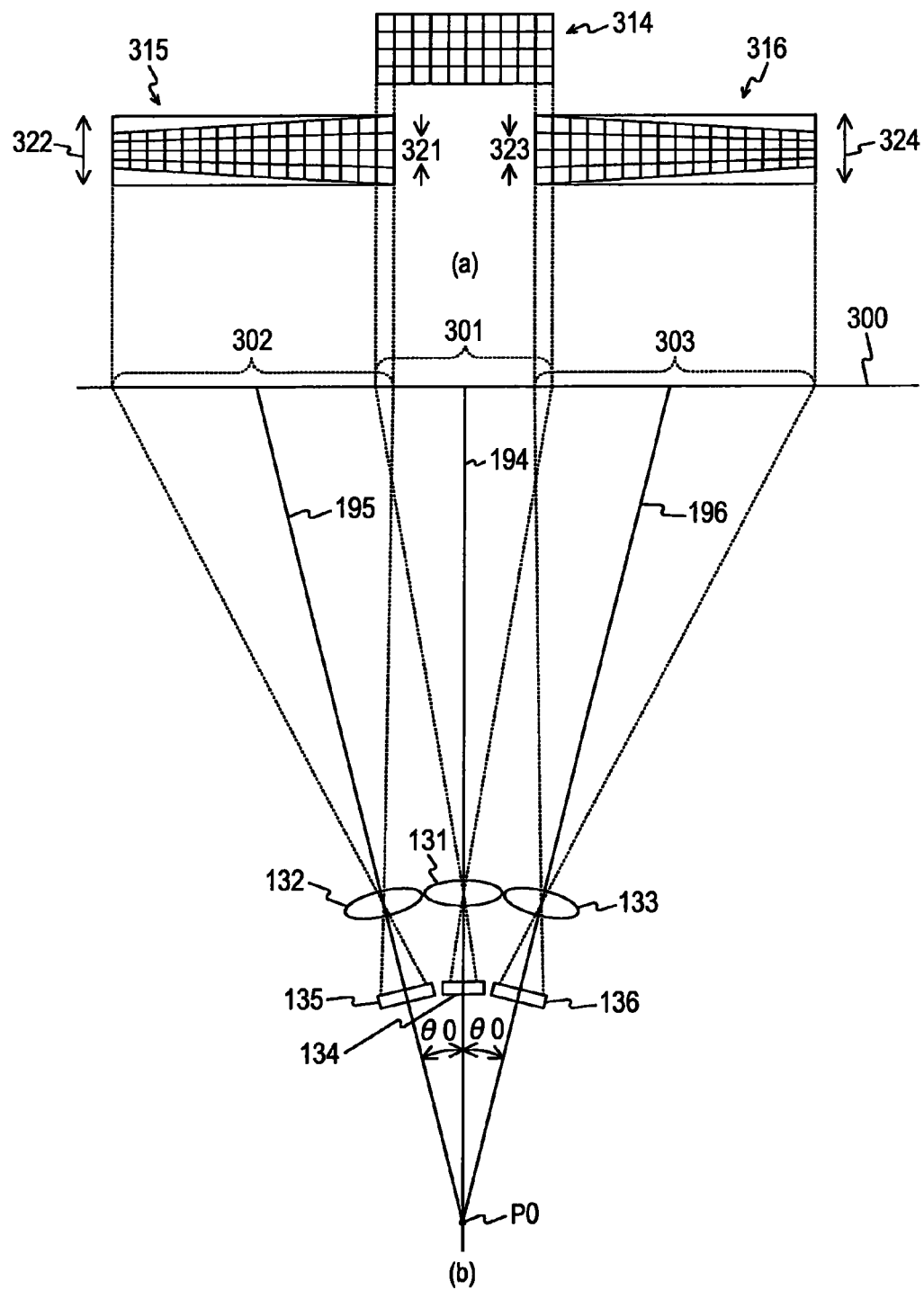
FIG. 21 is a diagram schematically showing the relationship between imaging systems of the imaging section 130 and captured images generated by these imaging systems according to the first embodiment of the present invention.

FIG. 21 is a diagram schematically showing the relationship between imaging systems of the imaging section 130 and captured images generated by these imaging systems according to the first embodiment of the present invention. (a) in FIG. 21 schematically shows captured images 314 to 316 generated by the imaging section 130. These captured images 314 to 316 are captured images corresponding to the subjects 311 to 313 shown in (a) in FIG. 20 and are schematically illustrated by rectangles in a grid form inside the subjects 311 to 313.

As shown in (a) in FIG. 21, since the optical axes 195 and 196 of the second and third imaging systems 192 and 193 are not perpendicular to the subject surface 300, a trapezoidal deformation occurs in the captured images 315 and 316. The trapezoidal deformation will be described in detail with reference to FIG. 22.

Figure 22:
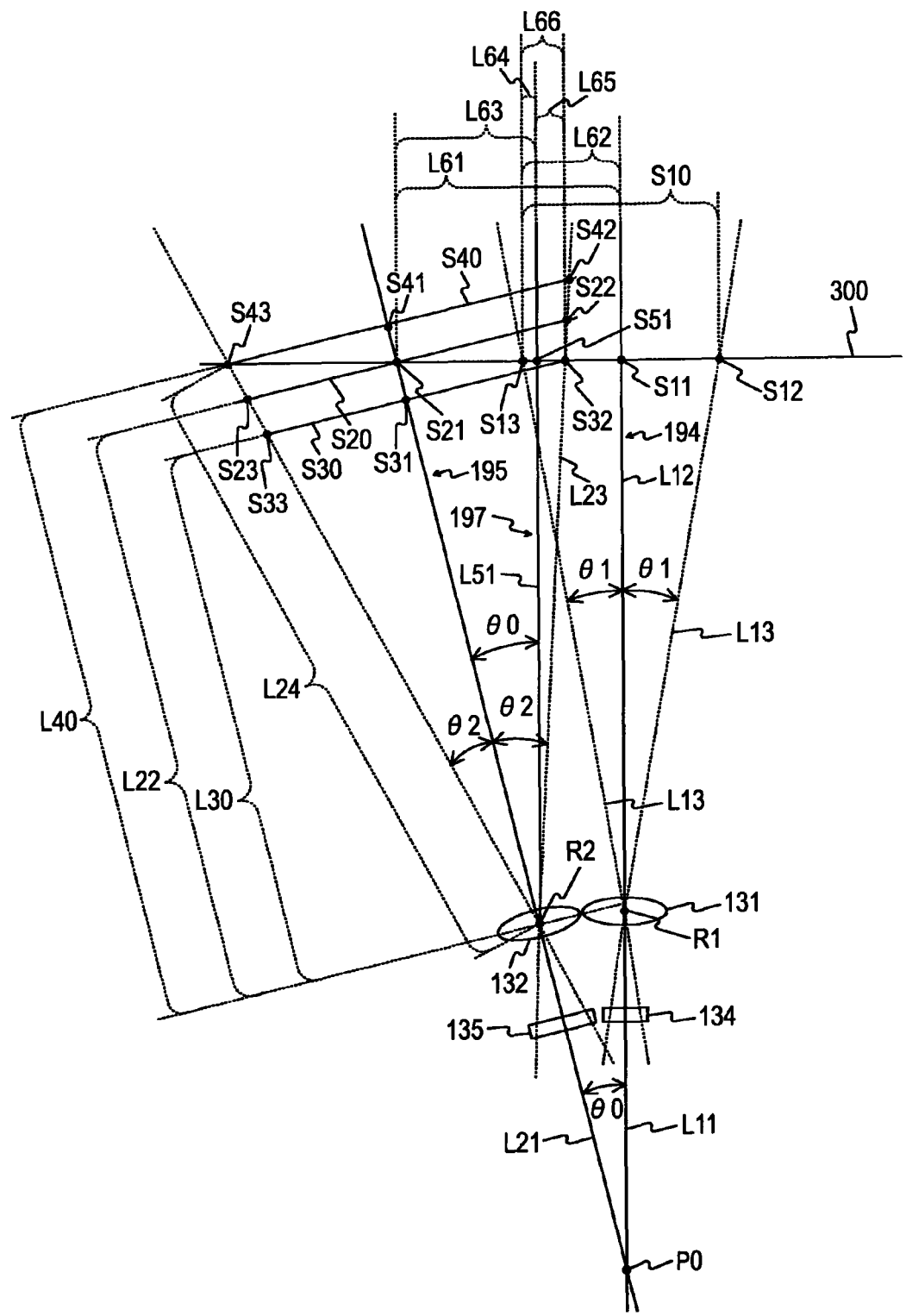
FIG. 22 is a diagram schematically showing the relationship between imaging systems of the imaging section 130 and a subject serving as an imaging target of these imaging systems according to the first embodiment of the present invention.

FIG. 22 is a diagram schematically showing the relationship between imaging systems of the imaging section 130 and a subject serving as an imaging target of these imaging systems according to the first embodiment of the present invention. In FIG. 22, in order to make the description easily understood, the configurations of the third imaging system 193 are omitted, and only the first and second imaging systems 191 and 192 are illustrated. Moreover, the example shown in FIG. 22 is approximately the same as the example shown in FIG. 18, except that the configurations of the third imaging system 193 are omitted. Moreover, since the intersection P0, the angles θ0, θ1, and θ2, the lens centers R1 and R2, and the distance L11 are the same as those of the example shown in FIG. 18, they will be denoted by the same reference numerals.

In FIG. 22, an intersection between the subject surface 300 and the optical axis 194 of the first imaging system 191 is assumed to be S11. Moreover, an intersection between the subject surface 300 and the right outer line of the angle of view of the first imaging system 191 is assumed to be S12, and an intersection between the subject surface 300 and the left outer line of the angle of view of the first imaging system 191 is assumed to be S13.

Moreover, a planar subject region which is a plane that includes the intersection S11 and is perpendicular to the optical axis 194 and which enters the first imaging system 191 is assumed to be a subject surface S10.

Moreover, an intersection between the optical axis 195 of the second imaging system 192 and the subject surface 300 is assumed to be S21, an intersection between the right outer line of the angle of view of the second imaging system 192 and the subject surface 300 is assumed to be S32, and an intersection between the left outer line of the angle of view of the second imaging system 192 and the subject surface 300 is assumed to be S43.

Moreover, a planar subject region which is a plane that includes the intersection S21 and is perpendicular to the optical axis 195 and which enters the second imaging system 192 is assumed to be a subject surface S20.

Moreover, a planar subject region which is a plane that includes the intersection S32 and is perpendicular to the optical axis 195 and which enters the second imaging system 192 is assumed to be a subject surface S30.

Moreover, a planar subject region which is a plane that includes the intersection S43 and is perpendicular to the optical axis 195 and which enters the second imaging system 192 is assumed to be a subject surface S40.

Moreover, an intersection between the subject surface S30 and the optical axis 195 is assumed to be S31, and an intersection between the subject surface S40 and the optical axis 195 is assumed to be S41.

Moreover, an intersection between the right outer line of the angle of view of the second imaging system 192 and the subject surface S20 is assumed to be S22, and an intersection between the right outer line of the angle of view of the second imaging system 192 and the subject surface S40 is assumed to be S42.

Moreover, an intersection between the left outer line of the angle of view of the second imaging system 192 and the subject surface S20 is assumed to be S23, and an intersection between the right outer line of the angle of view of the second imaging system 192 and the subject surface S30 is assumed to be S33.

Moreover, an intersection between the subject surface 300 and a line segment 197 that passes the lens center R2 of the second imaging system 192 and is perpendicular to the subject surface 300 is assumed to be S51.

For example, comparing the subject surface S40 including the left-end point S43 of the angle of view with the subject surface S30 including the right-end point S32 of the angle of view, the subject surface S40 is present at a position distant from the lens center R2 further than the subject surface S30. Therefore, when the subject surface S40 is imaged, a wider region is imaged than that when the subject surface S30 is imaged. For example, a case in which a line segment having the same length is disposed on the subject surface S40 and the subject surface S30 as a subject will be considered. In this case, comparing a captured image generated for the subject surface S30 with a captured image generated for the subject surface S40, the line segment included in the captured image generated for the subject surface S40 is shorter.

Therefore, for example, when the subject 312 shown in (a) in FIG. 20 is imaged by the second imaging system 192, a region corresponding to the subject 312 has a trapezoidal shape like a captured image 315 shown in (a) in FIG. 21. That is, in the example shown in (a) in FIG. 21, the left side of the rectangle in the captured image 315 corresponding to the subject 312 is shorter than the right side.

Similarly, when the subject 313 shown in (a) in FIG. 20 is imaged by the third imaging system 193, a region corresponding to the subject 313 has a trapezoidal shape like a captured image 316 shown in (a) in FIG. 21. As described above, a trapezoidal deformation occurs in a captured image generated by a trinocular imaging section. In the following description, a trapezoidal deformation correction method of correcting a trapezoidal deformation of a captured image will be described.

Here, the distance between the intersection S11 and the lens center R1 is assumed to be L12, and the distance between the intersection S13 and the lens center R1 and the distance between the intersection S12 and the lens center R1 are assumed to be L13.

Moreover, the distance between the intersection S21 and the lens center R2 is assumed to be L22, the distance between the intersection S31 and the lens center R2 is assumed to be L30, and the distance between the intersection S41 and the lens center R2 is assumed to be L40.

Moreover, the distance between the intersection S32 and the lens center R2 is assumed to be L23, the distance between the intersection S43 and the lens center R2 is assumed to be L24, and the distance between the intersection S51 and the lens center R2 is assumed to be L51. The distances L61 to L66 will be described with reference to FIGS. 24A to 24C.

From the formula of trigonometric functions, the following expression is satisfied.

$$L21+L22=L11+L22=(L11+L12)/\cos\theta0$$

From this expression, Expression (1) below is obtained. Here, L11=L21.

$$L22=\{(L11+L12)/\cos\theta0\}-L11 \tag{1}$$

As for the distance L51, Expression (2) below is obtained from the formula of trigonometric functions and Expression (1).

$$L51 = L22 \times \cos\theta0 \tag{2}$$
$$= [\{(L11+L12)/\cos\theta0\} - L11)] \times \cos\theta0$$

As for the distance L23, Expression (3) below is obtained from the formula of trigonometric functions and Expression (3).

$$L23 = L51/\cos(\theta2 - \theta0) \tag{3}$$
$$= (L22 \times \cos\theta0)/\cos(\theta2 - \theta0)$$

As for the distance L30, Expression (4) below is obtained from the formula of trigonometric functions and Expression (3).

$$L30 = L23 \times \cos\theta2 \tag{4}$$
$$= \{(L22 \times \cos\theta0)/\cos(\theta2-\theta0)\} \times \cos\theta2$$
$$= ([\{((L11+L12)/\cos\theta0\} - L11) \times \cos\theta0\}/$$
$$\cos(\theta2-\theta0)]) \times \cos\theta2$$

When the distances L11 and L12 in the optical axis 194 of the first imaging system 191 are determined, the distance L30 can be calculated using Expression (4). In this way, by calculating the distance L30, it is possible to calculate the value XR (=L12/L30) of the ratio of the distance L30 to the distance L12. Here, XR<1.

As for the distance L24, Expression (5) below is obtained from the formula of trigonometric functions and Expression (2).

$$L24 = L51/\cos(\theta2+\theta0) \tag{5}$$
$$= (L22 \times \cos\theta0)/\cos(\theta2+\theta0)$$

As for the distance L40, Expression (6) below is obtained from the formula of trigonometric functions and Expressions (1) and (5).

$$L40 = L24 \times \cos\theta2 \tag{6}$$
$$= \{(L22 \times \cos\theta0)/\cos(\theta2+\theta0)\} \times \cos\theta2$$
$$= [[\{(L11+L12)/\cos\theta0 - L11\} \times \cos\theta0]/$$
$$\cos(\theta2+\theta0)] \times \cos\theta2$$

When the distances L11 and L12 in the optical axis 194 of the first imaging system 191 are determined, the distance L40 can be calculated using Expression (6). In this way, by calculating the distance L40, it is possible to calculate the value XL (=L12/L40) of the ratio of the distance L40 to the distance L12. Here, XL>1.

Next, a correction method of correcting the trapezoidal deformation using the ratio values XR and XL will be described.

The respective coordinates of the captured image 315 shown in (a) in FIG. 21 are converted so that the right-side length increases/decreases by XR times and the left-side length increases/decrease by XL times. That is, on the right side of the captured image 315, the right-side length is reduced in the direction indicated by arrow 321 by XR times. On the other hand, on the left side of the captured image 315, the left-side length is enlarged in the direction indicated by arrow 322 by XL times. A corrected image 317 corrected in this way is shown in (a) in FIG. 23.

Figure 23:
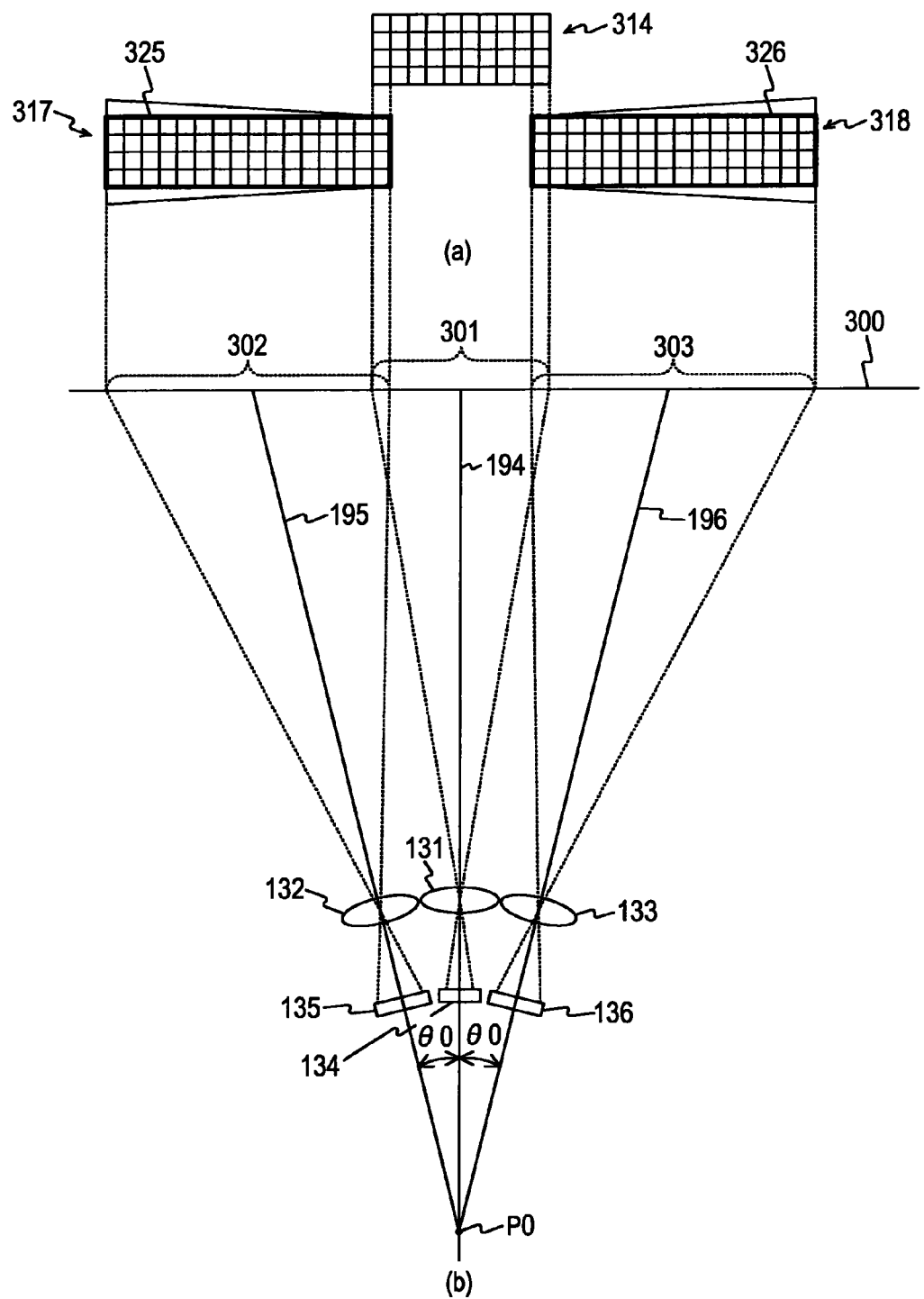
FIG. 23 is a diagram schematically showing the relationship among imaging systems of the imaging section 130, captured images generated by these imaging systems, and corrected images after correction according to the first embodiment of the present invention.

FIG. 23 is a diagram schematically showing the relationship among imaging systems of the imaging section 130, captured images generated by these imaging systems, and corrected images after correction according to the first embodiment of the present invention. (a) in FIG. 23 schematically shows the captured image 314 generated by the imaging section 130, and corrected images 317 and 318 obtained by correcting the captured images 315 and 316 shown in (a) in FIG. 21. The example shown in (b) in FIG. 23 is the same as the example shown in FIG. 18, except that the reference numerals and the like are omitted.

As described above, by converting the respective coordinates of the captured image 315 shown in (a) in FIG. 21 so that the right-side length and the left-side length increase/decrease by XR and XL times, respectively, the corrected image 317 shown in (a) in FIG. 23 is generated. The corrected image 317 generated in this way has a trapezoidal outer shape. Therefore, by cropping the central portion of the corrected image 317 into a rectangular shape, it is possible to obtain an image 325 (depicted by bold line) in which the trapezoidal deformation is corrected.

Similarly, by converting the respective coordinates of the captured image 316 shown in (a) in FIG. 21 so that the left-side length and the right-side length increase/decrease by XR and XL times, respectively, the corrected image 318 shown in (a) in FIG. 23 is generated. Moreover, by cropping the central portion of the corrected image 318 into a rectangular shape, it is possible to obtain an image 326 (depicted by bold line) in which the trapezoidal deformation is corrected. The process of correcting the trapezoidal deformation of a captured image is performed by the image combination processing section 224.

In addition, when performing such trapezoidal deformation correction processing, the coordinates of the respective pixels in the captured image deformed in a trapezoidal shape, for example, are measured, and the ratio values XR and XL are calculated in advance. Then, using the ratio values XR and XL calculated in advance, the trapezoidal deformation correction processing can be performed with the aid of software using an arithmetic device such as a CPU incorporated into the mobile phone unit 100.

Although in this example, a correction method of correcting a trapezoidal deformation of captured images occurring due to a trinocular imaging operation has been described, the correction may be performed using another trapezoidal deformation correction method (for example, see JP-A-8-307770).

[Combination Example of Captured Images]

FIGS. 24A to 24C are diagrams schematically showing the flow of combination when the image combination processing section 224 generates a combined image according to the first embodiment of the present invention. This example shows an example in which three captured images generated by three imaging systems are combined based on an angle (convergence angle) formed between the optical axes of the three imaging systems. That is, either one of the overlapping portions of two captured images generated by two imaging systems is removed based on the convergence angle, and the two captured images after the removal are combined.

FIG. 24A shows the captured image 314 and the corrected images 317 and 318 generated by the first to third imaging systems 191 to 193 of the imaging section 130. The captured image 314 and the corrected images 317 and 318 are the same as those shown in (a) in FIG. 23. As shown in FIG. 24A, through the trapezoidal deformation correction processing, the captured image 314 and corrected images 317 and 318 in which the trapezoidal deformation is corrected are obtained.

As described above, the same subject is included in the right-end region of the corrected image 317 and the left-end region of the captured image 314. Moreover, the same subject is included in the left-end region of the corrected image 318 and the right-end region of the captured image 314. In the following description, a method of calculating such regions where the same subject is included will be described.

Here, in FIG. 22, the distance between the intersection S11 and the intersection S21 is assumed to be L61, the distance between the intersection S11 and the intersection S13 is assumed to be L62, and the distance between the intersection S51 and the intersection S21 is assumed to be L63. Moreover, the distance between the intersection S13 and the intersection S51 is assumed to be L64, the distance between the intersection S32 and the intersection S51 is assumed to be L65, and the distance between the intersection S32 and the intersection S13 is assumed to be L66. The distance L66 is a distance for specifying a region where the same subject is included in the captured image generated by the first imaging system 191 and the captured image generated by the second imaging system 192. That is, the region is an overlapping region of the left-end region of the captured image generated by the first imaging system 191 and the right-end region of the captured image generated by the second imaging system 192.

From the formula of trigonometric functions, the following Expressions (7) and (8) are satisfied.

$$L61 = (L11 + L12) \times \tan\theta 0 \qquad (7)$$

$$L62 = L12 \times \tan\theta 1 \qquad (8)$$

From the formula of trigonometric functions and Expression (2), Expression (9) below is obtained.

$$L63 = L51 \times \tan\theta 0 \qquad (8)$$
$$= [\{(L11 + L12)/\cos\theta 0\} - L11] \times \cos\theta 0 \times \tan\theta 0$$

Using Expressions (7) and (8), Expression (10) below is obtained.

$$L64 = L61 - L62 - L63 \qquad (10)$$
$$= \{(L11 + L12) \times \tan\theta 0\} - (L12 \times \tan\theta 1) -$$
$$\{(L11 + L12)/\cos\theta 0\} - L11) \times \cos\theta 0 \times \tan\theta 0$$

From the formula of trigonometric functions and Expression (2), Expression (11) below is obtained.

$$L65 = L51 \times \tan(\theta 2 - \theta 0) \qquad (11)$$
$$= [\{(L11 + L12)/\cos\theta 0\} - L11] \times$$
$$\cos\theta 0 \times \tan(\theta 2 - \theta 0)$$

Using Expressions (10) and (11) obtained above, Expression (12) below is obtained.

$$L66 = L65 - L64 \qquad (12)$$
$$= \{[\{(L11 + L12)/\cos\theta 0\} - L11] \times \cos\theta 0 \times$$
$$\tan(\theta 2 - \theta 0)\} - \{\{(L11 + L12) \times \tan\theta 0\} -$$
$$(L12 \times \tan\theta 1) - \{(L11 + L12)/\cos\theta 0\} - L11) \times$$
$$\cos\theta 0 \times \tan\theta 0\}$$

When the distances L11 and L12 in the optical axis 194 of the first imaging system 191 are determined, the distance L66 can be calculated using Expression (12). Moreover, the same can be obtained for the overlapping region of the right-end region of the captured image generated by the first imaging system 191 and the left-end region of the captured image generated by the third imaging system 193.

FIG. 24B shows regions to be combined among the captured image 314 and the corrected images 317 and 318. For example, a region corresponding to the distance L66 calculated using Expression (12) is removed from the captured image 314 generated by the first imaging system 191. Similarly, the overlapping region calculated for the right-end portion of the captured image 314 is removed from the captured image 314. In FIG. 24B, the outline of an image 327 in which the overlapping regions on both ends are removed is depicted by bold line.

FIG. 24C shows a panoramic image 330 generated using the captured image 314 and the corrected images 317 and 318. As shown in FIG. 24B, after the images at both ends of the captured image 314 are removed, a panoramic image is generated using the image 327 after the removal and the corrected images 317 and 318. For example, the corrected image 317 is connected to the left end of the image 327 and the corrected image 318 is connected to the right end of the image 327, whereby the panoramic image 330 is generated.

FIGS. 25A to 25C are diagrams schematically showing the flow of combination when the image combination processing section 224 generates a combined image according to the first embodiment of the present invention. The example shown in FIGS. 25A and 25B is a modification of the example shown in FIGS. 24A and 24B, the images including the regions removed during the image combination are different. That is, as shown in FIG. 25B, a region (the right-end region) corresponding to the distance L66 calculated using Expression (12) is removed from the corrected image 317 corresponding to the captured image generated by the second imaging system 192. Similarly, the overlapping region calculated for the left-end portion is removed from the corrected image 318. In FIG. 25B, the outlines of images 332 and 333 in which the overlapping regions are removed are depicted by bold line.

FIG. 25C shows a panoramic image 330 generated using the images 331 to 333. As shown in FIG. 25B, the image 332 is connected to the left end of the image 331 and the image 333 is connected to the right end of the image 331, whereby the panoramic image 330 is generated.

FIGS. 26A to 26C are diagrams schematically showing the flow of combination when the image combination processing section 224 generates a combined image according to the first embodiment of the present invention. The example shown in FIGS. 26A and 26B is a modification of the example shown in FIGS. 24A and 24B, the images including the regions removed during the image combination are different. That is, as shown in FIG. 26B, a region corresponding to the half of the distance L66 calculated using Expression (12) is removed from the captured image 314 generated by the first imaging system 191. Moreover, a region (the right-end region) corresponding to the half of the distance L66 calculated using Expression (12) is removed from the corrected image 317 corresponding to the captured image generated by the second imaging system 192.

Similarly, the half of the overlapping region calculated for the right-end portion of the captured image 314 is removed from the captured image 314, and a region (the left-end region) corresponding to the half of the overlapping region is removed from the corrected image 318 corresponding to the captured image generated by the third imaging system 193. In FIG. 26B, the outlines of images 334 and 336 in which the overlapping regions are removed are depicted by bold line.

FIG. 26C shows a panoramic image 330 generated using the images 334 to 336. As shown in FIG. 26B, the image 335 is connected to the left end of the image 334 and the image 336 is connected to the right end of the image 334, whereby the panoramic image 330 is generated. In this way, by removing parts of the respective images, the images can be appropriately combined.

The image combination processing is performed by the image combination processing section 224. FIG. 8 shows an example of the image signal processing section 220 in which the YC conversion processing section 223 is disposed at the succeeding stage of the image combination processing section 224 and is disposed at the preceding stage of the sharpness processing section 225. However, the image combination processing may be performed at a different stage in the image signal processing section 220. For example, the trapezoidal deformation correction processing and the image combination processing may be performed at the preceding stage of the demosaic processing section 222. Moreover, for example, the trapezoidal deformation correction processing and the image combination processing may be performed at the succeeding stage of the demosaic processing section 222 and may be performed at the preceding stage of the YC conversion processing section 223. Furthermore, for example, the trapezoidal deformation correction processing and the image combination processing may be performed at the succeeding stage of the color adjustment processing section 226.

When performing the image combination processing, the overlapping regions of the respective images in which the trapezoidal deformation is corrected are measured in advance, for example. Then, using the measured values, the process of removing the overlapping regions of the images can be performed with the aid of software using an arithmetic device such as a CPU incorporated into the mobile phone unit 100.

Although in this example, a method of combining three captured images based on the convergence angle has been described, the image combination processing may be performed, for example, using other image combination methods. For example, an image combination method in which pattern matching is performed on the overlapping portions of two images generated by two imaging systems, and the two images are combined by the pattern matching may be used. Moreover, an image combination method in which changes in the density level of two images generated by two imaging systems are calculated, overlapping portions are calculated based on the changes in the density level, and the two images are combined may be used.

[Control Example of Imaging Mode]

Next, an example in which image data are read out from the imaging devices 134 to 136 and the image is displayed on the display section 140 will be described.

Figure 27:
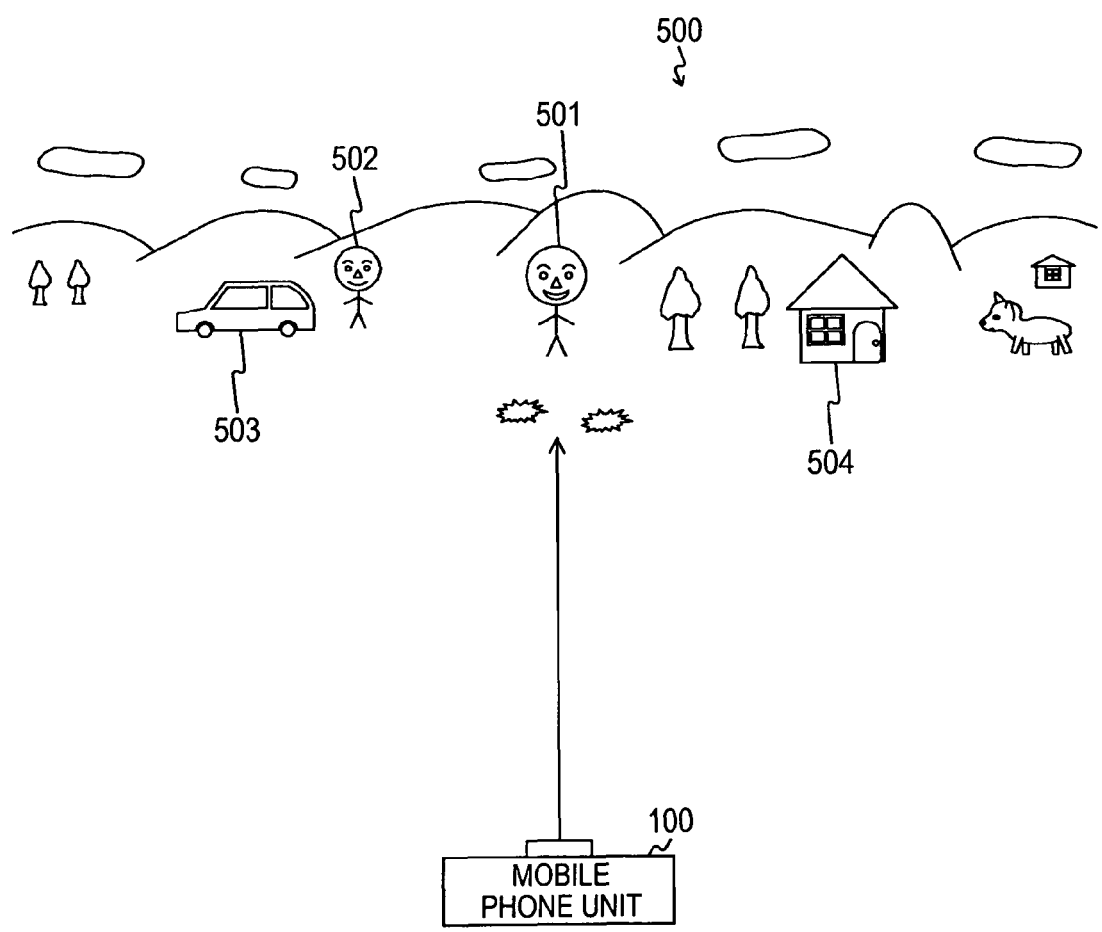
FIG. 27 is a diagram showing a subject 500 serving as an imaging target of an imaging process by the mobile phone unit 100 according to the first embodiment of the present invention.

FIG. 27 is a diagram showing a subject 500 serving as an imaging target of an imaging process by the mobile phone unit 100 according to the first embodiment of the present invention. The subject 500 is a subject, for example, including persons 501 and 502 standing with a mountain as the background, and a car 503, a house 504, and the like around the persons.

[Control Example in Imaging Mode with Second Casing in Horizontal State]

First, a readout method of reading out image data from the respective imaging devices and a method of displaying the readout image data when the second casing 120 is in the horizontal state will be described. Moreover, in the first embodiment of the present invention, five imaging modes are described as possible imaging modes when the second casing 120 is in the horizontal state.

[Control Method in Trinocular Horizontal Wide-Angle Imaging Mode]

Figure 28A:
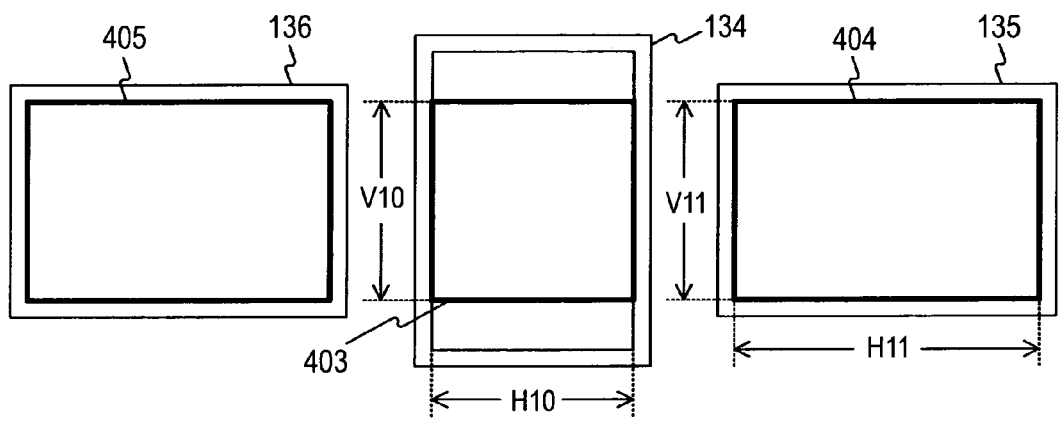
FIGS. 28A and 28B are diagrams schematically showing an example of an image data readout method (first readout method) in the imaging devices 134 to 136 according to the first embodiment of the present invention.
Figure 28B:
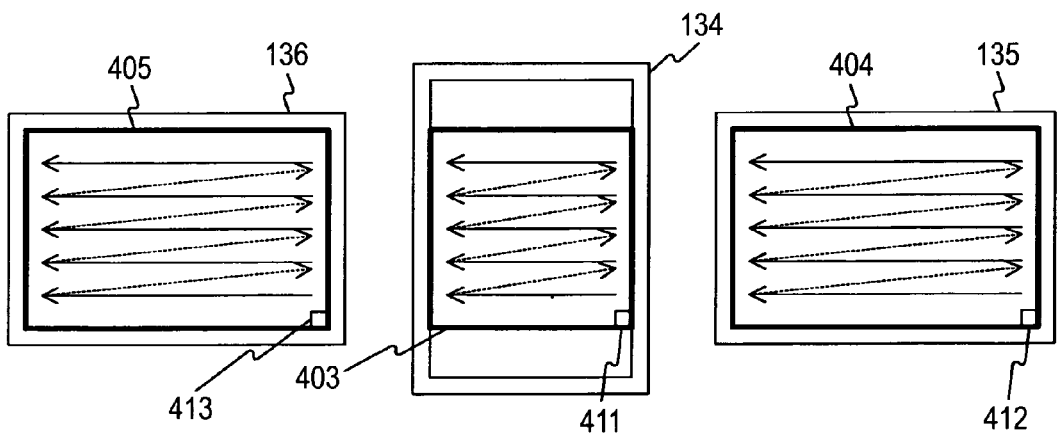

FIGS. 28A and 28B are diagrams schematically showing an example of an image data readout method (first readout method) in the imaging devices 134 to 136 according to the first embodiment of the present invention.

FIG. 28A shows pixel data readout regions 403 to 405 in which pixel data are read out from the imaging devices 134 to 136. The pixel data readout regions 403 to 405 are the same as the pixel data readout regions 403 to 405 shown in FIG. 4B. Therefore, they will be denoted by the same reference numerals, and redundant description thereof will be omitted. In the following description, the outlines of the pixel data readout regions of the imaging devices 134 to 136 are depicted by bold line. Here, the pixel data readout regions 403 to 405 are regions which are determined based on the setting contents stored in the registers 370 and 380 shown in FIGS. 13A and 13B. This example shows an example in which all pixels of the respective pixels included in the pixel data readout regions 403 to 405 are read out.

In the first embodiment of the present invention, an example in which an imaging device having a pixel count of 1440×1920 pixels and the horizontal-to-vertical ratio of the pixels is 3:4 is used as the imaging device 134, for example, will be described. Moreover, an example in which an imaging device having a pixel count of 1920×1440 pixels and the horizontal-to-vertical ratio of the pixels is 4:3 is used as the imaging devices 135 and 136, for example, will be described.

The respective setting values concerning the readout of pixel data of the imaging devices 134 to 136 when performing the readout operation are stored in the registers 370 and 380 shown in FIGS. 13A and 13B. Specifically, the following setting values (11) to (17) are stored in a vertical imaging region setting register 374 during multinocular all pixel readout imaging and a horizontal imaging region setting register 384 during multinocular all pixel readout imaging.

(11) A horizontal pixel count H10 of a readout region (pixel data readout region 403) of the imaging device 134.

(12) A vertical pixel count V11 of a readout region (pixel data readout region 403) of the imaging device 134.

(13) A horizontal pixel count H11 of a readout region (pixel data readout regions 404 and 405) of the imaging devices 135 and 136.

(14) A vertical pixel count V11 of a readout region (pixel data readout regions 404 and 405) of the imaging devices 135 and 136.

(15) Horizontal and vertical pixel counts from a pixel array end to a readout start position in the imaging devices 134 to 136.

(16) A vertical back porch period from a vertical synchronization signal to a vertical pixel readout start position in the imaging devices 134 to 136.

(17) A horizontal back porch period from a horizontal synchronization signal to a horizontal pixel readout start position in the imaging devices 134 to 136.

These setting values may be set in advance, and may be set to the vertical imaging region setting register 374 during multinocular all pixel readout imaging and the horizontal imaging region setting register 384 during multinocular all pixel readout imaging through the signal line L2 by the user operation.

FIG. 28B shows readout start positions 411 to 413 and a readout scanning direction in the pixel data readout regions 403 to 405. The readout start positions 411 to 413 and the readout scanning direction are the same as the readout start positions 411 to 413 and the readout scanning direction shown in FIG. 6A. Therefore, they will be denoted by the same reference numerals, and redundant description thereof will be omitted.

In this way, the overlapping portions of the respective images of the image data read out from the imaging devices 134 to 136 are removed as described above, whereby a combined image is generated. However, in the following description, in order to make the description easily understood, the overlapping portions of the respective images will not be taken into consideration in the description. In this example, parts of image data (1440×1440 pixels) are read out from the imaging device 134 having 1440×1920 pixels, and all image data are read out from the imaging devices 135 and 136 having 1920×1440 pixels. When combining the image data read out in this way, an image having about 7.6 million pixels (5280×1440 pixels) and a horizontal-to-vertical ratio of 11:3 is generated. A display example of the combined image generated in this way is shown in FIGS. 29A to 29C.

Figure 29A:
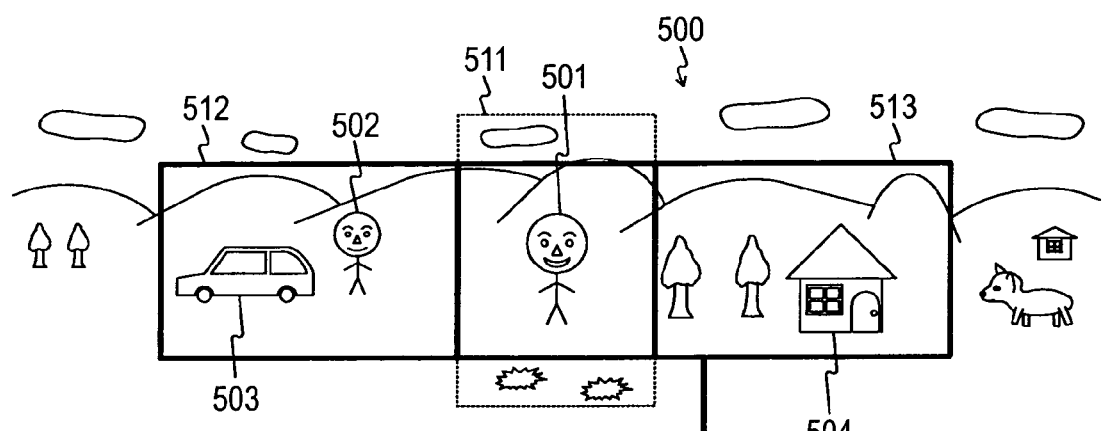
FIGS. 29A to 29C are diagrams showing an image display example in the display section 140 according to the first embodiment of the present invention.
Figure 29B:
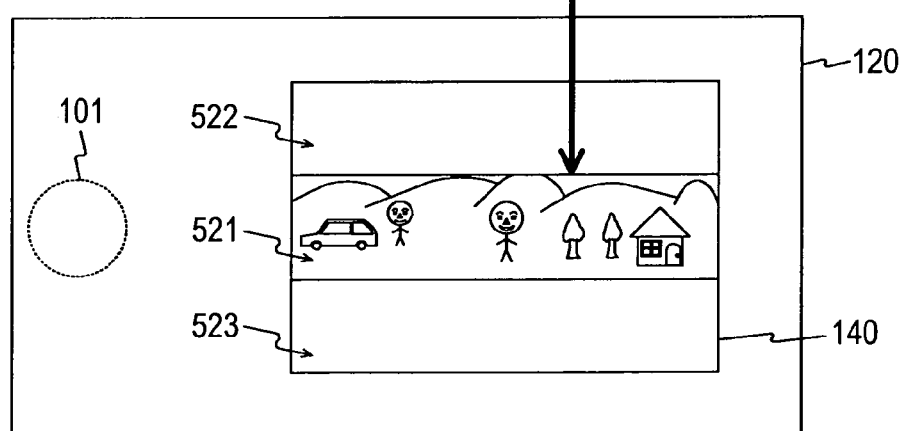
Figure 29C:
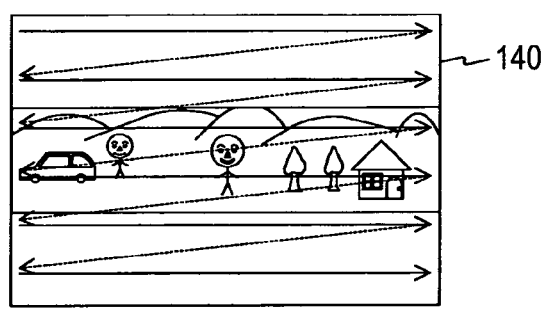

FIGS. 29A to 29C are diagrams showing an image display example in the display section 140 according to the first embodiment of the present invention. The example shown in FIGS. 29A to 29C is a display example of displaying image data read out by the first readout method shown in FIGS. 28A and 28B.

FIG. 29A shows a subject 500 serving as an imaging target of the imaging process by the mobile phone unit 100. The subject 500 is the same as that shown in FIG. 27. Here, imaging ranges 511 to 513 in the subject 500 are assumed to be imaging ranges corresponding to the pixel data readable regions 400 to 402 of the imaging devices 134 to 136 shown in FIG. 4A. That is, it is assumed that the imaging range 511 corresponds to the pixel data readable region 400 of the imaging device 134, the imaging range 512 corresponds to the pixel data readable region 401 of the imaging device 135, and the imaging range 513 corresponds to the pixel data readable region 402 of the imaging device 136. Moreover, the outlines of the regions of the imaging ranges 511 to 513 corresponding to the pixel data readout regions 403 to 404 shown in FIGS. 28A and 28B are depicted by bold line.

FIG. 29B shows a display example of displaying the image data read out by the first readout method shown in FIGS. 28A and 28B on the display section 140 when the subject 500 is an imaging target. In FIG. 29B, the first casing 110 among the first and second casings 110 and 120 of the mobile phone unit 100 is not illustrated. Moreover, in the following display examples shown below, the first casing 110 will be omitted.

As described above, since the horizontal-to-vertical ratio of the display section 140 is 4:3, it is not possible to display an image having a horizontal-to-vertical ratio of 11:3 on the entire screen of the display section 140. Therefore, when the respective pixels of the display section 140 are square grids, the image having a horizontal-to-vertical ratio of 11:3 which is read out and generated by the first readout method shown in FIGS. 28A and 28B is subjected to resolution conversion and then displayed. For example, the resolution of the image is converted in the horizontal and vertical directions so that the horizontal pixel count of the image is approximately the same as the horizontal pixel count of the display section 140 and the horizontal-to-vertical ratio is 11:3.

As shown in FIG. 29B, the resolution-converted combined image is displayed on the central portion (captured image display region 521) in the vertical direction of the display section 140. Here, for example, a single-color image is displayed in the blank portions (blank image display regions 522 and 523) above and below the displayed image.

When the respective pixels of the display section 140 are not square grids, the magnification of resolution conversion may be changed using the vertical-to-horizontal ratio of the pixels of the display section 140 so that the image displayed on the display section 140 has a proper shape, and then the resolution-converted image may be displayed.

FIG. 29C shows the scanning direction in the display section 140 when displaying the pixel data read out from the imaging devices 134 to 136. Since the scanning direction is the same as that of the example shown in FIG. 6C, redundant description thereof will be omitted.

[Control Example in Trinocular Horizontal Narrow-Angle Imaging Mode]

Figure 30A:
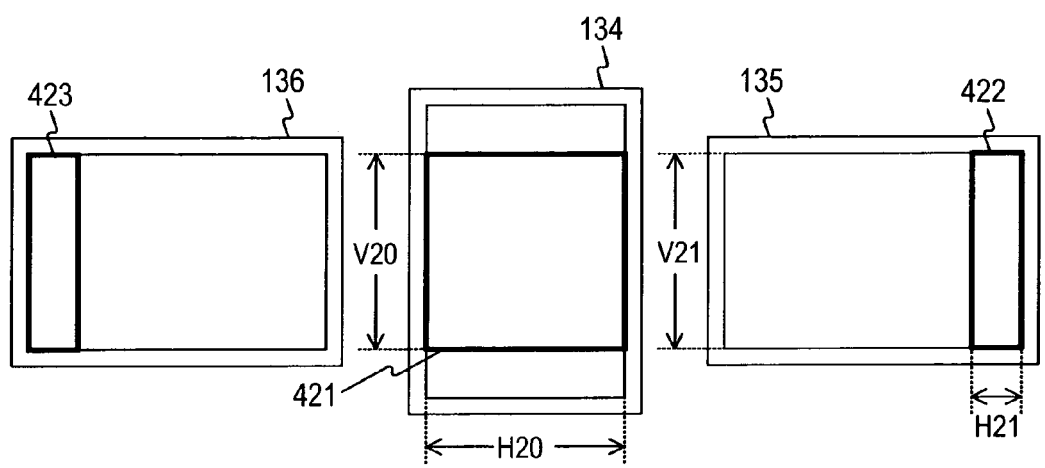
FIGS. 30A and 30B are diagrams schematically showing an example of an image data readout method (second readout method) in the imaging devices 134 to 136 according to the first embodiment of the present invention.
Figure 30B:
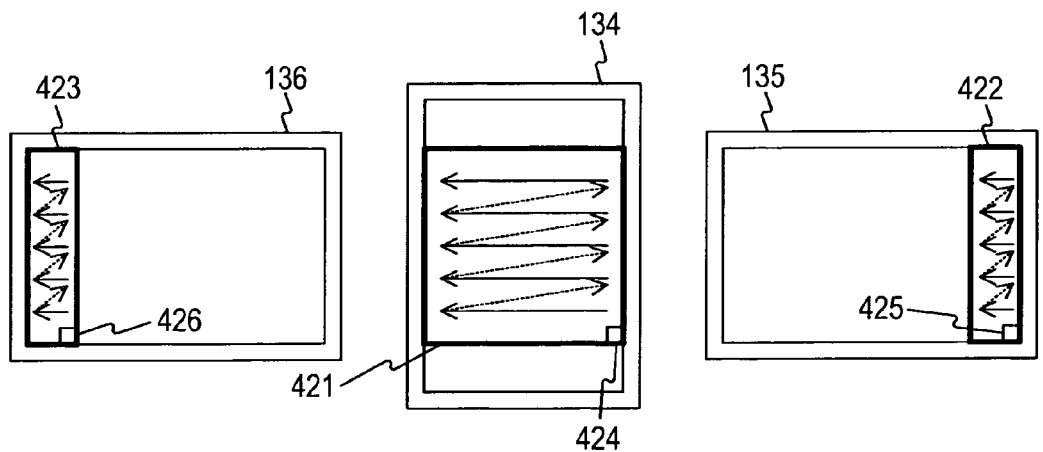

FIGS. 30A and 30B are diagrams schematically showing an example of an image data readout method (second readout method) in the imaging devices 134 to 136 according to the first embodiment of the present invention.

FIG. 30A shows pixel data readout regions 421 to 423 in which pixel data are read out from the imaging devices 134 to 136. The second readout method is a method of reading out horizontal images which are familiar to the users of imaging apparatuses such as digital still cameras. In the second readout method, for example, a partial region of the imaging device 134 is read out, and a partial region of each of the imaging devices 135 and 136 is read out.

The pixel data readout region 421 is assumed to be the same as, for example, the pixel data readout region 403 shown in FIGS. 28A and 28B (for example, a region having 1440×1440 pixels). Moreover, the pixel data readout regions 422 and 423 are assumed to have a vertical length V21 that is the same as, for example, the vertical length V20 of the pixel data readable regions 401 and 402. Moreover, the pixel data readout regions 422 and 423 are assumed to have a horizontal length H21 that is 1/6 of the horizontal length of the pixel data readable regions 401 and 402. That is, the pixel data readout regions 422 and 423 are assumed to be regions having 240×1140 pixels, for example. Moreover, the pixel data readout regions 421 to 423 are regions which are determined based on the setting contents stored in the registers 370 and 380 shown in FIGS. 13A and 13B. This example shows an example in which all pixels of the respective pixels included in the pixel data readout regions 421 to 423 are read out. Here, since a so-called reversed image is imaged in the imaging devices 134 to 136, the pixel data readout regions 422 and 423 of the imaging devices 135 and 136 are regions on the opposite sides of the imaging device 134.

The respective setting values concerning the readout of pixel data of the imaging devices 134 to 136 when performing the readout operation are stored in the registers 370 and 380 shown in FIGS. 13A and 13B. Specifically, the following setting values (21) to (27) are stored in the vertical imaging region setting register 374 during multinocular all pixel readout imaging and the horizontal imaging region setting register 384 during multinocular all pixel readout imaging.

(21) A horizontal pixel count H20 of a readout region (pixel data readout region 421) of the imaging device 134.

(22) A vertical pixel count V21 of a readout region (pixel data readout region 421) of the imaging device 134.

(23) A horizontal pixel count H21 of a readout region (pixel data readout regions 422 and 423) of the imaging devices 135 and 136.

(24) A vertical pixel count V21 of a readout region (pixel data readout regions 422 and 423) of the imaging devices 135 and 136.

(25) Horizontal and vertical pixel counts from a pixel array end to a readout start position in the imaging devices 134 to 136.

(26) A vertical back porch period from a vertical synchronization signal to a vertical pixel readout start position in the imaging devices 134 to 136.

(27) A horizontal back porch period from a horizontal synchronization signal to a horizontal pixel readout start position in the imaging devices 134 to 136.

These setting values may be set in advance, and may be set to the vertical imaging region setting register 374 during multinocular all pixel readout imaging and the horizontal imaging region setting register 384 during multinocular all pixel readout imaging through the signal line L2 by the user operation.

FIG. 30B shows readout start positions 424 to 426 and a readout scanning direction in the pixel data readout regions 421 to 423. In this example, parts of image data (1440×1440 pixels) are read out from the imaging device 134 having 1440×1920 pixels. Moreover, parts of image data (240×1440 pixels) are read out from the imaging devices 135 and 136 having 1920×1440 pixels. When combining the image data read out in this way, an image having about 2.76 million pixels (1920×1440 pixels) and a horizontal-to-vertical ratio of 4:3 is generated. A display example of the combined image generated in this way is shown in FIGS. 29A to 29C.

As described above, the pixel data readout regions 421 to 423 are examples of the readout regions in the imaging devices 135 and 136, of which the size is decreased from that of the first readout method. Moreover, a combined image generated by combining the image data read out by the second readout method has a horizontal-to-vertical ratio of 4:3 (which may be 16:9 or the like). Therefore, it is possible to generate and display a combined image having the same horizontal-to-vertical ratio as the horizontal-to-vertical ratio of recording images used in imaging apparatuses which are presently commercially available on the market.

Figure 31A:
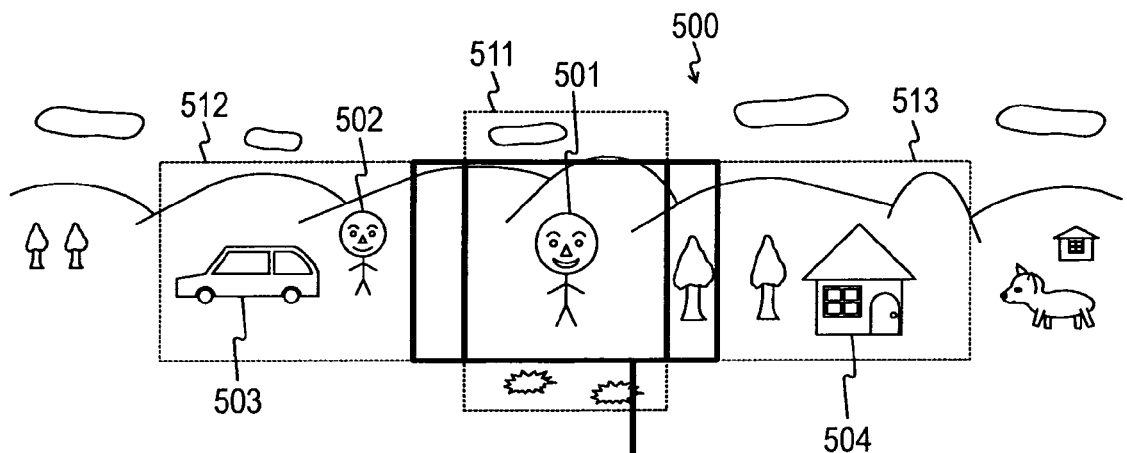
FIGS. 31A to 31C are diagrams showing an image display example in the display section 140 according to the first embodiment of the present invention.
Figure 31B:
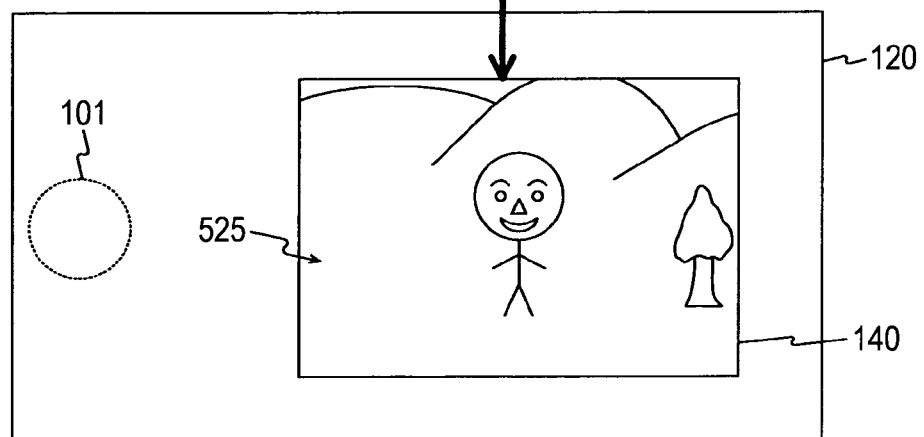
Figure 31C:
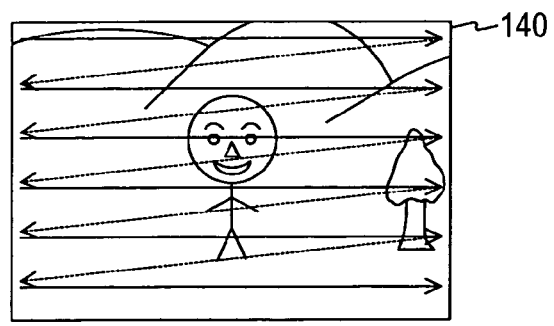

FIGS. 31A to 31C are diagrams showing an image display example in the display section 140 according to the first embodiment of the present invention. The example shown in FIGS. 31A to 31C is a display example of displaying image data read out by the second readout method shown in FIGS. 30A and 30B.

FIG. 31A shows a subject 500 serving as an imaging target of the imaging process by the mobile phone unit 100. The example shown in FIG. 31A is approximately the same as the example shown in FIG. 29A, except that the pixel data readout region is changed. Therefore, the same portions as those in FIG. 29A will be denoted by the same reference numerals, and description of those portions will be omitted. Moreover, the outlines of the regions of the imaging ranges 511 to 513 corresponding to the pixel data readout regions 421 to 423 shown in FIGS. 30A and 30B are depicted by bold line.

FIG. 31B shows a display example of displaying the image data read out by the second readout method shown in FIGS. 30A and 30B on the display section 140 when the subject 500 is an imaging target.

As described above, since the horizontal-to-vertical ratio of the display section 140 is 4:3, it is possible to display a combined image having a horizontal-to-vertical ratio of 4:3 on the entire screen of the display section 140. For example, the combined image is subjected to resolution conversion so that the size of the combined image is equal to the pixel count of the display section 140 and the resolution-converted combined image is displayed on the display section 140. Moreover, in this case, the blank image display regions 522 and 523 shown in FIG. 29B are not necessary.

When the horizontal-to-vertical ratio of the combined image read out and generated by the second readout method shown in FIGS. 30A and 30B is not identical to the horizontal-to-vertical ratio of the display device, the combined image can be displayed in a manner similar to the first readout method. In this case, for example, a single-color image is displayed in the blank portions (blank image display regions) above and below the displayed combined image.

FIG. 31C shows the scanning direction in the display section 140 when displaying the pixel data read out from the imaging devices 134 to 136. Since the scanning direction is the same as that of the example shown in FIG. 6C, redundant description thereof will be omitted.

[Control Example in Monocular Horizontal Imaging Mode]

Figure 32A:
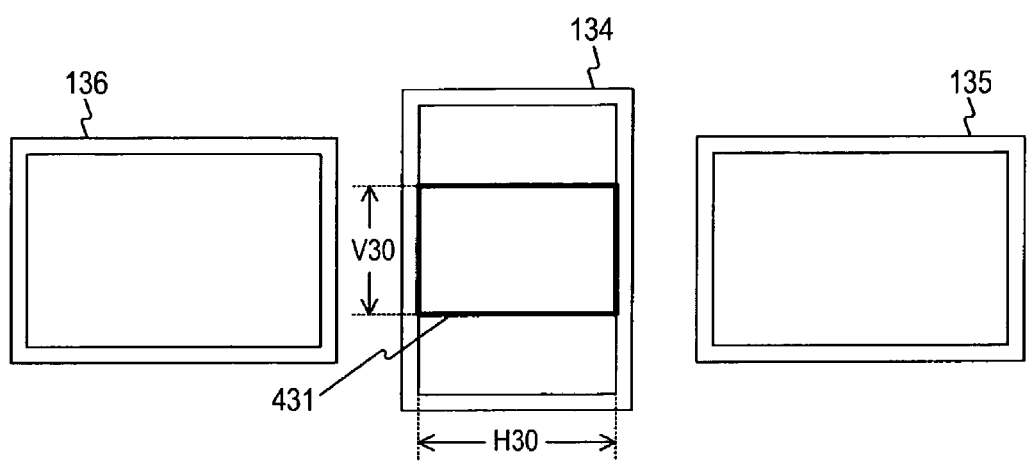
FIGS. 32A and 32B are diagrams schematically showing an example of an image data readout method (third readout method) in the imaging devices 134 to 136 according to the first embodiment of the present invention.
Figure 32B:
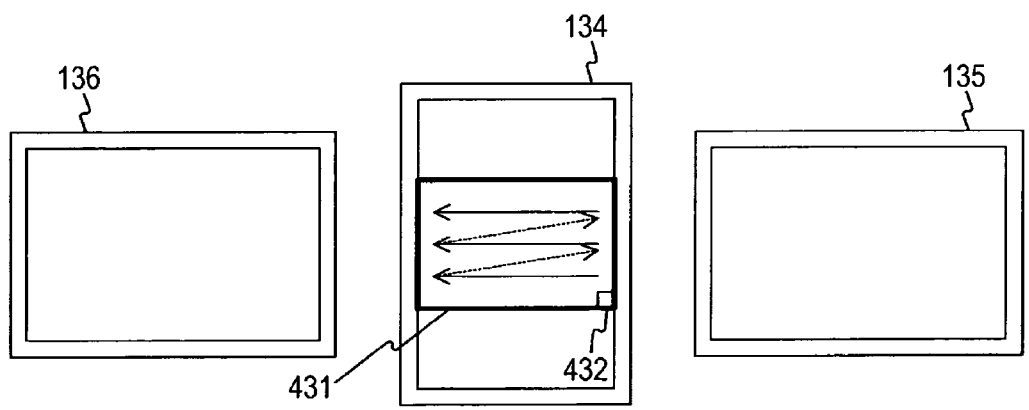

FIGS. 32A and 32B are diagrams schematically showing an example of an image data readout method (third readout method) in the imaging devices 134 to 136 according to the first embodiment of the present invention.

FIG. 32A shows a pixel data readout region 431 in which pixel data are read out from the imaging devices 134 to 136. The third readout method is a method of reading out horizontal images which are familiar to the users of imaging apparatuses such as digital still cameras. In the third readout method, for example, approximately the entire region in the horizontal direction of the imaging device 134 is read out, and a region having a smaller pixel count than in the horizontal direction is read out in the vertical direction. Moreover, readout of data from the imaging devices 135 and 136 is not performed.

For example, the pixel data readout region 431 is assumed to have a horizontal length H30 that is the same as the horizontal length of the pixel data readable region 400 and to have a vertical length V30 that is about half of the vertical length of the pixel data readable region 400. That is, the pixel data readout region 431 is assumed to be a region having 1440× 1080 pixels, for example. Moreover, the pixel data readout region 431 is a region which is determined based on the setting contents stored in the registers 370 and 380 shown in FIGS. 13A and 13B. This example shows an example in which all pixels of the respective pixels included in the pixel data readout region 431 are read out.

The respective setting values concerning the readout of pixel data of the imaging device 134 when performing the readout operation are stored in the registers 370 and 380 shown in FIGS. 13A and 13B. Specifically, the following setting values (31) to (35) are stored in a vertical imaging region setting register 371 during monocular all pixel readout imaging and a horizontal imaging region setting register 381 during monocular all pixel readout imaging.

(31) A horizontal pixel count H30 of a readout region (pixel data readout region 431) of the imaging device 134.

(32) A vertical pixel count V30 of a readout region (pixel data readout region 431) of the imaging device 134.

(33) Horizontal and vertical pixel counts from a pixel array end to a readout start position in the imaging device 134.

(34) A vertical back porch period from a vertical synchronization signal to a vertical pixel readout start position in the imaging device 134.

(35) A horizontal back porch period from a horizontal synchronization signal to a horizontal pixel readout start position in the imaging device 134.

These setting values may be set in advance, and may be set to the vertical imaging region setting register 371 during monocular all pixel readout imaging and the horizontal imaging region setting register 381 during monocular all pixel readout imaging through the signal line L2 by the user operation.

FIG. 32B shows a readout start position 432 and a readout scanning direction in the pixel data readout region 431. In this example, parts of image data (1440×1080 pixels) are read out from the imaging device 134 having 1440×1920 pixels. Moreover, readout of data from the imaging devices 135 and 136 is not performed. Using the image data read out in this way, an image having about 1.56 million pixels (1440×1080 pixels) and a horizontal-to-vertical ratio of 4:3 is generated. A display example of the image generated in this way is shown in FIGS. 33A to 33C.

As described above, the pixel data readout region 431 is an example of the readout region when image data are read out from only the imaging device 134, and readout of data from the imaging devices 135 and 136 is not performed. Moreover, an image generated based on the image data read out by the third readout method has a horizontal-to-vertical ratio of 4:3 (which may be 16:9 or the like) similarly to the second readout method. Therefore, it is possible to generate and display an image having the same horizontal-to-vertical ratio as the horizontal-to-vertical ratio of recording images used in imaging apparatuses which are presently commercially available on the market. Moreover, images having a higher density than the VGA (Video Graphics Array) images (having 640×480 pixels) which are widely used in common can be generated without operating the imaging devices 135 and 136. In this way, power consumption can be decreased.

Figure 33A:
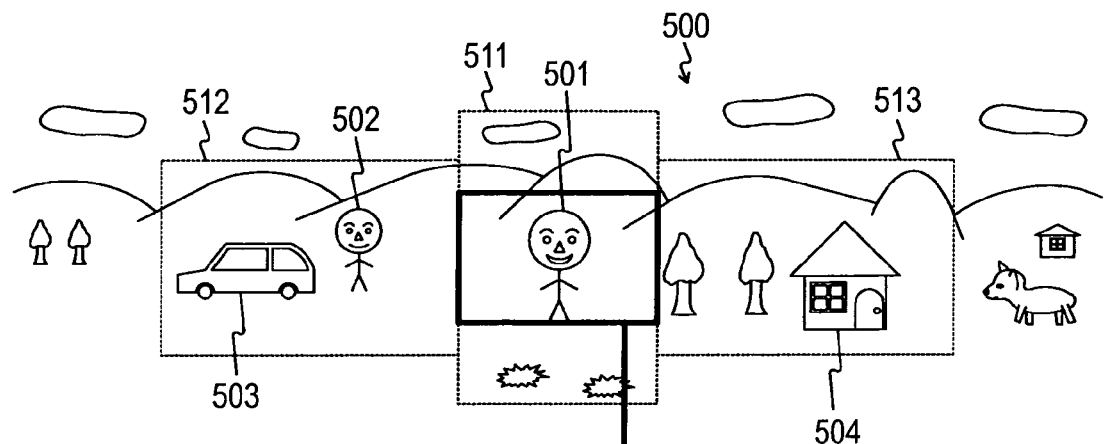
FIGS. 33A to 33C are diagrams showing an image display example in the display section 140 according to the first embodiment of the present invention.
Figure 33B:
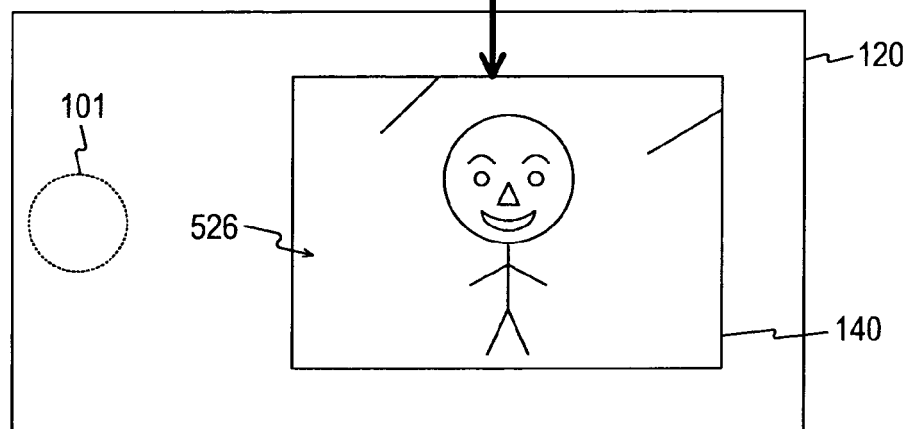
Figure 33C:
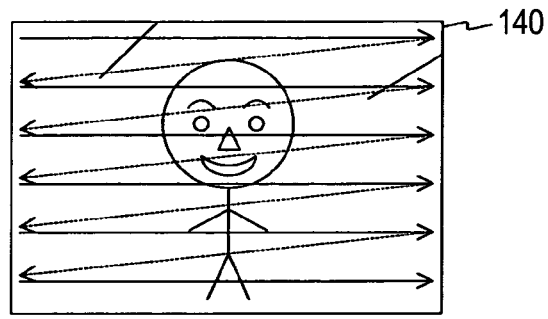

FIGS. 33A to 33C are diagrams showing an image display example in the display section 140 according to the first embodiment of the present invention. The example shown in FIGS. 33A to 33C is a display example of displaying image data read out by the third readout method shown in FIGS. 32A and 32B.

FIG. 33A shows a subject 500 serving as an imaging target of the imaging process by the mobile phone unit 100. The example shown in FIG. 33A is approximately the same as the example shown in FIG. 29A, except that the pixel data readout region is changed. Therefore, the same portions as those in FIG. 29A will be denoted by the same reference numerals, and description of those portions will be omitted. Moreover, the outline of the region of the imaging ranges 511 to 513 corresponding to the pixel data readout region 431 shown in FIGS. 32A and 32B is depicted by bold line.

FIG. 33B shows a display example of displaying the image data read out by the second readout method shown in FIGS. 30A and 30B on the display section 140 when the subject 500 is an imaging target.

As described above, since the horizontal-to-vertical ratio of the display section 140 is 4:3, it is possible to display an image having a horizontal-to-vertical ratio of 4:3 on the entire screen of the display section 140. For example, the image is subjected to resolution conversion so that the size of the image is equal to the pixel count of the display section 140 and the resolution-converted image is displayed on the display section 140. Moreover, in this case, the blank image display regions 522 and 523 shown in FIG. 29B are not necessary.

When the horizontal-to-vertical ratio of the combined image read out and generated by the third readout method shown in FIGS. 32A and 32B is not identical to the horizontal-to-vertical ratio of the display device, the combined image can be displayed in a manner similar to the first readout method. In this case, for example, a single-color image is displayed in the blank portions (blank image display regions) above and below the displayed combined image.

FIG. 33C shows the scanning direction in the display section 140 when displaying the pixel data read out from the imaging devices 134 to 136. Since the scanning direction is the same as that of the example shown in FIG. 6C, redundant description thereof will be omitted.

[Control Example in Monocular Vertical Imaging Mode]

Figure 34A:
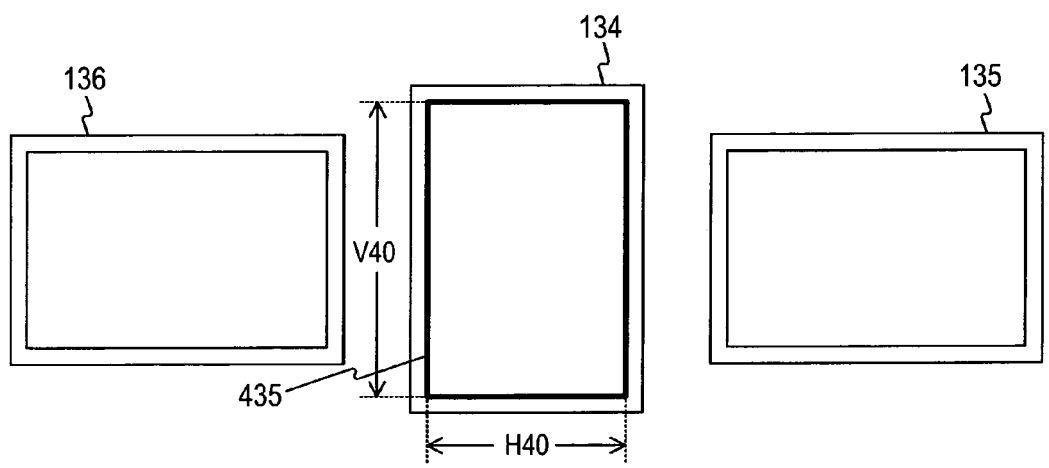
FIGS. 34A and 34B are diagrams schematically showing an example of an image data readout method (fourth readout method) in the imaging devices 134 to 136 according to the first embodiment of the present invention.
Figure 34B:
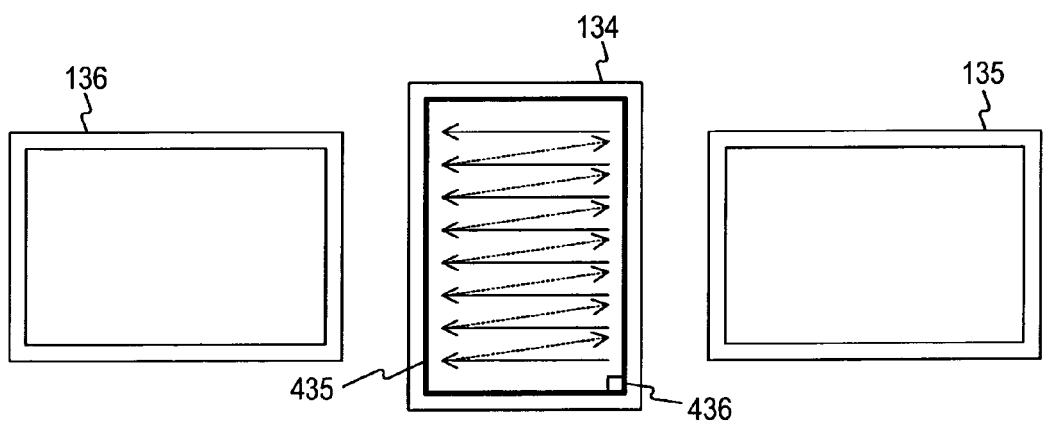

FIGS. 34A and 34B are diagrams schematically showing an example of an image data readout method (fourth readout method) in the imaging devices 134 to 136 according to the first embodiment of the present invention.

FIG. 34A shows a pixel data readout region 435 in which pixel data are read out from the imaging devices 134 to 136. The fourth readout method is a method of reading out vertical images which are familiar to the users of mobile phone units. In the fourth readout method, for example, the entire region of the imaging device 134 is read out. Moreover, readout of data from the imaging devices 135 and 136 is not performed.

For example, the pixel data readout region 435 is assumed to have a horizontal length H40 that is the same as the horizontal length of the pixel data readable region 400 and to have a vertical length V40 that is about half of the vertical length of the pixel data readable region 400. That is, the pixel data readout region 435 is assumed to be a region having 1440× 1920 pixels, for example. Moreover, the pixel data readout region 435 is a region which is determined based on the setting contents stored in the registers 370 and 380 shown in FIGS. 13A and 13B. This example shows an example in which all pixels of the respective pixels included in the pixel data readout region 435 are read out.

The respective setting values concerning the readout of pixel data of the imaging device 134 when performing the readout operation are stored in the registers 370 and 380 shown in FIGS. 13A and 13B. Specifically, the following setting values (41) to (45) are stored in the vertical imaging region setting register 371 during monocular all pixel readout imaging and the horizontal imaging region setting register 381 during monocular all pixel readout imaging.

(41) A horizontal pixel count H40 of a readout region (pixel data readout region 435) of the imaging device 134.

(42) A vertical pixel count V40 of a readout region (pixel data readout region 435) of the imaging device 134.

(43) Horizontal and vertical pixel counts from a pixel array end to a readout start position in the imaging device 134.

(45) A vertical back porch period from a vertical synchronization signal to a vertical pixel readout start position in the imaging device 134.

(45) A horizontal back porch period from a horizontal synchronization signal to a horizontal pixel readout start position in the imaging device 134.

These setting values may be set in advance, and may be set to the vertical imaging region setting register 371 during monocular all pixel readout imaging and the horizontal imaging region setting register 381 during monocular all pixel readout imaging through the signal line L2 by the user operation.

FIG. 34B shows a readout start position 436 and a readout scanning direction in the pixel data readout region 435. In this example, all image data (1440×1920 pixels) are read out from the imaging device 134 having 1440×1920 pixels. Moreover, readout of data from the imaging devices 135 and 136 is not performed. Using the image data read out in this way, an image having about 2.76 million pixels (1440×1920 pixels) and a horizontal-to-vertical ratio of 3:4 is generated. A display example of the image generated in this way is shown in FIGS. 35A to 35C.

As described above, the pixel data readout region 435 is an example of the readout region when image data are read out from only the imaging device 134, and readout of data from the imaging devices 135 and 136 is not performed. Moreover, an image generated based on the image data read out by the fourth readout method has a horizontal-to-vertical ratio of 3:4. Therefore, images having a higher density than the VGA (Video Graphics Array) images (having 640×480 pixels) which are widely used in common can be generated without operating the imaging devices 135 and 136. In this way, power consumption can be decreased.

Figure 35A:
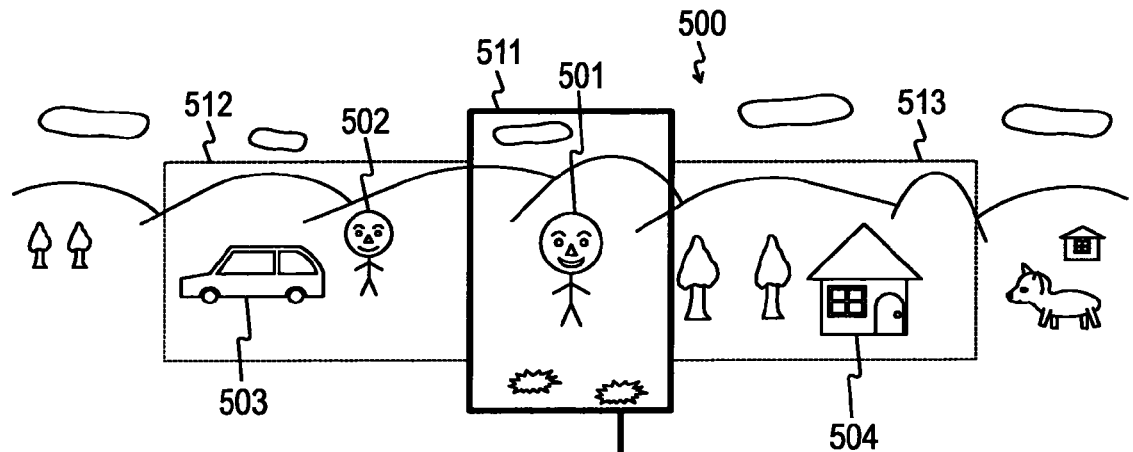
FIGS. 35A to 35C are diagrams showing an image display example in the display section 140 according to the first embodiment of the present invention.
Figure 35B:
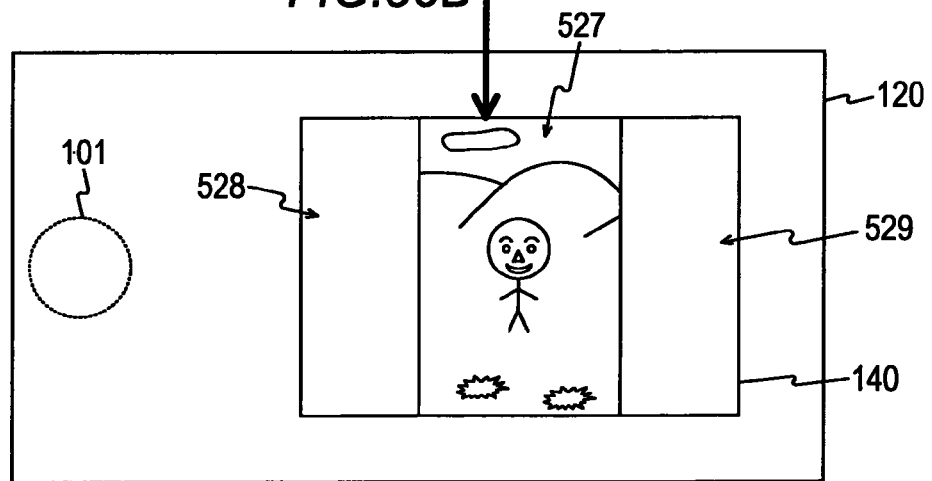
Figure 35C:
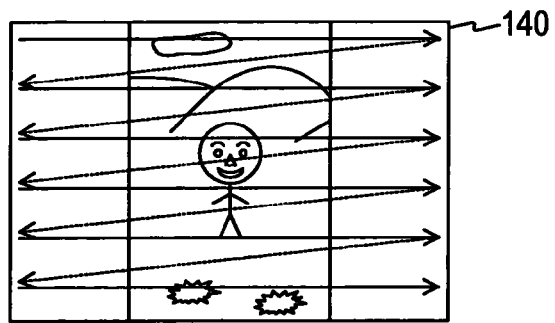

FIGS. 35A to 35C are diagrams showing an image display example in the display section 140 according to the first embodiment of the present invention. The example shown in FIGS. 35A to 35C is a display example of displaying image data read out by the fourth readout method shown in FIGS. 34A and 34B.

FIG. 35A shows a subject 500 serving as an imaging target of the imaging process by the mobile phone unit 100. The example shown in FIG. 35A is approximately the same as the example shown in FIG. 29A, except that the pixel data readout region is changed. Therefore, the same portions as those in FIG. 29A will be denoted by the same reference numerals, and description of those portions will be omitted. Moreover, the outline of the region of the imaging ranges 511 to 513 corresponding to the pixel data readout region 435 shown in FIGS. 34A and 34B is depicted by bold line.

FIG. 35B shows a display example of displaying the image data read out by the fourth readout method shown in FIGS. 34A and 34B on the display section 140 when the subject 500 is an imaging target.

As described above, since the horizontal-to-vertical ratio of the display section 140 is 4:3, it is not possible to display an image having a horizontal-to-vertical ratio of 3:4 on the entire screen of the display section 140. Therefore, for example, similarly to the first readout method, the image having a horizontal-to-vertical ratio of 3:4 is subjected to resolution conversion and then displayed. For example, the resolution of the image is converted in the horizontal and vertical directions so that the vertical pixel count of the image is approximately the same as the vertical pixel count of the display section 140 and the horizontal-to-vertical ratio is 3:4.

As shown in FIG. 35B, the resolution-converted image is displayed on the central portion (captured image display region 527) in the horizontal direction of the display section 140. Here, for example, a single-color image is displayed in the blank portions (blank image display regions 528 and 529) on the left and right sides of the displayed image.

When the horizontal-to-vertical ratio of the image read out and generated by the fourth readout method is not identical to the horizontal-to-vertical ratio of the display device, the image can be displayed in a manner similar to the first readout method.

FIG. 35C shows the scanning direction in the display section 140 when displaying the pixel data read out from the imaging devices 134 to 136. Since the scanning direction is the same as that of the example shown in FIG. 6C, redundant description thereof will be omitted.

[Control Example in Monocular Vertical Small-Area Imaging Mode]

Figure 36A:
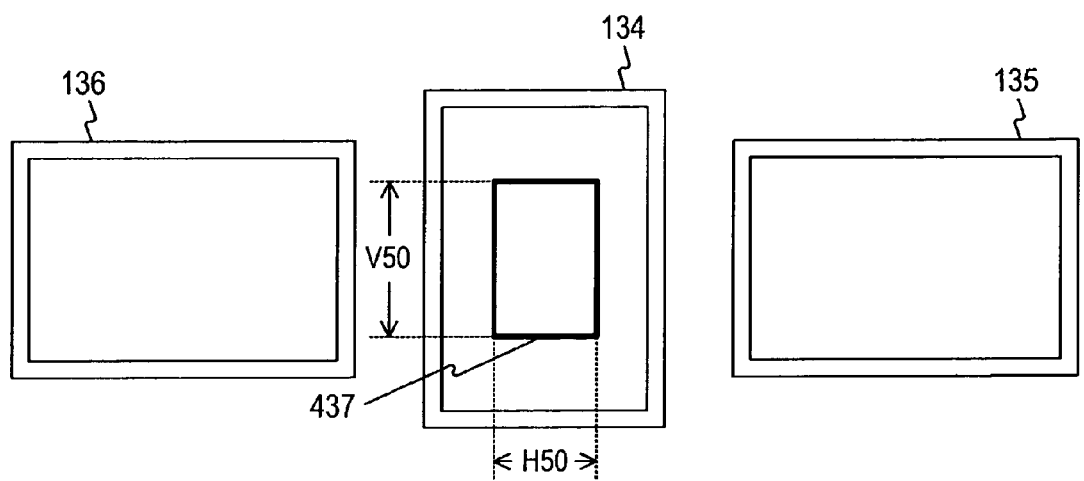
FIGS. 36A and 36B, are diagrams schematically showing an example of an image data readout method (fifth readout method) in the imaging devices 134 to 136 according to the first embodiment of the present invention.
Figure 36B:
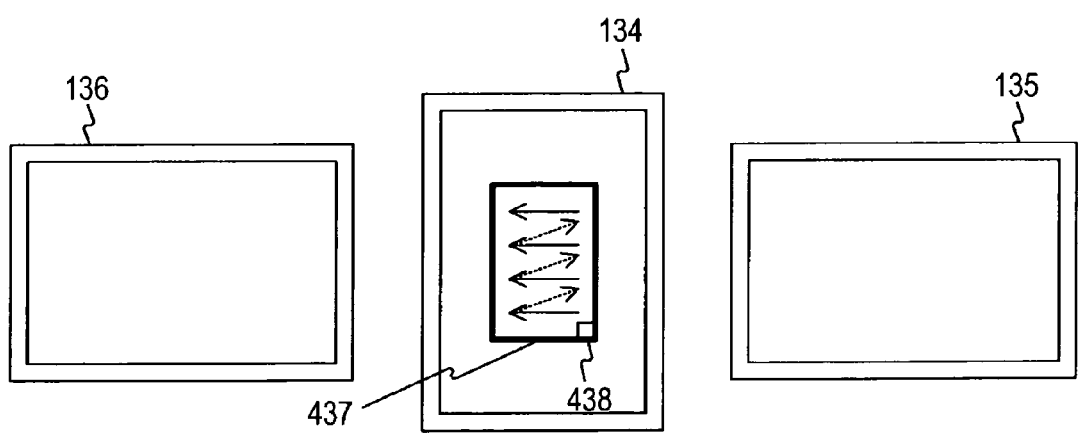

FIGS. 36A and 36B are diagrams schematically showing an example of an image data readout method (fifth readout method) in the imaging devices 134 to 136 according to the first embodiment of the present invention.

FIG. 36A shows a pixel data readout region 437 in which pixel data are read out from the imaging devices 134 to 136. The fifth readout method is a method of reading out vertical images which are familiar to the users of mobile phone units. In the fifth readout method, for example, a partial region of the imaging device 134 is read out. Moreover, readout of data from the imaging devices 135 and 136 is not performed.

For example, the pixel data readout region 437 is assumed to have a horizontal length V50 that is shorter than the horizontal length of the pixel data readable region 400 and to have a vertical length V50 that is shorter than the vertical length of the pixel data readable region 400. That is, the pixel data readout region 437 is assumed to be a region having 480×640 pixels, for example. Moreover, the pixel data readout region 437 is a region which is determined based on the setting contents stored in the registers 370 and 380 shown in FIGS. 13A and 13B. This example shows an example in which all pixels of the respective pixels included in the pixel data readout region 437 are read out.

The respective setting values concerning the readout of pixel data of the imaging device 134 when performing the readout operation are stored in the registers 370 and 380 shown in FIGS. 13A and 13B. Specifically, the following setting values (51) to (55) are stored in a vertical imaging region setting register 371 during monocular all pixel readout imaging and a horizontal imaging region setting register 381 during monocular all pixel readout imaging.

(51) A horizontal pixel count H50 of a readout region (pixel data readout region 437) of the imaging device 134.

(52) A vertical pixel count V50 of a readout region (pixel data readout region 437) of the imaging device 134.

(53) Horizontal and vertical pixel counts from a pixel array end to a readout start position in the imaging device 134.

(54) A vertical back porch period from a vertical synchronization signal to a vertical pixel readout start position in the imaging device 134.

(55) A horizontal back porch period from a horizontal synchronization signal to a horizontal pixel readout start position in the imaging device 134.

These setting values may be set in advance, and may be set to the vertical imaging region setting register 371 during monocular all pixel readout imaging and the horizontal imaging region setting register 381 during monocular all pixel readout imaging through the signal line L2 by the user operation.

FIG. 36B shows a readout start position 438 and a readout scanning direction in the pixel data readout region 437. In this example, parts of image data (480×640 pixels) are read out from the imaging device 134 having 1440×1920 pixels. Moreover, readout of data from the imaging devices 135 and 136 is not performed. Using the image data read out in this way, an image having about 0.31 million pixels (480×640 pixels) and a horizontal-to-vertical ratio of 3:4 is generated. A display example of the image generated in this way is shown in FIGS. 37A to 37C.

As described above, the pixel data readout region 437 is an example of the readout region when image data are read out from a partial region of the imaging device 134, and readout of data from the imaging devices 135 and 136 is not performed. Moreover, an image generated based on the image data read out by the fifth readout method is an image (namely, an image having a small data quantity) which is more appropriate for wireless transmission than the image generated by the fourth readout method, for example.

Figure 37A:
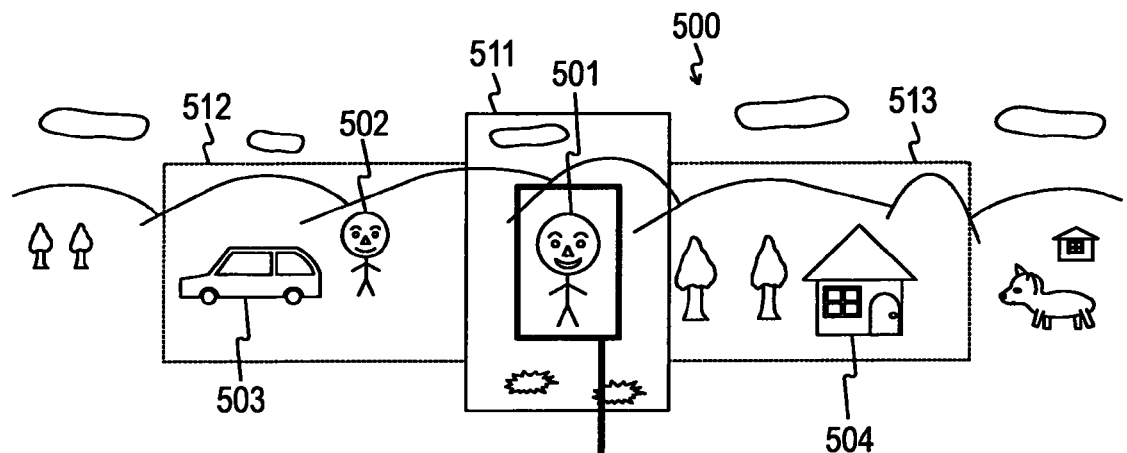
FIGS. 37A to 37C are diagrams showing an image display example in the display section 140 according to the first embodiment of the present invention.
Figure 37B:
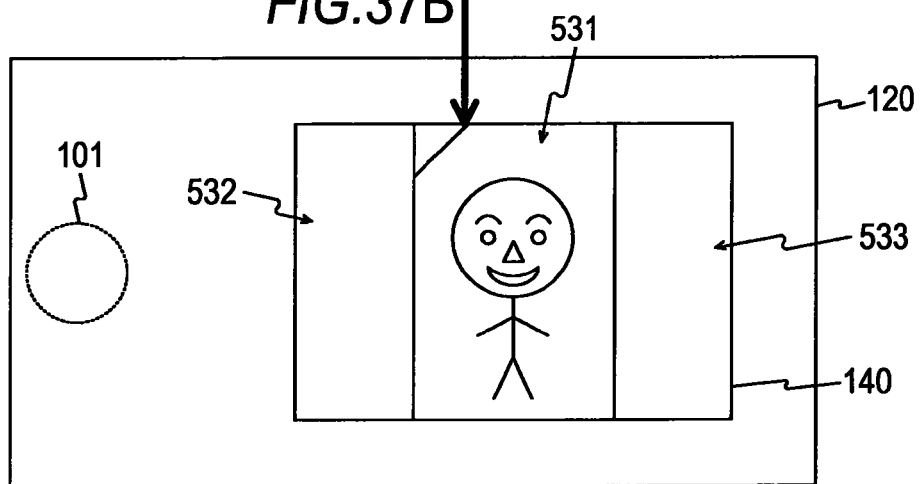
Figure 37C:
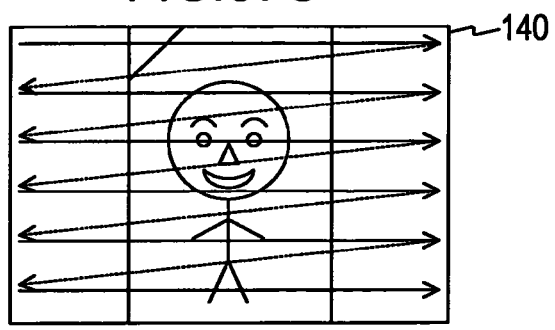

FIGS. 37A to 37C are diagrams showing an image display example in the display section 140 according to the first embodiment of the present invention. The example shown in FIGS. 37A to 37C is a display example of displaying image data read out by the fifth readout method shown in FIGS. 36A and 36B.

FIG. 37A shows a subject 500 serving as an imaging target of the imaging process by the mobile phone unit 100. The example shown in FIG. 37A is approximately the same as the example shown in FIG. 29A, except that the pixel data readout region is changed. Therefore, the same portions as those in FIG. 29A will be denoted by the same reference numerals, and description of those portions will be omitted. Moreover, the outline of the region of the imaging ranges 511 to 513 corresponding to the pixel data readout region 437 shown in FIGS. 36A and 36B is depicted by bold line.

FIG. 37B shows a display example of displaying the image data read out by the fifth readout method shown in FIGS. 36A and 36B on the display section 140 when the subject 500 is an imaging target.

As described above, since the horizontal-to-vertical ratio of the display section 140 is 4:3, it is possible to display an image having a horizontal-to-vertical ratio of 3:4 on the entire screen of the display section 140. Therefore, for example, similarly to the fourth readout method, the image having a horizontal-to-vertical ratio of 3:4 is subjected to resolution conversion and then displayed. For example, the resolution of the image is converted in the horizontal and vertical directions so that the vertical pixel count of the image is approximately the same as the vertical pixel count of the display section 140 and the horizontal-to-vertical ratio is 3:4.

As shown in FIG. 37B, the resolution-converted image is displayed on the central portion (captured image display region 531) in the horizontal direction of the display section 140. Here, for example, a single-color image is displayed in the blank portions (blank image display regions 532 and 533) on the left and right sides of the displayed image.

When the horizontal-to-vertical ratio of the image read out and generated by the fifth readout method is not identical to the horizontal-to-vertical ratio of the display device, the image can be displayed in a manner similar to the first readout method.

FIG. 37C shows the scanning direction in the display section 140 when displaying the pixel data read out from the imaging devices 134 to 136. Since the scanning direction is the same as that of the example shown in FIG. 6C, redundant description thereof will be omitted.

As described above, the respective setting values concerning the readout of pixel data of the imaging devices 134 to 136 are stored in the registers 370 and 380 shown in FIGS. 13A and 13B and are also stored in the imaging control section 201. When the second casing 120 is in the horizontal state, the first to fifth readout methods are changed whenever the user presses the imaging range changeover switch 111 shown in FIGS. 1A to 1D and other drawings. In this case, whenever the imaging range changeover switch 111 is pressed, the imaging control section 201 detects the pressing and sequentially changes the first to fifth readout methods. Moreover, for example, when the second casing 120 is in the horizontal state immediately after the mobile phone unit 100 is turned ON, the first readout method can be set.

[Example of Pixel Decimation and Pixel Addition]

Hereinabove, an example of reading out all pixels included in the pixel data readout region has been described as the first to fifth readout methods has been described. However, in some cases, high-density images may not be needed depending on the purpose of use. In the following description, an example of reading out parts of the respective pixels included in the pixel data readout region to decrease power consumption will be described.

The sixth to tenth readout methods described below are examples in which the imaging devices 134 to 136 perform pixel decimation processing to read out parts of the respective pixels included in the pixel data readout region. Although not described below, the imaging devices 134 to 136 may perform pixel addition processing to read out parts of the respective pixels included in the pixel data readout region.

[Decimation Example in Trinocular Horizontal Wide-Angle Imaging Mode]

First, the sixth readout method will be described with reference to FIGS. 28A and 28B and FIGS. 29A to 29C. The sixth readout method is an example which corresponds to the first readout method and in which 1/2 pixel decimation readout is performed in the vertical direction of the pixel data readout regions 403 to 405 shown in FIGS. 28A and 28B and 1/2 decimation readout is performed in the horizontal direction. That is, image data (720×720 pixels) which are decimated at a decimation ratio of 1/2 in the vertical and horizontal directions are read out from the pixel data readout region 403 of the imaging device 134 having 1440×1920 pixels. Moreover, image data (960×720 pixels) which are decimated at a decimation ratio of 1/2 in the vertical and horizontal directions are read out from the pixel data readout regions 404 and 405 of the imaging devices 135 and 136 having 1920× 1440 pixels. When combining the image data read out in this way, an image having about 1.9 million pixels (2640×720 pixels) and a horizontal-to-vertical ratio of 11:3 is generated. This image has a relatively wide angle of view in the horizontal direction and has higher density than the VGA images similarly to the example shown in FIGS. 29A to 29C. Moreover, the image can be generated with fewer power consumption than the first readout method.

The respective setting values concerning the readout of pixel data of the imaging devices 134 to 136 when performing the readout operation are stored in the registers 370 and 380 shown in FIGS. 13A and 13B. Specifically, the above-described setting values (11) to (17) are stored in a vertical imaging region setting register 375 during multinocular pixel decimation readout imaging and a horizontal imaging region setting register 385 during multinocular pixel decimation readout imaging. Moreover, the decimation intervals in the horizontal and vertical directions are stored in a vertical pixel decimation interval setting register 376 during multinocular pixel decimation readout imaging and a horizontal pixel decimation interval setting register 386 during multinocular pixel decimation readout imaging.

These setting values may be set in advance, and may be set through the signal line L2 by the user operation.

[Decimation Example in Trinocular Horizontal Narrow-Angle Imaging Mode]

Next, the seventh readout method will be described with reference to FIGS. 30A and 30B and FIGS. 31A to 31C. The seventh readout method is an example which corresponds to the second readout method and in which 1/2 pixel decimation readout is performed in the vertical direction of the pixel data readout regions 421 to 423 shown in FIGS. 30A and 30B and 1/2 decimation readout is performed in the horizontal direction. That is, image data (720×720 pixels) which are decimated at a decimation ratio of 1/2 in the vertical and horizontal directions are read out from the pixel data readout region 421 of the imaging device 134 having 1440×1920 pixels. Moreover, image data (240×720 pixels) which are decimated at a decimation ratio of 1/2 in the vertical and horizontal directions are read out from the pixel data readout regions 422 and 423 of the imaging devices 135 and 136 having 1920× 1440 pixels. When combining the image data read out in this way, an image having about 0.69 million pixels (960×720 pixels) and a horizontal-to-vertical ratio of 4:3 is generated. This image has a relatively wide angle of view in the horizontal direction and has higher density than the VGA images similarly to the example shown in FIGS. 31A to 31C. Moreover, the image can be generated with fewer power consumption than the second readout method.

The respective setting values concerning the readout of pixel data of the imaging devices 134 to 136 when performing the readout operation are stored in the registers 370 and 380 shown in FIGS. 13A and 13B. Specifically, the above-described setting values (11) to (27) are stored in a vertical imaging region setting register 375 during multinocular pixel decimation readout imaging and a horizontal imaging region setting register 385 during multinocular all pixel readout imaging. Moreover, the decimation intervals in the horizontal and vertical directions are stored in a vertical pixel decimation interval setting register 376 during multinocular pixel decimation readout imaging and a horizontal pixel decimation interval setting register 386 during multinocular pixel decimation readout imaging.

These setting values may be set in advance, and may be set through the signal line L2 by the user operation.

[Decimation Example in Monocular Horizontal Imaging Mode]

Next, the eighth readout method will be described with reference to FIGS. 32A and 32B and FIGS. 33A to 33C. The eighth readout method is an example which corresponds to the third readout method and in which 1/2 pixel decimation readout is performed in the vertical direction of the pixel data readout region 431 shown in FIGS. 32A and 32B and 1/2 decimation readout is performed in the horizontal direction. That is, image data (720×540 pixels) which are decimated at a decimation ratio of 1/2 in the vertical and horizontal directions are readout from the pixel data readout region 431 of the imaging device 134 having 1440×1920 pixels. When combining the image data read out in this way, an image having about 0.39 million pixels (720×540 pixels) and a horizontal-to-vertical ratio of 4:3 is generated. This image has the same angle of view as the example shown in FIGS. 33A to 33C and has higher density than the VGA images. Moreover, the image can be generated with fewer power consumption than the third readout method.

The respective setting values concerning the readout of pixel data of the imaging device 134 when performing the readout operation are stored in the registers 370 and 380 shown in FIGS. 13A and 13B. Specifically, the above-described setting values (31) to (35) are stored in a vertical imaging region setting register 372 during monocular pixel decimation readout imaging and a horizontal imaging region setting register 382 during monocular pixel decimation readout imaging. Moreover, the decimation intervals in the horizontal and vertical directions are stored in a vertical pixel decimation interval setting register 373 during monocular pixel decimation readout imaging and a horizontal pixel decimation interval setting register 383 during monocular pixel decimation readout imaging.

These setting values may be set in advance, and may be set through the signal line L2 by the user operation.

[Decimation Example in Monocular Vertical Imaging Mode]

Next, the ninth readout method will be described with reference to FIGS. 34A and 34B and FIGS. 35A to 35C. The ninth readout method is an example which corresponds to the fourth readout method and in which 1/2 pixel decimation readout is performed in the vertical direction of the pixel data readout region 435 shown in FIGS. 34A and 34B and 1/2 decimation readout is performed in the horizontal direction. That is, image data (720×960 pixels) which are decimated at a decimation ratio of 1/2 in the vertical and horizontal directions are read out from the pixel data readout region 435 of the imaging device 134 having 1440×1920 pixels. When combining the image data read out in this way, an image having about 0.69 million pixels (720×960 pixels) and a horizontal-to-vertical ratio of 3:4 is generated. This image has the same angle of view as the example shown in FIGS. 35A to 35C and has higher density than the VGA images. Moreover, the image can be generated with fewer power consumption than the fourth readout method.

The respective setting values concerning the readout of pixel data of the imaging device 134 when performing the readout operation are stored in the registers 370 and 380 shown in FIGS. 13A and 13B. Specifically, the above-described setting values (31) to (35) are stored in the vertical imaging region setting register 372 during monocular pixel decimation readout imaging and the horizontal imaging region setting register 382 during monocular pixel decimation readout imaging. Moreover, the decimation intervals in the horizontal and vertical directions are stored in the vertical pixel decimation interval setting register 373 during monocular pixel decimation readout imaging and the horizontal pixel decimation interval setting register 383 during monocular pixel decimation readout imaging.

These setting values may be set in advance, and may be set through the signal line L2 by the user operation.

[Decimation Example in Monocular Vertical Small-Area Imaging Mode]

Next, the tenth readout method will be described with reference to FIGS. 36A and 36B and FIGS. 37A to 37C. The tenth readout method is an example which corresponds to the fifth readout method and in which 1/2 pixel decimation readout is performed in the vertical direction of the pixel data readout region 437 shown in FIGS. 36A and 36B and 1/2 decimation readout is performed in the horizontal direction. That is, image data (240×320 pixels) which are decimated at a decimation ratio of 1/2 in the vertical and horizontal directions are read out from the pixel data readout region 437 of the imaging device 134 having 1440×1920 pixels. When combining the image data read out in this way, an image having about 0.08 million pixels (240×320 pixels) and a horizontal-to-vertical ratio of 3:4 is generated. This image has the same angle of view as the example shown in FIGS. 37A to 37C. Moreover, the image can be generated with fewer power consumption than the fifth readout method.

The respective setting values concerning the readout of pixel data of the imaging device 134 when performing the readout operation are stored in the registers 370 and 380 shown in FIGS. 13A and 13B. Specifically, the above-described setting values (51) to (55) are stored in the vertical imaging region setting register 372 during monocular pixel decimation readout imaging and the horizontal imaging region setting register 382 during monocular pixel decimation readout imaging. Moreover, the decimation intervals in the horizontal and vertical directions are stored in the vertical pixel decimation interval setting register 373 during monocular pixel decimation readout imaging and the horizontal pixel decimation interval setting register 383 during monocular pixel decimation readout imaging.

These setting values may be set in advance, and may be set through the signal line L2 by the user operation.

[Control Example in Imaging Mode with Second Casing in Vertical State]

Next, a readout method of reading out image data from the respective imaging devices and a method of displaying the readout image data when the second casing 120 is in the vertical state will be described. Moreover, in the first embodiment of the present invention, four imaging modes are described as possible imaging modes when the second casing 120 is in the vertical state. Here, when photographing is performed with the second casing 120 in the vertical state, it is assumed that the user does not have an intention to photograph a horizontal wide-angle image. Therefore, in the first embodiment of the present invention, an example in which, when the second casing 120 is in the vertical state, an image having a relatively narrow range in the horizontal direction is generated will be described.

[Control Example in Trinocular Horizontal Narrow-Angle Imaging]

The eleventh readout method is a method of reading out horizontal images which are familiar to the users of imaging apparatuses such as digital still cameras, similarly to the second readout method. In the eleventh readout method, for example, a partial region of the imaging device 134 is read out, and a partial region of each of the imaging devices 135 and 136 is read out. Therefore, an example of reading out all pixel in the pixel data readout regions 421 to 423 (shown in FIGS. 30A and 30B) similarly to the second readout method will be described as the eleventh readout method.

The pixel data readout regions 421 to 423 and the contents of the respective setting values concerning these regions stored in the registers 370 and 380 are the same as those of the example shown in FIG. 30A, and description thereof will be omitted. Moreover, the readout start positions 424 to 426 and the readout scanning direction in the pixel data readout regions 421 to 423 are the same as those in the example shown in FIG. 30B, and description thereof will be omitted. Moreover, the display example of the generated combined image is shown in FIGS. 38A to 38C.

Figure 38A:
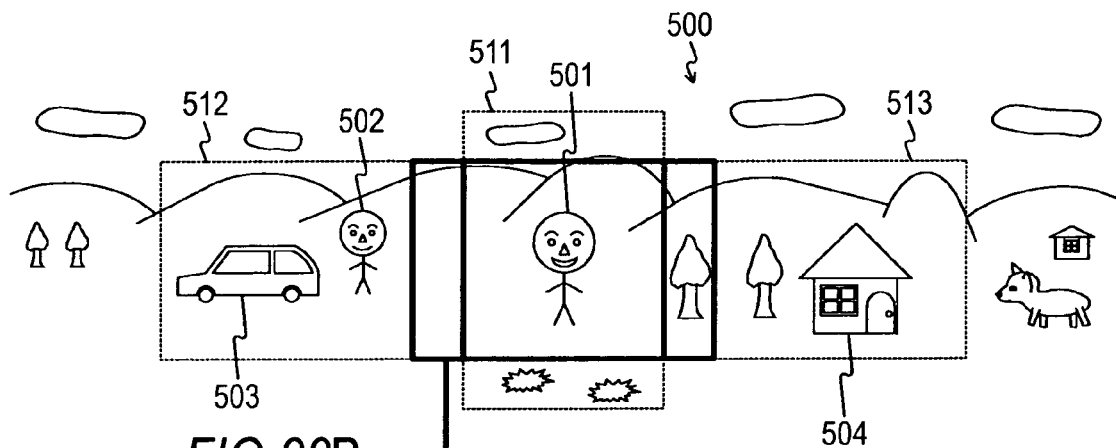
FIGS. 38A to 38C are diagrams showing an image display example in the display section 140 according to the first embodiment of the present invention.
Figure 38B:
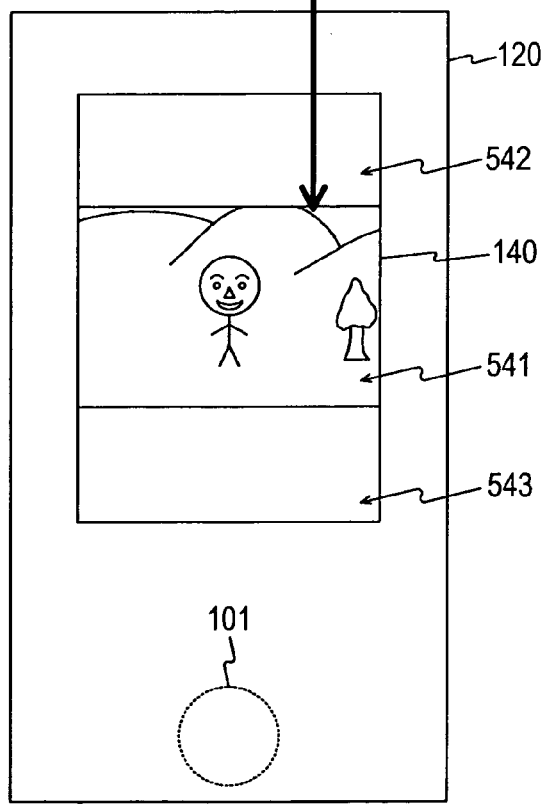
Figure 38C:
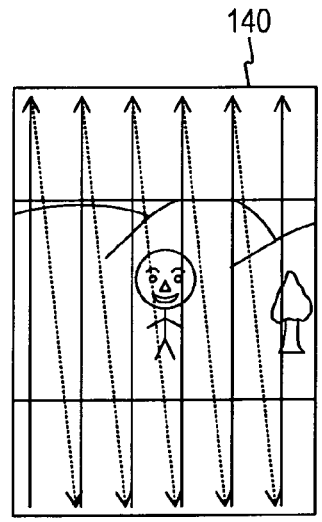

FIGS. 38A to 38C are diagrams showing an image display example in the display section 140 according to the first embodiment of the present invention. The example shown in FIGS. 38A to 38C is a display example of displaying image data read out by the eleventh readout method.

FIG. 38A shows a subject 500 serving as an imaging target of the imaging process by the mobile phone unit 100. The example shown in FIG. 38A is approximately the same as the example shown in FIG. 29A, except that the pixel data readout region is changed. Therefore, the same portions as those in FIG. 29A will be denoted by the same reference numerals, and description of those portions will be omitted. Moreover, the outlines of the regions of the imaging ranges 511 to 513 corresponding to the pixel data readout regions 421 to 423 shown in FIGS. 30A and 30B are depicted by bold line.

FIG. 38B shows a display example of displaying the image data read out by the eleventh readout method on the display section 140 when the subject 500 is an imaging target. FIG. 38B shows a case where the first casing 110 is in the vertical state. Moreover, the horizontal-to-vertical ratio of the display section 140 when the first casing 110 is in the vertical state is 3:4.

As described above, since the horizontal-to-vertical ratio of the display section 140 is 3:4, it is not possible to display an image having a horizontal-to-vertical ratio of 4:3 on the entire screen of the display section 140. Therefore, for example, similarly to the first readout method, the image having a horizontal-to-vertical ratio of 4:3 is subjected to resolution conversion and then displayed. For example, the resolution of the image is converted in the horizontal and vertical directions so that the horizontal pixel count of the image is approximately the same as the horizontal pixel count of the display section 140 and the horizontal-to-vertical ratio is 4:3.

As shown in FIG. 38B, the resolution-converted image is displayed on the central portion (captured image display region 541) in the vertical direction of the display section 140. Here, for example, a single-color image is displayed in the blank portions (blank image display regions 542 and 543) above and below the displayed image.

FIG. 38C schematically shows the scanning direction in the display section 140 when displaying the captured image and blank images written to the image memory 170.

[Rotation Processing Example of Captured Image]

Here, a case in which the second casing 120 is in the vertical state, and the image read out from the imaging device are displayed on the display section 140 in a manner similar to the case where the second casing 120 is in the horizontal state will be considered. In this case, since the second casing 120 is rotated by 90°, an image rotated by 90° with respect to the first casing 110 is displayed on the display section 140. That is, the user sees the subject included in the image displayed in the display section 140 in a state of being rotated by 90° and thus experiences a discomfort. Therefore, in the following description, an example of displaying the image by rotating it by 90° in the opposite direction to the rotation direction of the second casing 120 will be described.

FIGS. 39A to 39E are diagrams schematically showing a rotating process of rotating an image displayed on the display section 140 according to the first embodiment of the present invention. This example shows the relationship among the direction of a subject during imaging, the scanning direction in the imaging device, the direction of the writing and readout of image data into/from the image memory 170, the display scanning direction in the display section 140, and the direction of the subject displayed on the display section 140. The writing and readout of image data into/from the image memory 170 is performed by the DSP 200.

Figure 39A:
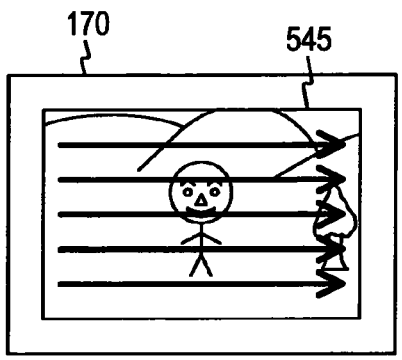
FIGS. 39A to 39E are diagrams schematically showing a rotating process of rotating an image displayed on the display section 140 according to the first embodiment of the present invention.

FIG. 39A schematically shows a state in which a captured image 545 read out in the scanning direction from the imaging devices 134 and 136 is written into the image memory 170 in the scanning direction by the DSP 200. In FIG. 39A, the scanning direction in the imaging devices 134 to 136 is indicated by arrows.

Figure 39D:
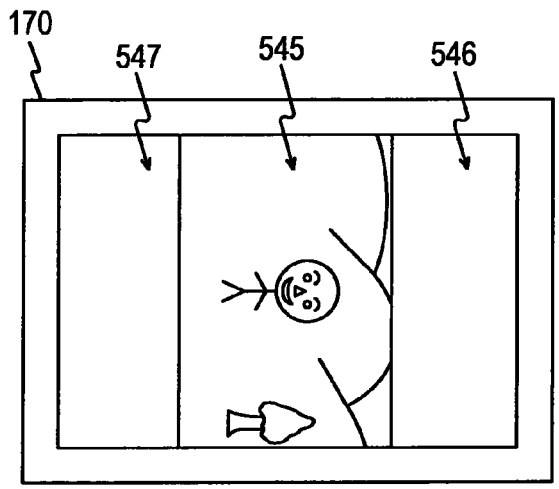
Figure 39B:
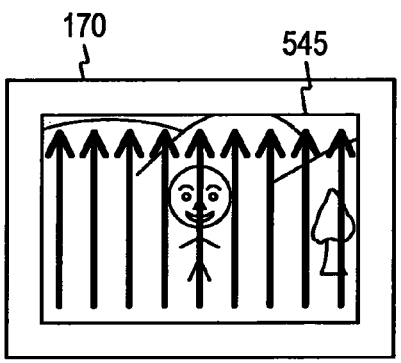

FIG. 39B schematically shows a state in which the captured image 545 written into the image memory 170 is read out while scanning it in a direction perpendicular to the scanning direction of the imaging devices 134 to 136. In FIG. 39B, the scanning direction of the captured image 545 read out from the image memory 170 is indicated by arrows.

Figure 39C:
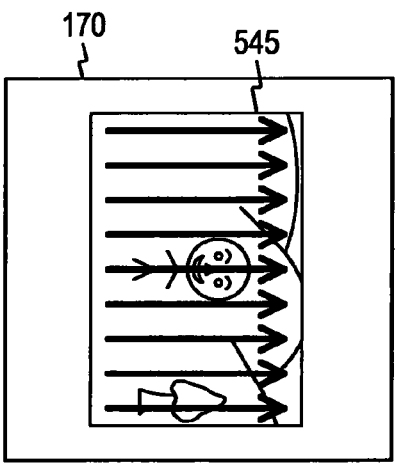

FIG. 39C shows a state in which the captured image 545 read out from the image memory 170 in the scanning direction shown in FIG. 39B is rewritten into the image memory 170 while scanning it in the same direction as the direction shown in FIG. 39A. In FIG. 39C, the scanning direction of the captured image 545 written into the image memory 170 is indicated by arrows. In this way, the captured image 545 read out from the image memory 170 while scanning it in the direction perpendicular to the scanning direction of the imaging devices 134 to 136 is rewritten into the image memory while scanning it in the readout direction. By doing so, it is possible to store the captured image 545 read out from the imaging devices 134 to 136 in the image memory 170 in a state of being rotated by 90°.

FIG. 39D schematically shows a state in which blank images 546 and 547 are added to the captured image 545 written into the image memory 170 in the scanning direction shown in FIG. 39C. The blank images 546 and 547 are images which are displayed in blank image display regions 542 and 543 shown in FIG. 38B.

Figure 39E:
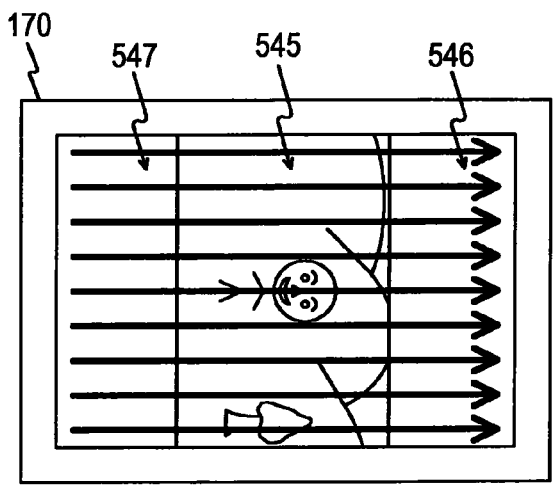

FIG. 39E schematically shows a state in which the captured image 545 and the blank images 546 and 547 written into the image memory 170 are read out while scanning them in the same direction as when they were initially written. By displaying the captured image 545 and the blank images 546 and 547 read out in the state shown in FIG. 39E on the display section 140, it is possible to display an image without giving a discomfort to the user. A display example of displaying the captured image 545 and the blank images 546 and 547 read out in the state shown in FIG. 39E on the display section 140 is shown in FIG. 38B.

[Control Example in Monocular Horizontal Imaging Mode]

The twelfth readout method is a method of reading out horizontal images which are familiar to the users of imaging apparatuses such as digital still cameras, similarly to the eleventh readout method. In the twelfth readout method, for example, approximately the entire region in the horizontal direction of the imaging device 134 is read out, and a region having a smaller pixel count than in the horizontal direction is read out in the vertical direction. Moreover, readout of data from the imaging devices 135 and 136 is not performed. Therefore, an example of reading out all pixel in the pixel data readout region 431 (shown in FIGS. 32A and 32B) similarly to the third readout method will be described as the twelfth readout method.

The pixel data readout region 431 and the contents of the respective setting values concerning the region stored in the registers 370 and 380 are the same as those of the example shown in FIG. 32A, and description thereof will be omitted. Moreover, the readout start position 432 and the readout scanning direction in the pixel data readout region 431 is the same as that in the example shown in FIG. 32B, and description thereof will be omitted. Moreover, the display example of the generated combined image is shown in FIGS. 40A to 40C.

Figure 40A:
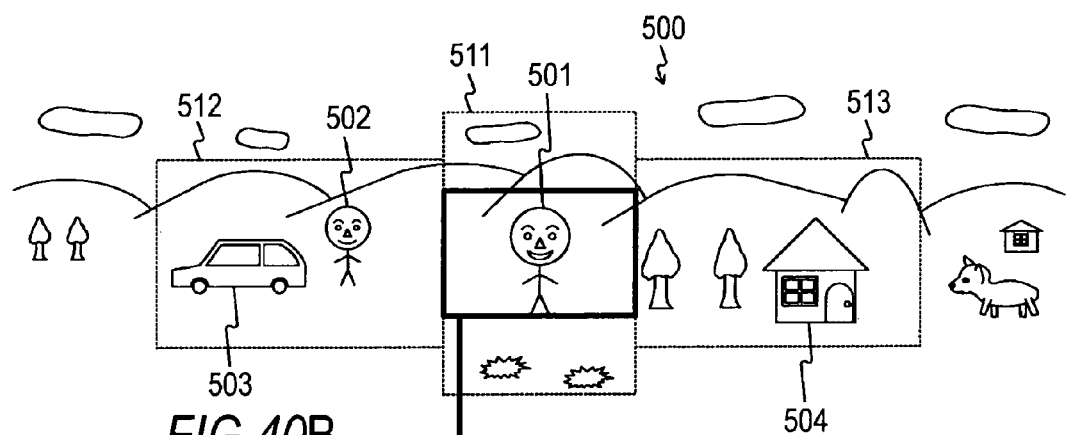
FIGS. 40A to 40C are diagrams showing an image display example in the display section 140 according to the first embodiment of the present invention.
Figure 40B:
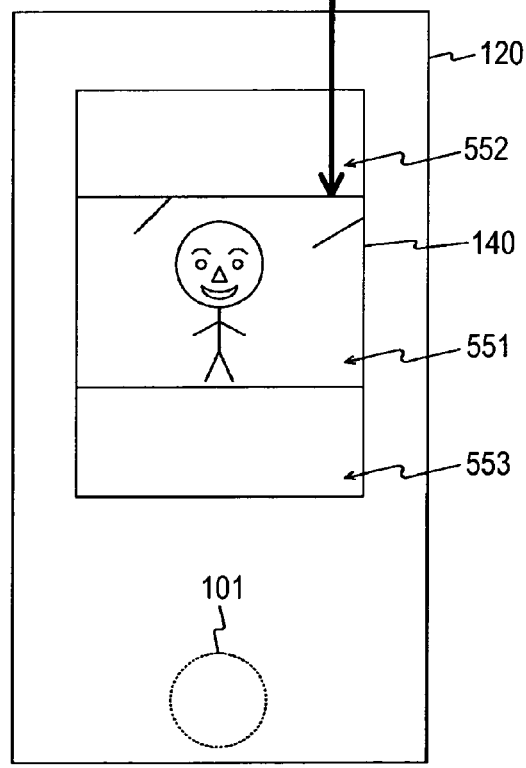
Figure 40C:
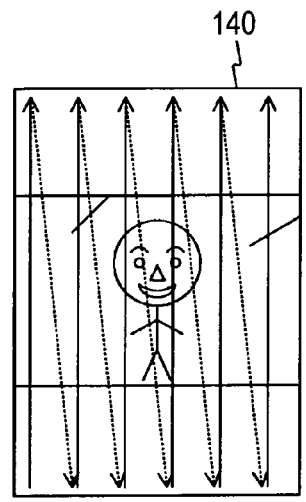

FIGS. 40A to 40C are diagrams showing an image display example in the display section 140 according to the first embodiment of the present invention. The example shown in FIGS. 40A to 40C is a display example of displaying image data read out by the twelfth readout method.

FIG. 40A shows a subject 500 serving as an imaging target of the imaging process by the mobile phone unit 100. The example shown in FIG. 40A is approximately the same as the example shown in FIG. 29A, except that the pixel data readout region is changed. Therefore, the same portions as those in FIG. 29A will be denoted by the same reference numerals, and description of those portions will be omitted. Moreover, the outline of the region of the imaging ranges 511 to 513 corresponding to the pixel data readout region 431 shown in FIGS. 32A and 32B are depicted by bold line.

FIG. 40B shows a display example of displaying the image data read out by the twelfth readout method on the display section 140 when the subject 500 is an imaging target. The display example shown in FIG. 40B is a display example of a captured image rotated by the rotation processing shown in FIGS. 39A to 39E.

As described above, since the horizontal-to-vertical ratio of the display section 140 is 3:4, it is not possible to display an image having a horizontal-to-vertical ratio of 4:3 on the entire screen of the display section 140. Therefore, for example, similarly to the eleventh readout method, the image having a horizontal-to-vertical ratio of 4:3 is subjected to resolution conversion and then displayed. For example, the resolution of the image is converted in the horizontal and vertical directions so that the horizontal pixel count of the image is approximately the same as the horizontal pixel count of the display section 140 and the horizontal-to-vertical ratio is 4:3.

As shown in FIG. 40B, the resolution-converted image is displayed on the central portion (captured image display region 551) in the vertical direction of the display section 140. Here, for example, a single-color image is displayed in the blank portions (blank image display regions 552 and 553) above and below the displayed image.

FIG. 40C schematically shows the scanning direction in the display section 140 when displaying the pixel data read out from the imaging device 134.

[Control Example in Monocular Vertical Imaging Mode]

The thirteenth readout method is a method of reading out vertical images which are familiar to the users of mobile phone units. In the thirteenth readout method, for example, the entire region of the imaging device 134 is read out. Moreover, readout of data from the imaging devices 135 and 136 is not performed. Therefore, an example of reading out all pixels of the pixel data readout region 435 (shown in FIGS. 34A and 34B) similarly to the fourth readout method will be described as the thirteenth readout method.

The pixel data readout region 435 and the contents of the respective setting values concerning the region stored in the registers 370 and 380 are the same as those of the example shown in FIG. 34A, and description thereof will be omitted. Moreover, the readout start position 436 and the readout scanning direction in the pixel data readout region 435 is the same as that in the example shown in FIG. 34B, and description thereof will be omitted. Moreover, the display example of the generated combined image is shown in FIGS. 41A to 41C.

Figure 41A:
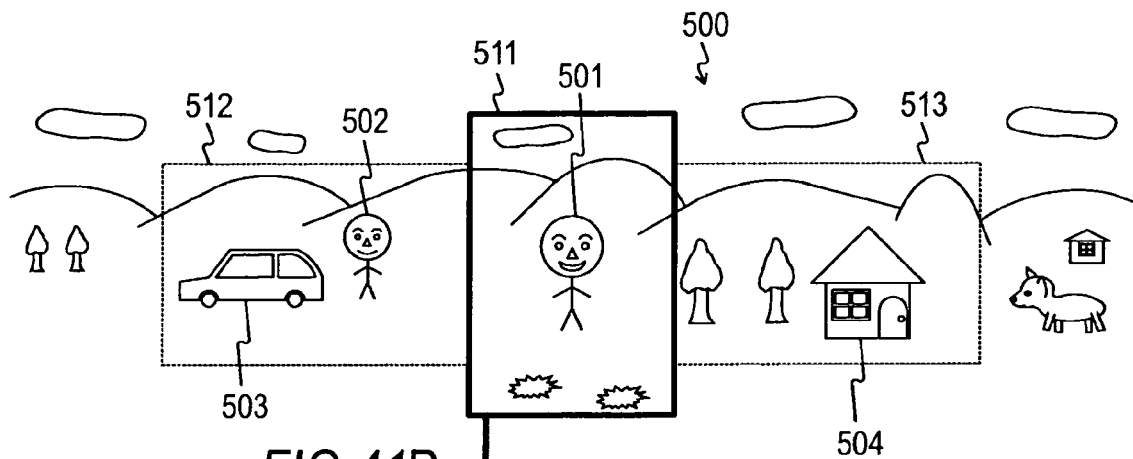
FIGS. 41A to 41C are diagrams showing an image display example in the display section 140 according to the first embodiment of the present invention.
Figure 41B:
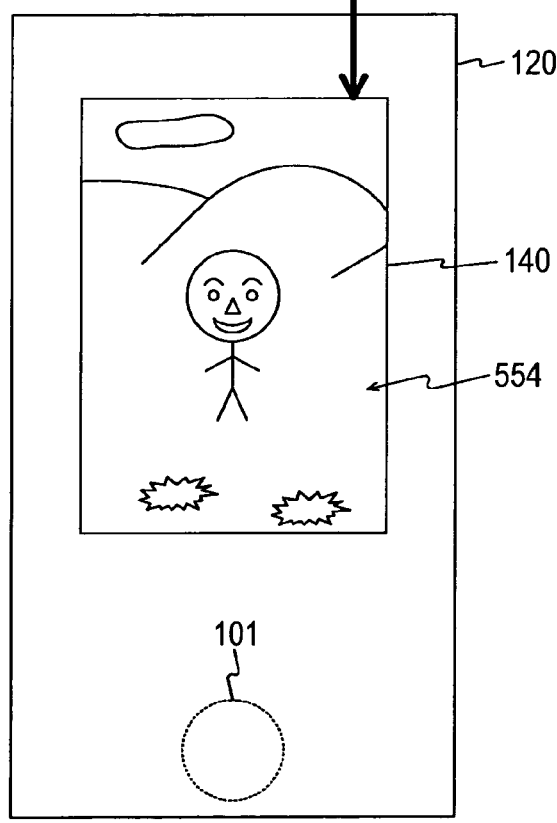
Figure 41C:
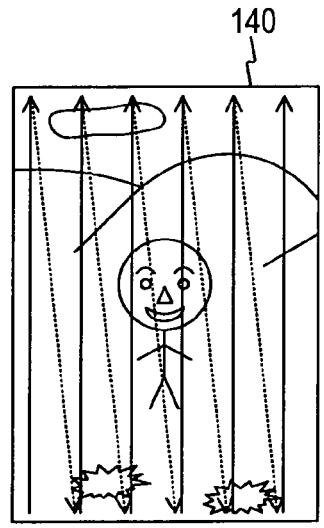

FIGS. 41A to 41C are diagrams showing an image display example in the display section 140 according to the first embodiment of the present invention. The example shown in FIGS. 41A to 41C is a display example of displaying image data read out by the thirteenth readout method.

FIG. 41A shows a subject 500 serving as an imaging target of the imaging process by the mobile phone unit 100. The example shown in FIG. 41A is approximately the same as the example shown in FIG. 29A, except that the pixel data readout region is changed. Therefore, the same portions as those in FIG. 29A will be denoted by the same reference numerals, and description of those portions will be omitted. Moreover, the outline of the region of the imaging ranges 511 to 513 corresponding to the pixel data readout region 435 shown in FIGS. 32A and 32B is depicted by bold line.

FIG. 41B shows a display example of displaying the image data read out by the thirteenth readout method on the display section 140 when the subject 500 is an imaging target. The display example shown in FIG. 41B is a display example of a captured image rotated by the rotation processing shown in FIGS. 39A to 39E.

As described above, since the horizontal-to-vertical ratio of the display section 140 is 3:4, it is not possible to display an image having a horizontal-to-vertical ratio of 3:4 on the entire screen of the display section 140. For example, the image is subjected to resolution conversion so that the size of the image is equal to the pixel count of the display section 140 and the resolution-converted image is displayed on the display section 140. Moreover, in this case, the blank image display regions are not necessary.

When the horizontal-to-vertical ratio of the image read out and generated by the thirteenth readout method is not identical to the horizontal-to-vertical ratio of the display device, the image can be displayed in a manner similar to the twelfth readout method. In this case, for example, a single-color image is displayed in the blank portions (blank image display regions) above and below the displayed combined image.

FIG. 41C shows the scanning direction in the display section 140 when displaying the pixel data read out from the imaging device 134.

[Control Example in Monocular Vertical Small-Area Imaging Mode]

The fourteenth readout method is a method of reading out vertical images which are familiar to the users of mobile phone units. In the fourteenth readout method, for example, a partial region of the imaging device 134 is readout. Moreover, readout of data from the imaging devices 135 and 136 is not performed. Therefore, an example of reading out all pixel in the pixel data readout region 437 (shown in FIGS. 36A and 36B) similarly to the fifth readout method will be described as the fourteenth readout method.

The pixel data readout region 437 and the contents of the respective setting values concerning the region stored in the registers 370 and 380 are the same as those of the example shown in FIG. 36A, and description thereof will be omitted. Moreover, the readout start position 438 and the readout scanning direction in the pixel data readout region 437 is the same as that in the example shown in FIG. 36B, and description thereof will be omitted. Moreover, the display example of the generated combined image is shown in FIGS. 42A to 42C.

Figure 42A:
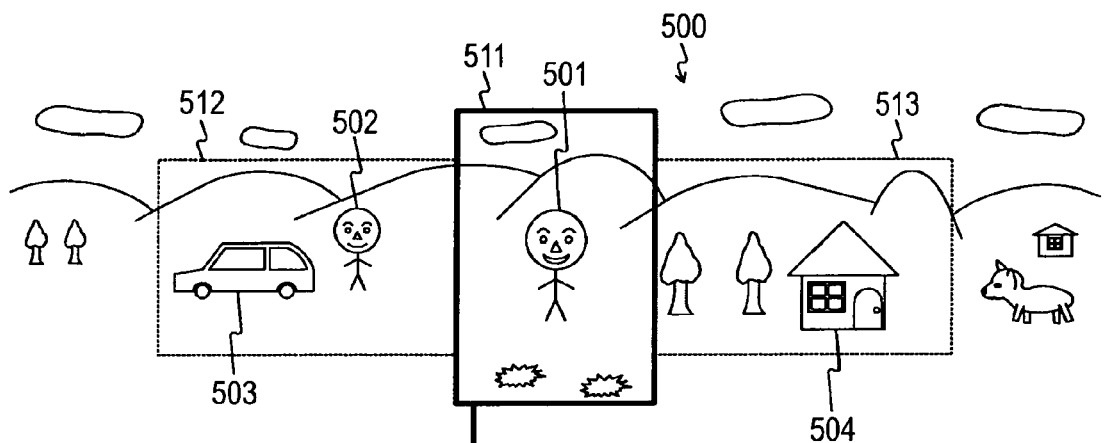
FIGS. 42A to 42C are diagrams showing an image display example in the display section 140 according to the first embodiment of the present invention.
Figure 42B:
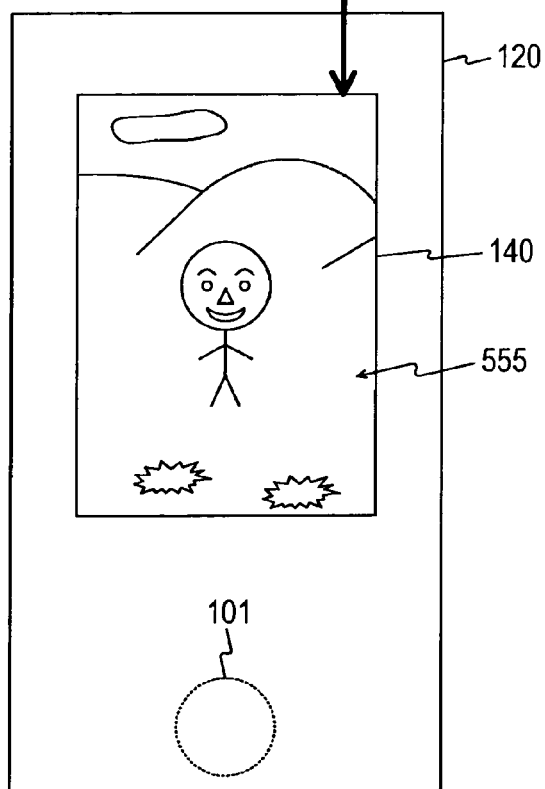
Figure 42C:
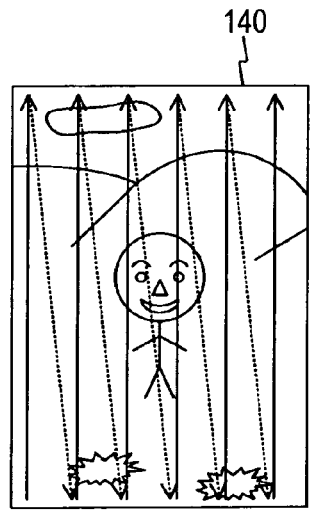

FIGS. 42A to 42C are diagrams showing an image display example in the display section 140 according to the first embodiment of the present invention. The example shown in FIGS. 42A to 42C is a display example of displaying image data read out by the fourteenth readout method.

FIG. 42A shows a subject 500 serving as an imaging target of the imaging process by the mobile phone unit 100. The example shown in FIG. 42A is approximately the same as the example shown in FIG. 29A, except that the pixel data readout region is changed. Therefore, the same portions as those in FIG. 29A will be denoted by the same reference numerals, and description of those portions will be omitted. Moreover, the outline of the region of the imaging ranges 511 to 513 corresponding to the pixel data readout region 437 shown in FIGS. 36A and 36B are depicted by bold line.

FIG. 42B shows a display example of displaying the image data read out by the fourteenth readout method on the display section 140 when the subject 500 is an imaging target. The display example shown in FIG. 42B is a display example of a captured image rotated by the rotation processing shown in FIGS. 39A to 39E.

As described above, since the horizontal-to-vertical ratio of the display section 140 is 3:4, it is possible to display an image having a horizontal-to-vertical ratio of 3:4 on the entire screen of the display section 140. For example, the image is subjected to resolution conversion so that the size of the image is equal to the pixel count of the display section 140 and the resolution-converted image is displayed on the display section 140. Moreover, in this case, the blank image display regions are not necessary.

When the horizontal-to-vertical ratio of the image read out and generated by the fourteenth readout method is not identical to the horizontal-to-vertical ratio of the display device, the image can be displayed in a manner similar to the twelfth readout method. In this case, for example, a single-color image is displayed in the blank portions (blank image display regions) above and below the displayed combined image.

FIG. 42C shows the scanning direction in the display section 140 when displaying the pixel data read out from the imaging device 134.

As described above, the respective setting values concerning the readout of pixel data of the imaging devices 134 to 136 are stored in the registers 370 and 380 shown in FIGS. 13A and 13B and are also stored in the imaging control section 201. When the second casing 120 is in the vertical state, the eleventh to fourteenth readout methods are changed whenever the user presses the imaging range changeover switch 111 shown in FIGS. 1A to 1D and other drawings. In this case, whenever the imaging range changeover switch 111 is pressed, the imaging control section 201 detects the pressing and sequentially changes the eleventh to fourteenth readout methods. Moreover, for example, when the second casing 120 is in the vertical state immediately after the mobile phone unit 100 is turned ON, the fourteenth readout method can be set.

[Example of Pixel Decimation and Pixel Addition]

Hereinabove, an example of reading out all pixels included in the pixel data readout region has been described as the eleventh to fourteenth readout methods. However, in some cases, high-density images may not be needed depending on the purpose of use. In the following description, an example of reading out parts of the respective pixels included in the pixel data readout region to decrease power consumption will be described.

The fifteenth to eighteenth readout methods described below are examples in which the imaging devices 134 to 136 perform pixel decimation processing to read out parts of the respective pixels included in the pixel data readout region. Although not described below, the imaging devices 134 to 136 may perform pixel addition processing to read out parts of the respective pixels included in the pixel data readout region.

[Decimation Example in Trinocular Horizontal Narrow-Angle Imaging Mode]

First, the fifteenth readout method will be described with reference to FIGS. 38A to 38C. The fifteenth readout method is an example which corresponds to the eleventh readout method and in which 1/2 pixel decimation readout is performed in the vertical direction of the pixel data readout regions 421 to 423 shown in FIGS. 30A and 30B and 1/2 decimation readout is performed in the horizontal direction. The decimation processing is the same as that in the example described in the seventh readout method, and detailed description thereof will be omitted. Moreover, the contents of the respective setting values stored in the registers 370 and 380 concerning the readout of the pixel data from the imaging devices 134 to 136 during the decimation processing are the same as those in the example described in the seventh readout method, detailed description thereof will be omitted.

[Decimation Example in Monocular Horizontal Imaging Mode]

Next, the sixteenth readout method will be described with reference to FIGS. 40A to 40C. The sixteenth readout method is an example which corresponds to the twelfth readout method and in which 1/2 pixel decimation readout is performed in the vertical direction of the pixel data readout region 431 shown in FIGS. 32A and 32B and 1/2 decimation readout is performed in the horizontal direction. The decimation processing is the same as that in the example described in the eighth readout method, and detailed description thereof will be omitted. Moreover, the contents of the respective setting values stored in the registers 370 and 380 concerning the readout of the pixel data from the imaging devices 134 to 136 during the decimation processing are the same as those in the example described in the eighth readout method, detailed description thereof will be omitted.

[Decimation Example in Monocular Vertical Imaging Mode]

Next, the seventeenth readout method will be described with reference to FIGS. 41A to 41C. The seventeenth readout method is an example which corresponds to the thirteenth readout method and in which 1/2 pixel decimation readout is performed in the vertical direction of the pixel data readout region 435 shown in FIGS. 34A and 34B and 1/2 decimation readout is performed in the horizontal direction. The decimation processing is the same as that in the example described in the ninth readout method, and detailed description thereof will be omitted. Moreover, the contents of the respective setting values stored in the registers 370 and 380 concerning the readout of the pixel data from the imaging devices 134 to 136 during the decimation processing are the same as those in the example described in the ninth readout method, detailed description thereof will be omitted.

[Decimation Example in Monocular Vertical Small-Area Imaging Mode]

Next, the eighteenth readout method will be described with reference to FIGS. 42A to 42C. The eighteenth readout method is an example which corresponds to the fourteenth readout method and in which 1/2 pixel decimation readout is performed in the vertical direction of the pixel data readout region 437 shown in FIGS. 36A and 36B and 1/2 decimation readout is performed in the horizontal direction. The decimation processing is the same as that in the example described in the tenth readout method, and detailed description thereof will be omitted. Moreover, the contents of the respective setting values stored in the registers 370 and 380 concerning the readout of the pixel data from the imaging devices 134 to 136 during the decimation processing are the same as those in the example described in the tenth readout method, detailed description thereof will be omitted.

[Readout Example During Monitoring Operation]

Next, a readout method of pixel data when a monitoring operation is performed will be described. For example, when a still-image recording mode for recording still images is set, a monitoring operation is performed until a still-image recording instruction is received. This monitoring operation is an operation of displaying a monitoring image on the display section 140 for checking whether or not the direction of the mobile phone unit 100 or the size of a subject is appropriate before issuing a still-image recording instruction, for example. The monitoring image is an image for allowing the user to check whether or not the direction of the mobile phone unit 100 or the size of a subject is appropriate but it is not the recording image. Therefore, the monitoring image may not have a high density as compared to the recording images.

Moreover, in many case, the pixel count of a display device provided in an imaging apparatus is several tenth of the pixel count of an imaging device provided in the imaging apparatus. Therefore, when the monitoring operation is being performed, the number of pixels read out from the imaging device can be decreased more than when an image recording operation is being performed. On the other hand, since the monitoring image is an image for checking the direction of the mobile phone unit 100 and the size of the subject, it is preferable that the angle of view of the monitoring image is the same as the case of performing the recording operation. Therefore, in the following description, a monitoring image readout method in which the angle of view during the monitoring operation is made identical to that during the recording operation, and the readout pixel count is reduced will be described.

For example, when the monitoring operation is being performed in one of the first to fifth readout methods, by performing the pixel decimation processing in a manner similar to the sixth to tenth readout methods, the readout pixel count is decreased. In this case, a decimation ratio larger than the decimation ratio (1/2) described in the sixth to tenth readout methods can be used.

Moreover, for example, when the monitoring operation is being performed in one of the sixth to tenth readout methods, by performing the pixel decimation processing in a similar manner, the readout pixel count is decreased. In this case, a decimation ratio (for example, a value obtained by multiplying 1/M (M>1; where M is an integer) with 1/2) further larger than the decimation ratio (1/2) described above can be used. Furthermore, when the monitoring operation is being performed in one of the eleventh to eighteenth readout methods, by performing the pixel decimation processing in a similar manner, the readout pixel count is decreased. In addition, by performing pixel addition processing instead of the pixel decimation processing, the readout pixel count may be decreased. The display example of the monitoring image is the same as the display examples of the first to fifth readout methods except that the readout pixel count is different, and redundant description thereof will be omitted.

[Modification of Pixel Decimation and Pixel Addition]

Hereinabove, an example of performing pixel decimation and pixel addition processing in the imaging devices 134 to 136 to decrease the pixel count of the image data has been described. In this example, an example of performing the pixel decimation and pixel addition processing in the DSP 200 will be described.

The pixel addition processing section 221 shown in FIG. 8 performs pixel addition and pixel decimation processing, and is disposed at the succeeding stage of the image buffers 211 to 219 and at the preceding stage of the demosaic processing section 222 inside the DSP 200. The configuration of the pixel addition processing section 221 can be approximately the same as the adders 354 to 357 and 366 of the imaging devices 134 to 136.

The pixel addition processing section 221 has a data memory that stores a predetermined amount of image data included in at least two horizontal lines of image data in order to perform pixel addition in the vertical direction, for example. Moreover, the pixel addition processing section 221 performs addition processing (namely, vertical pixel addition processing) of reading out image data positioned on the same columns on the image data from the image memory 170 and adding the readout image data using an adder.

For example, when performing horizontal pixel addition processing, the pixel addition processing section 221 performs addition processing (namely, horizontal pixel addition) of reading out the respective image data of a plurality of columns and adding the readout image data using an adder.

For example, when performing both the vertical pixel addition and the horizontal pixel addition, vertical pixel addition is performed on a plurality of columns, and horizontal pixel addition is further performed with respect to the image data obtained through the addition processing.

After performing the addition processing, the pixel addition processing section 221 outputs the added image data to the demosaic processing section 222 on the succeeding stage. Alternatively, the pixel addition processing section 221 writes the added image data into the image memory 170.

Moreover, for example, the pixel addition processing section 221 includes a data line and a select signal line for inputting one of the two sets of image data input during the addition processing to the adder, and the results of an AND operation between the data line and the select signal line are input to the adder. Moreover, the pixel addition processing section 221 stores the other set of image data. For example, when the select signal line is selected, the value of the data line is input to the adder, and pixel addition processing is performed. On the other hand, when the select signal line is not selected, the value 0 is input from the data line to the adder, and the pixel addition processing is not performed. In this case, pixel decimation processing is performed, and the image data input from a data line of the adder on a side where the select signal line is not provided are output.

[Flow Example of Image Data During Pixel Decimation and Pixel Addition]

Figure 43:
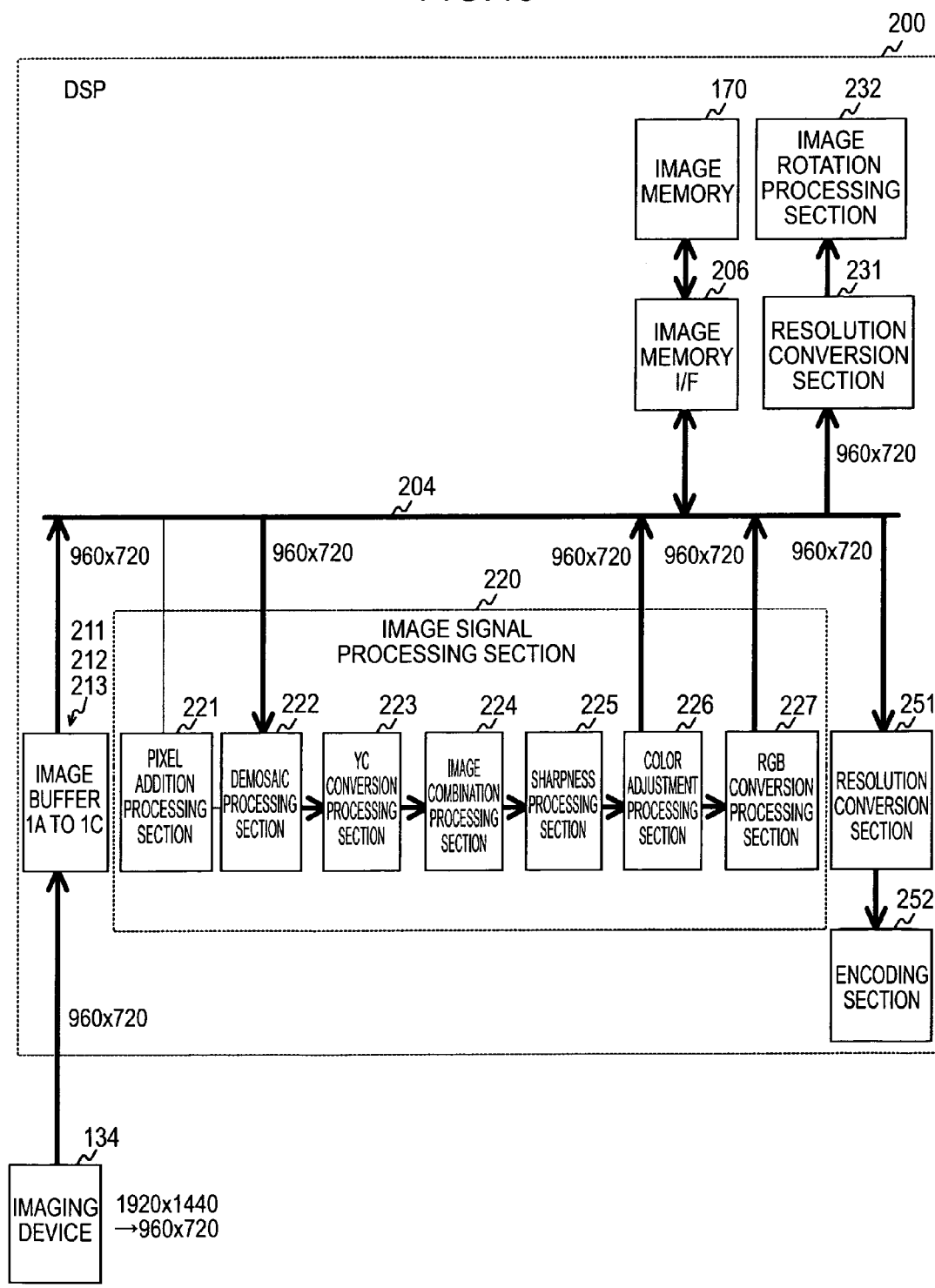
FIG. 43 is a diagram schematically showing the flow of image data when pixel decimation and pixel addition are performed by the imaging device 134 according to the first embodiment of the present invention.

FIG. 43 is a diagram schematically showing the flow of image data when pixel decimation and pixel addition are performed by the imaging device 134 according to the first embodiment of the present invention. The numbers near the bold arrows shown in FIG. 43 represent the pixel count of image data. FIG. 43 shows an example in which the number of pixel data is decimated at a decimation ratio of 1/2 in the horizontal direction and at a decimation ratio of 1/2 in the vertical direction using the imaging device 134 having a pixel count of 1920×1440 pixels. The case where the number of pixel data is added at an addition ratio of 1/2 in the horizontal direction and at an addition ratio of 1/2 in the vertical direction using the imaging device 134 can be similarly represented. As shown in FIG. 43, the pixel count (960×720 pixels) of image data output from the imaging device 134 is smaller than the pixel count (1920×1440 pixels) of the imaging device 134.

Figure 44:
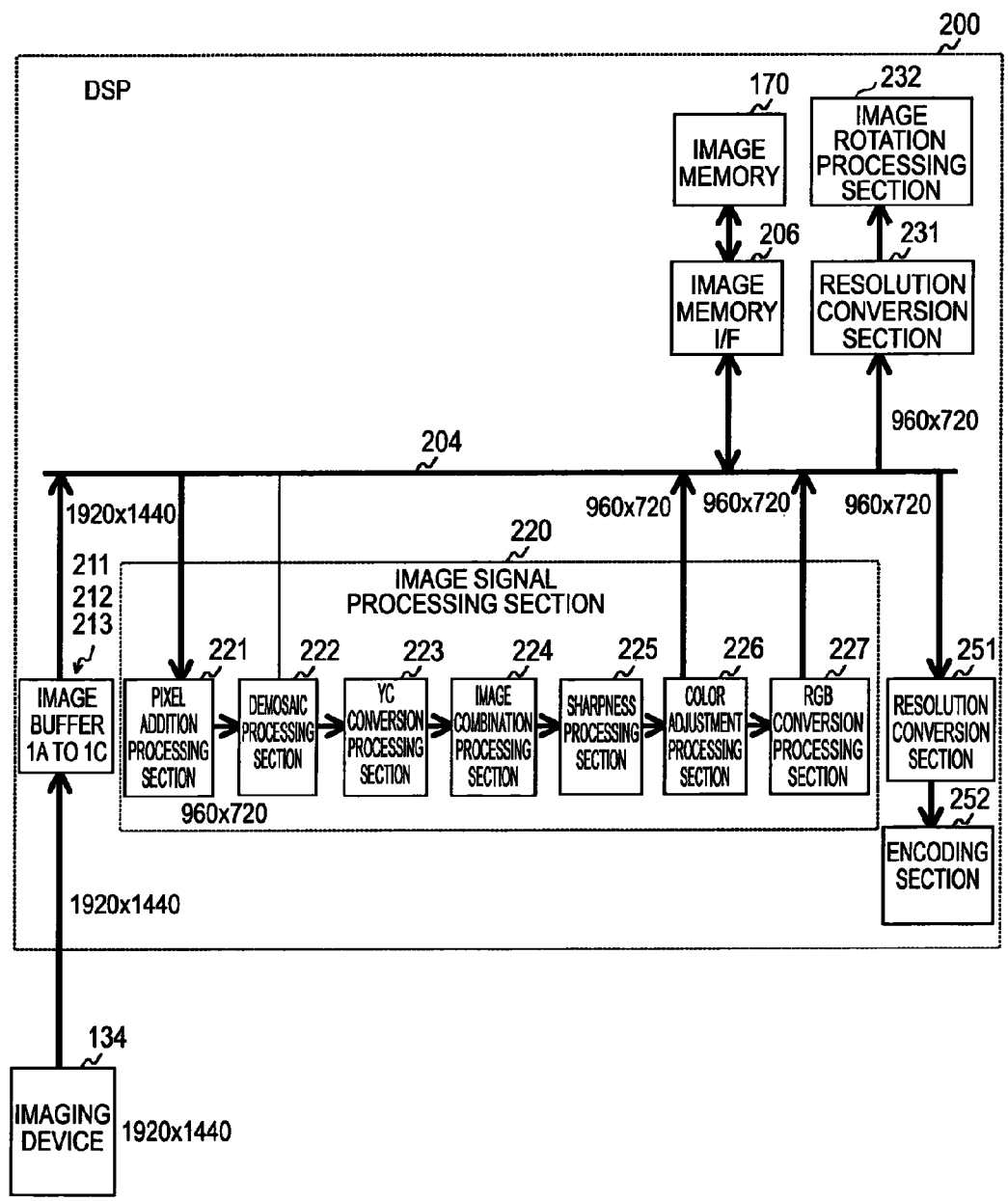
FIG. 44 is a diagram schematically showing the flow of image data when a pixel count is changed by a pixel addition processing section 221 according to the first embodiment of the present invention.

FIG. 44 is a diagram schematically showing the flow of image data when a pixel count is changed by a pixel addition processing section 221 according to the first embodiment of the present invention. The numbers near the bold arrows shown in FIG. 44 represent the pixel count of image data. FIG. 44 shows an example in which the pixel addition processing section 221 reduces the number of pixel data in the horizontal direction by 1/2 and the number of pixel data in the vertical direction by 1/2 with respect to the image data output from the imaging device 134 having a pixel count of 1920×1440 pixels. As shown in FIG. 44, the pixel count (960×720 pixels) of image data output from the pixel addition processing section 221 is smaller than the pixel count of the imaging device 134 and than the pixel count of the image data input to the pixel addition processing section 221.

Figure 45:
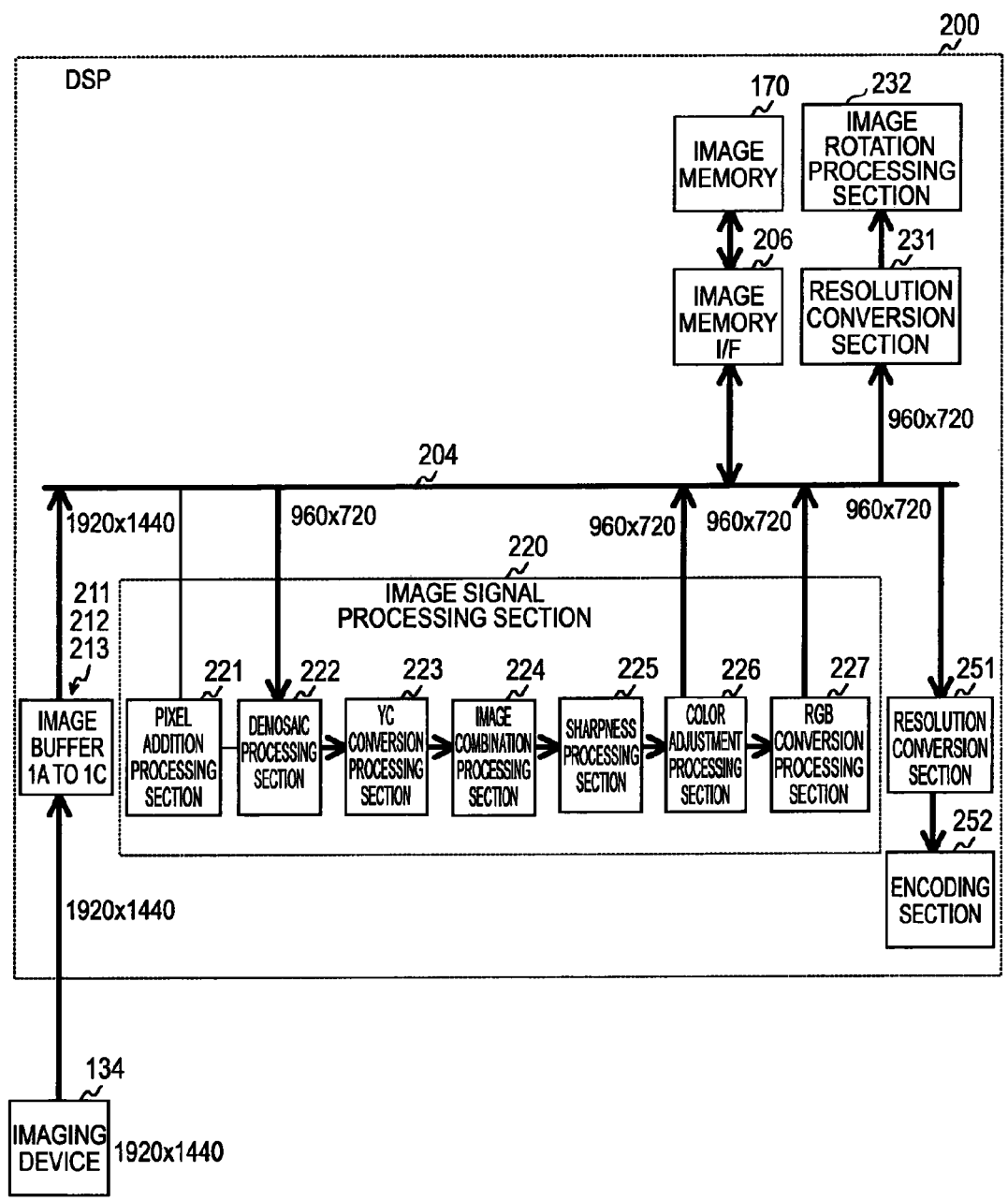
FIG. 45 is a diagram schematically showing the flow of image data when changing the pixel count at the time of reading out image data from an image memory 170 according to the first embodiment of the present invention.

FIG. 45 is a diagram schematically showing the flow of image data when changing the pixel count at the time of reading out image data from an image memory 170 according to the first embodiment of the present invention. The numbers near the bold arrows shown in FIG. 45 represent the pixel count of image data. FIG. 45 shows an example in which whenever image data are read out from the image memory 170, the image data are read out at intervals of a predetermined number of pixels on the image data, whereby the pixel count of the image data is decreased. That is, the image data output from the imaging device 134 having a pixel count of 1920×1440 pixels are stored in the image memory 170. When the demosaic processing section 222 reads out the image data stored in the image memory 170, the image data are read out so that the number of pixel data in the horizontal direction is reduced by 1/2 and the number of pixel data in the vertical direction is reduced by 1/2. As shown in FIG. 45, the pixel count of the image data read out from the image memory 170 and input to the demosaic processing section 222 is smaller than the pixel count of the imaging device 134 and than the pixel count of the image data written from the image buffers 211 to 213 into the image memory 170.

[Modification where Readout Region of Image Data is Changed]

In this example, the readout region of the pixel data is changed using the DSP 200 so as to decrease the pixel count of image data.

Figure 46:
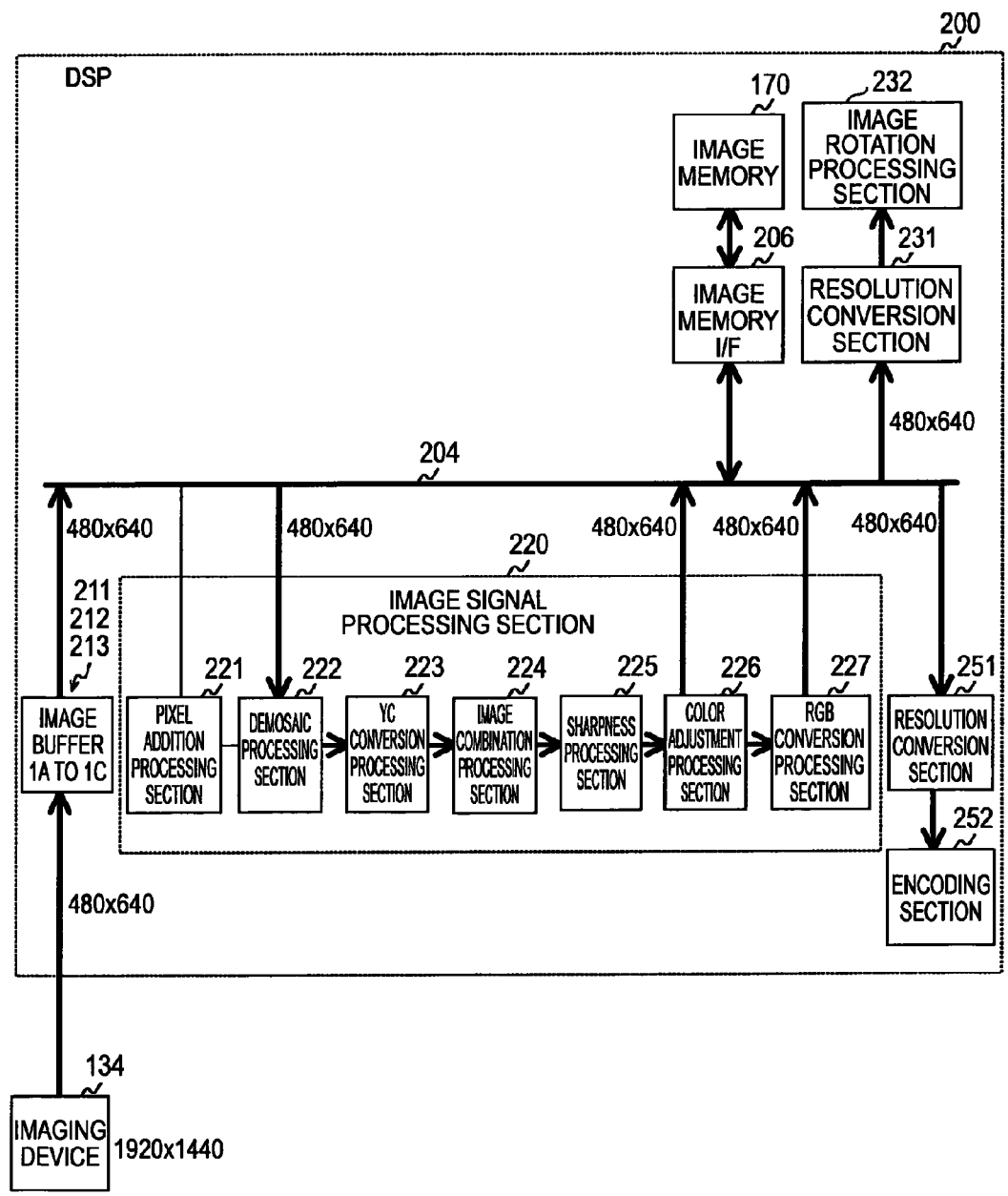
FIG. 46 is a diagram schematically showing the flow of image data when a readout region is changed by the imaging device 134 according to the first embodiment of the present invention.

FIG. 46 is a diagram schematically showing the flow of image data when a readout region is changed by the imaging device 134 according to the first embodiment of the present invention. The numbers near the bold arrows shown in FIG. 46 represent the pixel count of image data. FIG. 46 shows an example in which image data having a pixel count of 480×640 pixels are read out using the imaging device 134 having a pixel count of 1920×1440 pixels. As shown in FIG. 46, the pixel count of the imaging device 134 is 1920×1440 pixels, whereas the pixel count of image data output from the imaging device 134 is 480×640 pixels.

Figure 47:
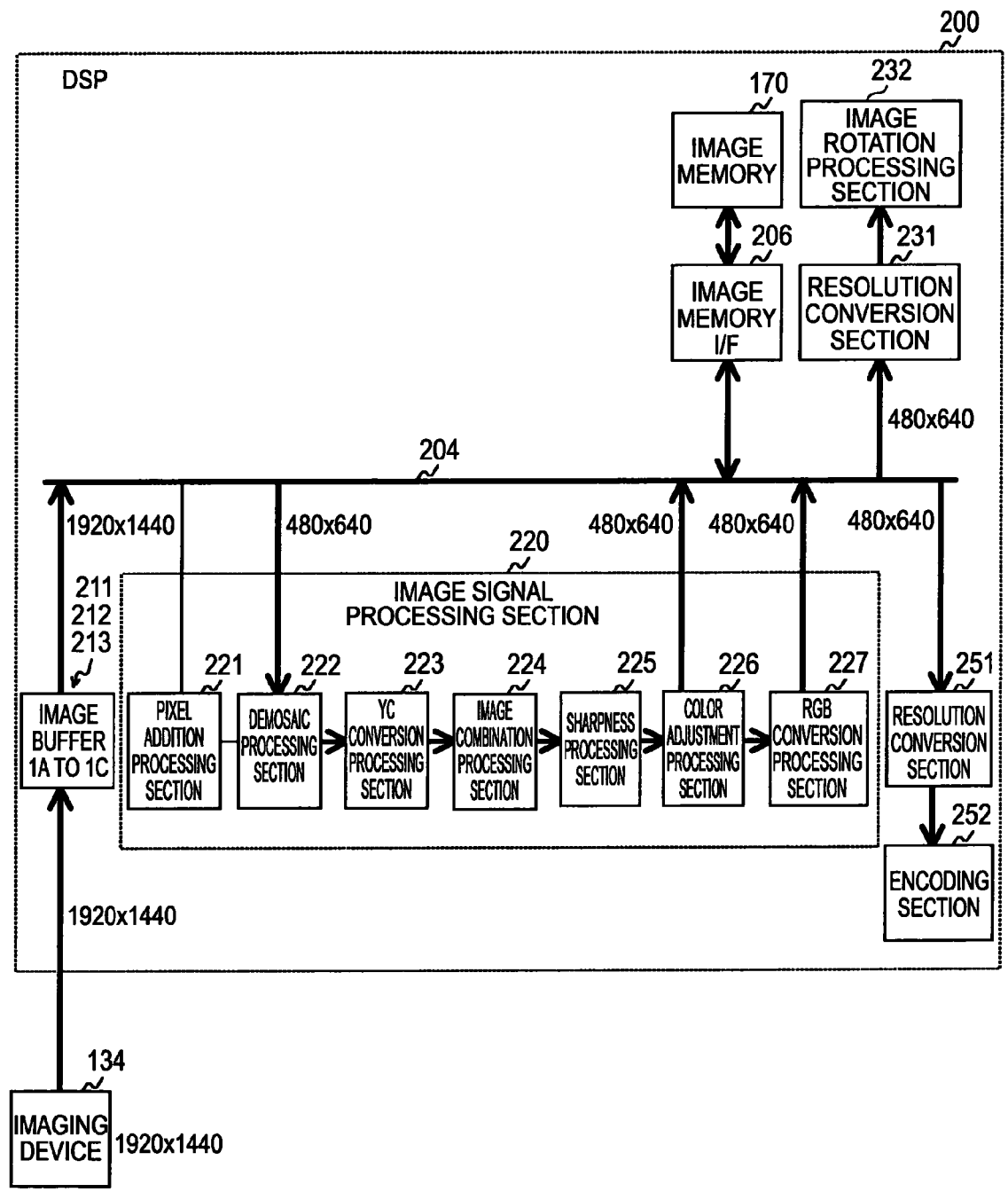
FIG. 47 is a diagram schematically showing the flow of image data when changing the readout region at the time of reading out image data from the image memory 170 according to the first embodiment of the present invention.

FIG. 47 is a diagram schematically showing the flow of image data when changing the readout region at the time of reading out image data from the image memory 170 according to the first embodiment of the present invention. The numbers near the bold arrows shown in FIG. 47 represent the pixel count of image data. FIG. 47 shows an example in which when image data are read out from the image memory 170, the image data are read out from a partial region on the image data, whereby the region of the image data is changed, and the pixel count of the image data is decreased. That is, the image data output from the imaging device 134 having a pixel count of 1920×1440 pixels are stored in the image memory 170. When the demosaic processing section 222 reads out the image data stored in the image memory 170, the image data corresponding to a region having a pixel count of 480×640 pixels are read out. As shown in FIG. 47, the pixel count of the imaging device 134 and the pixel count of the image data written from the image buffers 211 to 213 to the image memory 170 are 1920×1440 pixels. In contrast, the pixel count of the image data read out from the image memory 170 and input to the demosaic processing section 222 is 480×640 pixels.

[Deactivation Example of Two Imaging Systems During Monocular Imaging Operation]

Hereinabove, an example of generating captured images using at least one imaging systems of three imaging systems has been described. For example, in order to decrease power consumption, it is preferable to stop the operation of an imaging system that does not generate a captured image. In the following description, an example of stopping the operation of an imaging system that does not generate a captured image when generating captured images will be described.

[Configuration Example of Mobile Phone Unit]

Figure 48:
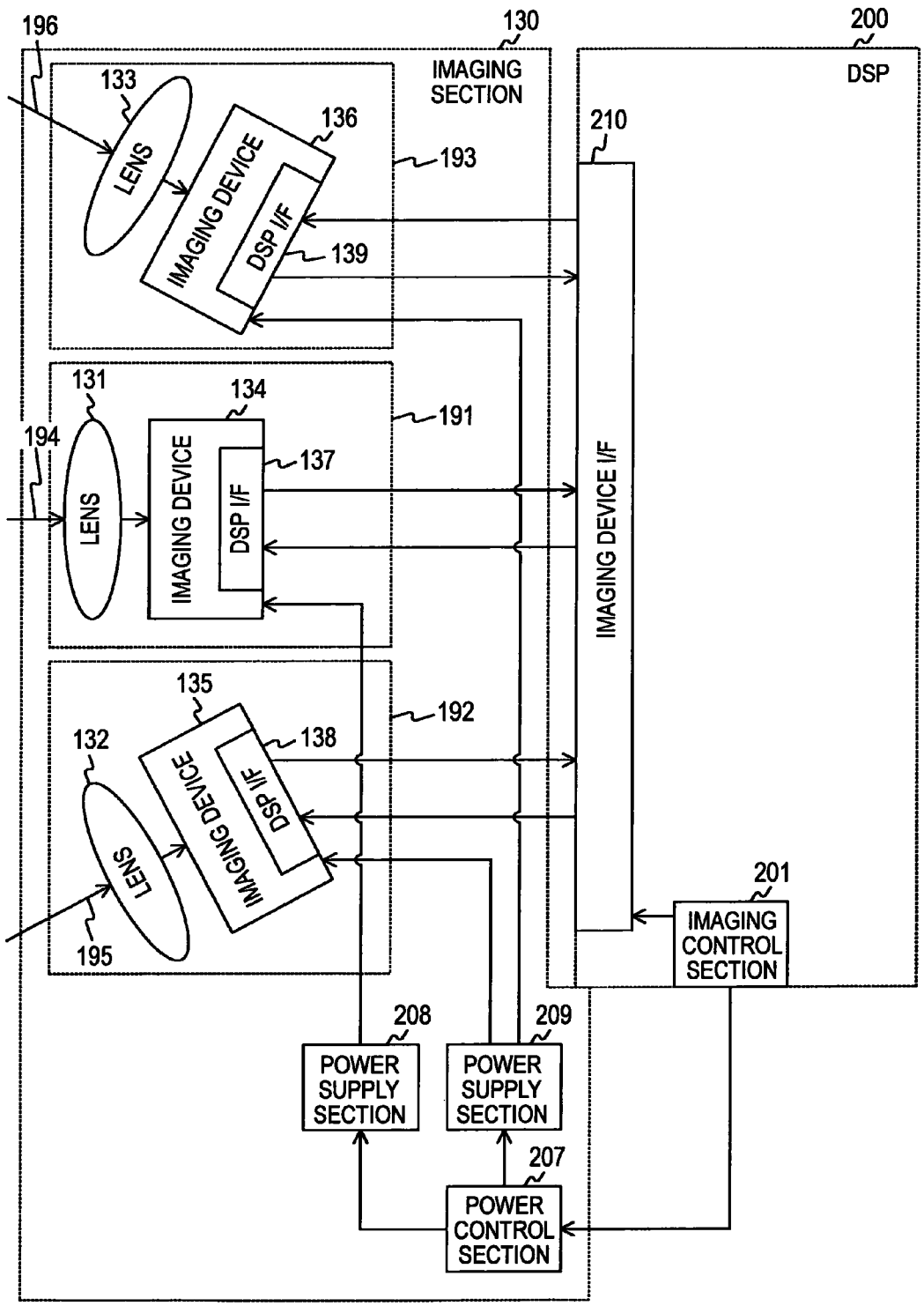
FIG. 48 is a block diagram showing a functional configuration example of the mobile phone unit 100 according to the first embodiment of the present invention.

FIG. 48 is a block diagram showing a functional configuration example of the mobile phone unit 100 according to the first embodiment of the present invention. The configuration example shown in FIG. 48 is an example in which the configurations shown in FIG. 3 other than the configuration responsible for supplying power to the first to third imaging systems 191 to 193 are omitted, and an imaging control section 201 is added. This example shows an example of stopping the operation of an imaging system by interrupting the power supplied to the imaging system (Control Method 1 shown in FIG. 50). The power control section 207 and the power supply sections 208 and 209 are the same as those shown in FIG. 3. Therefore, in the following description, only the portions concerning the deactivation of the imaging system will be described, and the redundant description of the same portions as those in FIG. 3 will be omitted.

For example, when an imaging operation (monocular imaging operation) wherein only the image data generated by the imaging device 134 are used is selected, the imaging control section 201 instructs the power supply section 209 to interrupt the supply of power to the second and third imaging systems 192 and 193. By doing so, when a monocular imaging operation is being performed, it is possible to stop the operation of the second and third imaging systems 192 and 193 which are not used for the imaging operation, and to reduce power consumption. When the supply of power to the second and third imaging systems 192 and 193 is interrupted, it is preferable that the DSP 200 stops outputting the clock signals, the vertical synchronization signal, the horizontal synchronization signal, and the like to the second and third imaging systems 192 and 193. In this way, power consumption can be further reduced.

FIGS. 49A to 49C are block diagrams showing a functional configuration example of the mobile phone unit 100 according to the first embodiment of the present invention. The respective configuration examples shown in FIGS. 49A to 49C show only simplified configurations concerning the deactivation of the imaging operation. That is, only logical AND circuits 801 to 807 and respective signal lines are shown. Here, the logical AND circuits 801 to 807 are circuits, to which two input signal line are connected, and which each output a "H" signal to an output signal line when a "H" signal is input from the respective input signal lines, namely, circuits which perform a logical multiplication (AND) operation. Moreover, this example shows an example in which when stopping the operation of an imaging system, the power to an imaging system to be stopped is not interrupted, but the supply of clocks or the like to the imaging system to be stopped is interrupted.

FIG. 49A shows a circuit configuration example in the DSP 200 for stopping the supply of clocks to an imaging system. Here, a signal line 809 is a signal line for supplying a clock signal to the imaging device 134, a signal line 810 is a signal line for supplying a clock signal to the imaging device 135, and a signal line 811 is a signal line for supplying a clock signal to the imaging device 136. Moreover, a signal line 812 is a signal line for supplying an ON/OFF control signal to the imaging device 134, a signal line 813 is a signal line for supplying an ON/OFF control signal to the imaging device 135, and a signal line 814 is a signal line for supplying an ON/OFF control signal to the imaging device 136. Moreover, a signal line 815 is a signal line for outputting the clock signal to the imaging device 134, a signal line 816 is a signal line for outputting the clock signal to the imaging device 135, and a signal line 817 is a signal line for outputting the clock signal to the imaging device 136. For example, when a monocular imaging operation is selected, the imaging control section 201 changes the signals of the signal lines 813 and 814 among the signal lines 812 to 814 to the "L" signals. In this way, the supply of clocks to the imaging devices 135 and 136 is stopped (Control Method 2 shown in FIG. 50).

FIG. 49B shows a circuit configuration example in which the supply of power and clocks to the imaging system is not interrupted, and the operation of a clock generation circuit in the imaging devices 134 to 136 is stopped. In this example, a multiplier 818 in the multipliers/dividers 391 and 392 shown in FIG. 12 is shown as an example. The multiplier 818 shown in this example is assumed to be the multiplier of the imaging devices 135 and 136. Here, a signal line 819 is a signal line for receiving a clock signal from the DSP 200, and a signal line 820 is a signal line for receiving an imaging ON/OFF signal from the DSP 200. Moreover, a signal line 821 is a signal line for outputting a multiplied clock signal. For example, when a monocular imaging operation is selected, the DSP 200 changes the signal of the signal line 820 to the "L" signal. In this way, the multipliers in the imaging devices 135 and 136 are stopped (Control Method 3 shown in FIG. 50).

FIG. 49C shows a circuit configuration example in which the supply of power and clocks to the imaging system and the operation of the clock multiplier in the imaging device are not stopped, and the operation of the vertical and horizontal scanning circuits in the imaging devices 134 to 136 is stopped. Here, a signal line 823 is a first signal line for inputting an internal vertical control signal of a vertical scanning circuit 822, and a signal line 824 is a second signal line for inputting an internal vertical control signal of the vertical scanning circuit 822. Moreover, signal lines 825 and 831 are signal lines for receiving an imaging ON/OFF signal from the DSP 200, and signal lines 828 and 830 are signal lines for receiving clock signals from the internal multiplier/divider of the imaging devices. Furthermore, a signal line 826 is a first signal line for outputting a vertical control signal from the vertical scanning circuit 822 to an external device, and a signal line 827 is a second signal line for outputting a vertical control signal from the vertical scanning circuit 822 to an external device. Furthermore, a signal line 832 is a signal line for supplying an internal clock signal to the horizontal scanning circuit 829.

Furthermore, a signal line 833 is a first signal line for outputting a horizontal control signal from a horizontal scanning circuit 829 to an external device, and a signal line 834 is a second signal line for outputting a horizontal control signal from the horizontal scanning circuit 829 to an external device. In this example, only the first and second signal lines are shown, and other signal lines are omitted. For example, when a monocular imaging operation is selected, the DSP 200 changes the signals of the signal lines 825 and 831 to the "L" signals. In this way, the output of the vertical and horizontal scanning signals from the vertical and horizontal scanning circuits in the imaging devices 135 and 136 is stopped (Control Method 4 shown in FIG. 50). In the example shown in FIG. 49C, since a larger number of circuits are operating in the second and third imaging systems 192 and 193 compared to the above-described examples, the effect of power consumption reduction is smaller than that obtained in the above-described examples. However, since clocks are supplied to the imaging devices, and the internal multipliers of the imaging devices are operating, the operations of the second and third imaging systems 192 and 193 can be quickly resumed when the monocular imaging operation is switched to the multinocular imaging operation.

Moreover, the operation of the imaging system may be stopped by fixing the vertical and horizontal synchronization signals supplied from the DSP 200 to the imaging system (Control Method 5 shown in FIG. 50). In this case, since the respective synchronization signals are not input, the imaging device is unable to perform an image data readout operation.

FIG. 50 is a diagram showing the relationship between a control method for stopping the operation of the imaging systems and the states of respective signal lines according to the first embodiment of the present invention. The table shown in FIG. 50 shows the relationship between the respective control methods and the respective signal lines. By performing the respective control methods shown in FIG. 50, it is possible to stop the operation of the imaging system. It is preferable that no signal is output from the signal lines in cells marked with an oblique stroke among the fields corresponding to Control Method 1. Moreover, it is preferable that the signal lines in fields marked with an oblique stroke among the fields corresponding Control Methods 2 to 5 are fixed to "L" or "H". Moreover, the signal lines (signal lines for supplying signals from the DSP 200 to the imaging systems) which are not included in the table shown in FIG. 50 may be put into any one of the states: "H" output, "L" output, insufficient output, and no output. However, it is preferable to put the signal lines into the state of no output in order to decrease the power consumption.

[Example of Fetching Image Data from Imaging System to DSP]

FIG. 51 is a timing chart schematically showing output timings of the imaging devices and written states of image buffers according to the first embodiment of the present invention. The horizontal axes shown in FIG. 51 represent time axes. Moreover, a waveform 700 represents a horizontal synchronization signal supplied from the DSP 200 to the respective imaging systems. Moreover, horizontal axes 701 to 703 represent changes over time of image data output from the respective imaging systems to the DSP 200. Furthermore, horizontal axes 704 to 706 represent changes over time of written states of the image buffers 211 to 219. In the example shown in FIG. 51, the written states of a set of three image buffers corresponding to each imaging system are shown on the same line.

For example, image buffers 1A, 1B, and 1C corresponding to the first imaging system 191 will be described as an example. For example, when writing of image data from the imaging device 134 to the first image buffer 1A ends, the image buffer 1A enters a standby state wherein it waits for the end of readout of the image data into the DSP 200. During the standby state of the image buffer 1A, writing of image data from the imaging device 134 to the second image buffer 1B is performed. Moreover, when writing of image data from the imaging device 134 to the second image buffer 1B ends, the image buffer 1B enters a standby state wherein it waits for the end of readout of the image data into the DSP 200. Moreover, the writing of the image data into the second image buffer 1B ends, readout of the image data from the first image buffer 1A into the DSP 200 is performed. The readout of the image data from the image buffer 1A ends before the writing of the image buffer 1C is finished, and the image buffer 1A enters a state where image data can be written thereto. Subsequently, these series of operations are repeatedly performed. Moreover, the same operation is performed for image buffers 2A to 2C and image buffers 3A to 3C.

Here, when the data written into the three image buffers are read out using one data bus 204, the imaging device needs to read out the image data in the image buffers in a period that is at least 1/3 of the period needed for writing the image data into the image buffers.

In the following description, the relationship between the clock frequency for the imaging devices reading out image data of the respective pixels and writing the image data into the image buffers 211 to 219 and the clock frequency for the DSP 200 reading out the image data of the image buffers 211 to 219 will be described. Moreover, the relationship between the clock frequency for the DSP 200 reading out the image data of the image buffers 211 to 219 during the multinocular imaging operation and the clock frequency for the DSP 200 reading out the image data of the image buffers 211 to 219 during the monocular imaging and recording operation will be described.

Figure 54A:
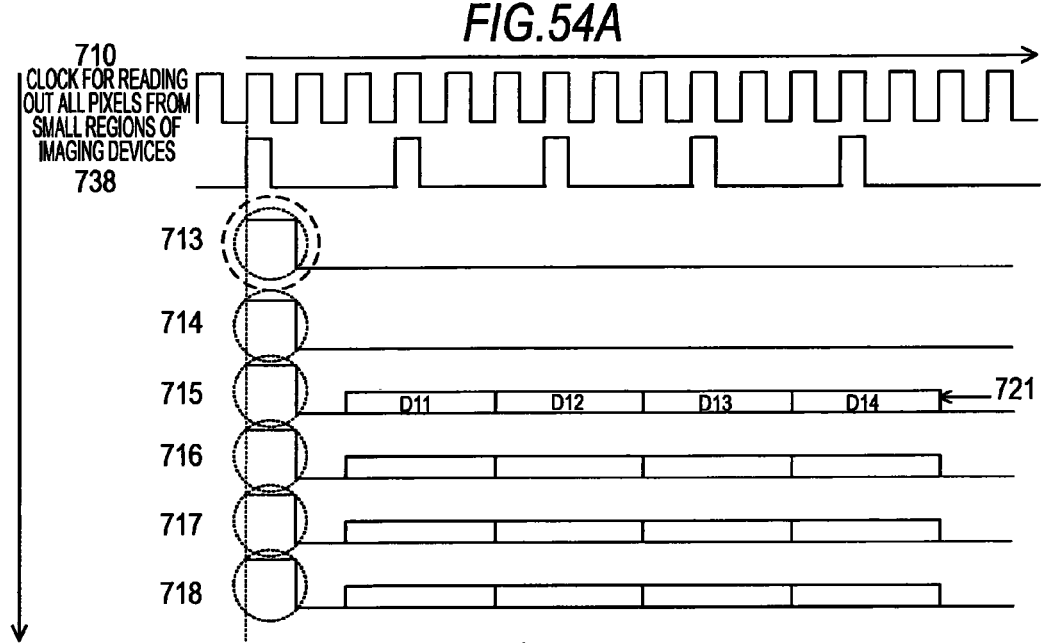
FIGS. 54A and 54B are diagrams showing the relationship between the clock frequencies for reading out respective pixels of the imaging devices and writing image data to image buffers and the clock frequencies for reading out image data from the image buffers according to the first embodiment of the present invention.
Figure 54B:
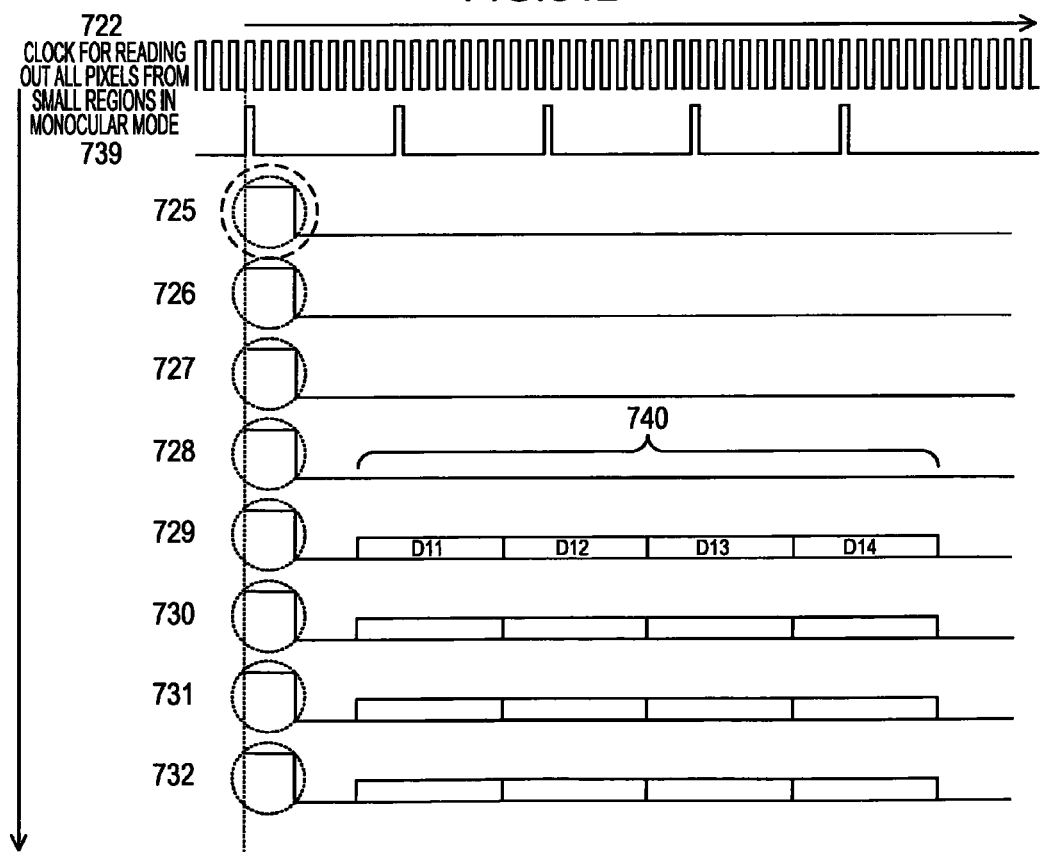

FIGS. 52A and 52B to FIGS. 54A and 54B are diagrams showing the relationship between the clock frequencies for reading out respective pixels of the imaging devices and writing image data to image buffers and the clock frequencies for reading out image data from the image buffers according to the first embodiment of the present invention. Here, the horizontal axes shown in FIGS. 52A and 52B to FIGS. 54A and 54B represent the elapse of time in one line, and the vertical axes represent the elapse of time for each line in one frame. FIGS. 52A and 52B show an example (trinocular horizontal wide-angle imaging mode) which corresponds to the first readout method shown in FIGS. 28A and 28B. FIGS. 53A and 53B show an example (monocular horizontal imaging mode) which corresponds to the third readout method shown in FIGS. 32A and 32B. Moreover, FIGS. 54A and 54B show an example (monocular vertical small-area imaging mode) which corresponds to the fifth readout method shown in FIGS. 36A and 36B.

FIG. 52A shows the relationship between the clock frequency in imaging devices and the output timing of image data from the imaging devices when the trinocular horizontal wide-angle imaging mode is set. A waveform 710 represents a clock used when all pixels are read out from all regions of the imaging devices 134 to 136 in the trinocular horizontal wide-angle imaging mode. Moreover, horizontal axes 713 to 718 represent changes over time of image data by rectangles, the image data being read out from the imaging devices 134 to 136 and output to the image buffers 211 to 219. The image data output to the image buffer 211 are depicted on a line 719, the image data output to the image buffer 212 are depicted on a line 720, and the image data output to the image buffer 213 are depicted on a line 721. In this example, different symbols (D11 to D1C and the like) are filled in only the rectangles on the horizontal axis 715, and the symbols in the rectangles are omitted for other horizontal axes. Moreover, a large broken-line circle shown on the horizontal axis 713 represents the timing of a vertical synchronization signal, and small dot-line circles shown on the horizontal axes 713 to 718 represent the timing of a horizontal synchronization signal. The same large broken-line circle and small dot-line circles will be used in the other horizontal axes shown in FIGS. 52A and 52B to FIGS. 54A and 54B so as to represent the timings of the vertical and horizontal synchronization signals.

FIG. 52B shows the relationship between the clock frequency in the DSP 200 and the readout timing of image data from the image buffers when the trinocular horizontal wide-angle imaging mode is set. A waveform 722 represents a clock used when the DSP 200 reads out image data from the image buffers 211 to 219 in the trinocular horizontal wide-angle imaging mode. Moreover, horizontal axes 725 to 732 represent changes over time of image data by rectangles, the image data being read out from the image buffers 211 to 219. In this example, different symbols (D11 to D1C and the like) are associated to only the rectangles on the horizontal axis 729 using arrows, and the symbols in the rectangles are omitted for other horizontal axes. These respective symbols correspond to the symbols shown in FIG. 52A. Moreover, a time interval 733 is a readout time interval for the imaging device 134, a time interval 734 is a readout time interval for the imaging device 135, and a time interval 735 is a readout time interval for the imaging device 136.

Here, when three sets of image data are input from the three imaging devices 134 to 136 into the DSP 200, the input image data are written into the image buffers 211 to 219. Moreover, the image data written into the image buffers 211 to 219 are read out through one data bus 204 in the DSP 200 and written into the image memory 170 through the image memory I/F 206. For example, a case where the trinocular horizontal wide-angle imaging mode is set will be considered. In this case, as shown in FIGS. 52A and 52B, the imaging devices 134 to 136 need to read out the image data in the respective image buffers 211 to 219 in a period that is at least 1/3 of the period needed for writing the image data into the image buffers 211 to 219.

FIG. 53A shows the relationship between the clock frequency in imaging devices and the output timing of image data from the imaging devices when the monocular horizontal imaging mode is set. FIG. 53B shows the relationship between the clock frequency in the DSP 200 and the readout timing of image data from the image buffers when the monocular horizontal imaging mode is set. A waveform 736 represents a clock used when the DSP 200 reads out image data from the image buffers 211 to 219 in the monocular horizontal imaging mode. A time interval 737 is a readout time interval for the imaging device 134. Moreover, the same portions as those in FIGS. 52A and 52B will be denoted by the same reference numerals.

As can be understood from comparison between FIGS. 52A and 52B and FIGS. 53A and 53B, the image data quantity in the trinocular horizontal wide-angle imaging mode is three times that of the monocular horizontal imaging mode. Therefore, when the trinocular horizontal wide-angle imaging mode is set, a clock frequency that is three times that of the trinocular horizontal wide-angle imaging mode is required as the clock frequency for reading out image data of the image buffers 211 to 219. Similarly, when the trinocular horizontal wide-angle imaging mode is set, a clock frequency that is three times that of the monocular horizontal imaging mode is required as the clock frequency for the DSP 200 performing internal image signal processing.

FIG. 54A shows the relationship between the clock frequency in imaging devices and the output timing of image data from the imaging devices when the monocular vertical small-area imaging mode is set. A waveform 738 represents a clock used when reading out all pixels from only a specific region of the imaging devices 134 to 136 in the monocular vertical small-area imaging mode. FIG. 54B shows the relationship between the clock frequency in the DSP 200 and the readout timing of image data from the image buffers when the monocular vertical small-area imaging mode is set. A waveform 739 represents a clock used when the DSP 200 reads out image data from the image buffers 211 to 219 in the monocular horizontal imaging mode. A time interval 740 is a readout time interval for the imaging device 134. Moreover, the same portions as those in FIGS. 52A and 52B will be denoted by the same reference numerals.

As can be understood from comparison between FIGS. 53A and 53B and FIGS. 54A and 54B, the image data quantity in the monocular vertical small-area imaging mode is smaller than that of an imaging mode where all pixels of the light receiving surface are read out. Therefore, when the monocular vertical small-area imaging mode is set, a clock frequency that is lower than that of an imaging mode where all pixels are read out is required as the clock frequency for reading out image data of the image buffer 211. Similarly, a clock frequency that is lower than that of an imaging mode where all pixels are read out can be used as the clock frequency for the DSP 200 performing internal image signal processing.

[Example of Operation Frequency Required for Data Bus of DSP]

Figure 55:
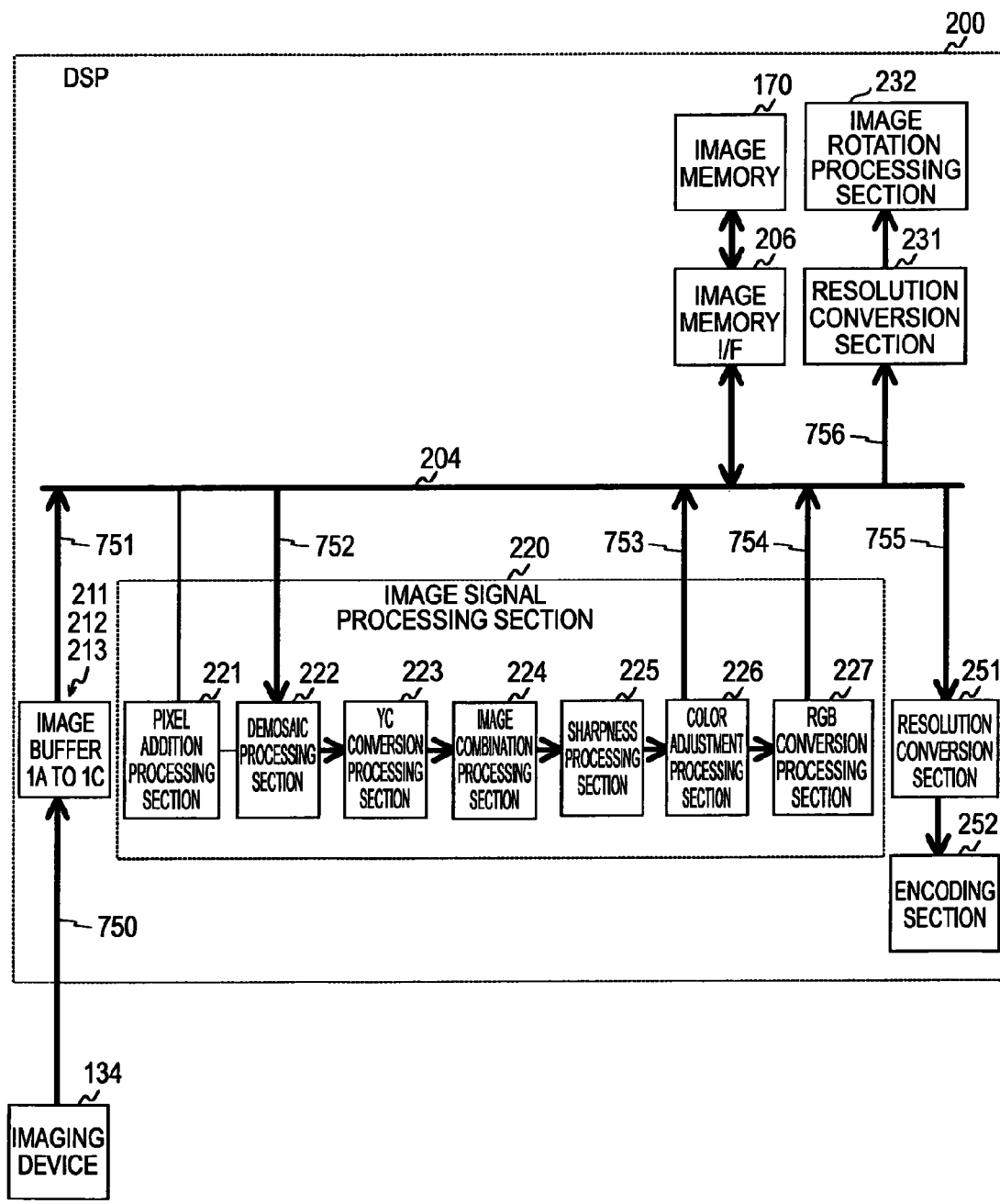
FIG. 55 is a diagram schematically showing the flow of image data generated by the imaging device 134 according to the first embodiment of the present invention.

FIG. 55 is a diagram schematically showing the flow of image data generated by the imaging device 134 according to the first embodiment of the present invention. The configuration shown in FIG. 55 is the same as the configuration example shown in FIG. 43, except that the data formats of the image data transmitted through the data bus 204 are added. In this example, it is assumed that the pixel addition processing section 221 in the DSP 200 is not used, and images are output to only the display section 140 and no images are output to an external display device.

The image data written from the imaging device 134 to the image buffers 211 to 213 are Bayer data 750. Moreover, the image data input to the DSP 200 are transmitted in a Bayer data format to the processing sections on the preceding stage of the demosaic processing section 222 that interpolates the Bayer data to RGB data (where R is red, G is green, and B is blue). That is, when the image data are written from the image buffers 211 to 213 into the image memory 170 and read out into the demosaic processing section 222, the image data are transmitted in the Bayer data format.

Here, the image data having been subjected to demosaic processing by the demosaic processing section 222 are directly transferred between respective processing sections until the image data are subjected to resolution conversion processing. When performing resolution conversion which involves signal processing of a large amount of data, the image data are written into the image memory 170 through the data bus 204 so that desired image data can be easily input at a desired timing. Moreover, the resolution conversion sections 231 and 251 read in image data necessary for the resolution conversion processing from the image memory 170.

In this way, before the resolution of a recording image is converted, image data having the RGB data format are written to the image memory 170 through the data bus 204. Moreover, when converting the resolution for an image recording purpose, the image data having the RGB data format are read out from the image memory 170 through the data bus 204.

Moreover, when displaying images on the display section 140, the display section 140 generally requests the image data in the YCbCr format. Therefore, before the resolution is converted for display devices, the image data having the YCbCr data format are written into the image memory 170 through the data bus 204. Moreover, when converting the resolution for an image displaying purpose, the image data having the YCbCr data format are read out from the image memory 170 through the data bus 204.

Here, the data quantity of a set of image data transmitted through the data bus 204 will be described. For example, a case in which when a set of image data are input from the imaging device 134 to the DSP 200, the input image data are recorded in the recording medium 180 as one image file and displayed on the display section 140 will be described. In this case, two sets of image data having the Bayer data format, two sets of image data having the YCbCr data format, two sets of image data having the RGB data format are transmitted through the data bus 204. That is, two sets of image data are transmitted in the Bayer data format from the image buffers 211 to 213 to the demosaic processing section 222 (Bayer 751 and 752). Moreover, two sets of image data are transmitted in the YCbCr data format from the color adjustment processing section 226 to the resolution conversion section 231 (YCbCr 753 and 756). Furthermore, two sets of image data are transmitted in the RGB data format from the RGB conversion processing section 227 to the resolution conversion section 251 (RGB 754 and 755).

Here, the data quantity of one set of image data having the YCbCr data format is approximately two times that of the image data of the same image size having the Bayer format. Moreover, the data quantity of one set of image data having the RGB data format is approximately three times that of the image data of the same image size having the Bayer format. For example, when recording one set of image data in the recording medium 180 as one image file and displaying the image data on the display section 140, it is necessary to transmit approximately 12 sets of image data through the data bus 204 as calculated in terms of the Bayer data format. Processing concerning the transmission of the image data is shown in FIGS. 56A and 56B.

Figure 56A:
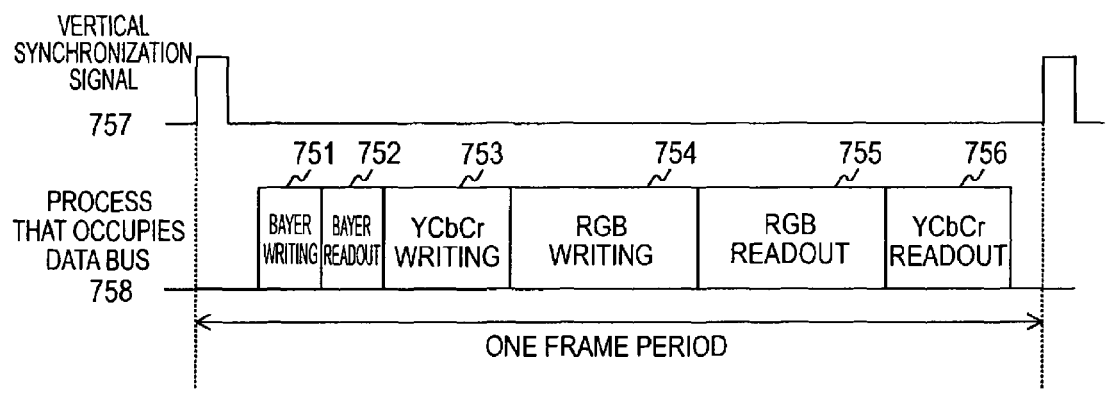
FIGS. 56A and 56B are diagrams schematically showing the relationship between the processing that occupies a data bus 204 and the duration according to the first embodiment of the present invention.
Figure 56B:
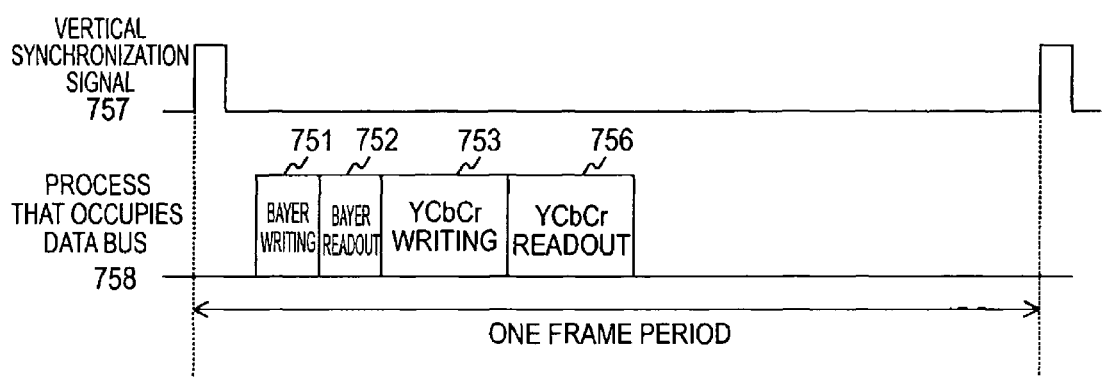

FIGS. 56A and 56B are diagrams schematically showing the relationship between the processing that occupies the data bus 204 and the duration according to the first embodiment of the present invention. FIG. 56A shows the relationship between the processing that occupies the data bus 204 and the duration when recording one set of image data input from the imaging device 134 to the DSP 200 in the recording medium 180 as one image file and displaying the image data on the display section 140. FIGS. 56A and 56B show the relationship when processing one frame of data, and the horizontal axes are time axes. The respective processings corresponding to those in the example shown in FIG. 55 will be denoted by the same reference numerals as those in FIG. 55.

FIG. 56B shows the relationship between the processing that occupies the data bus 204 and the duration when displaying one set of image data input from the imaging device 134 to the DSP 200 on the display section 140 without recording the image data in the recording medium 180. This example shows the case of performing a so-called monitoring image displaying operation. Here, when performing the monitoring image displaying operation, the image is displayed on the display section 140 but image data are not generated for a recording purpose. That is, a process 754 of writing RGB data into the image memory 170 before converting the resolution of a recording image and a process 755 of reading out the RGB data from the image memory 170 at the time of converting the resolution of a recording image are not necessary. Therefore, when displaying one set of image data input from the imaging device 134 to the DSP 200 on the display section 140 during the monitoring image displaying operation, it is only necessary to transmit approximately 6 sets of image data through the data bus 204 as calculated in terms of the Bayer data format.

As described above, the data quantity of image data transmitted through the data bus 204 can be calculated. In the following description, the operation frequency required for the data bus 204 will be described.

First, variables used for calculation of the operation frequency required for the data bus 204 will be described.

H: Horizontal pixel count of region in which pixel data are read out from imaging devices.

V: Vertical pixel count of region in which pixel data are read out from imaging devices.

R: Decimation ratio during pixel decimation readout when pixel data are read out from imaging devices.

B: Bit width of respective pixel data of images.

F: Number of processable images for one second in DSP 200 performing image signal processing on images input from imaging devices.

Kb: Number of images that need to be transmitted in Bayer data format on data bus 204 of DSP 200 when one image input from imaging devices is recorded in recording medium 180 and displayed on display section 140.

Ky: Number of images that need to be transmitted in YCbCr data format on data bus 204 of DSP 200 when one image input from imaging devices is recorded in recording medium 180 and displayed on display section 140.

Kr: Number of images that need to be transmitted in RGB data format on data bus 204 of DSP 200 when one image input from imaging devices is recorded in recording medium 180 and displayed on display section 140.

K: Number of images transmitted on data bus 204 of DSP 200, as calculated in terms of Bayer image data, when one image input from imaging devices is recorded in recording medium 180 and displayed on display section 140.

Here, K is calculated by the following expression.

$$K=Kb\times1+Ky\times2+Kr\times3$$

D: Bit width of data bus 204 of DSP 200

Using these variables, the data quantity (unit: bit) DD1 of image data input to the DSP 200 for one second is calculated by Expression (13) below.

$$DD1=H\times V\times R\times B\times F \qquad (13)$$

Moreover, the data quantity (unit: bit) DD2 of the image data that are to be transmitted through the data bus 204 for one second is calculated by Expression (14) below.

$$DD2=H\times V\times R\times B\times F\times K \qquad (14)$$

Moreover, the clock frequency (unit: Hz) Fclk of the data bus 204 necessary for transmitting the image data is calculated by Expression (15) below.

$$Fclk=H\times V\times R\times B\times F\times K/(D-D\bmod B) \qquad (15)$$

Here, the lower limit Fclk_min of a desirable range of the clock frequency Fclk can be calculated by Expression (16) below.

$$Fclk\_min=(H\times V\times R\times B\times F\times K\times1.0)/(D-D\bmod B) \qquad (16)$$

Here, actually, the data transmitted on the data bus 204 are not transmitted seamlessly but are transmitted with a small gap between them. Therefore, it is commonly known to those skilled in the art to ensure a margin of several tens of percents for the transmission capability of the data bus 204 when calculating the operation frequency of the data bus 204 based on the quantity of data that need to be transmitted using the data bus 204.

For example, when a margin of several percents is ensured, the amount of margin may be too small. On the other hand, when a margin of one hundred and several tens of percents is ensured, the amount of margin may be too large. These are also commonly known to those skilled in the art. For example, the rate of decrease in the amount of data transmitted on the data bus 204 when the transmission intervals of data on the data bus 204 decrease is several tens of percents. Therefore, it would be enough to ensure a maximum margin of 100% as the transmission capability of the data bus 204. Thus, the upper limit of the desirable range of the clock frequency Fclk is defined as follows.

Here, the upper limit Fclk_max of the desirable range of the clock frequency Fclk can be calculated by Expression (17) below.

$$Fclk\_\max=(H \times V \times R \times B \times F \times K \times 2.0)/(D-D \bmod B) \quad (17)$$

In this way, since the lower limit Fclk_min and the upper limit Fclk_max of the desirable range of the clock frequency Fclk can be calculated, the desirable range of the clock frequency Fclk of the data bus 204 can be defined by Expression (18) below.

$$(H \times V \times R \times B \times F \times K \times 1.0)/(D-D \bmod B) \leq Fclk \leq (H \times V \times R \times B \times F \times K \times 2.0)/(D-D \bmod B) \quad (18)$$

Here, "D-D mod B" shown in Expressions (16) to (18) will be described.

When the bit width of the data bus 204 is not an integer multiple of the bit width of the respective pixels of the imaging devices, the writing operation on the image memory 170 results in a waste of data. For example, when the bit width of the data bus 204 is 128 bits, and the bit width of the respective pixels of the imaging devices is 12 bits, it is unable to transmit the 12-bit pixel data corresponding to an amount of 11 pixels but only able to transmit the 12-bit pixel data corresponding to 10 pixels. Therefore, the writing operation results in a waste of data corresponding to 8 bits. The amount representing this waste of data is D mod B. That is, the value (effective data bus width) which is a subtraction of the amount representing the waste of data from the bit width of the data bus 204 is "D−D mod B".

As shown in Expressions (16) to (18) described above, the range of a desirable operation frequency of the data bus 204 can be calculated by H, V, R, B, F, K, and D. However, the respective values of H, V, R, B, F, K, and D change in accordance with, the content of the imaging operation performed by the mobile phone unit 100. Therefore, it is preferable to change the operation frequency of the data bus 204 in accordance with the respective values of H, V, R, B, F, K, and D set for each imaging operation. In this way, by changing the operation frequency of the data bus 204, it is possible to decrease the operation frequency of the data bus 204 in the DSP 200 to a necessary and sufficient value and to decrease the power consumption.

FIG. 57 is a diagram showing the parameters for determining the operation frequency of the data bus 204 for each imaging operation of the mobile phone unit 100 according to the first embodiment of the present invention. By setting the respective parameters (H1sr, V1sr, and the like) shown in FIG. 57, it is possible to determine the operation frequency of the data bus 204 for each imaging operation of the mobile phone unit 100. An example of these respective parameters is shown in FIG. 58.

FIG. 58 is a diagram showing an example of the parameters for determining the operation frequency of the data bus 204 for each imaging operation of the mobile phone unit 100 according to the first embodiment of the present invention. This example shows the case of performing a still-image recording operation. Moreover, the lower limit Fclk_min and the upper limit Fclk_max of the operation frequency of the data bus 204 can be calculated in advance based on the respective parameters. The example shown in FIG. 58 shows the case in which the number of images subjected to the still-image recording processing for one second and the number of images subjected to the monitoring operation for one second are 30.

[Example of Time-Division Processing of Still-Image Recording Operation]

Next, time-division processing of a still-image recording operation will be described. The time-division processing means that still-image imaging and recording processes do not end within one frame period (namely, one cycle of the vertical synchronization signal supplied to the image signal processing section 220), but the respective processes are performed over several frame periods.

For example, even when a user photographs relatively many still images using a camera-equipped mobile phone unit which is widely used in recent years, in many cases, the user can photograph only about one image for several seconds. Therefore, in the case of performing a still-image recording operation, it is expected that the user's convenience will not be impaired greatly, for example, even when an image signal processing, recording process, and the like for one still image are performed over about one second. Moreover, by performing image signal processing and recording processes, and the like for one still image in such a way, it is possible to decrease the operation frequency of the data bus 204 of the DSP 200 and to decrease the power consumption.

After one still image is recorded, a message such as "Please wait for a while" may be displayed on the display section 140 until the image signal processing and recording processes, and the like for that image are finished, thus informing the user of the fact that the still-image imaging process is being executed. Moreover, besides the message, an icon or a mark indicating that the still-image imaging process is being executed may be displayed, and a monitoring operation may be performed in parallel and a monitoring image may be displayed.

Figure 59:
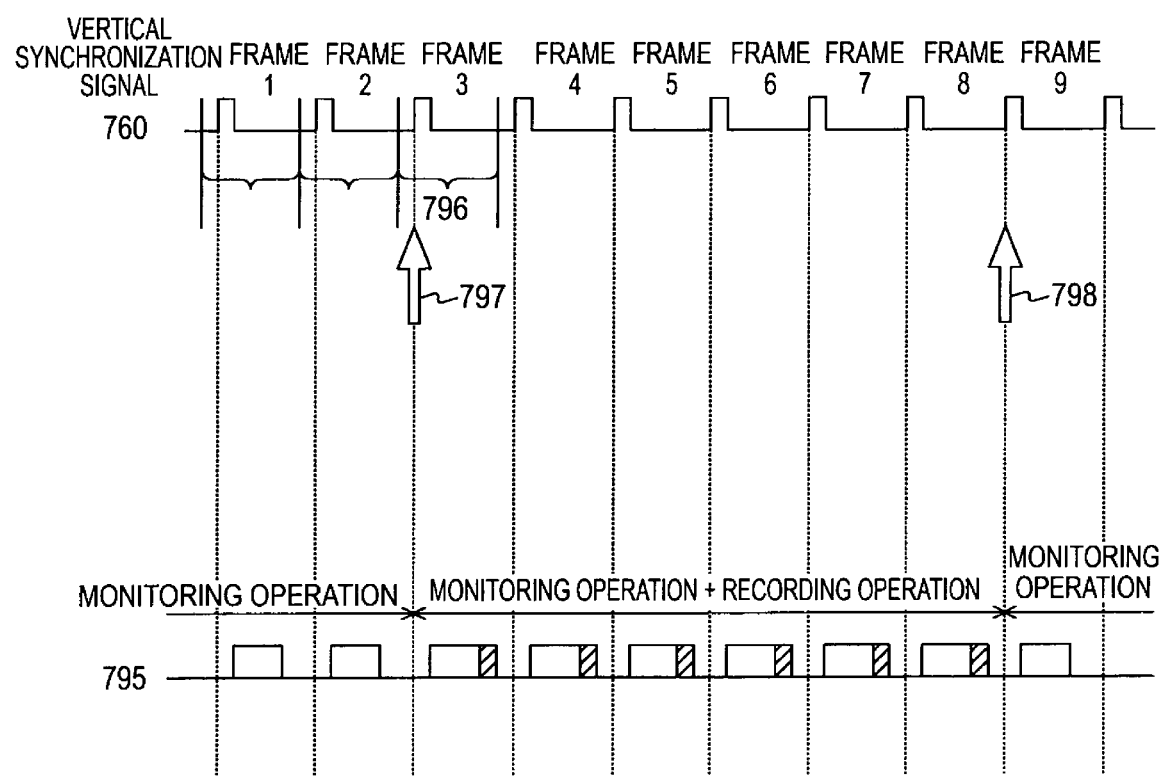
FIG. 59 is a diagram schematically showing a time-division process performed by the image signal processing section 220 according to the first embodiment of the present invention.
Figure 60A:
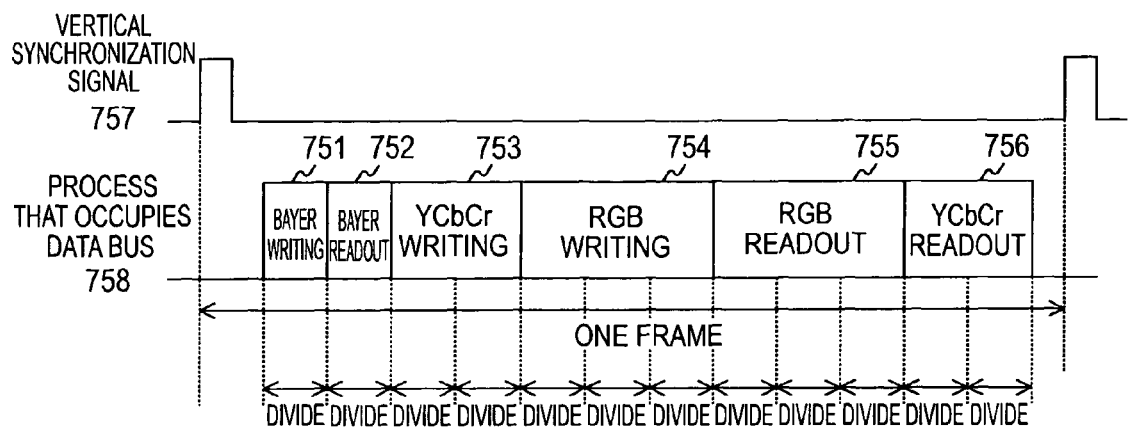
FIGS. 60A and 60B are diagrams schematically showing a time-division process performed by the image signal processing section 220 according to the first embodiment of the present invention.
Figure 60B:
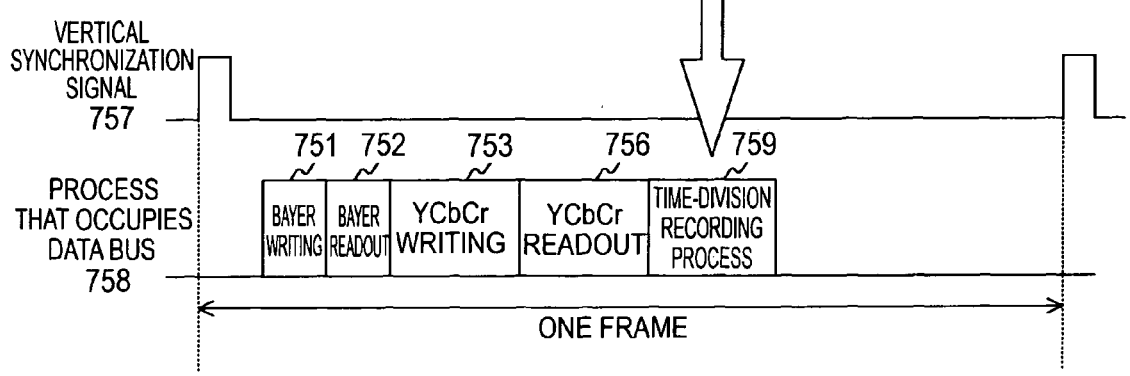

FIG. 59 and FIGS. 60A and 60B are diagrams schematically showing a time-division process performed by the image signal processing section 220 according to the first embodiment of the present invention. The example shown in FIG. 59 and FIGS. 60A and 60B shows time-division processing when a still-image recording instruction is received during the monitoring operation. The horizontal axis shown in FIG. 59 represents a time axis. Moreover, a waveform 760 represents a vertical synchronization signal. Moreover, a horizontal axis 795 shows the relationship between the processing that occupies the data bus 204 and the duration. The empty rectangles shown on the horizontal axis 759 represent processing that occupies the data bus 204, necessary for a monitoring process for each frame. Moreover, the hatched rectangles shown on the horizontal axis 795 represent processing (time-division processing) that occupies the data bus 204, necessary for a still-image recording process.

As described above, when performing the monitoring operation, the quantity of data that need to be transmitted through the data bus 204 is smaller than that when performing a still-image imaging operation. Here, a case in which a still-image recording instruction is issued at a certain point in time of a time interval 796 will be considered. In this case, a still-image recording operation is performed for Frame 3 indicated by arrow 797. For example, when a recording instruction is received from the user, the DSP 200 performs image signal processing and recording processes over a period including a frame (for example, Frame 3) corresponding to the timing of the recording instruction and its subsequent plural frames (for example, Frames 4 to 8). During execution of the image signal processing and recording processes, the imaging devices and the DSP 200 perform the monitoring operation in parallel. When the recording operation ends (for example, the point in time indicated by arrow 798), the imaging devices and the DSP 200 perform only the monitoring operation.

When performing time-division processing of the still-image recording process, the monitoring operation may not be performed during the execution of the time-division processing, and a single-color image or a predetermined image may be displayed on the display section 140. Moreover, a message or the like informing the user of the fact that image recording process is being executed may be displayed together with such an image.

FIGS. 60A and 60B show the quantity of data that need to be transmitted through the data bus 204 of the DSP 200 during the time-division processing described above in order to perform the monitoring operation and the time-division processing of the recording process within the period of the vertical synchronization signal. The example shown in FIGS. 60A and 60B is a partial modification of the example shown in FIGS. 56A and 56B, and is different in that time-division recording process 759 is added in FIG. 60B. Moreover, the same portions as those in FIGS. 56A and 56B will be denoted by the same reference numerals.

For example, the recording process shown in FIG. 60A is divided into 12 divided processes. As shown in FIG. 60B, in the case of the monitoring operation, respective signal processing (for example, time-division recording process 759) which involves transmission of data corresponding to two Bayer images for one frame are performed. Moreover, in frames subsequent to the frame where the recording process is started, signal processing for the recording process is performed in parallel with the monitoring operation after the start of the recording operation. However, it is necessary to ensure that the beginning first processing involves transmission of data corresponding to an amount equal to or larger than one Bayer image in order to finish the writing of image data into the image memory 170. The rectangles 751 to 753 and 756 shown in FIG. 60B correspond to the empty rectangles on the horizontal axis 795 shown in FIG. 59, and the rectangle 759 shown in FIG. 60B corresponds to the hatched rectangles on the horizontal axis 795 shown in FIG. 59.

FIG. 61 is a diagram showing an example of the parameters for determining the operation frequency of the data bus 204 for a still-image recording operation of the mobile phone unit 100 according to the first embodiment of the present invention. The example shown in FIG. 61 is the same as that of FIG. 58, except that the number of images subjected to the still-image recording process for one second is 1, and the values associated to this are changed. In this way, by setting the number of images subjected to still-image recording process for one second to 1, it is possible to decrease the lower limit Fclk_min and the upper limit Fclk_max of the operation frequency of the data bus 204. Moreover, it is possible to decrease the power consumption of the DSP 200.

Here, as described above, since the image generated during the monitoring operation is not an image for a displaying purpose, it is preferable to decimate the pixel data to decrease power consumption. In the examples shown in FIGS. 58 and 61, in the case of the monitoring operation, a value smaller than 1 is used as the decimation ratio of the pixel data. Therefore, the operation frequency required for the data bus 204 of the DSP 200 can be made smaller than the operation frequency required for the data bus 204 during the still-image recording operation shown in FIGS. 58 and 61, and the power consumption can be decreased.

FIG. 62 is a diagram showing an example of the parameters for determining the operation frequency of the data bus 204 for a video recording operation of the mobile phone unit 100 according to the first embodiment of the present invention. FIG. 62 shows an example of the respective parameters shown in FIG. 57 in the case of the video recording operation.

Here, the image data quantity in the trinocular horizontal wide-angle imaging mode is approximately three times that of the monocular horizontal imaging mode. Therefore, for example, when performing a still-image recording operation, a large image can be processed over a period corresponding to several vertical synchronization signals (namely, several frames). In this way, it is possible to suppress the operation frequency required for the data bus 204 from increasing too high. However, when the video recording operation is performed, since a new image is input for every frame, it is necessary to process image data of trinocular images within one frame period. Therefore, in order to suppress the operation frequency required for the data bus 204 from increasing too high, as shown in FIG. 62, it is preferable to perform image decimation processing to decrease the data quantity.

[Example of Countermeasure to Image Data Fetching Delay]

In the first embodiment of the present invention, three sets of image data simultaneously input from three imaging devices to the DSP 200 are temporarily stored in image buffers having a ring buffer structure. By using the image buffers having the ring buffer structure, the three sets of image data simultaneously input from three imaging devices to the DSP 200 can be written into at least one image memory 170 through one data bus 204 and the image memory I/F 205. However, when using the image buffers 211 to 219 having the ring buffer structure, as described later, image data are delayed when they are read out from the image buffers 211 to 219 and fetched into the DSP 200. Therefore, it is necessary to take measures to cope with such a delay.

Figure 63:
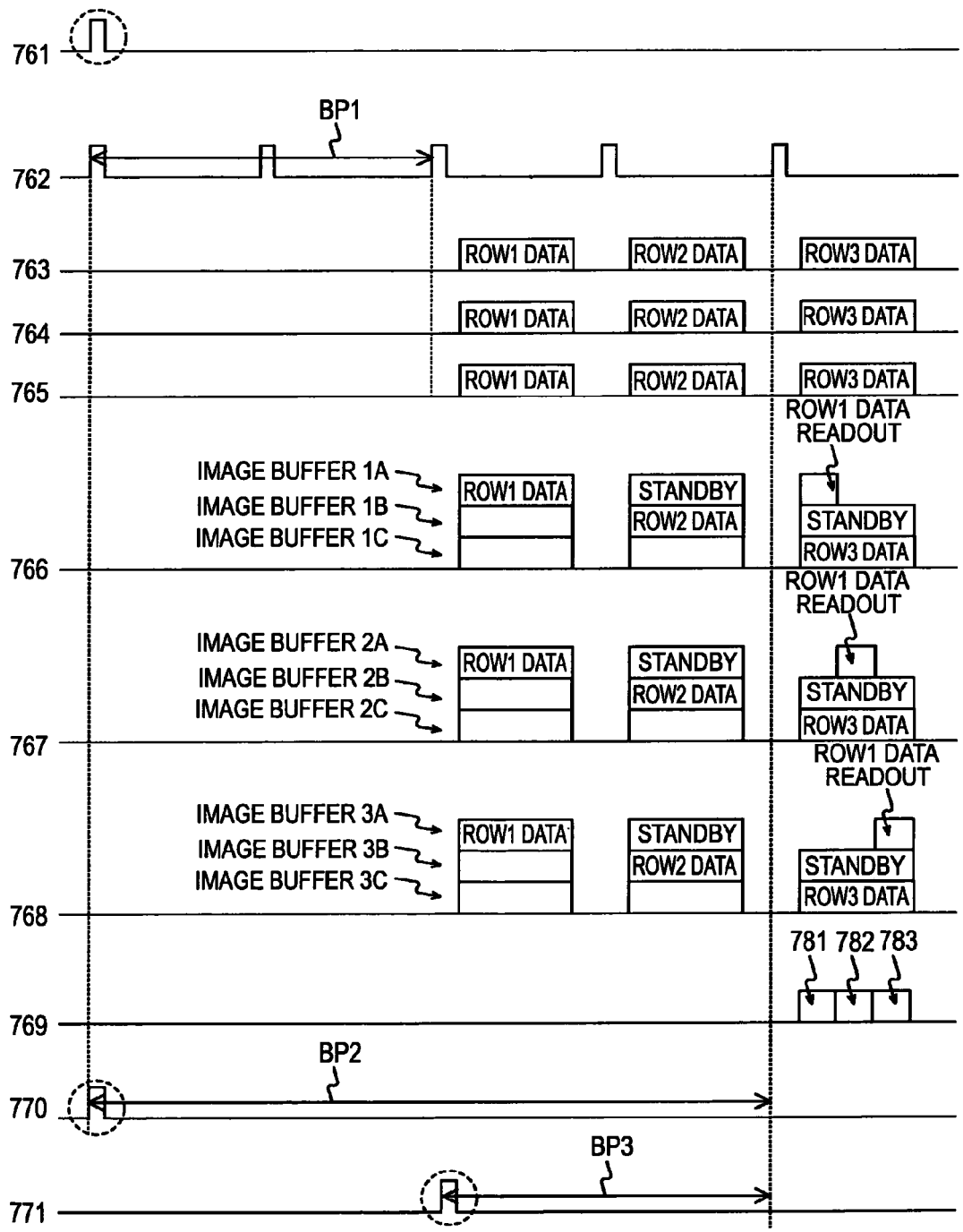
FIG. 63 is a timing chart schematically showing the timings when data are written to the image buffers 211 to 219 and the timings when data are fetched into the DSP 200 according to the first embodiment of the present invention.

FIG. 63 is a timing chart schematically showing the timings when data are written to the image buffers 211 to 219 and the timings when data are fetched into the DSP 200 according to the first embodiment of the present invention. The horizontal axes shown in FIG. 63 represent time axes. Moreover, a waveform 761 represents a vertical synchronization signal supplied from the DSP 200 to the respective imaging systems, and a waveform 762 represents a horizontal synchronization signal supplied from the DSP 200 to the respective imaging systems. Reference number BP1 in the waveform 762 represents a vertical back porch corresponding to two lines. In the example shown in FIG. 63, it is assumed that the capacity of each of the image buffers 211 to 219 is the same as the data quantity of one line of image data input from the imaging devices 134 to 136 to the DSP 200.

A horizontal axis 763 represents changes over time of image data input from the first imaging system 191 to the DSP 200, and a horizontal axis 764 represents changes over time of image data input from the second imaging system 192 to the DSP 200. Moreover, a horizontal axis 765 represents changes over time of image data input from the third imaging system 193 to the DSP 200.

Moreover, a horizontal axis 766 represents changes over time of written states of the image buffers 211 to 213, a horizontal axis 767 represents changes over time of written states of the image buffers 214 to 216, and a horizontal axis 768 represents changes overtime of written states of the image buffers 217 to 219. In the example shown in FIG. 63, the written states of a set of three image buffers corresponding to each imaging system are shown on the same line.

Moreover, a horizontal axis 769 represents image data which are to be read out from the image buffers 211 to 219 of the DSP 200 and which are to be fetched into the DSP 200.

Moreover, a waveform 770 represents a vertical synchronization signal having the same timing as the vertical synchronization signal input from the DSP 200 to the respective imaging system, and a waveform 771 represents a vertical synchronization signal which is delayed for supplying the same to the internal sections of the DSP 200. The reference number BP2 in the waveform 770 represents a vertical back porch corresponding to four lines, and the reference number BP3 in the waveform 771 represents a vertical back porch corresponding to two lines.

As shown in FIG. 63, a period corresponding to two lines is delayed after effective image data are written into the image buffer 211 to 219 and before the data are read out from the image buffers and fetched into the DSP 200.

Figure 64:
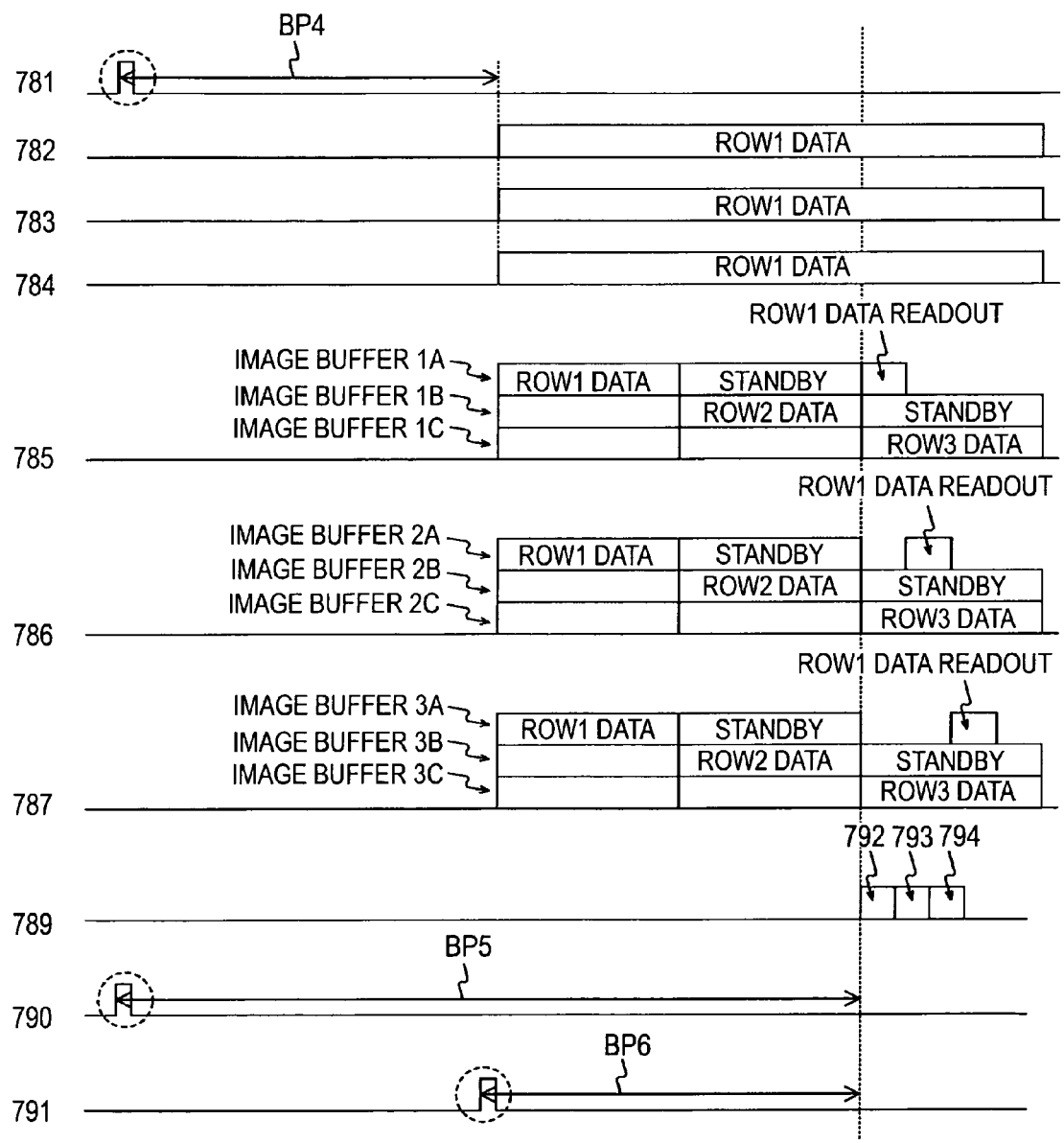
FIG. 64 a timing chart schematically showing the timings when data are written to the image buffers 211 to 219 and the timings when data are fetched into the DSP 200 according to the first embodiment of the present invention.

FIG. 64 a timing chart schematically showing the timings when data are written to the image buffers 211 to 219 and the timings when data are fetched into the DSP 200 according to the first embodiment of the present invention. The horizontal axes shown in FIG. 64 represent time axes. Moreover, a waveform 781 represents a horizontal synchronization signal supplied from the DSP 200 to the respective imaging systems. Reference number BP4 in the waveform 781 represents a horizontal back porch in an image generated by the imaging devices 134 to 136. In the example shown in FIG. 63, it is assumed that the capacity of each of the image buffers 211 to 219 is the same as 1/3 of the data quantity of one line of image data input from the imaging devices 134 to 136 to the DSP 200.

A horizontal axis 782 represents changes over time of image data input from the first imaging system 191 to the DSP 200, and a horizontal axis 783 represents changes over time of image data input from the second imaging system 192 to the DSP 200. Moreover, a horizontal axis 784 represents changes over time of image data input from the third imaging system 193 to the DSP 200.

Moreover, a horizontal axis 785 represents changes over time of written states of the image buffers 211 to 213, a horizontal axis 786 represents changes over time of written states of the image buffers 214 to 216, and a horizontal axis 787 represents changes over time of written states of the image buffers 217 to 219. In the example shown in FIG. 64, the written states of a set of three image buffers corresponding to each imaging system are shown on the same line.

Moreover, a horizontal axis 789 represents image data which are to be read out from the image buffers 211 to 219 of the DSP 200 and which are to be fetched into the DSP 200.

Moreover, a waveform 790 represents a horizontal synchronization signal having the same timing as the horizontal synchronization signal input from the DSP 200 to the respective imaging system, and a waveform 791 represents a horizontal synchronization signal which is delayed for supplying the same to the internal sections of the DSP 200. The reference number BP5 in the waveform 790 represents a horizontal back porch, and the reference number BP6 in the waveform 791 represents a horizontal back porch.

As shown in FIG. 64, a period corresponding to 2/3 lines is delayed after effective image data are written into the image buffer 211 to 219 and before the data are read out from the image buffers and fetched into the DSP 200.

It is necessary to eliminate these delays so that the space between the vertical synchronization signal and the effective image data and the space between the horizontal synchronization signal and the effective image data are identical to the spaces when the image data are generated in the imaging devices 134 to 136. Therefore, in the first embodiment of the present invention, a signal of which the cycle is the same as the synchronization signal input from the DSP 200 to the imaging devices 134 to 136 and of which the phase is delayed is used in at least a part of the image signal processing section 220 in the DSP 200. Moreover, the imaging control section 201 of the DSP 200 generates and supplies the synchronization signal which is input from the DSP 200 to the imaging devices 134 to 136 and also generates the signal of which the cycle is the same as the synchronization signal input to the imaging devices 134 to 136 and of which the phase is delayed. Moreover, the imaging control section 201 supplies the generated synchronization signal to the respective internal sections of the DSP 200.

[Operation Example of Imaging Apparatus]

Figure 65:
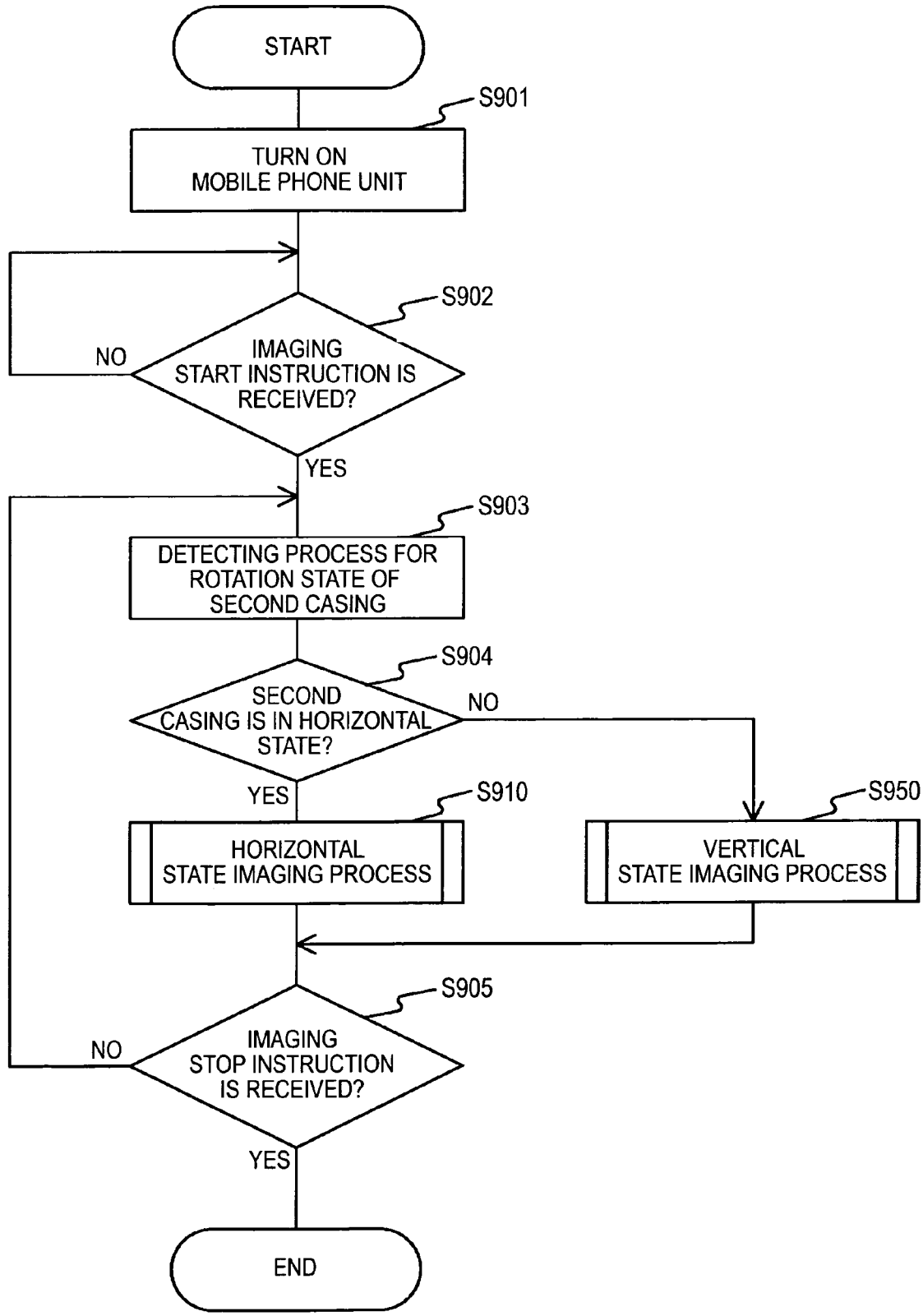
FIG. 65 is a flowchart showing the processing procedures of an imaging control process by the mobile phone unit 100 according to the first embodiment of the present invention.

FIG. 65 is a flowchart showing the processing procedures of an imaging control process by the mobile phone unit 100 according to the first embodiment of the present invention.

First, the mobile phone unit 100 is turned ON (step S901). Subsequently, it is determined whether or not an imaging start instruction is received (step S902). For example, the user can start the imaging operation by inputting an instruction operation to start an imaging operation on a menu screen of the display section 140. When the imaging start instruction is not received (step S902), monitoring is continued until the imaging start instruction is received.

When the imaging start instruction is received (step S902: Yes), the rotation state detection section 150 detects the rotation state of the second casing 120 (step S903). Subsequently, the imaging control section 201 determines whether or not the rotation state of the second casing 120 is in the horizontal state (step S904). When the rotation state of the second casing 120 is in the horizontal state, a horizontal imaging process is performed (step S910). The horizontal imaging process will be described in detail with reference to FIG. 66. On the other hand, when the rotation state of the second casing 120 is in the vertical state, a vertical imaging process is performed (step S950). The horizontal imaging process will be described in detail with reference to FIG. 69.

Subsequently, it is determined whether or not an imaging stop instruction is received (step S905). When the imaging stop instruction is not received (step S905: No), the flow returns to step S903. On the other hand, when the imaging stop instruction is received (step S905: Yes), the operation of the imaging control process ends.

Figure 66:
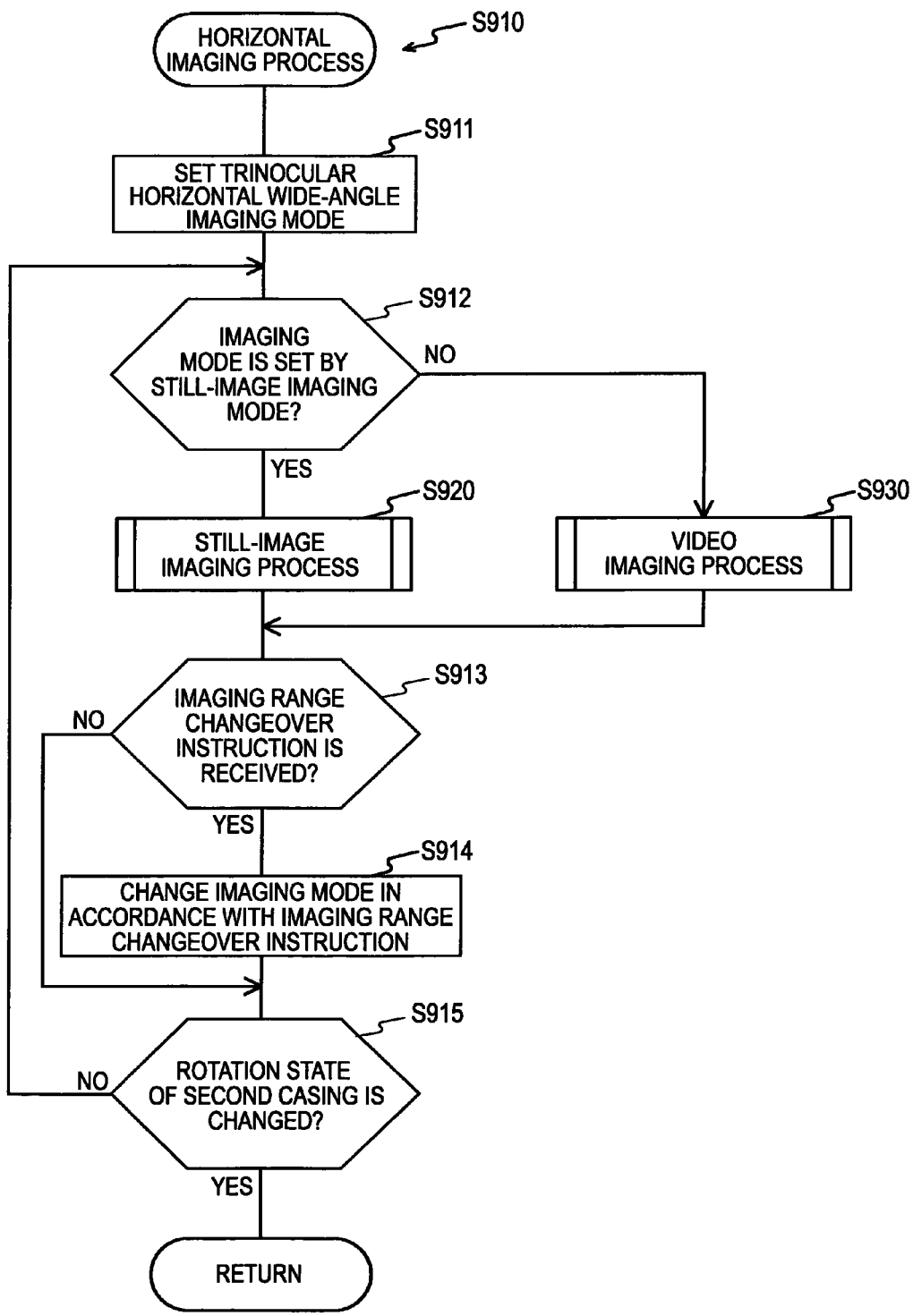
FIG. 66 is a flowchart showing a horizontal imaging process among the processing procedures of the imaging control process by the mobile phone unit 100 according to the first embodiment of the present invention.

FIG. 66 is a flowchart showing the horizontal imaging process (the processing procedures of step S910 shown in FIG. 65) among the processing procedures of the imaging control process by the mobile phone unit 100 according to the first embodiment of the present invention.

First, the imaging control section 201 sets a trinocular horizontal wide-angle imaging mode as an initial setting (step S911). Subsequently, the imaging control section 201 determines which one of the still-image/video imaging modes is set (step S912). When the still-image imaging mode is set (step S912: Yes), the still-image imaging process is performed (step S920). The still-image imaging process will be described in detail with reference to FIG. 67. On the other hand, when the video imaging mode is set (step S912: No), the video imaging process is performed (step S930). The video imaging process will be described in detail with reference to FIG. 68.

Subsequently, it is determined whether or not an imaging range changeover instruction is received (step S913). For example, it is determined whether or not the imaging range changeover switch 111 shown in FIGS. 1A to 1D and other drawings is pressed. When the imaging range changeover instruction is not received (step S913: No), the flow proceeds to step S915. On the other hand, when the imaging range changeover instruction is received (step S913: Yes), the imaging control section 201 changes the imaging mode in accordance with the received imaging range changeover instruction (step S914). For example, whenever the imaging range changeover switch 111 is pressed, the imaging mode is switched in the order of: (1) trinocular horizontal wide-angle imaging mode, (2) trinocular horizontal narrow-angle imaging mode, (3) monocular horizontal imaging mode, (4) monocular vertical imaging mode, and (5) monocular vertical small-area imaging mode.

Subsequently, it is determined whether or not the rotation state of the second casing 120 is changed (step S915). When the rotation state of the second casing 120 is not changed, the flow returns to step S912. On the other hand, when the rotation state of the second casing 120 is changed (step S915: Yes), the operation of the horizontal imaging process ends.

Figure 67:
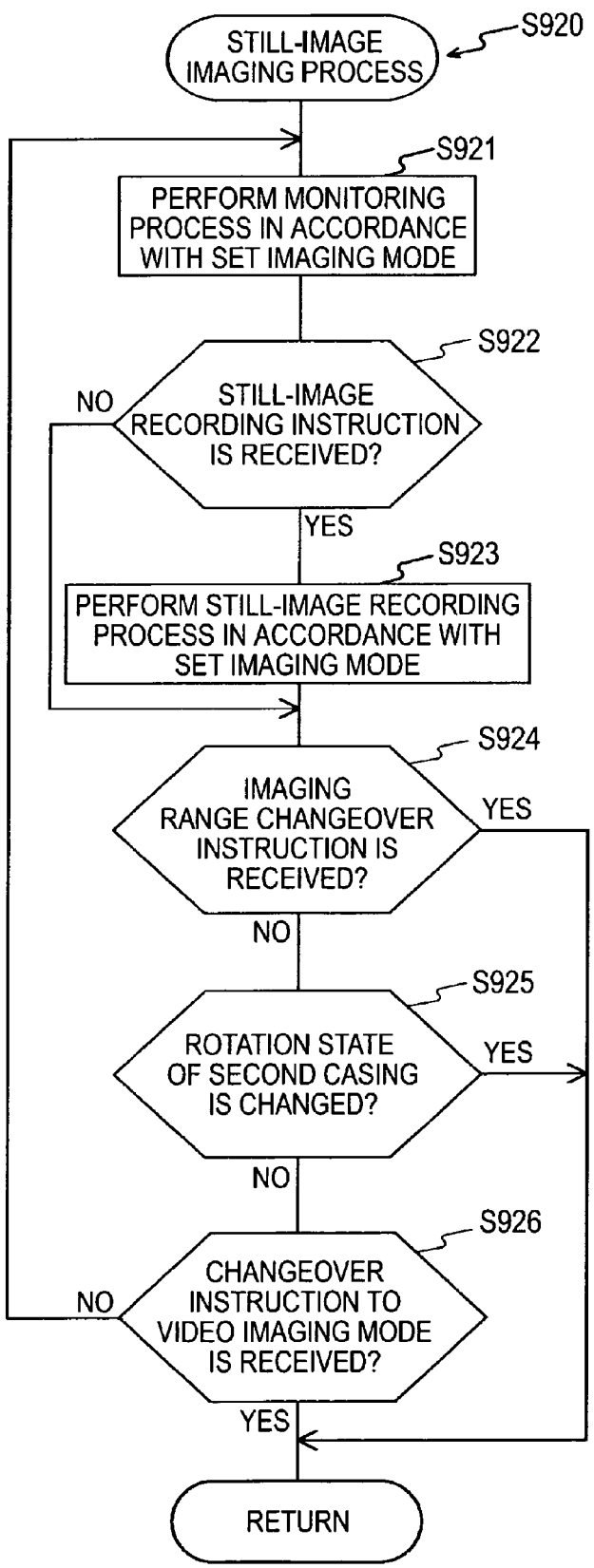
FIG. 67 is a flowchart showing a still-image imaging process among the processing procedures of the imaging control process by the mobile phone unit 100 according to the first embodiment of the present invention.

FIG. 67 is a flowchart showing the still-image imaging process (the processing procedures of step S920 shown in FIG. 66) among the processing procedures of the imaging control process by the mobile phone unit 100 according to the first embodiment of the present invention.

First, a monitoring process is performed in accordance with the set imaging mode (step S921). For example, when the trinocular horizontal wide-angle imaging mode is set, an image within the range of the bold line shown in FIG. 29A is displayed on the display section 140 as the monitoring image as shown in FIG. 29B. Moreover, as described above, during the monitoring process, the pixel decimation processing or the pixel addition processing may be performed.

Subsequently, it is determined whether or not a still-image recording instruction is received (step S922). For example, it is determined whether or not the OK key 114 is pressed in a state where the monitoring image is displayed on the display section 140. When the still-image recording instruction is received (step S922: Yes), the flow proceeds to step S924. On the other hand, when the still-image recording instruction is not received (step S922: No), the still-image recording process is performed in accordance with the set imaging mode (step S923). For example, when the trinocular horizontal wide-angle imaging mode is set, an image within the range of the bold line shown in FIG. 29A is recorded in the recording medium 180.

Subsequently, it is determined whether or not an imaging range changeover instruction is received (step S924). When the imaging range changeover instruction is not received (step S924: No), it is determined whether or not the rotation state of the second casing 120 is changed (step S925). When the rotation state of the second casing 120 is not changed (step S925: No), it is determined whether or not a changeover instruction to switch from the still-image imaging mode to the video imaging mode is received (step S926). For example, it is determined whether or not the still-image/video changeover switch 112 is pressed in a state where the still-image imaging mode is set. When the imaging range changeover instruction is received, the rotation state of the second casing 120 is changed, or the changeover instruction to switch from the still-image imaging mode to the video imaging mode is received (any one of steps S924 to S926: Yes), the operation of the still-image imaging process ends. On the other hand, when the imaging range changeover instruction is not received, the rotation state of the second casing 120 is not changed, and the changeover instruction to switch from the still-image imaging mode to the video imaging mode is not received (all steps S924 to S926: No), the flow returns to step S921.

Figure 68:
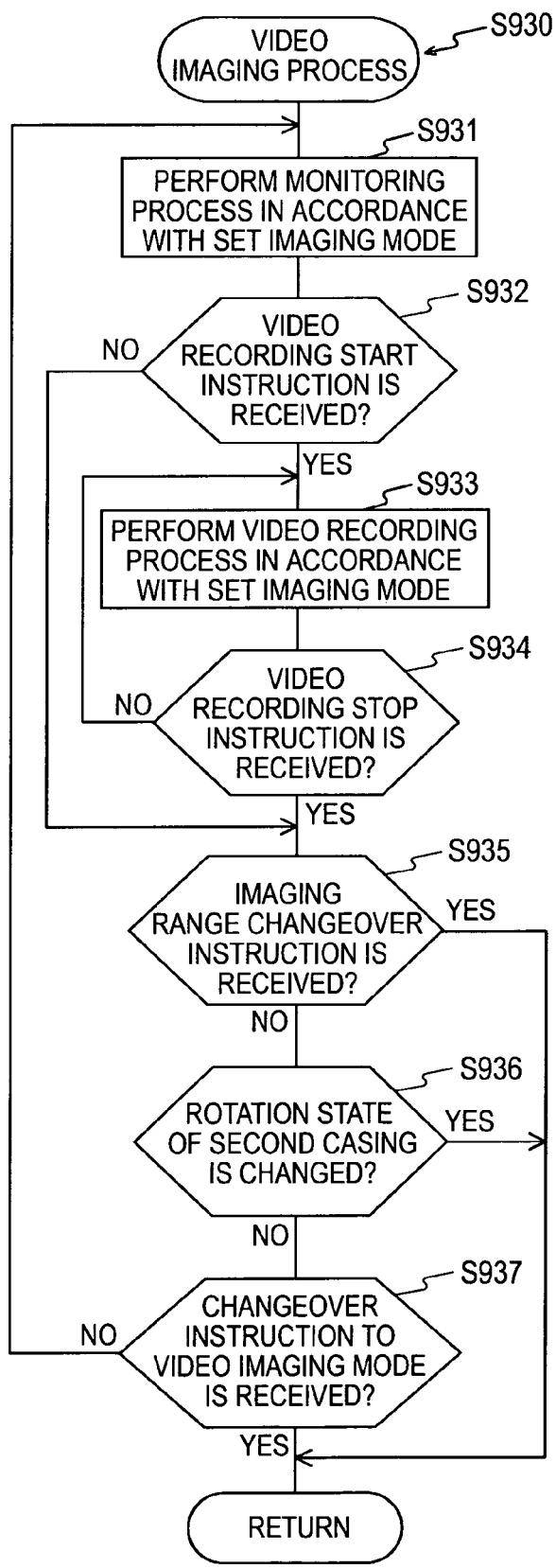
FIG. 68 is a flowchart showing a video imaging process among the processing procedures of the imaging control process by the mobile phone unit 100 according to the first embodiment of the present invention.

FIG. 68 is a flowchart showing the video imaging process (the processing procedures of step S930 shown in FIG. 66) among the processing procedures of the imaging control process by the mobile phone unit 100 according to the first embodiment of the present invention.

First, a monitoring process is performed in accordance with the set imaging mode (step S931).

Subsequently, it is determined whether or not a video recording start instruction is received (step S932). For example, it is determined whether or not the OK key 114 is pressed in a state where the monitoring image is displayed on the display section 140. When the video recording start instruction is not received (step S932: NO), the flow proceeds to step S935. On the other hand, when the video recording start instruction is received (step S932: YES), the video recording process is performed in accordance with the set imaging mode (step S933). Subsequently, it is determined whether or not a video recording stop instruction is received (step S934). For example, it is determined whether or not the OK key 114 is pressed in a state where the video recording process is being performed. When the video recording stop instruction is not received (step S934: No), the video recording process is continued (step S933). On the other hand, when the video recording stop instruction is received (step S934: Yes), the video recording process ends and the flow proceeds to step S935.

Subsequently, it is determined whether or not an imaging range changeover instruction is received (step S935). When the imaging range changeover instruction is not received (step S935: No), it is determined whether or not the rotation state of the second casing 120 is changed (step S936). When the rotation state of the second casing 120 is not changed (step S936: No), it is determined whether or not a changeover instruction to switch from the still-image imaging mode to the video imaging mode is received (step S937). When the imaging range changeover instruction is received, the rotation state of the second casing 120 is changed, or the changeover instruction to switch from the still-image imaging mode to the video imaging mode is received (any one of steps S935 to S937: Yes), the operation of the video imaging process ends. On the other hand, when the imaging range changeover instruction is not received, the rotation state of the second casing 120 is not changed, and the changeover instruction to switch from the still-image imaging mode to the video imaging mode is received (all steps S935 to S937: No), the flow returns to step S931. When the video imaging mode is set, the video recording process may be performed with the decimation ratio increased further than that in the still-image imaging mode.

Figure 69:
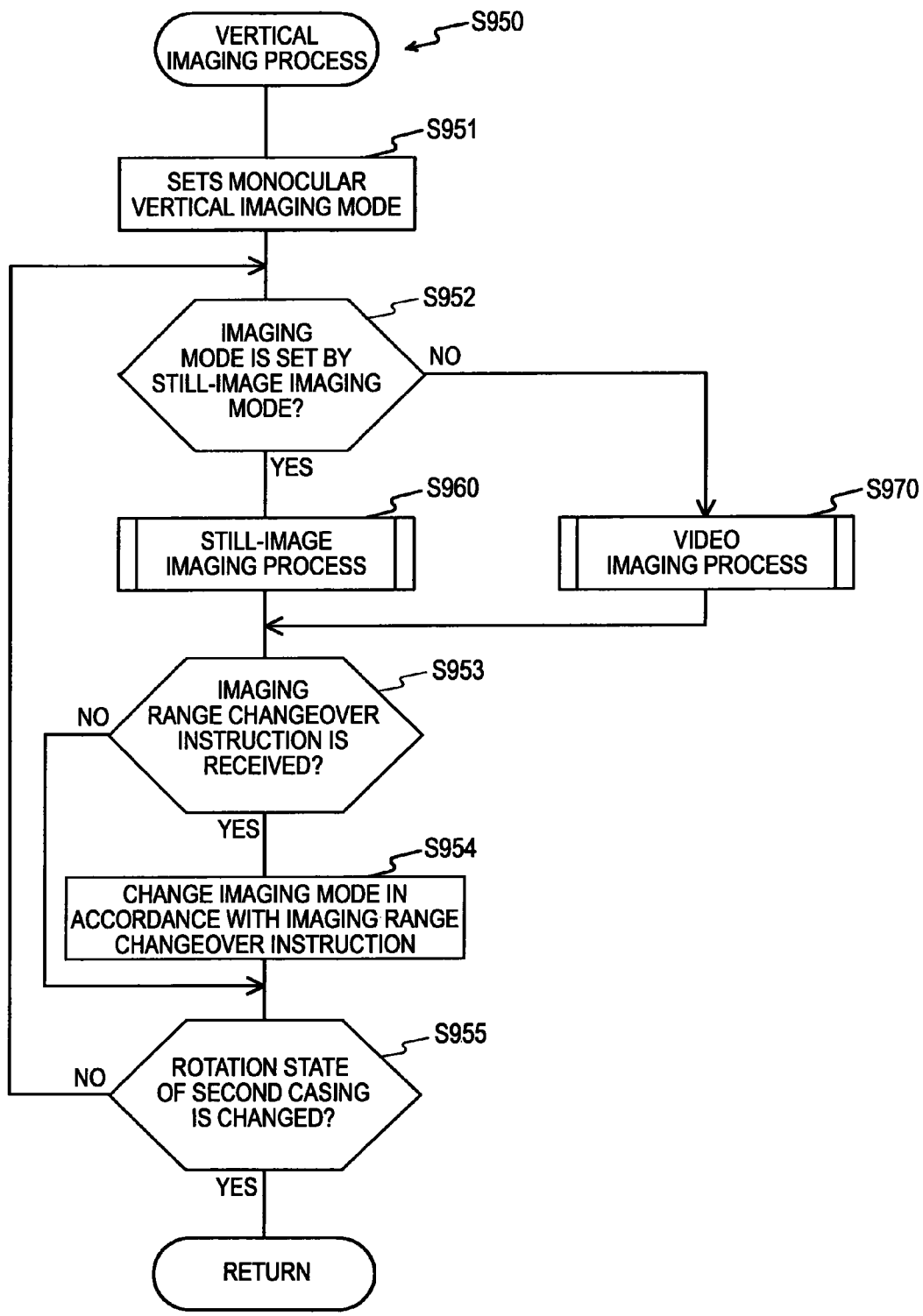
FIG. 69 is a flowchart showing a vertical imaging process among the processing procedures of the imaging control process by the mobile phone unit 100 according to the first embodiment of the present invention.

FIG. 69 is a flowchart showing the vertical imaging process (the processing procedures of step S950 shown in FIG. 65) among the processing procedures of the imaging control process by the mobile phone unit 100 according to the first embodiment of the present invention.

First, the imaging control section 201 sets a monocular vertical imaging mode as an initial setting (step S951). Subsequently, the imaging control section 201 determines which one of the still-image/video imaging modes is set (step S952). When the still-image imaging mode is set (step S952: Yes), the still-image imaging process is performed (step S960). The processing procedures of the still-image imaging process are approximately the same as those shown in FIG. 67 except that the image displayed on the display section 140 is different. Therefore, the description thereof will be omitted. On the other hand, when the video imaging mode is set (step S952: No), the video imaging process is performed (step S970). The processing procedures of the video imaging process are approximately the same as those shown in FIG. 68 except that the image displayed on the display section 140 is different. Therefore, the description thereof will be omitted.

Subsequently, it is determined whether or not an imaging range changeover instruction is received (step S953). When the imaging range changeover instruction is not received (step S953: No), the flow proceeds to step S955. On the other hand, when the imaging range changeover instruction is received (step S953: Yes), the imaging control section 201 changes the imaging mode in accordance with the received imaging range changeover instruction (step S954). For example, whenever the imaging range changeover switch 111 is pressed, the imaging mode is switched in the order of: (1) monocular vertical imaging mode, (2) monocular vertical small-area imaging mode, (3) monocular horizontal imaging mode, and (4) trinocular horizontal narrow-angle imaging mode.

Subsequently, it is determined whether or not the rotation state of the second casing 120 is changed (step S955). When the rotation state of the second casing 120 is not changed, the flow returns to step S952. On the other hand, when the rotation state of the second casing 120 is changed (step S955: Yes), the operation of the vertical imaging process ends.

As described above, in the first embodiment of the present invention, the plurality of imaging modes can be easily switched. In many cases, when making calls, sending email messages, or reading text using a mobile phone unit, for example, the mobile phone unit is used with the casing in the vertical state. Therefore, in many case, when photographing using a camera-equipped mobile phone unit, for example, the user photographs images with the casing and the display device in the vertical state and records vertical images. Moreover, in many cases, the users of mobile phone units reproduce or send the vertical images recorded in this way.

However, the human has a wide eyesight in the horizontal direction. Therefore, it is expected that by recording images with a large horizontal-to-vertical ratio, it is possible to record images of which the imaging range is close to a region falling into the eyesight of the human and to thus diminish a discomfort of the user. Therefore, in the first embodiment of the present invention, it is possible to switch between a vertical image which is commonly familiar to the users of camera-equipped mobile phone units and an image (for example, a panoramic image) having a relatively large angle of view close to the human eyesight just by an operation of rotating the second casing 120. Since the vertical image and the image having a large angle of view can be switched with a relatively simple operation, it is possible to prevent the user from missing the right photographing timing. Moreover, the user can easily photograph images that meet his/her preferences.

Moreover, the vertical image which is commonly familiar to the users of camera-equipped mobile phone units can be displayed or recorded in the monocular vertical imaging mode or the monocular vertical small-area imaging mode. Moreover, the image (for example, a panoramic image) having a relatively large angle of view closer to the human eyesight can be displayed or recorded in the trinocular horizontal wide-angle imaging mode, the trinocular horizontal narrow-angle imaging mode, or the monocular vertical imaging mode. Furthermore, these imaging modes can be easily switched by the imaging range changeover switch 111. In this way, since a plurality of kinds of images can be switched by a relatively simple operation, it is possible to prevent the user from missing the right photographing timing. Moreover, the user can easily photograph images that meet his/her preferences.

[Modification of Arrangement Configuration of Imaging Device]

Hereinabove, an example in which the central imaging device among the three imaging devices of the imaging section is disposed so that the longitudinal direction of the central imaging device is approximately identical to the direction perpendicular to the arrangement direction of the imaging devices. However, as described above, the three imaging devices may be disposed so that the respective longitudinal directions of the three imaging devices of the imaging section are approximately identical to the arrangement direction. That is, the imaging device 134 may be rotated by 90° in the state shown in FIG. 4A so that the longitudinal directions of the imaging devices 134 to 136 are approximately identical to the arrangement direction. An example of this arrangement configuration is shown in FIGS. 70A to 70C.

Figure 70A:
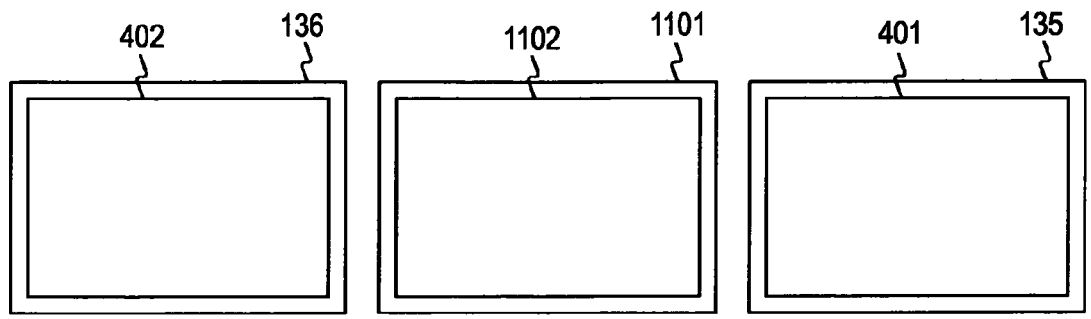
FIGS. 70A to 70C are diagrams showing a modification of the arrangement configuration of the three imaging devices that form the imaging section 130 according to the first embodiment of the present invention.
Figure 70B:
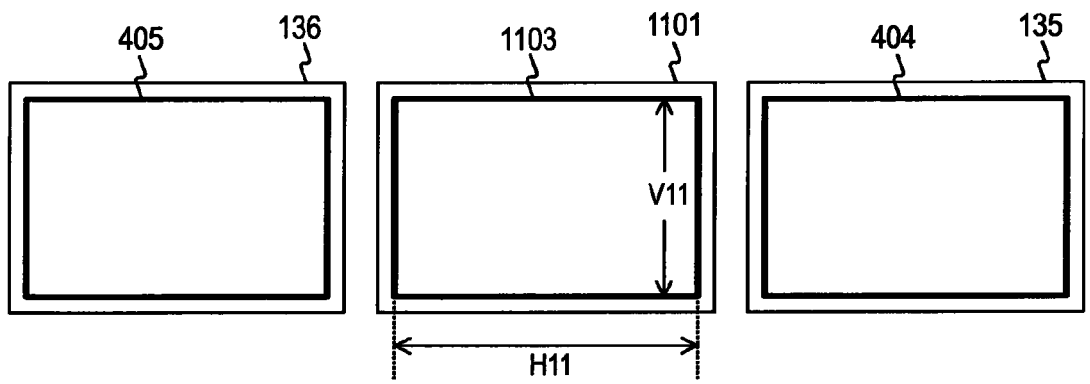
Figure 70C:
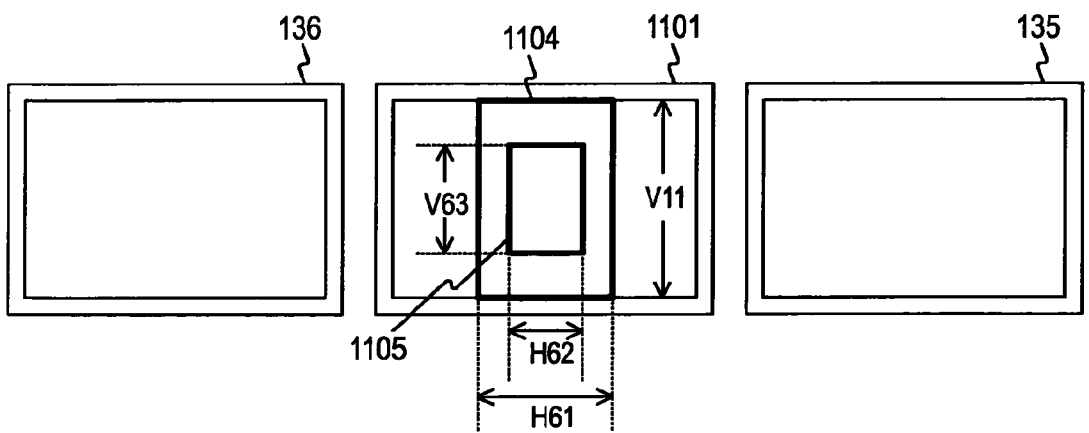

FIGS. 70A to 70C are diagrams showing a modification of the arrangement configuration of the three imaging devices that form the imaging section 130 according to the first embodiment of the present invention. FIG. 70A shows an arrangement configuration of imaging devices 1101, 135, and 136. Since the imaging devices 135 and 136 are the same as those in the example shown in FIG. 4A, they will be denoted by the same reference numerals, and description thereof will be omitted. Moreover, the arrangement configuration of the imaging device 1101 is approximately the same as that of the imaging device 134 except that the imaging device 134 shown in FIG. 4A is disposed to be rotated by 90°. Therefore, in the following description, only the point of difference from the imaging device 134 will be described, and a part of the redundant description will be omitted.

FIG. 70A shows an arrangement configuration example when the longitudinal direction of the first casing 110 is made identical to the vertical direction so that the pivot member 101 is on the upper side. Specifically, the imaging device 1101 is disposed at the center, and the imaging devices 135 and 136 are disposed on either side of the imaging device 1101. That is, in the arrangement direction, the imaging devices 1101, 135 and 136 are disposed horizontally. Moreover, the central positions of the imaging devices 1101, 135, and 136 are disposed on the same plane. In FIG. 70A, similarly to the example shown in FIG. 4A, pixel data readable regions 1102, 401, and 402 in which the respective pixels can be read out are schematically depicted by rectangles in the imaging devices 1101, 135, and 136.

FIG. 70B shows an example of a pixel data readout region when image data are generated with the second casing 120 in the horizontal state. The pixel data readout regions 1103, 404, and 405 are examples of regions of the pixel data readable regions 1102, 401, and 402 in which respective pixels are read out at the time of generating image data used for displaying or recording, and the outlines thereof are depicted by bold lines in FIG. 70B. The pixel data readout regions 1103, 404, and 405 may be the same as the pixel data readable regions 1102, 401, and 402, for example. Moreover, the pixel data readout regions 1103, 404, and 405 may be configured, for example, so that the vertical length thereof is V11 and the horizontal length thereof is H11. The vertical length V11 and the horizontal length H11 are the same as those shown in FIG. 4B.

FIG. 70C shows an example of a pixel data readout region when image data are generated with the second casing 120 in the vertical state. This example shows pixel data readout regions 1104 and 1105 when image data are generated by only the imaging device 1101 of the imaging devices 1101, 135, and 136. The pixel data readout regions 1104 and 1105 are examples of regions of the pixel data readable regions 1102, 401, and 402 in which respective pixels are read out at the time of generating a combined image used for displaying or recording, and the outline thereof is depicted by a bold line in FIG. 70C. The pixel data readout region 1104 may be configured, for example, so that the vertical length thereof is V11 and the horizontal length thereof is H61. Moreover, the pixel data readout region 1105 may be configured, for example, so that the vertical length thereof is V63 and the horizontal length thereof is H62. For example, the horizontal length H61 may be 1080 pixels. Moreover, for example, the horizontal length H62 may be 480 pixels, and the vertical length V63 may be 640 pixels. The details of these image generation examples will be described with reference to FIGS. 71A and 71B to FIGS. 74A to 74C.

As for a readout method of reading out one line of data in the imaging device 1101, a readout method in which the direction of one line is the long-side direction similarly to the imaging devices 135 and 136 can be used.

[Display Example of Images Generated by Three Imaging Devices Disposed Horizontally in Arrangement Direction]

Next, an example of displaying images generated by three imaging devices arranged by the arrangement configuration shown in FIG. 70A on the display section 140 will be described. In this example, the case where the subject 500 shown in FIG. 27 is photographed will be described as an example. Therefore, the same elements as those of the subject 500 shown in FIG. 27 will be denoted by the same reference numerals.

FIGS. 71A and 71B to FIGS. 74A to 74C are diagrams showing a display example of an image generated by the imaging section 130 according to the first embodiment of the present invention.

Figure 71A:
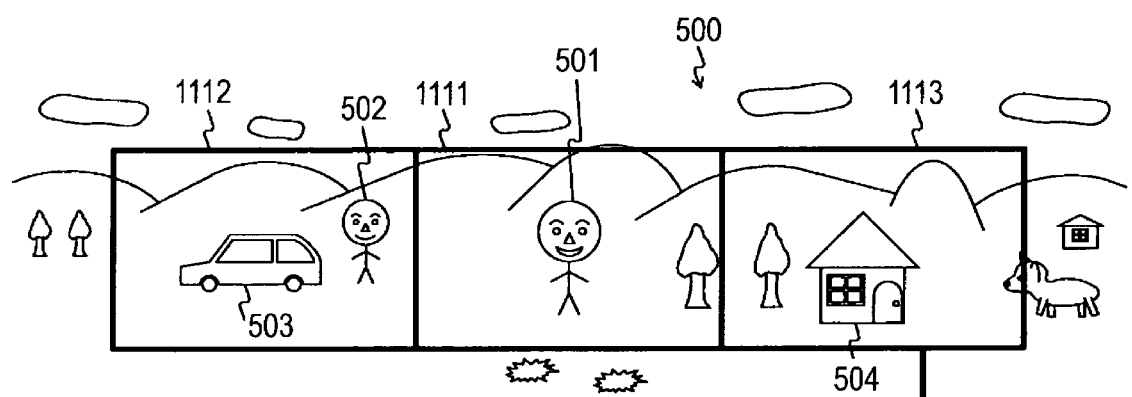
FIGS. 71A and 71B are diagrams showing a display example of an image generated by the imaging section 130 according to the first embodiment of the present invention.
Figure 71B:
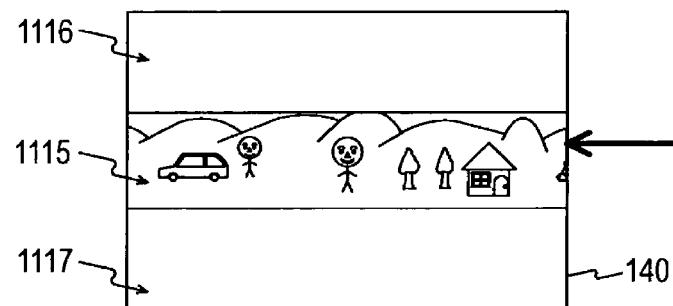

FIGS. 71A and 71B show a display example of a combined image (panoramic image) obtained by combining the respective images generated by the imaging devices 1101, 135, and 136 of the imaging section 130.

FIG. 71A schematically shows imaging ranges 1111 to 1113 in the subject 500. The imaging ranges 1111 to 1113 are assumed to be imaging ranges corresponding to the pixel data readable regions 1102, 401, and 402 of the imaging devices 1101, 135, and 136 shown in FIG. 70A. Moreover, the outlines of regions of the imaging ranges 1111 to 1113 corresponding to the pixel data readout regions in which pixel data are read out from the imaging devices 1101, 135, and 136 are depicted by rectangles with bold lines. The pixel data readout regions (depicted by rectangles with bold lines) shown in FIG. 71A are the same as the pixel data readout regions 1103, 404, and 405 shown in FIG. 70B. Moreover, in FIGS. 72A to 72C to FIGS. 74A to 74C, pixel data readout regions of the imaging devices 1101, 135, and 136 are also depicted by rectangles with bold lines.

In the display examples shown in FIGS. 71A and 71B to FIGS. 74A to 74C, an example in which an imaging device having a pixel count of 1920×1440 pixels and the horizontal-to-vertical ratio of the pixels is 4:3 is used as the imaging devices 1101, 135, and 136 will be described. Moreover, in this example, in order to make the description easily understood, the overlapping portions of the respective images will not be taken into consideration in the description. For example, all image data are read out from the imaging devices 1101, 135, and 136 having 1920×1440 pixels. When combining the image data read out in this way, an image having about 8.29 million pixels (5760×1440 pixels) and a horizontal-to-vertical ratio of 4:1 is generated. A display example of the combined image generated in this way is shown in FIG. 71B.

FIG. 71B shows a display example of displaying image data readout out from the pixel data readout regions shown in FIG. 71A on the display section 140 when the second casing 120 is in the horizontal state. In FIG. 71B, the outlines of the first and second casings 110 and 120 of the mobile phone unit 100 are omitted, and only the display region of the display section 140 is illustrated. Moreover, similarly, in the display examples described below, only the display region of the display section 140 is illustrated.

As described above, since the horizontal-to-vertical ratio of the display section 140 is 4:3, it is not possible to display an image having a horizontal-to-vertical ratio of 4:1 on the entire screen of the display section 140. Therefore, when the respective pixels of the display section 140 are square grids, the image having a horizontal-to-vertical ratio of 4:1 which is read out from the pixel data readout regions shown in FIG. 71A and generated is subjected to resolution conversion and then displayed. For example, the resolution of the image is converted in the horizontal and vertical directions so that the horizontal pixel count of the image is approximately the same as the horizontal pixel count of the display section 140 and the horizontal-to-vertical ratio is 4:1. Moreover, as shown in FIG. 71B, the resolution-converted combined image is displayed on the central portion (captured image display region 1115) in the vertical direction of the display section 140. Here, for example, a single-color image is displayed in the blank portions (blank image display regions 1116 and 1117) above and below the displayed image.

When the respective pixels of the display section 140 are not square grids, the magnification of resolution conversion may be changed using the vertical-to-horizontal ratio of the pixels of the display section 140 so that the image displayed on the display section 140 has a proper shape, and then the resolution-converted image may be displayed.

Even when the second casing 120 is in the vertical state, similarly, an image (horizontal-to-vertical ratio: 4:1) which is read out from the pixel data readout regions shown in FIG. 71A and generated can be subjected to resolution conversion and displayed, but the illustration thereof is omitted.

Figure 72A:
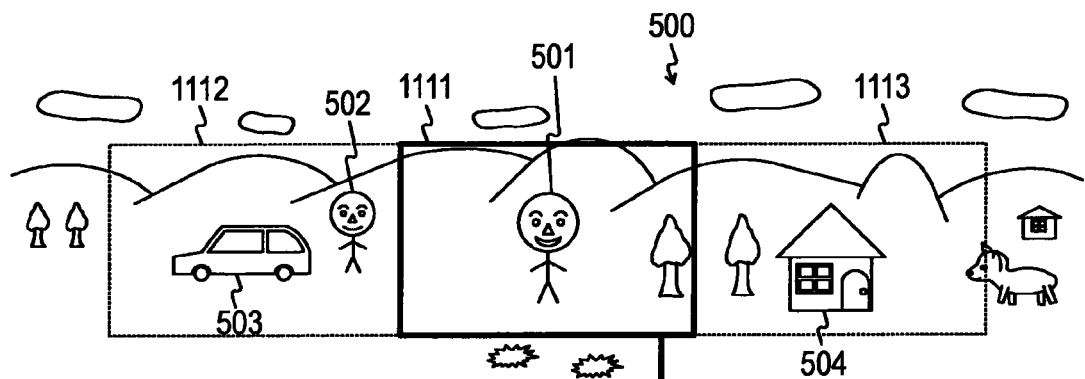
FIGS. 72A to 72C are diagrams showing a display example of an image generated by the imaging section 130 according to the first embodiment of the present invention.

FIG. 72A schematically shows a pixel data readout region in the imaging ranges 1111 to 1113. The pixel data readout region (depicted by a rectangle with a bold line) shown in FIG. 72A is the same as the pixel data readout region 1103 shown in FIG. 70B. For example, all image data are read out from the imaging device 1101 having 1920×1440 pixels. When combining the image data read out in this way, an image having about 2.76 million pixels (1920×1440 pixels) and a horizontal-to-vertical ratio of 4:3 is generated. A display example of the combined image generated in this way is shown in FIGS. 72B and 72C.

Figure 72B:
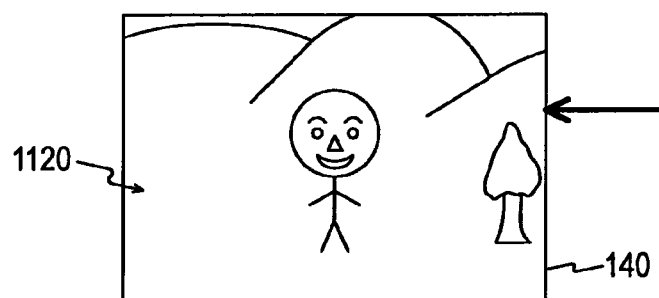

FIG. 72B shows a display example of displaying image data readout out from the pixel data readout region shown in FIG. 72A on the display section 140 when the second casing 120 is in the horizontal state. As described above, since the horizontal-to-vertical ratio of the display section 140 is 4:3, it is possible to display an image having a horizontal-to-vertical ratio of 4:3 on the entire screen of the display section 140. For example, an image to be displayed is subjected to resolution conversion so that the size of the image is equal to the pixel count of the display section 140 and the resolution-converted image is displayed on the display section 140.

Figure 72C:
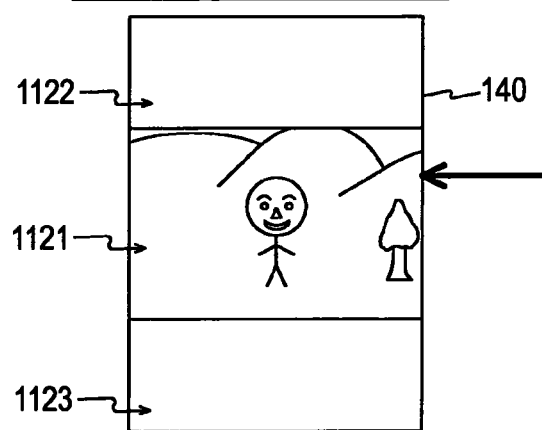

FIG. 72C shows a display example of displaying image data readout out from the pixel data readout region shown in FIG. 72A on the display section 140 when the second casing 120 is in the vertical state. In this case, since the horizontal-to-vertical ratio of the display section 140 is 3:4, it is not possible to display an image having a horizontal-to-vertical ratio of 4:3 on the entire screen of the display section 140. Therefore, as described above, an image to be displayed is subjected to resolution conversion and the resolution-converted image is displayed. Moreover, as shown in FIG. 72C, the resolution-converted combined image is displayed on the central portion (captured image display region 1121) in the vertical direction of the display section 140. In addition, for example, a single-color image is displayed in the blank portions (blank image display regions 1122 and 1123) above and below the displayed image.

Figure 73A:
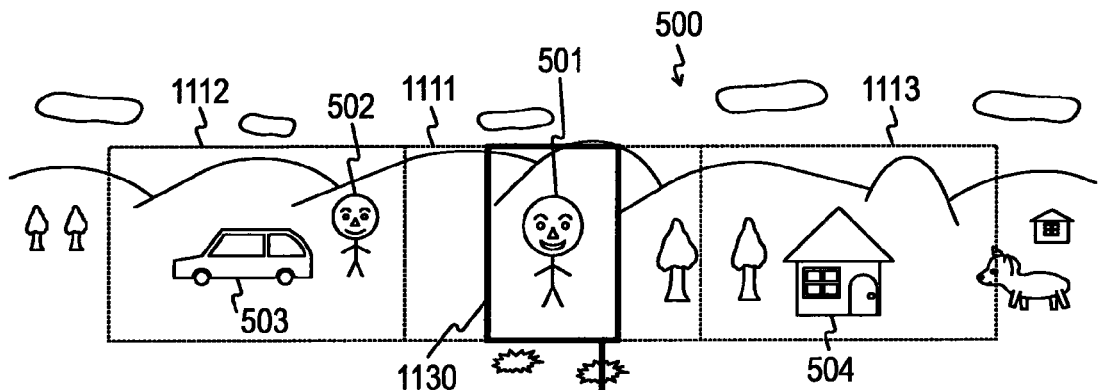
FIGS. 73A to 73C are diagrams showing a display example of an image generated by the imaging section 130 according to the first embodiment of the present invention.

FIG. 73A schematically shows a pixel data readout region 1130 in the imaging ranges 1111 to 1113. The pixel data readout region 1130 (depicted by a rectangle with a bold line) shown in FIG. 73A is the same as the pixel data readout region 1104 shown in FIG. 70C. For example, parts of image data (for example, 1080×1440 pixels) are read out from the imaging device 1101 having 1920×1440 pixels. When combining the image data read out in this way, an image having about 1.56 million pixels (1080×1440 pixels) and a horizontal-to-vertical ratio of 3:4 is generated. A display example of the combined image generated in this way is shown in FIGS. 73B and 73C.

Figure 73B:
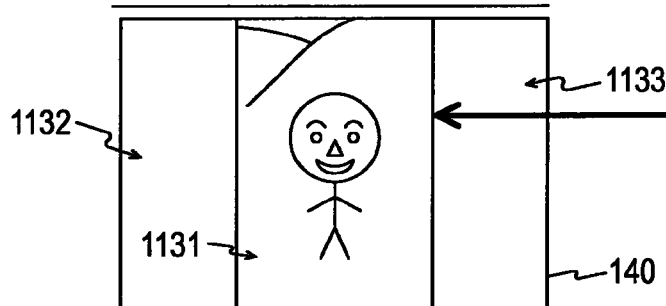

FIG. 73B shows a display example of displaying image data readout out from the pixel data readout region 1130 shown in FIG. 73A on the display section 140 when the second casing 120 is in the horizontal state. As described above, since the horizontal-to-vertical ratio of the display section 140 is 4:3, it is not possible to display an image having a horizontal-to-vertical ratio of 3:4 on the entire screen of the display section 140. Therefore, as described above, for example, the resolution of the image is converted in the horizontal and vertical directions so that the vertical pixel count of the image is approximately the same as the vertical pixel count of the display section 140 and the horizontal-to-vertical ratio is 4:3. As shown in FIG. 73B, the resolution-converted image is displayed on the central portion (captured image display region 1131) in the horizontal direction of the display section 140. Moreover, for example, a single-color image is displayed in the blank portions (blank image display regions 1132 and 1133) on the left and right sides of the displayed image.

Figure 73C:
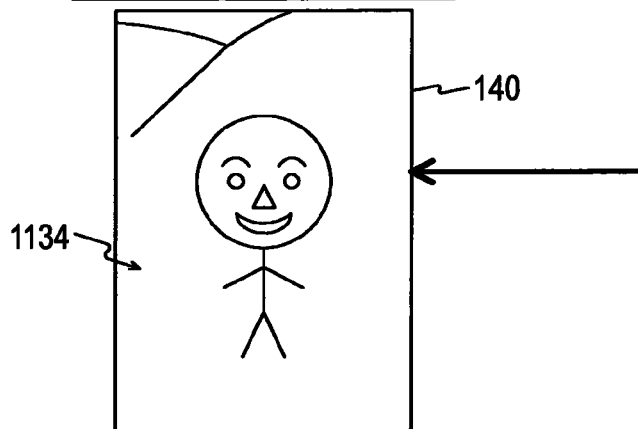

FIG. 73C shows a display example of displaying image data readout out from the pixel data readout region 1130 shown in FIG. 73A on the display section 140 when the second casing 120 is in the vertical state. In this case, since the horizontal-to-vertical ratio of the display section 140 is 4:3, it is possible to display an image having a horizontal-to-vertical ratio of 4:3 on the entire screen of the display section 140. For example, an image to be displayed is subjected to resolution conversion so that the size of the image is equal to the pixel count of the display section 140 and the resolution-converted image is displayed on the display section 140.

Figure 74A:
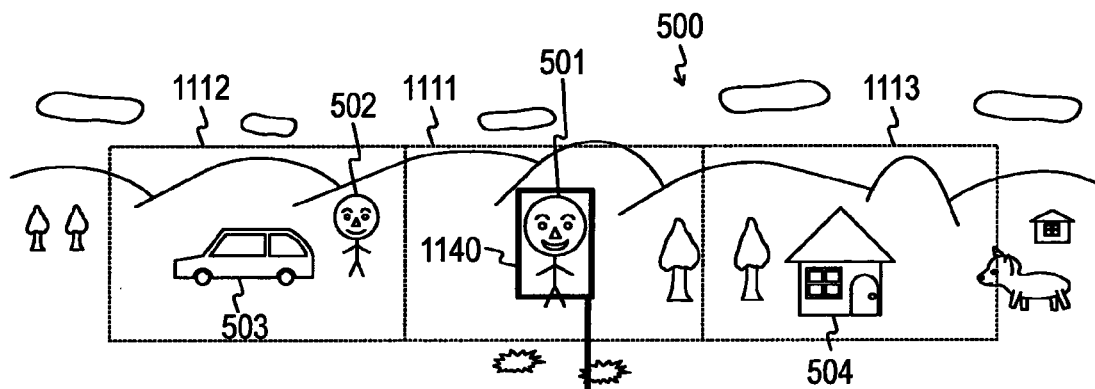
FIGS. 74A to 74C are diagrams showing a display example of an image generated by the imaging section 130 according to the first embodiment of the present invention.

FIG. 74A schematically shows a pixel data readout region 1140 in the imaging ranges 1111 to 1113. The pixel data readout region 1140 (depicted by a rectangle with a bold line) shown in FIG. 74A is the same as the pixel data readout region 1105 shown in FIG. 70C. For example, parts of image data (for example, 480×640 pixels) are read out from the imaging device 1101 having 1920×1440 pixels. When combining the image data read out in this way, an image having about 0.31 million pixels (480×640 pixels) and a horizontal-to-vertical ratio of 3:4 is generated. A display example of the combined image generated in this way is shown in FIGS. 74B and 74C.

Figure 74B:
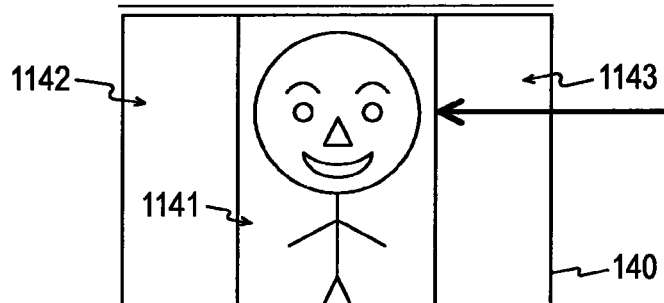

FIG. 74B shows a display example of displaying image data readout out from the pixel data readout region 1140 shown in FIG. 74A on the display section 140 when the second casing 120 is in the horizontal state. As described above, since the horizontal-to-vertical ratio of the display section 140 is 4:3, it is not possible to display an image having a horizontal-to-vertical ratio of 3:4 on the entire screen of the display section 140. Therefore, as described above, for example, the resolution of the image is converted in the horizontal and vertical directions so that the vertical pixel count of the image is approximately the same as the vertical pixel count of the display section 140 and the horizontal-to-vertical ratio is 4:3. As shown in FIG. 74B, the resolution-converted image is displayed on the central portion (captured image display region 1141) in the horizontal direction of the display section 140. Moreover, for example, a single-color image is displayed in the blank portions (blank image display regions 1142 and 1143) on the left and right sides of the displayed image.

Figure 74C:
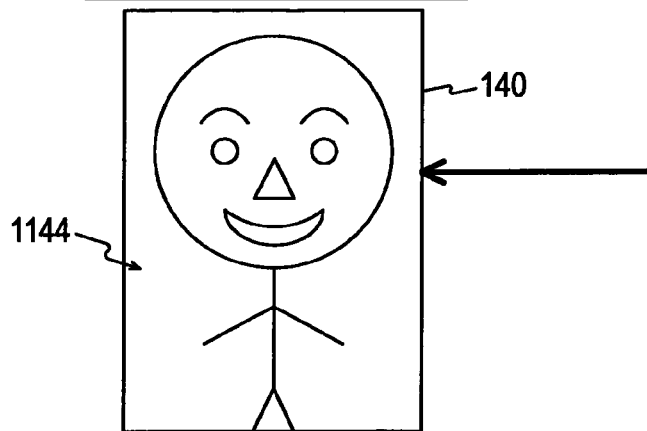

FIG. 74C shows a display example of displaying image data readout out from the pixel data readout region shown in FIG. 74A on the display section 140 when the second casing 120 is in the vertical state. In this case, since the horizontal-to-vertical ratio of the display section 140 is 4:3, it is possible to display an image having a horizontal-to-vertical ratio of 4:3 on the entire screen of the display section 140. For example, an image to be displayed is subjected to resolution conversion so that the size of the image is equal to the pixel count of the display section 140 and the resolution-converted image is displayed on the display section 140.

Moreover, since the pixel decimation processing, the pixel addition processing, and the like can be similarly applied to the respective processings when the central imaging device of the three imaging devices of the imaging section is disposed vertically, detailed description thereof will be omitted.

[Configuration Example of Image File]

Next, the image data (image files) recorded in the recording medium 180 by the above-described still-image recording process will be described in detail with reference to the drawings.

Figures 75A, 75B:
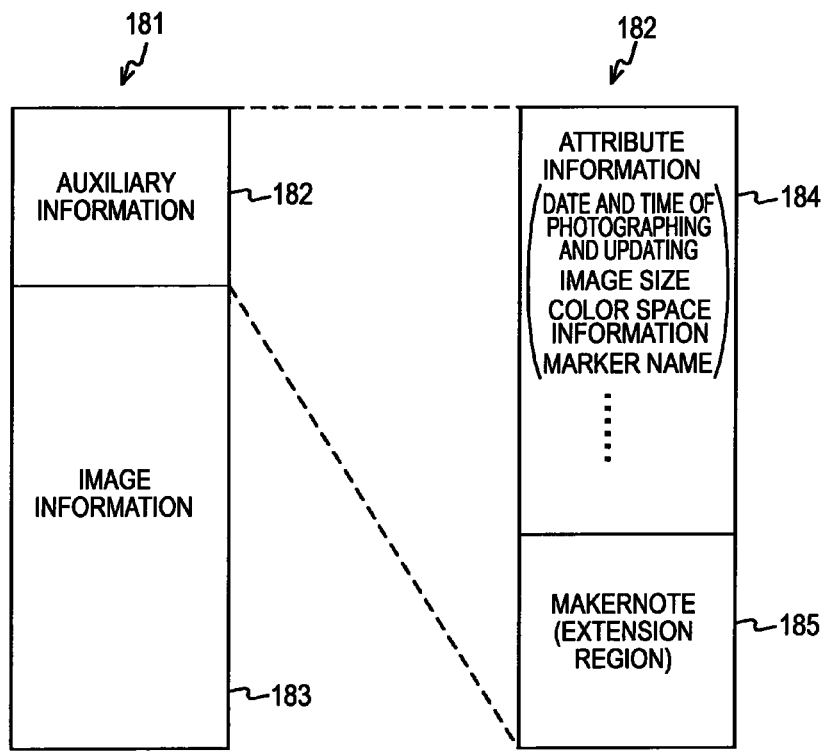
FIGS. 75A to 75C are diagrams showing an example of a file structure of an image file stored in a recording medium 180 according to the first embodiment of the present invention.
Figure 75C:
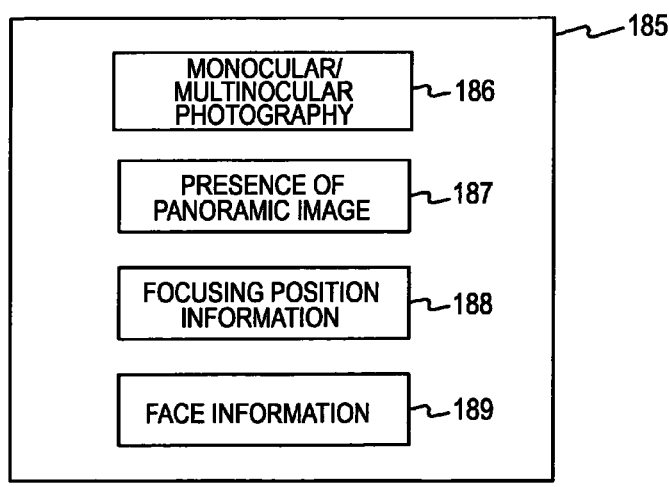

FIGS. 75A to 75C are diagrams showing an example of a file structure of an image file stored in a recording medium 180 according to the first embodiment of the present invention. The example shown in FIGS. 75A to 75C shows a simplified file structure of a still-image file recorded in accordance with a DCF (Design rule for Camera File system) specification. DCF is a file system specification for realizing the interoperability of images via recording media between devices such as digital still cameras or printers. The DCF specification is based on Exif (Exchangeable image file format) and defines a file naming method and a folder configuration when recording files in recording media. Exif is a specification for adding image data and camera information in image files and defines a format (file format) for recording image files. FIG. 75A shows a configuration example of an image file 181, FIG. 75B shows a configuration example of auxiliary information 182, and FIG. 75C shows a configuration example of a makernote 185.

The image file 181 is a still-image file recorded in accordance with the DCF specification and includes auxiliary information 182 and image information 183 as shown in FIG. 75A. The image information 183 is image data, for example, which are generated by the imaging section 130 and subjected to various image signal processings by the image signal processing section 220, and which are subjected to resolution conversion by the resolution conversion section 251 and compressed in the JPEG format by the encoding/decoding section 252.

The auxiliary information 182 includes attribute information 184 and makernote 185 as shown in FIG. 75B. The attribute information 184 is attribute information or the like of the image file 181, and for example, includes GPS information, orientation information, characteristics information (for example, device characteristics) of the imaging section, date and time of photographing and updating, image size, color space information, maker name, and the like.

The makernote 185 is a region in which user specific data are generally recorded, and is an extension region in which each maker can freely record information (TAGID=37500, MakerNote). As shown in FIG. 75C, in the makernote 185, for example, monocular/multinocular photography information 186, panoramic image information 187, focusing position information 188, and face information 189 are recorded as information concerning a captured image.

The monocular/multinocular photography information 186 is information representing whether the image data is image data (monocular photography) generated using only the imaging device 134 or image data (multinocular photography) generated using the imaging devices 134 to 136. For example, "0" is stored when the image data are image data generated by monocular photography and "1" is stored when the image data are image data generated by multinocular photography.

The panoramic image information 187 is information representing whether the image is an image (panoramic image) of which the aspect ratio exceeds a predetermined value or the other image (normal image). For example, "0" is stored when the image is a normal image, and "1" is stored when the image is a panoramic image.

The focusing position information 188 is information on the focusing position of a captured image, and for example, information on the focusing position detected by the AF control section 281 is stored.

The face information 189 is information including the position and size of the face included in an image generated by the imaging section 130. For example, the position (coordinates) of the left-top corner of a rectangular region including the face in the captured image is stored as the face position, and the vertical and horizontal lengths (vertical and horizontal widths) of the rectangular region in the captured image are stored as the face size. The face information is stored by the face detection section 282.

Moreover, an image included in a specific region of the captured image can be displayed as an enlarged image using the auxiliary information 182 (the attribute information 184 and the makernote 185) recorded in the image file 181.

[Display Example of Postview Image]

Next, a method of displaying a captured image recorded by photographing using the mobile phone unit 100 immediately after the captured image is photographed will be described. First, a postview operation (postview display) will be described.

The postview operation is an operation in which when a still-image recording instruction is issued in a still-image recording mode, a captured image recorded by a recording process is automatically displayed for a predetermined period after the recording process of the captured image in accordance with the recording instruction is finished. The image (captured image) displayed during the postview operation is referred to as a postview image.

When the user inputs a still-image recording instruction, a monitoring image is not displayed on the display section 140 for a predetermined period. Specifically, since image signal processing or image recording processing is performed after the recording instruction is issued until the recording process of the captured image is finished in the mobile phone unit 100, a message that it is unable to photograph a new captured image is displayed on the display section 140. For example, a single-color blank image (for example, a black or dark blue image) is displayed on the display section 140, and a text such as "Under processing" or "Please wait for a while" or a mark (for example, an hourglass) indicating that processing is being executed inside the device is displayed on the single-color blank image. The image indicating that it is unable to photograph a new captured image is referred to as a "black image", and this displaying operation is referred to as a "black image displaying operation". That is, when the user inputs a still-image recording instruction, a black image is displayed on the display section 140 by the black image displaying operation, and when a predetermined period elapses, a postview image is displayed on the display section 140 by the postview operation.

In the following description, a case where three imaging devices are disposed horizontally in the arrangement direction (namely, the case of the arrangement configuration shown in FIG. 70A) will be described as an example. In the respective embodiments of the present invention, it should be noted that the "image" described herein has the meaning of an image itself and also has the meaning of image data for displaying the image.

[Functional Configuration Example of Mobile Phone Unit]

Figure 76:
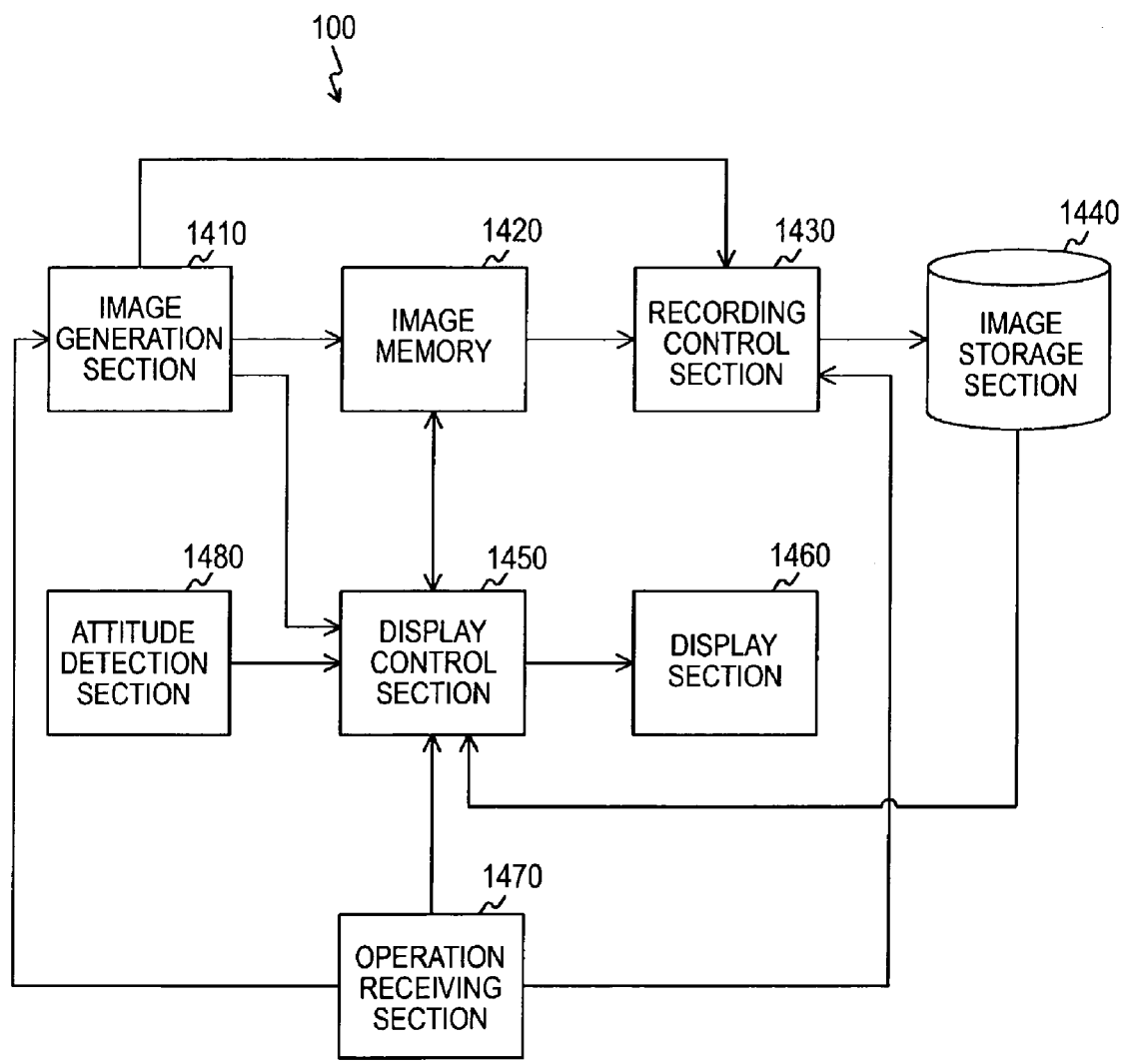
FIG. 76 is a block diagram showing a functional configuration example of the mobile phone unit 100 according to the first embodiment of the present invention.

FIG. 76 is a block diagram showing a functional configuration example of the mobile phone unit 100 according to the first embodiment of the present invention. The mobile phone unit 100 includes an image generation section 1410, an image memory 1420, a recording control section 1430, an image storage section 1440, a display control section 1450, a display section 1460, an operation receiving section 1470, and an attitude detection section 1480.

The image generation section 1410 images a subject to generate a captured image and stores the generated captured image in the image memory 1420. For example, the captured image may be a captured image generated using one imaging device 1101 or a captured image (for example, a panoramic image) which is generated by combining three captured images generated using three imaging devices 1101, 135, and 136. The captured image is generated in accordance with a user instruction received by the operation receiving section 1470. The captured image generated using one imaging device 1101 can be a captured image having approximately the same aspect ratio as the display region of the display section 1460, for example. Moreover, the image generation section 1410 outputs various kinds of information produced when generating the captured image to the display control section 1450 and the recording control section 1430. The respective kinds of information produced when generating the captured image may be, for example, the respective kinds of information shown in FIG. 75C such as information on the face included in the captured image or information (focusing position information) on the focusing position. For example, the image generation section 1410 corresponds to the imaging section 130 and the DSP 200 (the image signal processing section 220, the AF control section 281, the face detection section 282, and the like shown in FIG. 7) shown in FIG. 2.

The image memory 1420 stores the captured images generated by the image generation section 1410 or captured images (image files) acquired from the image storage section

1440 by the display control section 1450. The image memory 1420 supplies the stored captured images to the recording control section 1430 or the display control section 1450. For example, the image memory 1420 corresponds to the image memory 170 shown in FIG. 2.

The recording control section 1430 records the captured image generated by the image generation section 1410 and stored in the image memory 1420 in the image storage section 1440 as an image file in accordance with the user operation received by the operation receiving section 1470. Moreover, the recording control section 1430 records information (the respective kinds of information produced when generating the captured image), which is output from the image generation section 1410, in the image file when recording the captured image. For example, the recording control section 1430 corresponds to the DSP 200 (the imaging control section 201, the resolution conversion section 251, the encoding/decoding section 252, and the like shown in FIG. 7) shown in FIG. 2.

The image storage section 1440 stores the captured images generated by the image generation section 1410 as image files and supplies the stored image files to the display control section 1450. For example, the image storage section 1440 corresponds to the recording medium 180 shown in FIG. 2.

The display control section 1450 displays the captured images generated by the image generation section 1410 and stored in the image memory 1420 on the display section 1460 in accordance with the user operation received by the operation receiving section 1470. For example, the display control section 1450 displays the same image as the captured image recorded in the image storage section 1440 by the recording control section 1430 on the display section 1460. In this case, an enlarged image of a specific region of the captured image stored in the image memory 1420 can be displayed based on the information (the respective kinds of information produced when generating the captured image) output from the image generation section 1410. Moreover, the captured image and the enlarged image of the specific region thereof can be displayed in a correlated manner. The display control example thereof is shown in FIGS. 78A to 78C to FIGS. 85A to 85C and other drawings.

Moreover, the display control section 1450 acquires image files stored in the image storage section 1440, stores the image files in the image memory 1420, and displays the captured images of the image files on the display section 1460 in accordance with the user operation received by the operation receiving section 1470. For example, the display control section 1450 can display an enlarged image of a specific region in the captured image stored in the image memory 1420 based on the information (the respective kinds of information produced when generating the captured image) recorded in the acquired image file. When the enlarged image of the specific region is displayed in this way, and an operation input to change the display state of the enlarged image is received, a control amount based on the operation input is changed in accordance with the kind of the captured image from which the enlarged image is cropped, and the display state of the enlarged image is changed. Moreover, when the enlarged image of the specific region is displayed, and the operation input to change the display state of the enlarged image is received, a control amount based on the operation input may be changed in accordance with the attitude of the display section 1460 detected by the attitude detection section 1480. The attitude of the display section 1460 is a horizontal state or a vertical state, for example. The display control example thereof is shown in FIGS. 92A to 92C to FIGS. 95A to 95C (the second embodiment of the present invention) and other drawings.

Furthermore, the display control section 1450 displays various setting screens (for example, setting screens shown in FIGS. 77A and 77B and FIGS. 91A and 91B) on the display section 1460 in accordance with the user operation received by the operation receiving section 1470. For example, the display control section 1450 corresponds to the DSP 200 (the imaging control section 201, the CPU 202, the encoding/decoding section 252, the resolution conversion section 231, the image rotation processing section 232, and the like shown in FIG. 7) shown in FIG. 2.

The display section 1460 displays various images based on the control of the display control section 1450. The display example thereof is shown in FIGS. 78A to 78C to FIGS. 85A to 85C, FIGS. 92A to 92C to FIGS. 95A to 95C (the second embodiment of the present invention), and other drawings. For example, the display section 1460 corresponds to the display section 140 shown in FIG. 2.

The operation receiving section 1470 is an operation receiving section that receives operation inputs from the user, and outputs the content of the received operation inputs to the respective sections. For example, when a still-image recording instruction is input by the user, the operation receiving section 1470 outputs the content of the instruction to the image generation section 1410, the recording control section 1430, and the display control section 1450. Moreover, when a display instruction to display the image files stored in the image storage section 1440 is input by the user, the operation receiving section 1470 outputs the content of the instruction to the display control section 1450. Moreover, when the image files stored in the image storage section 1440 are displayed, and an instruction to change the displayed state is received, the operation receiving section 1470 outputs the content of the instruction to the display control section 1450. For example, the operation receiving section 1470 corresponds to the respective operation members (the imaging range changeover switch 111, the still-image/video changeover switch 112, the number pad 113, the OK key 114, the cross key 115, and the like) shown in FIGS. 1A to 1D and FIG. 2.

The attitude detection section 1480 detects the attitude of the display section 1460 and outputs the detection result to the display control section 1450. For example, when the second casing 120 is in the horizontal state, the attitude detection section 1480 detects that the attitude of the display section 1460 is the horizontal state. When the second casing 120 is in the vertical state, the attitude detection section 1480 detects that the attitude of the display section 1460 is the vertical state. For example, the attitude detection section 1480 corresponds to the rotation state detection section 150 shown in FIG. 2.

[Display Example of Postview Operation Setting Screen]

FIGS. 77A and 77B are diagrams showing a display example of postview operation setting screens (setting screens 1200 and 1210) of the display section 140 according to the first embodiment of the present invention. These setting screens are screens for setting the displaying method when performing the postview operation.

In the first embodiment of the present invention, the displaying method is changed in accordance with the kind of an image to be displayed as a postview image. For example, when an image to be displayed for a postview purpose is not a panoramic image (for example, when the aspect ratio of the image is approximately the same as the display region of the display section 140), only the image to be displayed is displayed for a postview purpose. On the other hand, when an image to be displayed for a postview purpose is a panoramic image (for example, the aspect ratio of the image exceeds a predetermined reference), the panoramic image and an image (enlarged image) enlarging a specific region thereof are displayed simultaneously or sequentially for a postview purpose.

FIG. 77A shows a setting screen 1200 for designating a specific region in a panoramic image to be displayed for a postview purpose. In the setting screen 1200, a plurality of operation buttons 1201 to 1204 for designating a specific region of the panoramic image to be displayed are provided. The setting screen 1200 is displayed on the display section 140 when the user inputs a predetermined operation, for example.

A "Person's Face" button 1201 is a button that is pressed when designating a region including the face of a person as the specific region of the panoramic image.

A "Focused Subject" button 1202 is a button that is pressed when designating a region including a focused subject as the specific region of the panoramic image.

A "Central Region of Panoramic Image" button 1203 is a button that is pressed when designating the central region of the panoramic image as the specific region of the panoramic image.

A "Designate Through Manual Operation During Displaying" button 1204 is a button that is pressed when designating the specific region of the panoramic image through a manual operation of the user in the displayed state of the panoramic image.

When a determination operation (for example, an operation of pressing the OK key 114) is input after any one of the respective operation buttons is pressed, the content corresponding to the pressed operation button is determined as the setting content.

FIG. 77B shows a setting screen 1210 for designating a displaying method when the image to be displayed for a postview purpose is the panoramic image. In the setting screen 1210, a plurality of operation buttons 1211 to 1214 for designating the displaying method are provided. The setting screen 1210 is displayed on the display section 140 when the user inputs a predetermined operation (for example, a determination operation in the displayed state of the setting screen 1200), for example.

A "Whole View→Enlarged View of Designated Region (Auto)" button 1211 is a button that is pressed when designating a displaying method in which an image to be displayed for a postview purpose is a panoramic image, the panoramic image (whole image) is first displayed, and then, a designated region is displayed in an enlarged view. Moreover, in this displaying method, the transition from the panoramic image to the designated region (enlarged view) is automatically performed. Here, the designated region is the specific region designated in the setting screen 1200 shown in FIG. 77A.

A "Whole View→Enlarged View of Designated Region (Manual)" button 1212 is a button that is pressed when designating a displaying method in which an image to be displayed for a postview purpose is a panoramic image, the panoramic image (whole image) is first displayed, and then, a designated region is displayed in an enlarged view. Moreover, in this displaying method, the transition from the panoramic image to the designated region (enlarged view) is performed by a manual operation of the user.

A "Enlarged View of Designated Region→Whole View (Auto)" button 1213 is a button that is pressed when designating a displaying method in which an image to be displayed for a postview purpose is a panoramic image, a designated region is first displayed in an enlarged view, and then, the panoramic image (whole image) is displayed. Moreover, in this displaying method, the transition from the designated region (enlarged view) to the panoramic image is automatically performed.

A "Enlarged View of Designated Region→Whole View (Manual)" button 1214 is a button that is pressed when designating a displaying method in which an image to be displayed for a postview purpose is a panoramic image, a designated region is first displayed in an enlarged view, and then, the panoramic image (whole image) is displayed. Moreover, in this displaying method, the transition from the designated region (enlarged view) to the panoramic image is performed by a manual operation of the user.

When a determination operation (for example, an operation of pressing the OK key 114) is input after any one of the respective operation buttons is pressed, the content corresponding to the pressed operation button is determined as the setting content.

[Display Example of Postview Image with Second Casing in Horizontal State]

FIGS. 78A to 78C to FIGS. 85A to 85C are diagrams showing a display transition example of a postview image displayed on the display section 140 according to the first embodiment of the present invention. In this example, a case in which a still-image imaging mode is set in the horizontal state of the second casing 120, and the user inputs a still-image recording instruction will be described as an example. Moreover, in this example, a case where three imaging devices are disposed horizontally in the arrangement direction (namely, the case of the arrangement configuration shown in FIG. 70A) will be described as an example.

FIG. 78A to 78C shows a display transition example when the "Person's Face" button 1201 is pressed in the setting screen 1200, the "Whole View→Enlarged View of Designated Region (Auto)" button 1211 is pressed in the setting screen 1210, and the respective determination operations are input.

When the still-image imaging mode is set, a monitoring operation is executed until the user inputs a still-image recording instruction. When the user inputs a still-image recording instruction (for example, an operation of pressing the OK key 114) during the execution of the monitoring operation, a still-image recording process (a still-image imaging operation and a still-image recording operation) is performed. Specifically, the imaging section 130 performs an AF (Auto Focus) operation and focuses on a subject. Subsequently, the DSP 200 performs image signal processing on the image data readout out from the imaging devices 1101, 135, and 136, and the image data (captured image) having been subjected to the image signal processing are written into the recording medium 180 as an image file.

FIG. 78A shows a captured image stored in the image memory 170 by the still-image recording process. The captured image is an image corresponding to the imaging ranges 1111 to 1113 shown in FIG. 71A.

As described above, when the AF operation is performed, the focusing position (the position of the focused subject) of the generated captured image is stored in the AF control section 281. Moreover, when the face of a person is included in the captured image, the face of the person is detected by the face detection section 282, and the position (the position of the face in the captured image) of the detected face is stored in the face detection section 282. Furthermore, when face-based AF which performs an AF operation using the face detected in this way as a focusing target is performed, the position (the focusing position) of the face serving as the focusing target in the captured image is stored in the face detection section 282. As the positions of the face, one apex (for example, a top-left apex) of a rectangular region including at least a part of the detected face and the vertical length (vertical width) and horizontal length (horizontal width) thereof are stored.

Moreover, a message is displayed on the display section 140 in order to inform the user of the fact that no more images can be photographed by the mobile phone unit 100 during the period of the still-image recording process. For example, a black image is displayed on the display section 140. When the still-image recording process is finished, the black image displayed on the display section 140 is removed, and a postview operation is performed. The transition from the black image to the postview image on the display section 140 is automatically performed by the mobile phone unit 100 without being instructed by the user.

FIG. 78B shows a display example of displaying the whole captured image stored in the image memory 170 by the still-image recording process. When a postview operation is performed, the entire parts (whole image) of the captured image recorded by the still-image recording process is displayed on the display section 140 as shown in FIG. 78B.

Here, as shown in FIG. 7, image data which have not been subjected to resolution conversion for a recording purpose are written to the image memory 170. Moreover, the resolution conversion section (recording resolution conversion section) 251 reads out the written image data from the image memory 170 and converts the resolution of the readout image data into a resolution for a recording purpose. Subsequently, the image data having been subjected to resolution conversion for a recording purpose are encoded by the encoding/decoding section 252, and the encoded image data are recorded in the recording medium 180 through the recording medium I/F 253. As described above, during the still-image recording process, the image data which have not been encoded and which have not subjected to resolution conversion for a recording purpose are stored in the image memory 170.

When displaying the whole image during the postview operation, the image data stored in the image memory 170 are read out and displayed. That is, the resolution conversion section 231 converts the resolution of the image data read out from the image memory 170 into a resolution appropriate for displaying the whole image on the display section 140.

For example, by combining all the image data generated by the imaging devices 1101, 135, and 136, a combined image (horizontal-to-vertical ratio: 12:3) having about 8.29 million pixels (5760×1440 pixels) is obtained. Moreover, the horizontal-to-vertical ratio of the display section 140 is 4:3. Therefore, similarly to the example shown in FIG. 71B, the resolution conversion section 231 performs resolution conversion so that the resolution in the vertical and horizontal directions of the combined image is decreased by a ratio of 1/9. An image obtained through the 1/9 resolution conversion is displayed on the central portion (captured image display region 1221) in the vertical direction of the display section 140 as shown in FIG. 78B. Here, for example, a single-color image is displayed in the blank portions (blank image display regions 1222 and 1223) above and below the displayed image.

In this way, a combined image (panoramic image) generated using the imaging devices 1101, 135, and 136 can be displayed for a postview purpose. Here, as shown in FIG. 78B, the panoramic image displayed for a postview purpose is displayed with a relatively low resolution. Therefore, it is expected that it is difficult to view the face (for example, the look or appearance) of a person 501 included in the panoramic image since the face is too small. Therefore, in the first embodiment of the present invention, when the image to be displayed in the postview operation is a panoramic image, the panoramic image and an enlarged image of the specific region in the panoramic image are displayed in a correlated manner. In this way, when the user photographs a panoramic image, it is possible to view easily the whole image and a region (specific region) that the user focuses on.

Here, as described above, when the face of a person is included in the captured image, the face of the person is detected by the face detection section 282, and the position (one apex of a rectangular region, and the vertical width and horizontal width) of the detected face is stored in the face detection section 282. For example, the respective faces of persons 501 and 502 included in the image data stored in the image memory 170 are detected by the face detection section 282, and the positions (rectangular regions 1231 and 1232) of the detected faces are stored in the face detection section 282. When displaying an enlarged image, the enlarged image is generated using the position of the face. For example, the resolution of an image corresponding to the position (the rectangular regions 1231 and 1232) of the face is converted so as to comply with the pixel count of the display region of the display section 140.

In the respective embodiments of the present invention, the enlarged image is defined based on the resolution when an image (cropped image) cropped from the captured image (whole image) is displayed on the display section 140 and the resolution when the whole image before cropping is displayed on the display section 140. That is, when the resolution (the resolution in the image memory 170) of the cropped image when displayed on the display section 140 is smaller than the resolution (the resolution in the image memory 170) of the whole image before cropping when displayed on the display section 140, the cropped image is defined as an enlarged image. Moreover, in the respective embodiments of the present invention, an operation of displaying the cropped image is referred to as an "zooming operation" or "zooming". Furthermore, the ratio of the resolution (the resolution in the image memory 170) of the cropped image when displaying the cropped image to the resolution (the resolution in the image memory 170) of the whole image when displaying the whole image is referred to as a "magnification ratio".

Here, a case in which when displaying an enlarged image, the image (face image) of the face of a person to be displayed is displayed so as to occupy 3/4 in the vertical direction of the display region of the display section 140 (640×480 pixels; horizontal-to-vertical ratio=4:3) will be described as an example. For example, a case in which image data having 5760×1440 pixels (horizontal-to-vertical ratio=12:3) are stored in the image memory 170, and the face of a person included in the image data has a size corresponding to 1/8 in the vertical direction of the image data will be considered. In this case, the vertical size of the face image in the image data stored in the image memory 170 is 180 pixels. Therefore, by increasing the resolution of a surrounding image (320×240 pixels; horizontal-to-vertical ratio=4:3) near the face twice, it is possible to display the face image so as to occupy 3/4 in the vertical direction of the display region of the display section 140. That is, the resolution of the surrounding image (320× 240 pixels; horizontal-to-vertical ratio=4:3) is increased twice to generate a display target image (640×480 pixels; horizontal-to-vertical ratio=4:3). In this way, from the face image having the vertical size of 180 pixels in the image data stored in the image memory 170, it is possible to generate a display target image having a vertical size of 360 pixels.

Here, when converting an image having a small resolution into an image having a large resolution, an existing resolution conversion method (for example, linear interpolation processing) can be used as the image signal processing. Such a process of generating an image having a large resolution from an image having a small resolution is generally called a super-resolution process. Since a device performing this super-resolution process is available as a semiconductor device, it is possible to perform resolution conversion using such a semiconductor device. That is, by incorporating such a semiconductor device into the DSP 200, it is possible to perform resolution conversion using the DSP 200.

In the above example, the case in which the vertical pixel count (180 pixels) of the face image in the image data stored in the image memory 170 is smaller than the vertical pixel count (480 pixels) in the display region of the display section 140 has been described as an example. Therefore, when generating a display target image from the image data stored in the image memory 170, it was necessary to perform resolution conversion which increases the resolution in order to match the resolution with the vertical pixel count (480 pixels) in the display region of the display section 140. However, there may be a case in which the vertical pixel count of the face image in the image data stored in the image memory 170 is larger than the vertical pixel count (480 pixels) in the display region of the display section 140. In this case, when generating a display target image from the image data stored in the image memory 170, resolution conversion which decreases the resolution is performed in order to match the resolution with the vertical pixel count (480 pixels) in the display region of the display section 140. The display target image generated in this way is displayed on the entire surface of the display section 140.

FIG. 78C shows a display example of displaying a part of a captured image stored in the image memory 170 by the still-image recording process as an enlarged image. As shown in FIG. 78B, the entire parts (whole image) of the captured image is displayed on the display section 140 for a predetermined period. When the predetermined period elapses, an enlarged image of a specific region corresponding to the setting content is displayed on the display section 140. In this example, since the "Person's Face" button 1201 is pressed, and the determination operation is input, a region including the face of a person becomes the specific region. Therefore, a region (the rectangular region 1231 or 1232) including the face of the person 501 or 502 becomes a display target of the enlarged image. When the faces of plural persons are detected as described above, the face displayed as the enlarged image can be determined based on the size of the face in the captured image, the position (for example, near the center and near the left end) of the face in the captured image, and whether or not the face is focused. For example, the example shown in FIG. 78C shows an example in which among the faces included in the image stored in the image memory 170, the face of the person 501 located near the center and having the larger size is determined as the face displayed as the enlarged image.

Moreover, it is preferable that the period (predetermined period) between displaying (first stage of postview presentation) of the panoramic image and displaying of the enlarged image is set in advance by the user so as to be changeable by the user operation. Furthermore, when the enlarged image is displayed for a predetermined period (second stage of postview presentation), the operation of displaying the postview image ends, and the monitoring operation is performed.

Here, when the faces of plural persons are detected, a region surrounded by a rectangle including the detected plural faces may be displayed as the enlarged image, for example.

Moreover, each of the detected plural faces may be sequentially displayed as the enlarged image for a predetermined period. Furthermore, the face images including the detected plural faces may be displayed in a line as the enlarged images. In this case, the enlarged images have a size smaller than the size of a display target region of the display section 140. Moreover, among the enlarged images displayed in a line, one enlarged image selected by the user operation may be displayed on the display section 140 as the enlarged image. These displaying methods may be set by the user operation. For example, after the "Person's Face" button 1201 is pressed in the setting screen 1200 shown in FIG. 77A and the determination operation is input, a setting screen for setting the displaying method may be displayed, and the displaying method may be set in the setting screen by the user operation. Furthermore, the upper limit (for example, 2 to 5) of the number of faces displayed as the enlarged images may be set by the user operation.

FIG. 79C shows an example of displaying a rectangular region including the faces of the persons 501 and 502 as an enlarged image, for example. Moreover, FIG. 80C shows an example of displaying both the regions including the faces of the persons 501 and 502 as an enlarged image at the same time. Furthermore, FIGS. 81B and 81C show an example of displaying both the regions including the faces of the persons 501 and 502 as an enlarged image in a sequential manner. In addition, FIG. 82B shows an example of displaying both the regions including the faces of the persons 501 and 502 as an enlarged image together with a panoramic image.

FIG. 79A to 79C shows a display transition example when the "Person's Face" button 1201 is pressed in the setting screen 1200, the "Whole View→Enlarged View of Designated Region (Auto)" button 1211 is pressed in the setting screen 1210, and the respective determination operations are input. In this example, a region surrounded by a rectangle including the faces of plural persons is displayed as an enlarged image. Since the example shown in FIGS. 79A and 79B is approximately the same as the example shown in FIGS. 78A and 78B, detailed description thereof will be omitted.

FIG. 79C shows a display example of displaying a part of a captured image stored in the image memory 170 by the still-image recording process as an enlarged image. As shown in FIG. 79B, after the entire parts (whole image) of the captured image is displayed on the display section 140 for a predetermined period, a rectangular region 1233 including the rectangular region 1231 including the face of the person 501 and the rectangular region 1232 including the face of the person 502 is displayed as the enlarged image. The rectangular region including the respective faces can be determined based on the maximum and minimum values in the up-down and left-right directions of the respective rectangular regions including the faces, for example.

Moreover, the resolution conversion section 231 performs resolution conversion on the image included in the rectangular region 1233 so that the image included in the rectangular region 1233 can be displayed within the display section 140. As shown in FIG. 79A, since the image included in the rectangular region 1233 is horizontal, resolution conversion is performed so that the resolution in the horizontal direction of the display region of the display section 140 is the same as the resolution in the horizontal direction of the image included in the rectangular region 1233. The resolution-converted image is displayed on the central portion (captured image display region 1224) in the vertical direction of the display section 140 as shown in FIG. 79C. Here, for example, a single-color image is displayed in the blank portions (blank image display regions 1225 and 1226) above and below the displayed image.

Figure 80A:
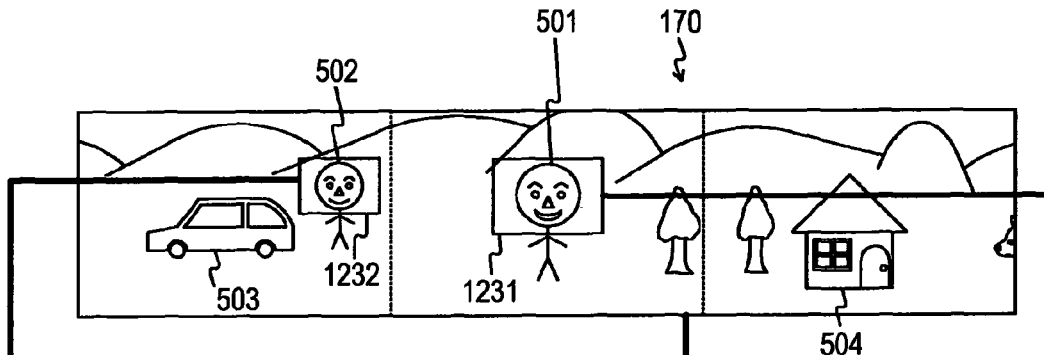
FIGS. 80A to 80C are diagrams showing a display transition example of a postview image displayed on the display section 140 according to the first embodiment of the present invention.
Figure 80B:
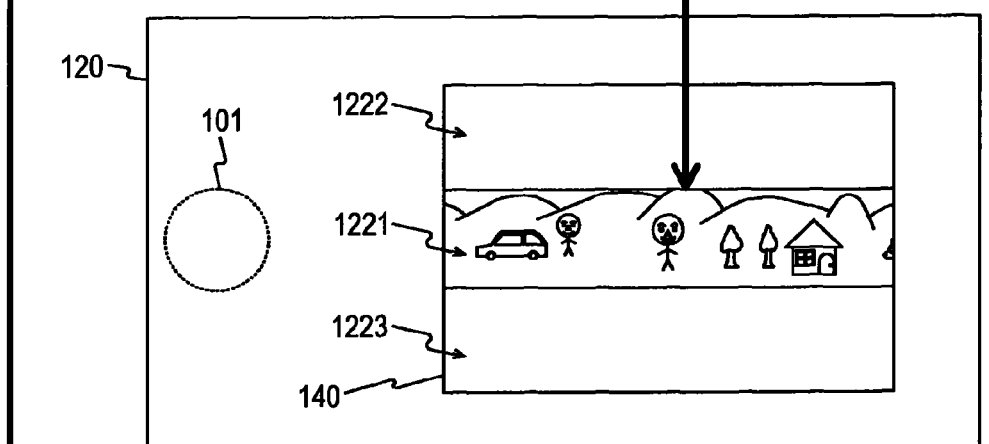
Figure 80C:
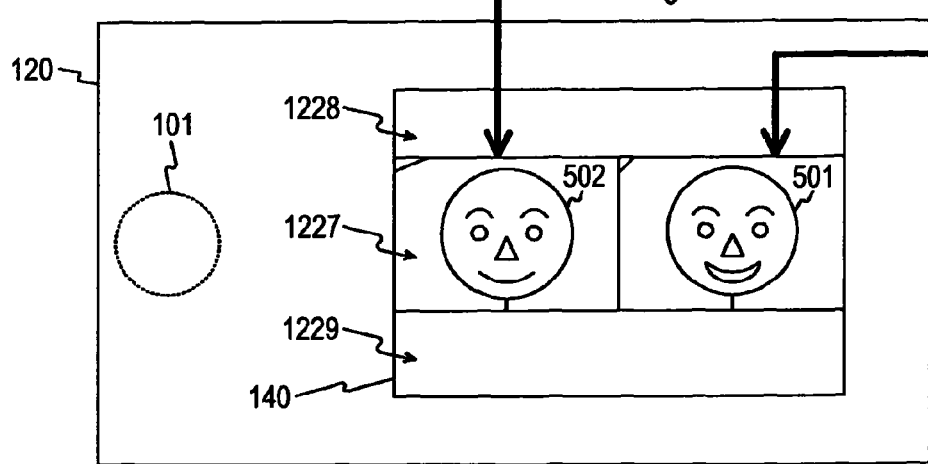

FIG. 80A to 80C shows a display transition example when the "Person's Face" button 1201 is pressed in the setting screen 1200, the "Whole View→Enlarged View of Designated Region (Auto)" button 1211 is pressed in the setting screen 1210, and the respective determination operations are input. In this example, the respective rectangular regions including the faces of plural persons are displayed as enlarged images. Since the example shown in FIGS. 80A and 80B is approximately the same as the example shown in FIGS. 78A and 78B, detailed description thereof will be omitted.

FIG. 80C shows a display example of displaying a part of a captured image stored in the image memory 170 by the still-image recording process as an enlarged image. As shown in FIG. 80B, after the entire parts (whole image) of the captured image is displayed on the display section 140 for a predetermined period, the rectangular region 1231 including the face of the person 501 and the rectangular region 1232 including the face of the person 502 are displayed as the enlarged images. In this case, the respective enlarged images can be displayed in a line in the horizontal or vertical direction.

When there are a number of faces to be displayed, the respective enlarged images can be displayed in a matrix form. Moreover, parts of the respective enlarged images may be displayed on the display section 140, and the other enlarged images may be displayed by a scroll operation. When among the plurality of enlarged images displayed in this manner, one or plural enlarged images are selected by a predetermined user operation (for example, by the cross key 115), only the selected enlarged images may be displayed.

Moreover, the resolution conversion section 231 performs resolution conversion on the images included in the rectangular regions 1231 and 1232 so that the respective images included in the rectangular regions 1231 and 1232 can be displayed within the display section 140. In the example shown in FIG. 80C, since there are two rectangular regions to be displayed, the sizes of the respective images included in the rectangular regions 1231 and 1232 are made identical, and the same-sized images are displayed on the display section 140 in a line in the horizontal direction. In this case, resolution conversion is performed so that the resolution in the horizontal direction of the display region of the display section 140 is the same as the sum of the resolutions in the horizontal direction of the respective images included in the same-sized rectangular regions 1231 and 1232. The resolution-converted images are displayed on the central portion (captured image display region 1227) in the vertical direction of the display section 140 as shown in FIG. 80C. Here, for example, a single-color image is displayed in the blank portions (blank image display regions 1228 and 1229) above and below the displayed image.

Figure 81A:
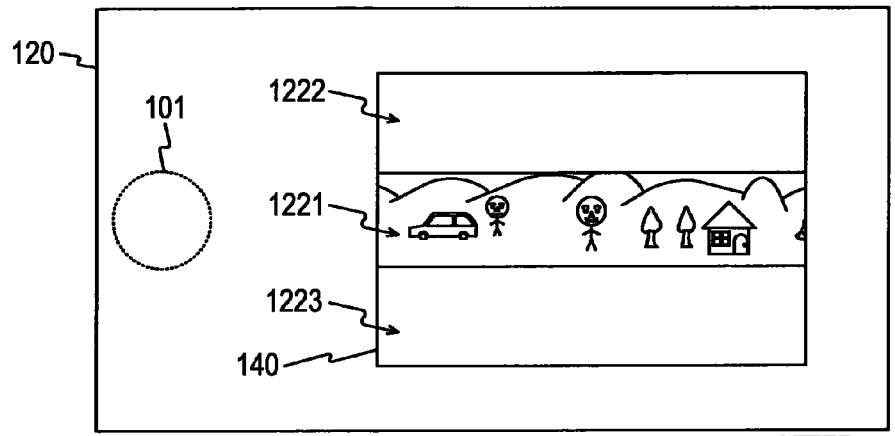
FIGS. 81A to 81C are diagrams showing a display transition example of a postview image displayed on the display section 140 according to the first embodiment of the present invention.
Figure 81B:
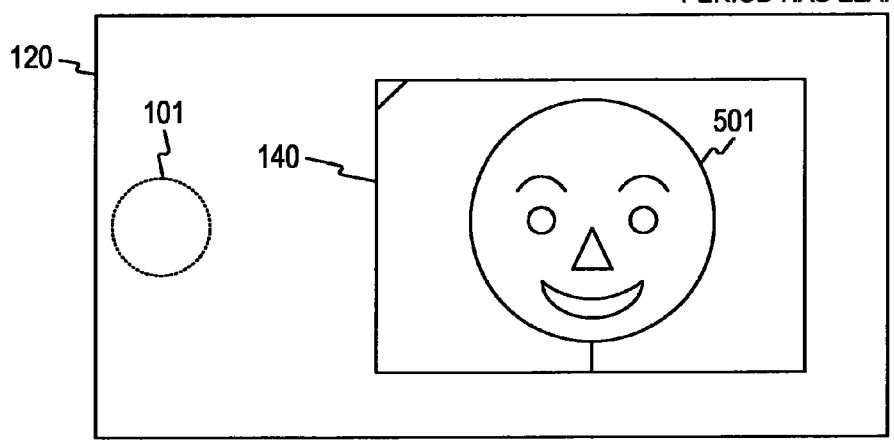
Figure 81C:
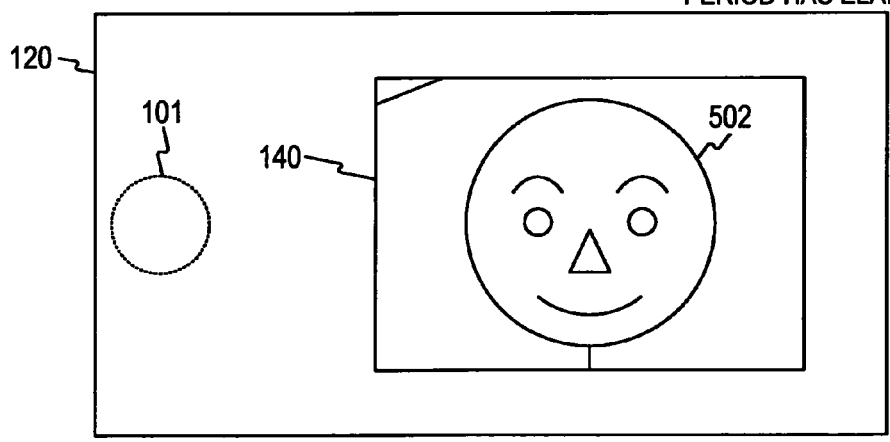

FIG. 81A to 81C shows a display transition example when the "Person's Face" button 1201 is pressed in the setting screen 1200, the "Whole View→Enlarged View of Designated Region (Auto)" button 1211 is pressed in the setting screen 1210, and the respective determination operations are input. In this example, the respective rectangular regions including the faces of plural persons are sequentially displayed as enlarged images. Since the example shown in FIGS. 81A and 81B is approximately the same as the example shown in FIGS. 78B and 78C, detailed description thereof will be omitted.

FIG. 81C shows a display example of displaying a part of a captured image stored in the image memory 170 by the still-image recording process as an enlarged image. As shown in FIGS. 81A and 81B, after the entire parts (whole image) of the captured image is displayed on the display section 140 for a predetermined period, the image included in the rectangular region 1231 including the face of the person 501 is displayed on the display section 140 for a predetermined period. Moreover, as shown in FIG. 81C, after the image including the face of the person 501 is displayed on the display section 140 for a predetermined period, the image included in the rectangular region 1232 including the face of the person 502 is displayed as the enlarged image. Since the example shown in FIG. 81C is the same as the example shown in FIG. 78C except that the rectangular regions to be displayed are different, detailed description thereof will be omitted.

Figure 82A:
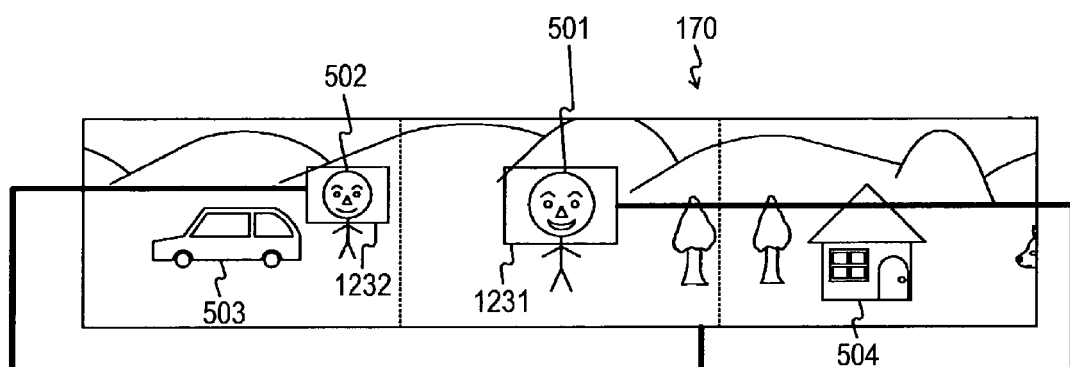
FIGS. 82A and 82B are diagrams showing a display transition example of a postview image displayed on the display section 140 according to the first embodiment of the present invention.
Figure 82B:
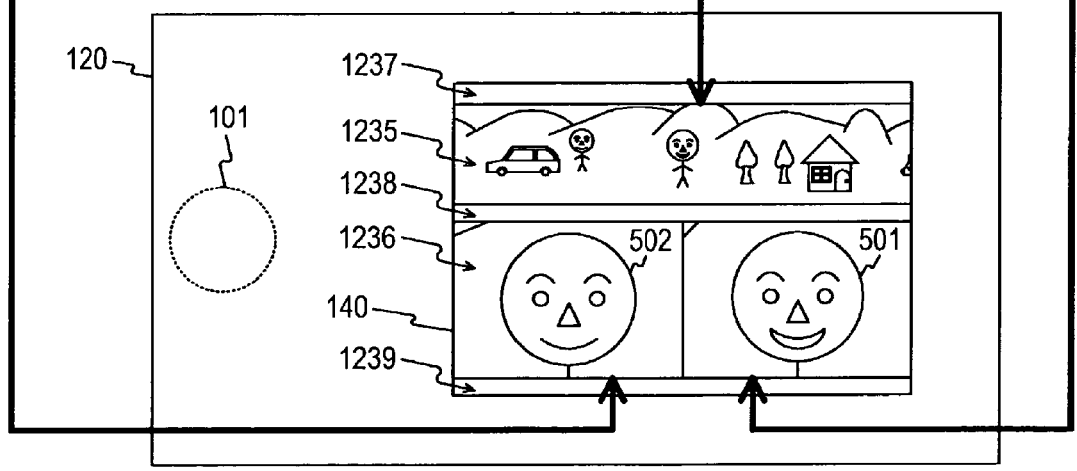

FIGS. 82A and 82B shows another display example when the "Persons' Face" button 1201 is pressed in the setting screen 1200 and the determination operation is input. In this example, the respective rectangular regions including the faces of plural persons are displayed as the enlarged images together with the panoramic image at the same time. Since the example shown in FIG. 82A is approximately the same as the example shown in FIG. 78A, detailed description thereof will be omitted.

FIG. 82B shows a display example of displaying a captured image stored in the image memory 170 by the still-image recording process and the parts (enlarged images) thereof at the same time. In the example shown in FIG. 82B, the panoramic image displayed in the captured image display region 1221 of FIG. 78B and the enlarged images displayed in the captured image display region 1227 of FIG. 80C are displayed at the same time. That is, the panoramic image is displayed in a captured image display region 1235 of the display section 140, and the enlarged images thereof are displayed in a captured image display region 1236. Although the arrangement of these respective images is determined by the size thereof, in this example, the respective images arranged in a line in the up-down direction. Moreover, for example, a single-color image is displayed in the blank portions (blank image display regions 1237 and 1239) above and below the respective displayed images. Since the resolution conversion and the like of the panoramic image and the enlarged images are the same as those of the example shown in FIGS. 78B and 80C, detailed description thereof will be omitted. Moreover, the panoramic image displayed in the captured image display region 1221 of FIG. 78B and the enlarged image displayed in the captured image display region 1224 of FIG. 79C may be displayed at the same time. Like this, the panoramic image and the enlarged image of the specific region may be displayed at one time in a correlated manner. In this way, the user can view the panoramic image and the specific region at one time.

In the above, an example in which when displaying a panoramic image generated using three imaging devices on the display section 140, the panoramic image which has been subjected to resolution conversion processing which decreases the resolution by a ratio of 1/9 is displayed on the display section 140 has been described. That is, a panoramic image (for example, 5760×1440 pixels; horizontal-to-vertical ratio=12:3) is subjected to resolution conversion so that the resolution is decreased by a ratio of 1/9, whereby a display target image (640×160 pixels; horizontal-to-vertical ratio=12:3) is generated. Moreover, the generated display target image is displayed on the display section 140 (for example, 640×480 pixels; horizontal-to-vertical ratio=4:3). However, when displaying the entire parts of the panoramic image, the panoramic image may be divided at a predetermined position (for example, the central position in the horizontal direction) of the panoramic image, and the divided panoramic images may be displayed in a line.

FIGS. 83A to 83C show a display example of displaying the panoramic image and the entire parts thereof as enlarged images. In this example, the panoramic image is first displayed, and then, the entire parts thereof are displayed as the enlarged images. Since the example shown in FIGS. 83A and 83B is approximately the same as the example shown in FIGS. 78A and 78B, detailed description thereof will be omitted.

FIG. 83C shows a display example of displaying the entire parts of a captured image stored in the image memory 170 by the still-image recording process as enlarged images. For example, a panoramic image (for example, 5760×1440 pixels; horizontal-to-vertical ratio=12:3) is subjected to resolution conversion so that the resolution is decreased by a ratio of 1/4.5, whereby a display target image (1280×320 pixels; horizontal-to-vertical ratio=12:3) is generated. Moreover, the display target image is divided at the central position 1240 (shown in FIG. 83A) in the horizontal direction of the generated display target image, whereby two display target images (640×320 pixels: horizontal-to-vertical ratio=6:3) are generated. Then, the divided display target images are arranged in the up-down direction and displayed on the display section 140 (for example, 640×480 pixels; horizontal-to-vertical ratio=4:3). For example, the display target images can be displayed on the display section 140 so that the divided display target images partially overlap in the up-down direction. In this case, for example, whenever the user selects one of the divided images, the selected image can be displayed on the upper side in an overlapped manner.

Moreover, when displaying the entire parts of the divided display target images on the display region of the display section 140, the resolution conversion is performed so as to comply with the display region of the display section 140. For example, when the divided display target images are displayed in a line in the up-down direction, resolution conversion is performed so that the resolution of the display target images is decreased so as to comply with the vertical size of the display region of the display section 140. Moreover, the two resolution-converted display target images are displayed on the display section 140 in a line in the up-down direction. This display example is shown in FIG. 83C. That is, the divided panoramic images are displayed in a captured image display region 1241 of the display section 140. Moreover, for example, a single-color image is displayed in the blank portions (blank image display regions 1242 and 1243) on the left and right sides of the respective displayed images. Here, it is highly likely that the most important subject (for example, the most preferred person of the photographer) is included near the central position in the horizontal direction of the generated display target image. Therefore, the position distant from the central position in the horizontal direction of the generated display target image may be used as the dividing line. Moreover, for example, when the face is detected near the central position, the dividing line may be moved so that the changed dividing line does not cross the detected face. Furthermore, a designation operation to designate the dividing line for the panoramic image (shown in FIG. 83B) displayed on the display section 140 may be received, and the designated dividing line may be used.

[Display Transition Example of Enlarged Image Through Manual Operation]

In the above, an example in which the transition display from the panoramic image to the enlarged image is automatically performed after the elapse of a predetermined period. However, the transition of display may be performed by a manual operation in accordance with the user preference. For example, the user may need to view the entire parts of the panoramic image but not the enlarged image of the panoramic image. For example, this is the case where the user needs to perform photographing again immediately after failing to compose the structural outline of a panoramic image, or the user does not need to view the details of a subject (for example, only with a landscape) included in the panoramic image. Therefore, in this example, a case in which when the entire parts of the panoramic image is displayed as the first stage of presentation, it is determined whether or not to display the enlarged image of the panoramic image by the user operation, and the enlarged image is displayed in accordance with the user operation will be described.

FIG. 84A to 84C show a display transition example when the "Person's Face" button 1201 is pressed in the setting screen 1200, the "Whole View→Enlarged View of Designated Region (Manual)" button 1212 is pressed in the setting screen 1210, and the respective determination operations are input. That is, this example is a modification of the example shown in FIGS. 78A to 78C and is different in that the transition from the panoramic image to the enlarged image is performed by the user operation. Therefore, the same portions as those in FIGS. 78A to 78C will be denoted by the same reference numerals, and a part of the redundant description will be omitted.

FIG. 84B shows a display example of displaying the entire parts of the captured image stored in the image memory 170 by the still-image recording process. Similarly to FIG. 78B, the entire parts of the captured image are displayed in the captured image display region 1221, and the blank image display region 1222 is provided on the upper portion of the captured image display region 1221. In the example shown in FIG. 84B, operation buttons for instructing whether or not a designated region will be displayed as an enlarged image are provided in a blank image display region 1245 on the lower portion of the captured image display region 1221. As the operation buttons, a "Do Not Display Designated Region" button 1246 and a "Display Designated Region in Enlarged View" button 1247 are displayed.

The "Do Not Display Designated Region" button 1246 is a button that is pressed when not displaying the designated region as the enlarged image after the panoramic image is displayed. When this button is pressed, the enlarged image is not displayed after the panoramic image is displayed, and the monitoring operation is performed after the elapse of a predetermined time after the panoramic image is displayed. For example, when the user wants to view only the panoramic image being displayed, the user can quickly move on to the next photography by pressing this button.

The "Display Designated Region in Enlarged View" button 1247 is a button that is pressed when displaying the designated region as the enlarged image after the panoramic image is displayed. When this button is pressed, the enlarged image is displayed as shown in FIG. 84C.

FIG. 84C shows a display example of displaying a part of a captured image stored in the image memory 170 by the still-image recording process as an enlarged image. When the "Display Designated Region in Enlarged View" button 1247 is pressed in the display screen shown in FIG. 84B within a predetermined period after the entire parts (whole image) of the captured image are displayed on the display section 140, an enlarged image of a specific region corresponding to the setting content is displayed on the display section 140. Similarly to the example shown in FIG. 78C, this example shows an example in which among the faces included in the image stored in the image memory 170, the face of the person 501 located near the center and having the larger size is determined as the face displayed as the enlarged image.

Moreover, it is preferable that the period (predetermined period) between displaying (first stage of postview presentation) of the panoramic image and determining whether or not to display the enlarged image is set in advance by the user so as to be changeable by the user operation. Furthermore, when the enlarged image is displayed for a predetermined period (second stage of postview presentation), the operation of displaying the postview image ends, and the monitoring operation is performed.

In the above, an example in which the entire parts of the captured image are first displayed (first stage of presentation) on the display section 140, and then, the enlarged image of the captured image is displayed (second stage of presentation) on the display section 140 after the elapse of a predetermined period or when a predetermined operation is input. However, for example, the enlarged image of the captured image may be first displayed on the display section 140 as a first stage of the postview operation, and then, the entire parts of the captured image are displayed (second stage of presentation) on the display section 140 after the elapse of a predetermined period or when a predetermined operation is input.

[Display Transition Example of Enlarged Image after Specific Region is Designated by Manual Operation]

In the above, an example of displaying a preset specific region as the enlarged image has been described. However, for example, the user may want to designate a region that is to be displayed as the enlarged image of the panoramic image after viewing the entire parts of the panoramic image. Therefore, in this example, a case in which when the entire parts of the panoramic image is displayed as the first stage of presentation, a region (specific region) that is to be displayed as an enlarged image of the panoramic image is designated, and the designated specific region is displayed as the enlarged image will be described.

FIG. 85A to 85C show a display transition example when the "Designate Through Manual Operation During Displaying" button 1204 is pressed in the setting screen 1200, the "Whole View→Enlarged View of Designated Region (Manual)" button 1212 is pressed in the setting screen 1210, and the respective determination operations are input. That is, this example is a modification of the example shown in FIGS. 78A to 78C and FIGS. 84A to 84C and is different in that the specific region displayed as the enlarged image is designated in the panoramic image. Therefore, the same portions as those in FIGS. 78A to 78C or FIGS. 84A to 84C will be denoted by the same reference numerals, and a part of the redundant description will be omitted.

FIG. 85B shows a display example of displaying the entire parts of the captured image stored in the image memory 170 by the still-image recording process. Similarly to FIG. 78B, the entire parts of the captured image are displayed in a captured image display region 1250, and blank image display regions 1222 and 1223 are provided above and below the captured image display region 1250. In the example shown in FIG. 85B, specific region candidate marks 1251 and 1252 for designating the specific region to be displayed in the captured image display region 1250 to be overlapped on the panoramic image. In this example, a region including the face detected by the face detection section 282 is shown to the user as the specific region. For example, green dot-line rectangles can be used as the specific region candidate marks 1251 and 1252. Moreover, when the user selects one of the specific region candidate marks 1251 and 1252, an image specified by the selected specific region candidate mark is displayed as the enlarged image. This display example is shown in FIG. 85C.

FIG. 85C shows a display example of displaying a part of a captured image stored in the image memory 170 by the still-image recording process as an enlarged image. It will be assumed that a select operation of selecting one of the specific region candidate marks 1251 and 1252 is input in the display screen shown in FIG. 85B within a predetermined period after the entire parts (whole image) of the captured image are displayed on the display section 140. In this case, an enlarged image specified by the selected specific region candidate mark is displayed on the display section 140. FIG. 85C shows a display example when the specific region candidate mark 1252 is selected.

In this example, the case in which one specific region candidate mark is selected from among a plurality of specific region candidate marks and the enlarged image is displayed has been described. However, plural specific region candidate marks may be selected, and these respective enlarged images may be displayed at the same time or in a sequential manner.

Moreover, it is preferable that the period (predetermined period) between displaying (first stage of postview presentation) of the panoramic image and determining whether or not to display the enlarged image is set in advance by the user so as to be changeable by the user operation. Furthermore, when the enlarged image is displayed for a predetermined period (second stage of postview presentation), the operation of displaying the postview image ends, and the monitoring operation is performed. When the user has not performed the select operation within a predetermined period after the panoramic image is displayed (first stage of postview presentation), the monitoring operation is performed without performing the second stage of the postview operation of displaying the enlarged image.

In this example, the case in which the specific region candidate marks are displayed to be overlapped on the panoramic image, and a desired specific region candidate mark is selected from the specific region candidate marks has been described. However, for example, an arbitrary position on the panoramic image may be designated, and an image included in a predetermined region including the designated position may be displayed as the enlarged image. For example, in this case, the display section 140 is configured by a touch panel, and the user presses a position that the user wants to zoom in on the panoramic image being displayed on the touch panel. Then, the coordinates corresponding to the pressed position are detected, and a predetermined region around the coordinates is subjected to resolution conversion so as to comply with the pixel count of the display region of the display section 140. Moreover, the size of the display region of the enlarged image may be changed in accordance with the pressing operation of the user. For example, when the same position is pressed several times, the display region of the enlarged image can be enlarged in accordance with the number of presses.

[Display Example of Postview Image with Second Casing in Vertical State]

Next, a case in which a still-image imaging mode is set in the vertical state of the second casing 120, and the user inputs a still-image recording instruction will be described as an example. Moreover, in this example, a case where three imaging devices are disposed horizontally in the arrangement direction (namely, the case of the arrangement configuration shown in FIG. 70A) will be described as an example.

In this example, a case in which the second casing 120 is in the vertical state similarly to the example shown in FIG. 73C, and the image data read out from the pixel data readout region 1130 shown in FIG. 73A are displayed on the display section 140 will be described. Moreover, this example shows a display transition example when the "Person's Face" button 1201 is pressed in the setting screen 1200, the "Whole View→Enlarged View of Designated Region (Manual)" button 1212 is pressed in the setting screen 1210, and the respective determination operations are input.

When the second casing 120 is in the vertical state, the whole image is displayed on the display section 140 as the first stage of the postview operation (see FIG. 73C). The displaying method of the whole image is approximately the same as the method of displaying the whole image as the first stage of the postview operation when the second casing 120 is in the horizontal state.

Moreover, when the user inputs an instruction operation to display a designated region in an enlarged view within a predetermined period after the whole image is displayed on the display section 140, the image of the designated region is displayed in an enlarged view as the second stage of the postview operation. For example, the "Do Not Display Designated Region" button 1246 and the "Display Designated Region in Enlarged View" button 1247 shown in FIG. 84B are displayed to be overlapped on the whole image being displayed as the first stage of the postview operation, and the instruction operation can be performed using these buttons.

In this example, a case in which the same subject is photographed with the same magnification from the same distance as the case where the second casing 120 is in the horizontal state, and the subject is enlarged to the same size as the case where the second casing 120 is in the horizontal state will be described. For example, an example of displaying the face of the person 501 included in the subject 500 in an enlarged view is described.

When the second casing 120 is in the horizontal state, as described above, the enlarged image is displayed so that the face of the person 501 occupies 3/4 in the vertical direction of the display region of the display section 140 (640×480 pixels; horizontal-to-vertical ratio=4:3). Specifically, the face (vertical size: 180 pixels) of the person 501 included in the image stored in the image memory 170 is subjected to resolution conversion so that the vertical size thereof is changed to 360 pixels. As for the zooming when the second casing 120 is in the vertical state, similarly, a case in which the face of the person 501 included in the image stored in the image memory 170 is subjected to resolution conversion so that the vertical size is changed to 360 pixels will be considered.

That is, an image (240×320 pixels; horizontal-to-vertical ratio=3:4) around the face of the person 501 included in the image (1080×1440 pixels; horizontal-to-vertical ratio=3:4) stored in the image memory 170 is fetched out. This fetched image is assumed to have a size such that the face of the person 501 occupies 180 vertical pixels among the 320 vertical pixels. Then, the face of the person 501 included in the fetched image is subjected to resolution conversion so that the vertical size is changed to 360 pixels, and the resolution-converted image is displayed on the display section 140.

[Comparison Example of Magnification Ratio of Postview Image]

Next, a comparison example of the magnification ratio of the postview image when the second casing is in the horizontal state and when it is in the vertical state will be described. In this example, a case in which the same subject is photographed with the same magnification from the same distance, and the subject is displayed in an enlarged view having the same size when the second casing 120 is arranged horizontally and when the second casing 120 is arranged vertically will be described. For example, an example of displaying the face of the person 501 included in the subject 500 in an enlarged view will be described.

When the second casing 120 is in the horizontal state, it is assumed that an image (5760×1440 pixels; horizontal-to-vertical ratio=12:3) generated using three imaging devices 1101, 135, and 136 is stored in the image memory 170. Moreover, it is assumed that an image (vertical size: 180 pixels) of the face is included in the stored image. Furthermore, it is assumed that the image is displayed on the display section 140 (640×480 pixels; horizontal-to-vertical ratio=4:3).

As described above, when the second casing 120 is in the horizontal state, and the entire parts of the image stored in the image memory 170 are displayed on the display section 140, the image stored in the image memory 170 is subjected to resolution conversion so that the resolution thereof is decreased by a ratio of 1/9. Moreover, in this case, when the image of the face of the person 501 is displayed so as to occupy 3/4 in the vertical direction of the display region of the display section 140, the image stored in the image memory 170 is subjected to resolution conversion so that the resolution thereof is increased twice.

In the first embodiment of the present invention, as described above, the ratio of the resolution of a display target image when displaying an image (cropped image) included in a specific region to the resolution of the display target image when displaying the whole image is referred to as a "magnification ratio". Therefore, the magnification ratio of the zooming when the second casing 120 is in the horizontal state is 18.

Moreover, as described above, a case of displaying the whole image and displaying the image of the specific region in an enlarged view when the second casing 120 is in the vertical state will be considered. In this case, when the entire parts of the image stored in the image memory 170 are displayed on the display section 140, as described above, the image stored in the image memory 170 is subjected to resolution conversion so that the resolution thereof is decreased by a ratio of 1/2.25. Moreover, when displaying the image of the face of the person 501 so as to have the same size as that when the second casing 120 is in the horizontal state, as described above, the image stored in the image memory 170 is subjected to resolution conversion so that the resolution thereof is increased twice. Therefore, the magnification ratio of the zooming when the second casing 120 is in the vertical state is 4.

Moreover, a case of displaying the same subjects included in the image stored in the image memory 170 in enlarged images so that the enlarged images have the same size on the display section 140 will be considered. In this case, the magnification ratio when the second casing 120 is in the horizontal state can be made larger than the magnification ratio when the second casing 120 is in the vertical state.

[Operation Example of Mobile Phone Unit]

FIG. 86 is a flowchart showing an example of the processing procedures of a postview image display process by the mobile phone unit 100 according to the first embodiment of the present invention. In this example, an example of changing the method of displaying a postview image in accordance with whether or not a captured image recorded by the still-image recording process is a panoramic image will be described.

First, it is determined whether or not a still-image imaging mode is set (step S1501), and when the still-image imaging mode is not set, the operation of a postview image display process ends. On the other hand, when the still-image imaging mode is set (step S1501: Yes), a monitoring process is performed (step S1502). Moreover, as described above, during the monitoring process, the pixel decimation processing or the pixel addition processing may be performed.

Subsequently, it is determined whether or not a still-image recording instruction is received (step S1503), and when the still-image recording instruction is not received, the monitoring process is repeated (step S1502). On the other hand, when the still-image recording instruction is received (step S1503: Yes), the still-image recording process is performed (step S1504). Moreover, it is determined whether or not the captured image recorded by the still-image recording process is a panoramic image (step S1505). The steps S1502 to S1504 are examples of the step of generating an image as described in the claims. Moreover, the step S1504 is an example of the step of recording the image as described in the claims.

When the captured image recorded by the still-image recording process is a panoramic image (step S1505: Yes), the entire parts of the captured image (panoramic image) recorded by the still-image recording process are displayed on the display section 140 (step S1506). This panoramic image is continuously displayed for a predetermined period, for example. Moreover, after the elapse of the predetermined period, an image (enlarged image) of a specific region in the captured image (panoramic image) recorded by the still-image recording process is displayed on the display section 140 (step S1507). This enlarged image is continuously displayed for a predetermined period, for example. Moreover, after the elapse of the predetermined period, it is determined whether or not the still-image imaging mode is disabled (step S1509), and when the still-image imaging mode is disabled, the operation of the postview image display process ends. On the other hand, when the still-image imaging mode is not disabled (step S1509: No), the flow returns to step S1502.

When the captured image recorded by the still-image recording process is not a panoramic image (step S1505: No), the entire parts of the captured image recorded by the still-image recording process are displayed on the 140 (step S1508). This captured image is continuously displayed for a predetermined period, for example. Moreover, after the elapse of the predetermined period, the flow proceeds to step S1509.

FIG. 87 is a flowchart showing an example of the processing procedures of a postview image display process by the mobile phone unit 100 according to the first embodiment of the present invention. This processing procedure is a modification of the example shown in FIG. 86, and the order of the step of displaying the entire parts of the panoramic image and the step of displaying the enlarged image thereof is different. Since the other portions are the same as those of FIG. 86, the same steps as those of FIG. 86 will be denoted by the same reference numerals, and description thereof will be omitted.

When the captured image recorded by the still-image recording process is a panoramic image (step S1505: Yes), an image (enlarged image) of a specific region in the captured image (panoramic image) recorded by the still-image recording process is displayed on the display section 140 (step S1507). This enlarged image is continuously displayed for a predetermined period, for example. Moreover, after the elapse of the predetermined period, the entire parts of the captured image (panoramic image) recorded by the still-image recording process are displayed on the display section 140 (step S1506). This panoramic image is continuously displayed for a predetermined period, for example.

Figure 88:
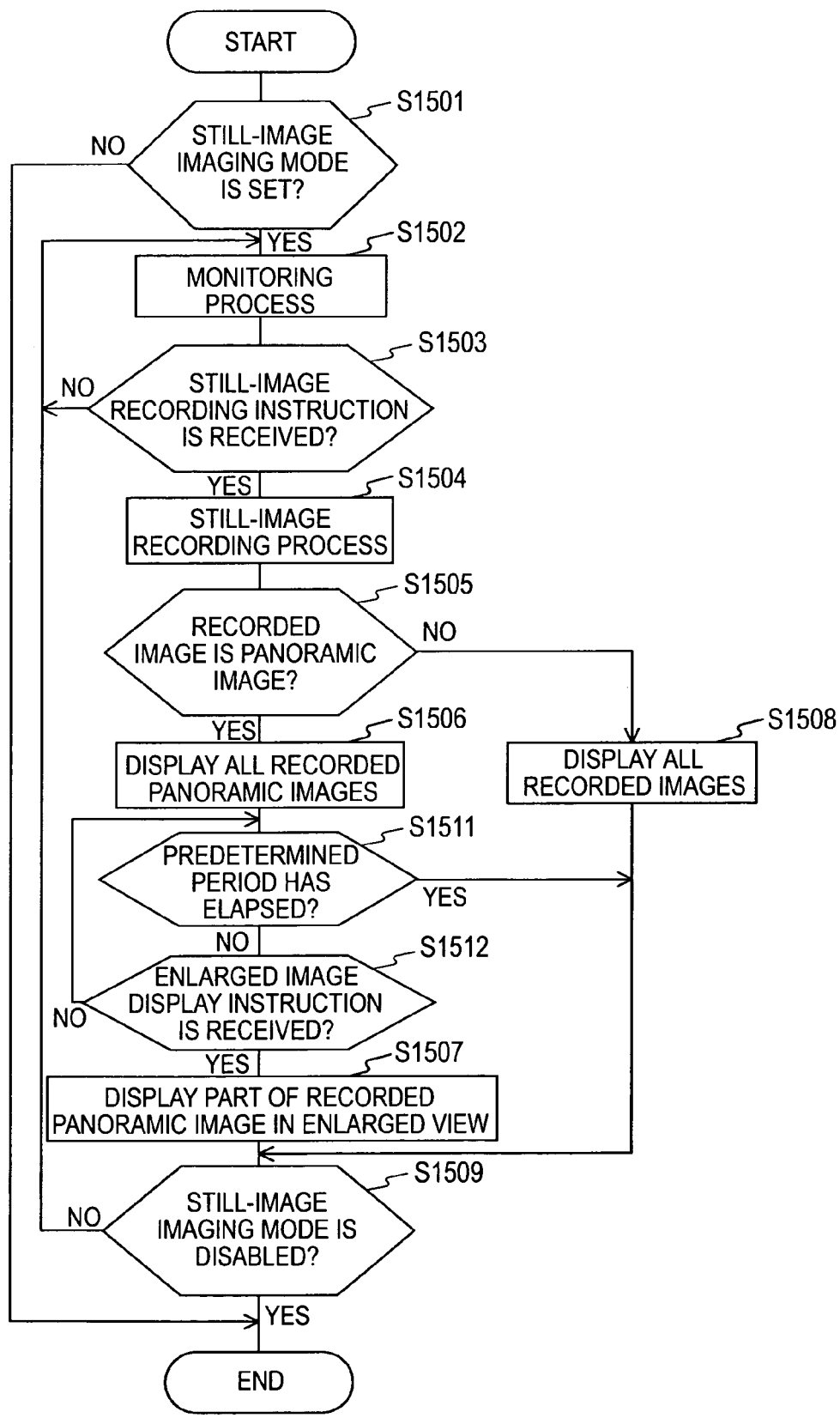
FIG. 88 is a flowchart showing an example of the processing procedures of a postview image display process by the mobile phone unit 100 according to the first embodiment of the present invention.

FIG. 88 is a flowchart showing an example of the processing procedures of a postview image display process by the mobile phone unit 100 according to the first embodiment of the present invention. This processing procedure is a modification of the example shown in FIG. 86, and the method of displaying the enlarged image of the panoramic image is different. Since the other portions are the same as those of FIG. 86, the same steps as those of FIG. 86 will be denoted by the same reference numerals, and description thereof will be omitted.

After the entire parts of the captured image (panoramic image) recorded by the still-image recording process are displayed on the display section 140 (step S1506), it is determined whether or not a predetermined period has elapsed (step S1511). When the predetermined period has elapsed (step S1511: Yes), the flow proceeds to step S1509. On the other hand, when the predetermined period has not elapsed (step S1511: No), it is determined whether or not an enlarged image display instruction is received (step S1512).

When the enlarged image display instruction is not received (step S1512: No), the flow returns to step S1511. On the other hand, when the enlarged image display instruction is received (step S1512: Yes), an image (enlarged image) of a specific region in the captured image (panoramic image) recorded by the still-image recording process is displayed on the display section 140 (step S1507). This enlarged image is continuously displayed for a predetermined period, for example.

Figure 89:
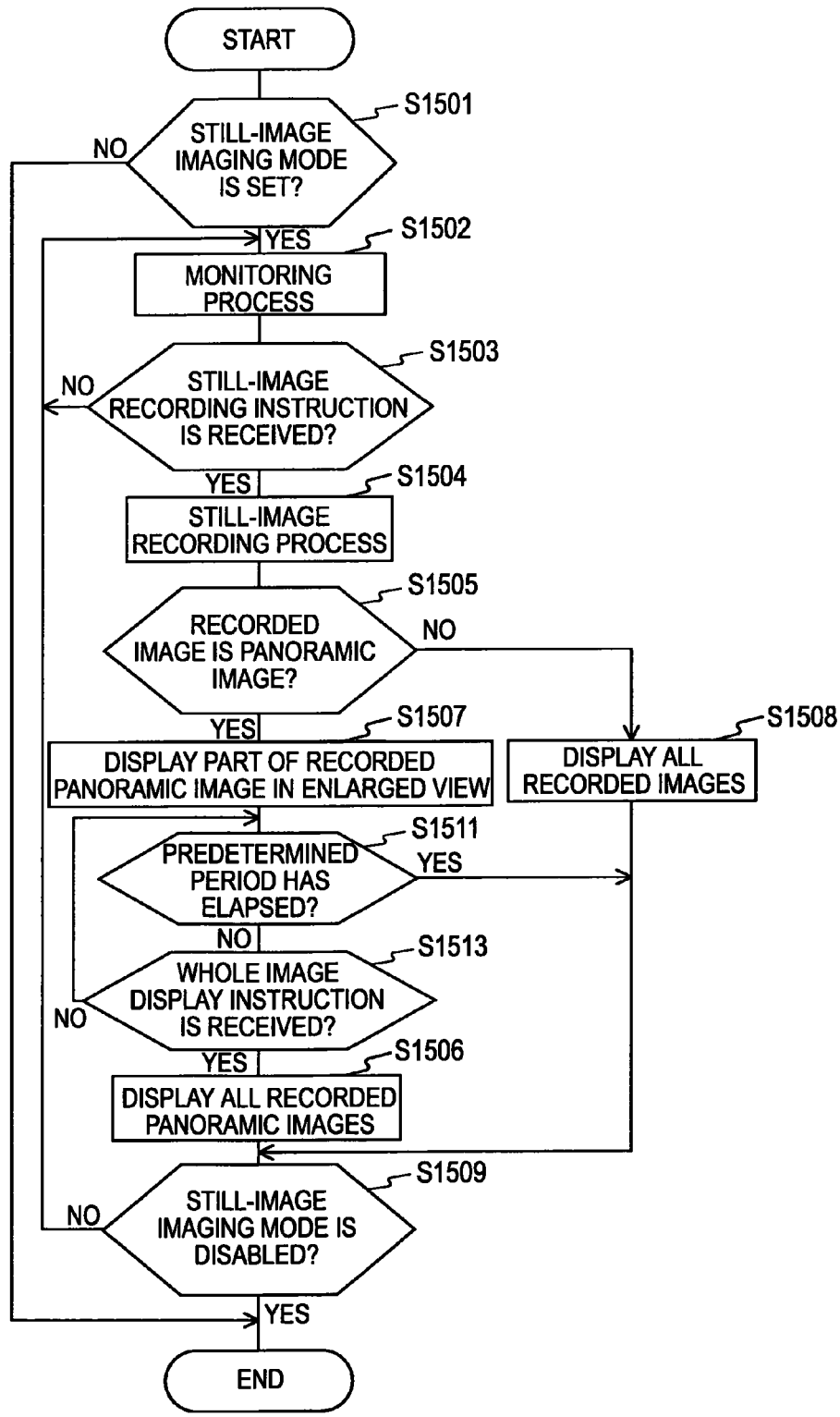
FIG. 89 is a flowchart showing an example of the processing procedures of a postview image display process by the mobile phone unit 100 according to the first embodiment of the present invention.

FIG. 89 is a flowchart showing an example of the processing procedures of a postview image display process by the mobile phone unit 100 according to the first embodiment of the present invention. This processing procedure is a modification of the example shown in FIG. 88, and the order of the step of displaying the entire parts of the panoramic image and the step of displaying the enlarged image thereof is different. Since the other portions are the same as those of FIG. 88, the same steps as those of FIG. 88 will be denoted by the same reference numerals, and description thereof will be omitted.

After an image (enlarged image) of a specific region in the captured image (panoramic image) recorded by the still-image recording process is displayed on the display section 140 (step S1507), it is determined whether or not a predetermined period has elapsed (step S1511). When the predetermined period has elapsed (step S1511: Yes), the flow proceeds to step S1509. On the other hand, when the predetermined period has not elapsed (step S1511: No), it is determined whether or not a whole image display instruction is received (step S1513).

When the whole image display instruction is not received (step S1513: No), the flow returns to step S1511. On the other hand, when the whole image display instruction is received (step S1513: Yes), the entire parts of the captured image (panoramic image) recorded by the still-image recording process are displayed on the display section 140 (step S1506). This panoramic image is continuously displayed for a predetermined period, for example.

Figure 90:
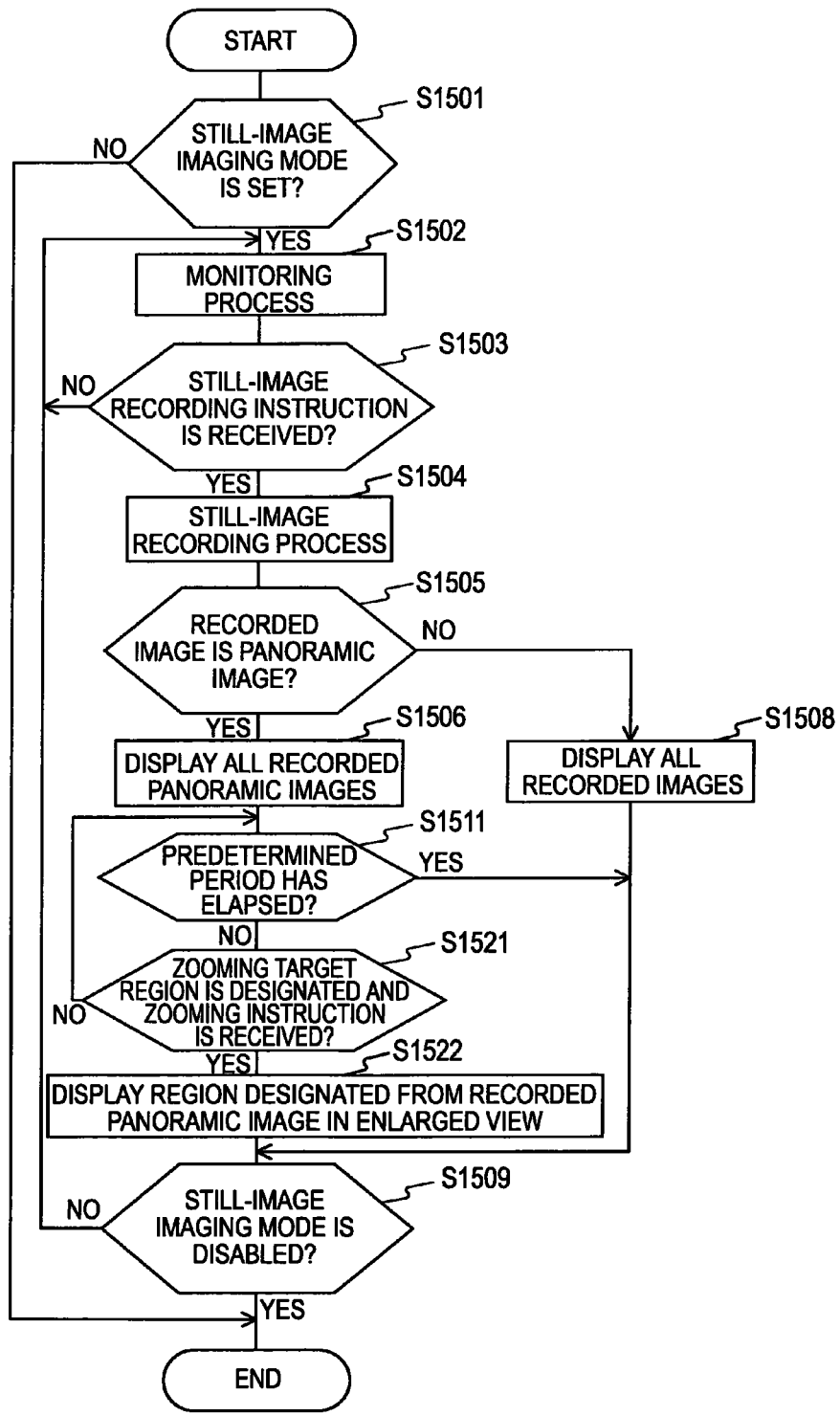
FIG. 90 is a flowchart showing an example of the processing procedures of a postview image display process by the mobile phone unit 100 according to the first embodiment of the present invention.

FIG. 90 is a flowchart showing an example of the processing procedures of a postview image display process by the mobile phone unit 100 according to the first embodiment of the present invention. This processing procedure is a modification of the example shown in FIG. 88, and the method of displaying the enlarged image of the panoramic image is different. Since the other portions are the same as those of FIG. 88, the same steps as those of FIG. 88 will be denoted by the same reference numerals, and description thereof will be omitted.

After the entire parts of the captured image (panoramic image) recorded by the still-image recording process are displayed on the display section 140 (step S1506), it is determined whether or not a predetermined period has elapsed (step S1511). When the predetermined period has not elapsed (step S1511: No), it is determined whether or not a designation operation of designating a region to be displayed as an enlarged image and a display instruction to display the region in an enlarged view are received (step S1521).

When the designation operation and the display instruction are not received (step S1521: No), the flow returns to step S1511. On the other hand, when the designation operation and the display instruction are received (step S1521: Yes), an enlarged image of a designated region (a designated region selected by the user) in the captured image (panoramic image) recorded by the still-image recording process is displayed on the display section 140 (step S1522). This enlarged image is continuously displayed for a predetermined period, for example.

In the first embodiment of the present invention, although the case of displaying the postview image immediately after photographing has been described, the same can be applied to the case of reproducing still images. For example, when a still-image reproduction instruction is input, and still images are sequentially displayed one by one, it is determined whether or not a display target image is a panoramic image based on the attribute information included in the image file. Moreover, when the display target image is a normal image, only the image is displayed. On the other hand, the display target image is a panoramic image, as described above, the panoramic image and the enlarged image of the specific region thereof are displayed in a correlated manner. In this way, when reproducing one or plural still images, a normal still image is displayed as it is, and a panoramic image is displayed so as to be correlated with the enlarged image of the specific region of the panoramic image. Therefore, the reproduced still images can be viewed easily. In this way, according to the first embodiment of the present invention, it is possible to provide an appropriate representation in accordance with the kind of a captured image.

2. Second Embodiment

In the first embodiment of the present invention, an example in which when displaying a postview image, a captured image and an enlarged image of a part thereof are displayed in a correlated manner has been described. Here, for example, the enlarged image of the panoramic image is an image included in a partial region of the panoramic image. Therefore, for example, when the enlarged image is displayed, the user may want to display the surrounding image of the enlarged image of the panoramic image. In such a case, it is possible to display the enlarged image of a desired region by moving a display target region of the enlarged image with the user operation. However, since the panoramic image is long in a specific direction (for example, the horizontal direction), when the enlarged image being displayed presently is the central portion of the panoramic image, and the desired region is the end portion in the specific direction, it is expected that the user has to perform a lot of operations. Therefore, in the second embodiment of the present invention, an example of making the operation of moving a zooming target region easy when displaying a predetermined region of the panoramic image in an enlarged view will be described.

The process of recording image data in the recording medium 180 and the process of displaying the entire parts of the panoramic image on the display section 140 and displaying a partial image thereof in an enlarged view at the time of displaying the postview image are the same as those of the first embodiment of the present invention. Thus, detailed description thereof will be omitted. The internal configuration and the functional configuration of the second embodiment of the present invention are the same as those of the first embodiment of the present invention. Therefore, the same portions as those of the first embodiment of the present invention will be denoted by the same reference numerals, and description thereof will be omitted. In the second embodiment of the present invention, a case of reproducing still images using the mobile phone unit 100 will be described as an example.

Here, a method of displaying the entire parts of a reproduction target still image on the display section 140 when reproducing still images using the mobile phone unit 100 will be described. When displaying still images (image files) recorded in the recording medium 180 on the display section 140, the still images recorded in the recording medium 180 are input to the encoding/decoding section 252 through the recording medium I/F 253 and decoded by the encoding/decoding section 252. The decoded images are stored in the image memory 170. The images stored in the image memory 170 in this way are displayed on the display section 140 in accordance with the user operation. Since the displaying method during the reproducing operation is approximately the same as the postview displaying method during the still-image recording operation, detailed description thereof will be omitted.

[Display Example of Image Zooming Setting Screen]

Figure 92A:
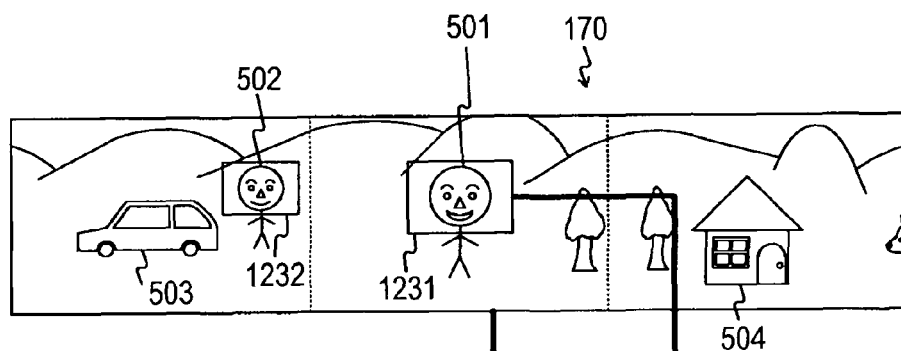
FIGS. 92A to 92C are diagrams schematically showing the relationship between an image stored in the image memory 170 and an image displayed on the display section 140 according to the second embodiment of the present invention.
Figure 92B:
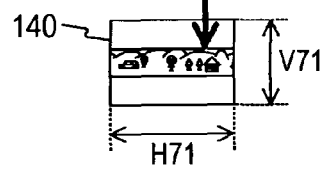

FIGS. 91A and 92B are diagrams showing a display example of an image zooming setting screen (setting screens 1300 and 1310) of the display section 140 according to the second embodiment of the present invention. These setting screens are screens for setting the displaying method when displaying an image of a specific region of an image (still image) in an enlarged view.

FIG. 91A shows a setting screen 1300 for designating a specific region in a display target image. In the setting screen 1300, a plurality of operation buttons 1301 to 1304 for designating a specific region of the display target image are provided. The setting screen 1300 is displayed on the display section 140 when the user inputs a predetermined operation, for example. Since these respective operation buttons 1301 to 1304 are approximately the same as the operation buttons 1201 to 1204 shown in FIG. 77A, detailed description thereof will be omitted.

When a determination operation (for example, an operation of pressing the OK key 114) is input after any one of the respective operation buttons is pressed, the content corresponding to the pressed operation button is determined as the setting content.

FIG. 91B shows a setting screen 1310 for designating the magnification ratio of an image of a specific region to be displayed. In the setting screen 1310, a pulldown button 1311 is provided. When the pulldown button 1311 is pressed, a list of magnification ratios such as "2.0", "4.0", and "9.0" is displayed. The user can select a desired magnification ratio from the list of magnification ratios being displayed. Although this example shows an example in which the user selects a desired magnification ratio from the list of magnification ratios, the user may manually input the desired magnification ratio.

When a determination operation (for example, an operation of pressing the OK key 114) is input after the magnification ratio selection operation is performed, the selected magnification ratio is determined as the setting content. When the user does not want to designate any particular magnification ratio, a predetermined magnification ratio is used.

[Display Example of Panoramic Image]

Figure 92C:
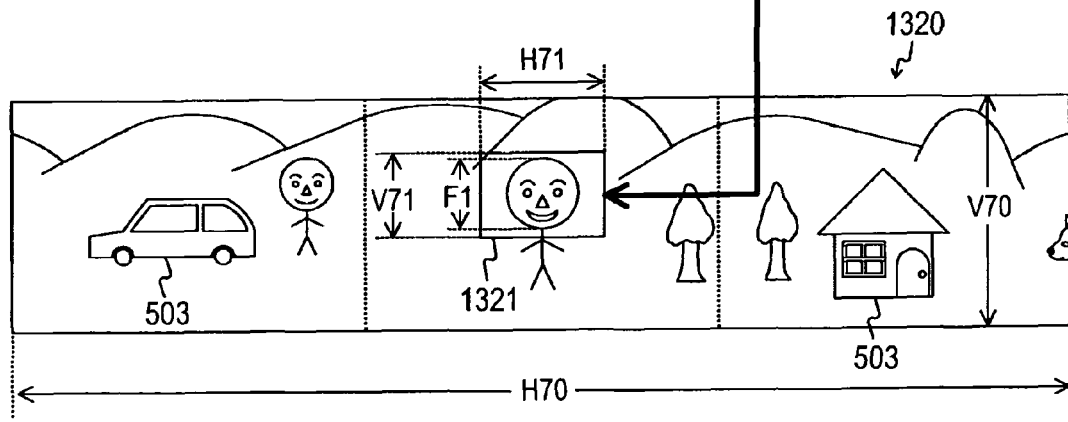

FIGS. 92A to 92C are diagrams schematically showing the relationship between an image stored in the image memory 170 and an image displayed on the display section 140 according to the second embodiment of the present invention. FIG. 92A schematically shows a state in which the image data (panoramic images) generated using three imaging devices 1101, 135, and 136 are stored in the image memory 170. In this example, a case in which an image having 5760×1440 pixels (horizontal-to-vertical ratio=12:3) is stored in the image memory 170, and a face (vertical size: 180 pixels) is included in the image will be described as an example.

FIG. 92B shows a state in which the image stored in the image memory 170 in the state shown in FIG. 92A is displayed on the display section 140 oriented in the horizontal state. In this example, it is assumed that the vertical length (vertical width) of the display region of the display section 140 is V71, and the horizontal length (horizontal width) is H71.

FIG. 92C shows a state in which an image included in a region (rectangular region 1231) including the face of the person 501 in the image stored in the image memory 170 in the state shown in FIG. 92A is displayed on the display section 140 oriented in the horizontal state. This example shows an image 1320 stored in the image memory 170, and the outline of an image region displayed on the display section 140 is depicted by a rectangle 1321, and the other images other than the image displayed on the display section 140 are also shown outside the rectangle 1321. Moreover, it is assumed that the vertical length (vertical width) of the image 1320 is V70, and the horizontal length (horizontal width) is H70.

As shown in FIG. 92C, when the image included in the region (the rectangular region 1231) including the face of the person 501 is displayed on the display section 140, the image read out from the image memory 170 is subjected to resolution conversion in accordance with the set magnification ratio. In this example, a case in which the image (face image) including the face of the person 501 is displayed so as to occupy 3/4 in the vertical direction of the display section 140 having 640×480 pixels (horizontal-to-vertical ratio=4:3) will be described as an example. In this case, among the images stored in the image memory 170, the image data of a rectangular region (320×240 pixels; horizontal-to-vertical ratio=4: 3) around the face of the person 501 are read out. Moreover, the resolution of the readout image is increased twice, whereby a display target image (640×480 pixels; horizontal-to-vertical ratio=4:3) is generated. In this way, the face image of the person 501 having a vertical size of 180 pixels in the image data stored in the image memory 170 is changed to an image having a vertical size of 360 pixels in the display target image. The image (an image inside the rectangle 1321) generated in this way is displayed on the display section 140.

Figure 93A:
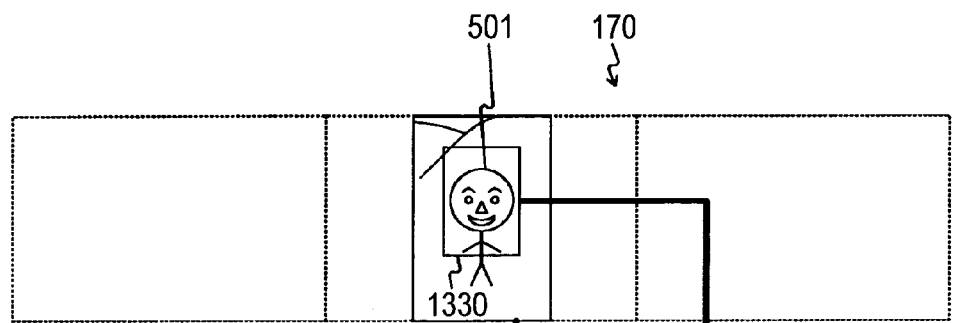
FIGS. 93A to 93C are diagrams schematically showing the relationship between an image stored in the image memory 170 and an image displayed on the display section 140 according to the second embodiment of the present invention.
Figure 93B:
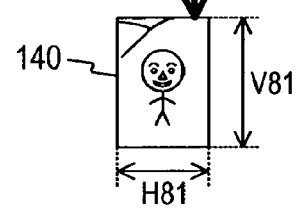
Figure 93C:
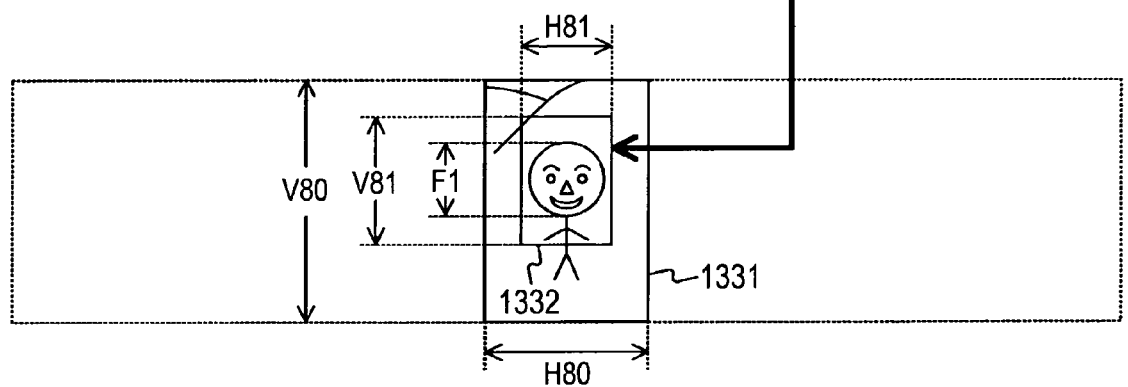

FIGS. 93A to 93C are diagrams schematically showing the relationship between an image stored in the image memory 170 and an image displayed on the display section 140 according to the second embodiment of the present invention. FIG. 93A schematically shows a state in which the image data generated using the central region (1080×1440 pixels) of one imaging device 1101 (1920×1440 pixels) are stored in the image memory 170. In this example, a case in which an image having 1080×1440 pixels (horizontal-to-vertical ratio=3:4) is stored in the image memory 170, and a face (vertical size: 180 pixels) is included in the image will be described as an example.

FIG. 93B shows a state in which the image stored in the image memory 170 in the state shown in FIG. 93A is displayed on the display section 140 oriented in the vertical state. In this example, it is assumed that the vertical length (vertical width) of the display region of the display section 140 is V81, and the horizontal length (horizontal width) is H81. The vertical width V71 shown in FIGS. 92A to 92C has the same value as H81, and the horizontal width H71 has the same value as V81.

FIG. 93C shows a state in which an image included in a region (rectangular region 1330) including the face of the person 501 in the image stored in the image memory 170 in the state shown in FIG. 93A is displayed on the display section 140 oriented in the horizontal state. This example shows an image 1331 stored in the image memory 170, and the outline of an image region displayed on the display section 140 is depicted by a rectangle 1332, and the other images other than the image displayed on the display section 140 are also shown outside the rectangle 1332. Moreover, it is assumed that the vertical length (vertical width) of the image 1331 is V80, and the horizontal length (horizontal width) is H80.

As shown in FIG. 93C, when the image included in the region (the rectangular region 1232) including the face of the person 501 is displayed on the display section 140, the image read out from the image memory 170 is subjected to resolution conversion in accordance with the set magnification ratio. In this example, a case in which the image (face image) including the face of the person 501 is displayed so that the vertical size thereof becomes 360 pixels similarly to the case where the display section 140 is in the horizontal state will be described as an example. In this case, among the images stored in the image memory 170, the image data of a rectangular region (320×240 pixels; horizontal-to-vertical ratio=4: 3) around the face of the person 501 are read out. Moreover, the resolution of the readout image is increased twice, whereby a display target image (640×480 pixels; horizontal-to-vertical ratio=4:3) is generated. In this way, the face image of the person 501 having a vertical size of 180 pixels in the image data stored in the image memory 170 is changed to an image having a vertical size of 360 pixels. The image (an image inside the rectangle 1330) generated in this way is displayed on the display section 140.

In this way, it is possible to display the image including the face of the person 501 among the images stored in the image memory 170 on the display section 140 in an enlarged view. Here, when the image is displayed on the display section 140 in an enlarged view, the user may be able to view regions (for example, a surrounding image) other than the image region. In this case, the user can move the image displayed on the display section 140 in an enlarged view with a predetermined operation. For example, the user can display a zooming target region in the image 1320 shown in FIG. 92C using an operation member (for example, the cross key 115).

When the user moves the zooming target region, the image data of the zooming target region moved by the user are read out from the image memory 170. Moreover, as described above, the readout image data are subjected to resolution conversion so as to comply with the display region of the display section 140, and the resolution-converted image data are displayed on the display section 140.

Moreover, when the user wants to further enlarge the enlarged image being displayed or view a subject near the enlarged image, the user can change the display magnification of the enlarged image using an operation member.

For example, when the display magnification is changed by the user, information (display magnification information) on the changed magnification ratio is obtained, and the enlarged image is displayed based on the magnification ratio changed by the user. That is, the image data that become necessary in accordance with the changed display magnification are read-out from the image memory 170. Moreover, as described above, the readout image data are subjected to resolution conversion so as to comply with the display region of the display section 140, and the resolution-converted image data are displayed on the display section 140.

As described above, whenever, the zooming target region is moved or the display magnification is changed, the image displayed on the display section 140 is changed. This operation is repeated until the user inputs an instruction to stop displaying images.

[Movement Example of Zooming Target Region Through User Operation]

As described above, FIG. 92C shows a display example of an enlarged image (the image inside the rectangle 1321) when the display section 140 is in the vertical state. Moreover, FIG. 93C shows a display example of an enlarged image (the image inside the rectangle 1332) when the display section 140 is in the horizontal state. The enlarged images shown in FIGS. 92C and 93C are examples in which the faces (the face of the person 501) of the same subjects 500 photographed with the same magnification from the same distance are displayed on the display section 140 with the same size.

That is, FIG. 92C shows an example in which a face having a vertical width F1 (vertical size: 360 pixels) is displayed in the display region (640×480 pixels; horizontal-to-vertical ratio=4:3) of the display section 140. Moreover, FIG. 93C shows an example in which a face having a vertical width F1 (vertical size: 360 pixels) is displayed in the display region (480×640 pixels; horizontal-to-vertical ratio=3:4) of the display section 140.

Here, in the example shown in FIG. 93C, for example, when moving the zooming target region in the display section 140 to the right end of the image 1331, it is necessary to move the zooming target region by a distance of (H80-H81)/2. For example, a case in which H80=2160 pixels and H81=480 pixels, and the zooming target region is moved to the right end while shifting it by a distance corresponding to 1/2 of the horizontal width of the display region of the display section 140 by one moving operation. In this case, since (H80-H81)/2=840 pixels, the zooming target region can be moved to the right end of the image 1331 through four moving operations (960 pixels).

In contrast, in the example shown in FIG. 92C, for example, when moving the zooming target region in the display section 140 to the right end of the image 1320, it is necessary to move the zooming target region by a distance of (H70-H71)/2. For example, a case in which H70=11520 pixels and H71=640 pixels, and the zooming target region is moved to the right end while shifting it by a distance corresponding to 1/2 of the horizontal width of the display region of the display section 140 by one moving operation. In this case, since (H70-H71)/2=5440 pixels, the zooming target region can be moved to the right end of the image 1320 through seventeen moving operations. As described above, when the original image of the enlarged image is a panoramic image, it is expected that the moving operation of moving the zooming target region to a desired position needs to be performed for relatively many times, thus complicating the moving operation. Therefore, in the second embodiment of the present invention, the control amount by the moving operation is changed in accordance with the kind of the original image from which the enlarged image displayed on the display section 140 is cropped (for example, whether the original image is a panoramic image or not), or the state (the vertical or horizontal state) of the second casing 120.

[Movement Example of Zooming Target Region]

Figure 94A:
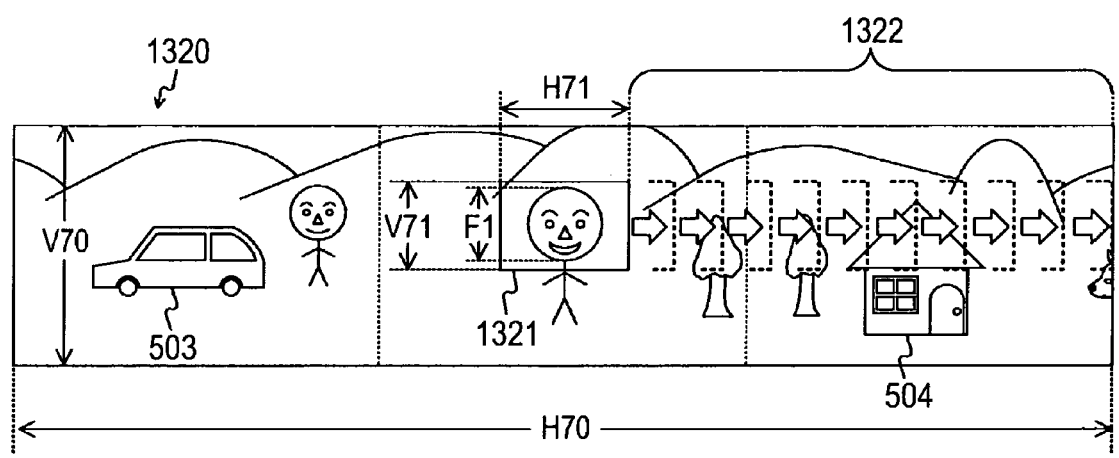
FIGS. 94A and 94B are diagrams showing the relationship between an operation input received by an operation receiving section 1470 and a zooming target region moved by the operation input according to the second embodiment of the present invention.
Figure 94B:
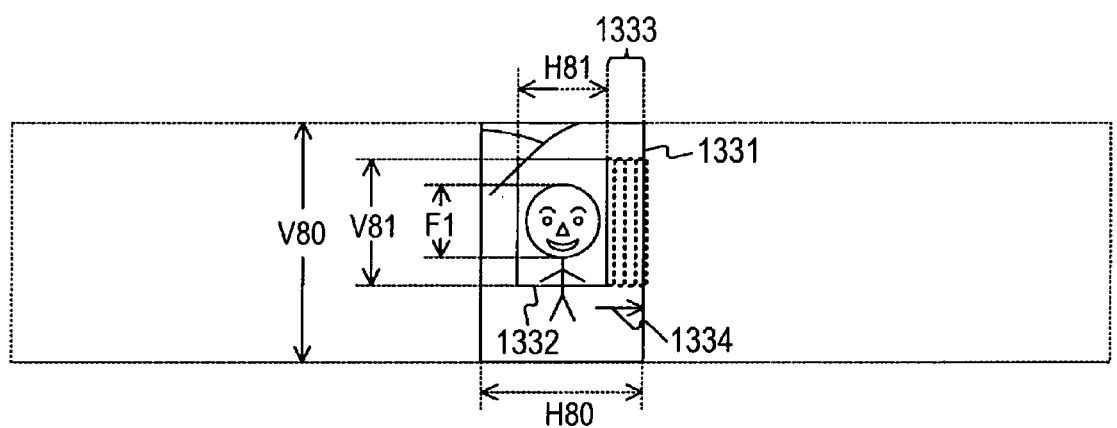

FIGS. 94A and 94B are diagrams showing the relationship between an operation input received by the operation receiving section 1470 and a zooming target region moved by the operation input according to the second embodiment of the present invention. In this example, a case in which one operation member is used in the moving operation of moving the zooming target region of the image displayed on the display section 140 will be described as an example. In this example, the cross key 115 is used as the operation member. For example, when moving the zooming target region to the right, the moving operation can be performed by pressing the right portion of the cross key 115.

FIG. 94A schematically shows the movement amount of the zooming target region by the moving operation of the user when the display section 140 is in the horizontal state. That is, this example shows a case in which the zooming target region is moved in the right-side region (a region 1322) of an image 1320 in accordance with the moving operation of the user. The image 1320 is assumed to be the same as the image 1320 shown in FIG. 92C. In this example, in the region 1322, the direction of the zooming target region moved in accordance with the moving operation of the user is depicted by empty arrows, and the transition (the transition of the right end of the zooming target region) of the zooming target region moved in accordance with one moving operation of the user is depicted by dot-line brackets. That is, it is assumed that the user performs ten moving operations when moving a zooming target region disposed at the central portion of the image 1320 to the right end of the image 1320.

For example, when H70=11520 pixels and H71=640 pixels, in order to move the zooming target region to the right end of the image 1320, it is necessary to move the zooming target region by a distance of (H70-H71)/2=5440 pixels. In this example, it is assumed that the movement amount of the zooming target region moved by one moving operation of the user is 544 pixels.

FIG. 94B schematically shows the movement amount of the zooming target region by the moving operation of the user when the display section 140 is in the vertical state. That is, this example shows a case in which the zooming target region is moved in the right-side region (a region 1333) of an image 1331 in accordance with the moving operation of the user. The image 1331 is assumed to be the same as the image 1320 shown in FIG. 93C. In this example, in the region 1331, the direction of the zooming target region moved in accordance with the moving operation of the user is depicted by arrows 1334, and the transition (the transition of the right end of the zooming target region) of the zooming target region moved in accordance with one moving operation of the user is depicted by dot-line brackets. That is, it is assumed that the user performs four moving operations when moving a zooming target region disposed at the central portion of the image 1331 to the right end of the image 1331.

For example, when H80=2160 pixels and H81=480 pixels, in order to move the zooming target region to the right end of the image 1331, it is necessary to move the zooming target region by a distance of (H80-H81)/2=840 pixels. In this example, it is assumed that the movement amount of the zooming target region moved by one moving operation of the user is 240 pixels.

As shown in FIGS. 94A and 94B, the magnitude of the movement amount of the zooming target region by one moving operation of the user when the display section 140 is in the horizontal state is made larger than that when the display section 140 is in the vertical state. That is, the number of pixels over which the zooming target region is moved by one moving operation when the display section 140 is in the horizontal state is made lager than the number of pixels over which the zooming target region is moved by one moving operation when the display section 140 is in the vertical state.

Moreover, the ratio of the movement amount of the zooming target region by one moving operation to the width of the zooming target region when the display section 140 is in the horizontal state may be made larger than the ratio of the movement amount of the zooming target region by one moving operation to the width of the zooming target region when the display section 140 is in the vertical state.

Moreover, although this example shows a case in which the movement amount of the zooming target region by the moving operation is changed in accordance with whether the display section 140 is in the horizontal state or the vertical state, the movement amount may be changed based on the aspect ratio of a display target image. For example, when the aspect ratio of a display target image (an image stored in the image memory 170) is different from the aspect ratio of the display region of the display section 140, the movement amount of the zooming target region by the moving operation for the display target image may be changed. Moreover, when the aspect ratio of a display target image (an image stored in the image memory 170) exceeds a predetermined reference, the movement amount of the zooming target region by the moving operation for the display target image may be changed.

Although in this example, the cross key 115 is used as the operation member, other operation members may be used. For example, some keys of the number pad 113 may be correlated to respective movement directions, so that when the key of the number pad 113 correlated to a desired movement direction is pressed, the moving operation is performed.

When the display section is configured by a touch panel, the moving operation may be performed by an operation of dragging or tapping on the touch panel in a desired movement direction, for example.

[Moving Operation Example of Zooming Target Region Using Plural Operation Members]

In FIGS. 94A and 94B, an example of performing a moving operation of moving the zooming target region using one operation member was described. Here, for example, the mobile phone unit 100 is provided with a plurality of operation members such as the number pad 114, the cross key 115, and the like. Therefore, by using these operation members in collaboration, the moving operation desired by the user can be made easier. This example shows an example of moving the zooming target region using a plurality of operation members.

Figure 95A:
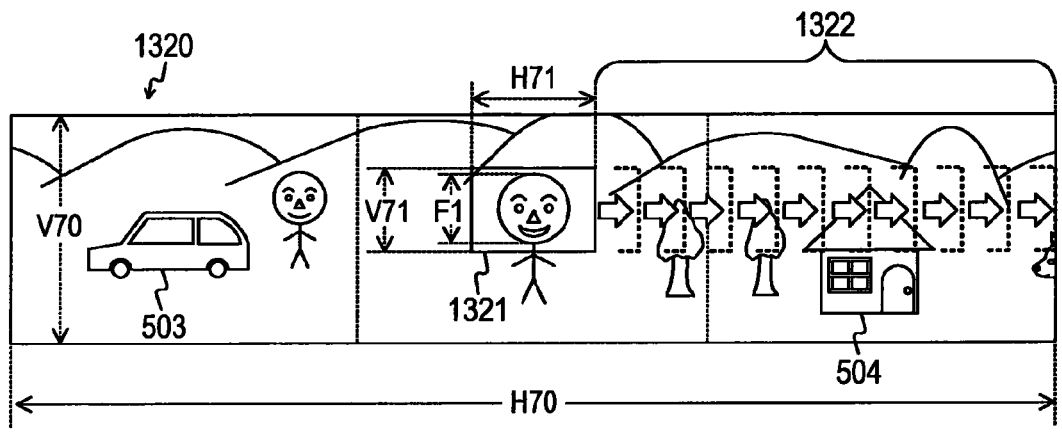
FIGS. 95A to 95C are diagrams showing the relationship between an operation input received by an operation receiving section 1470 and a zooming target region moved by the operation input according to the second embodiment of the present invention.
Figure 95B:
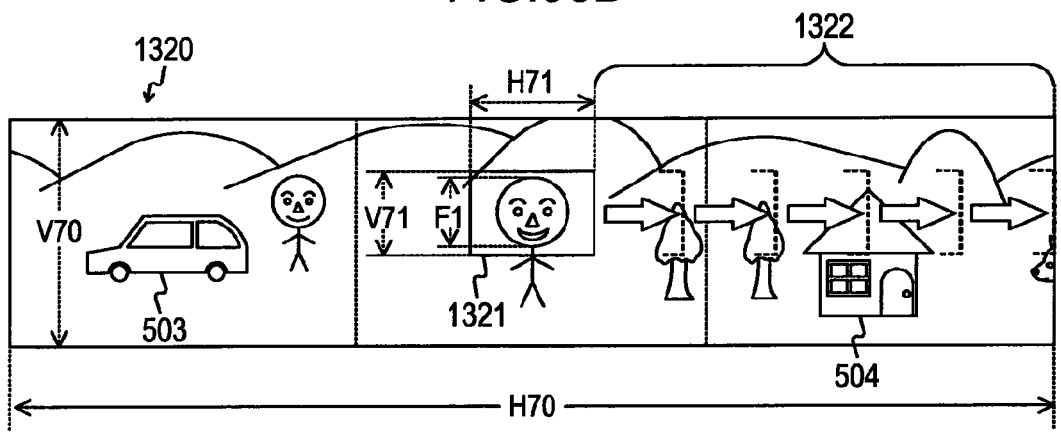
Figure 95C:
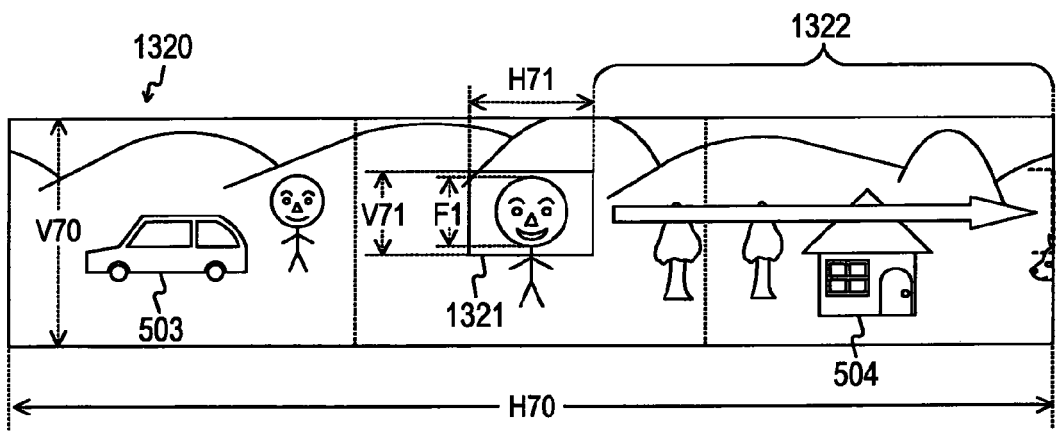

FIGS. 95A to 95C are diagrams showing the relationship between an operation input received by the operation receiving section 1470 and a zooming target region moved by the operation input according to the second embodiment of the present invention. This example shows a transition example of the display target image when the display section 140 is in the horizontal state.

FIG. 95A schematically shows the movement amount of the zooming target region by the moving operation of the user using one operation member. The example shown in FIG. 95A is the same as the example shown in FIG. 94A. Therefore, description thereof will be omitted.

FIG. 95B schematically shows the movement amount of the zooming target region by the moving operation of the user using two operation members. The example shown in FIG. 95B is a modification of the example shown in FIG. 94A. Therefore, the same portions as those of the example shown in FIG. 94A will be denoted by the same reference numerals, and detailed description thereof will be omitted.

Here, an example of using a predetermined key (for example, "0" key) of the number pad 113 and the cross key 115 as the two operation members will be described. For example, when moving the zooming target region to the right, the right portion of the cross key 115 is pressed in a state where the predetermined key of the number pad 113 is pressed (second operation method). When the right portion of the cross key 115 is pressed in a state where the predetermined key of the number pad 113 is not pressed (first operation method), for example, the zooming target region is moved to the right similarly to the example shown in FIG. 95A.

In the example shown in FIG. 95B, it is assumed that the user performs five moving operations when moving a zooming target region disposed at the central portion of the image 1320 to the right end of the image 1320. For example, when H70=11520 pixels and H71=640 pixels, in order to move the zooming target region to the right end of the image 1320, it is necessary to move the zooming target region by a distance of (H70−H71)/2=5440 pixels. In this example, it is assumed that the movement amount of the zooming target region moved by one moving operation of the user is 1088 pixels.

Although this example shows an example of performing the moving operation using two operation members, the moving operation shown in FIGS. 95A and 95B may be performed using one operation member and changing the operation content thereof. For example, when moving the zooming target region to the right using the cross key 115 as the operation member, the moving operation shown in FIG. 95A is performed by a short press (first operation method) on the right portion of the cross key 115. On the other hand, the moving operation shown in FIG. 95B is performed by a long press (second operation method) on the right portion of the cross key 115. Similarly, the first and second operation methods may be performed using the number pad 113 or the like.

Moreover, when the display section is configured by a touch panel, the moving operation shown in FIG. 95A is performed by a drag operation (first operation method) on the touch panel in a desired movement direction, for example. On the other hand, the moving operation shown in FIG. 95B is performed by a short tap operation (second operation method) on a portion near the outer edge of the touch panel in the desired movement direction.

FIG. 95C schematically shows the movement amount of the zooming target region by the moving operation of the user using three operation members. The example shown in FIG. 95C is a modification of the example shown in FIG. 94A. Therefore, the same portions as those of the example shown in FIG. 94A will be denoted by the same reference numerals, and detailed description thereof will be omitted.

Here, an example of using two predetermined keys (for example, "0" and "8" keys) of the number pad 113 and the cross key 115 as the three operation members will be described. For example, when moving the zooming target region to the right, the right portion of the cross key 115 is pressed in a state where the two predetermined keys of the number pad 113 are pressed (third operation method). When the right portion of the cross key 115 is pressed in a state where none of the two predetermined keys of the number pad 113 is pressed (first operation method), for example, the zooming target region is moved to the right similarly to the example shown in FIG. 95A. Moreover, the right portion of the cross key 115 is pressed in a state where one of the two predetermined keys of the number pad 113 is pressed (second operation method), for example, the zooming target region is moved to the right similarly to the example shown in FIG. 95B.

In the example shown in FIG. 95C, it is assumed that the user performs one moving operation when moving a zooming target region disposed at the central portion of the image 1320 to the right end of the image 1320. For example, when H70=11520 pixels and H71=640 pixels, in order to move the zooming target region to the right end of the image 1320, it is necessary to move the zooming target region by a distance of (H70−H71)/2=5440 pixels. In this example, it is assumed that the movement amount of the zooming target region moved by one moving operation of the user is 5440 pixels.

Although this example shows an example of performing the moving operation using three operation members, the moving operation shown in FIGS. 95A and 95B may be performed using one or plural operation members and changing the operation content thereof. In this example, an example of using the number pad 113 and the cross key 115 as the operation members will be described. For example, when moving the zooming target region to the right, the moving operation shown in FIG. 95A is performed by a short press (first operation method) on the right portion of the cross key 115. On the other hand, the moving operation shown in FIG. 95B is performed by a long press (second operation method) on the right portion of the cross key 115. Moreover, the moving operation shown in FIG. 95C is performed by a short press (third operation method) on the right portion (for example, "6" key) of the number pad 113. Similarly, the first to third operation methods may be performed using other operation members.

Moreover, when the display section is configured by a touch panel, the moving operation shown in FIG. 95A is performed by a drag operation (first operation method) on the touch panel in a desired movement direction, for example. On the other hand, the moving operation shown in FIG. 95B is performed by a short tap operation (second operation method) on a portion near the outer edge of the touch panel in the desired movement direction. Furthermore, the moving operation shown in FIG. 95C is performed by a long tap operation (third operation method) on a portion near the outer edge of the touch panel in the desired movement direction.

That is, the number of pixels over which the zooming target region is moved by the first operation method when the display section 140 is in the horizontal state is made lager than the number of pixels over which the zooming target region is moved by the first operation method when the display section 140 is in the vertical state. Moreover, the number of pixels over which the zooming target region is moved by the second operation method when the display section 140 is in the horizontal state is made lager than the number of pixels over which the zooming target region is moved by the second operation method when the display section 140 is in the vertical state. Furthermore, the number of pixels over which the zooming target region is moved by the third operation method when the display section 140 is in the horizontal state is made lager than the number of pixels over which the zooming target region is moved by the third operation method when the display section 140 is in the vertical state.

Moreover, the number of pixels over which the zooming target region is moved by the second operation method is made lager than the number of pixels over which the zooming target region is moved by the first operation method. Furthermore, the number of pixels over which the zooming target region is moved by the third operation method is made lager than the number of pixels over which the zooming target region is moved by the second operation method.

Moreover, the movement amount may be changed based on the ratio of the movement amounts moved by the respective operation methods to the width of the zooming target region. That is, the ratio of the movement amount of the zooming target region by the first operation method to the width of the zooming target region when the display section 140 is in the horizontal state may be made larger than the ratio of the movement amount of the zooming target region by the first operation method to the width of the zooming target region when the display section 140 is in the vertical state. Moreover, the ratio of the movement amount of the zooming target region by the second operation method to the width of the zooming target region when the display section 140 is in the horizontal state may be made larger than the ratio of the movement amount of the zooming target region by the second operation method to the width of the zooming target region when the display section 140 is in the vertical state. Furthermore, the ratio of the movement amount of the zooming target region by the third operation method to the width of the zooming target region when the display section 140 is in the horizontal state may be made larger than the ratio of the movement amount of the zooming target region by the third operation method to the width of the zooming target region when the display section 140 is in the vertical state.

Moreover, the ratio of the movement amount of the zooming target region by the second operation method to the width of the zooming target region may be made larger than the ratio of the movement amount of the zooming target region by the first operation method to the width of the zooming target region. Furthermore, the ratio of the movement amount of the zooming target region by the third operation method to the width of the zooming target region may be made larger than the ratio of the movement amount of the zooming target region by the second operation method to the width of the zooming target region.

Moreover, the moving operation using the first to third operation methods may be enabled only when the display section 140 is in the horizontal state, and the moving operation using only the first operation method may be enabled when the display section 140 is in the vertical state.

Although in the above examples, an example of performing the moving operation of the zooming target region using one or three operation members (first to third operation methods) has been described, the moving operation of the zooming target region may be performed using four or more operation members (four or more operation methods).

In the above examples, the case of moving the zooming target region in the horizontal direction has been described. However, the zooming target region may be moved in the vertical direction. Therefore, for example, even when moving the zooming target region in the vertical direction, the number of pixels moved by one moving operation of the zooming target region can be changed similarly to the case of moving the zooming target region in the horizontal direction. For example, the number of pixels over which the zooming target region is moved by one moving operation when the display section 140 is in the horizontal state can be made lager than the number of pixels over which the zooming target region is moved by one moving operation when the display section 140 is in the vertical state. Moreover, the ratio of the movement amount of the zooming target region by one moving operation to the width of the zooming target region when the display section 140 is in the horizontal state may be made larger than the ratio of the movement amount of the zooming target region by one moving operation to the width of the zooming target region when the display section 140 is in the vertical state.

When the display section 140 is in the horizontal state, the ratio of the number of pixels existing up to the outer edge in the vertical direction of the enlarged image to the vertical pixel count of the display section 140 is smaller than that in the horizontal direction of the enlarged image. Therefore, a small number of operations are required to move the zooming target region in the vertical direction until the outer edge in the vertical direction of the enlarged image is displayed. Therefore, in order to simplify the configuration of the mobile phone unit 100, when the operation of moving the zooming target region in the vertical direction is performed, the movement amount when the display section 140 is in the horizontal state may be made identical to the movement amount when the display section 140 is in the vertical state.

In the above examples, the case of moving the zooming target region has been described as an example. However, the zooming target region may be enlarged or reduced. Therefore, for example, when an operation of enlarging or reducing the zooming target region is performed, the magnification/reduction ratio (display magnification) enlarged or reduced by one enlarging/reducing operation can be changed similarly to the moving operation. For example, the magnification/reduction ratio enlarged or reduced by one enlarging/reducing operation when the display section 140 is in the horizontal state can be made larger than the magnification/reduction ratio enlarged or reduced by one enlarging/reducing operation when the display section 140 is in the horizontal state.

[Example of Relationship Between Pixel Shape and Pixel Count]

Here, the relationship between a pixel shape and a pixel count will be described. In the respective embodiments of the present invention, the case in which pixels (so-called square grid, pixels) of which the vertical and horizontal lengths are the same are used as the pixels that form the display section 140 has been described as an example. Therefore, an example in which when an image having a horizontal-to-vertical ratio of 4:3 is displayed on the display section 140, for example, resolution conversion is performed so that an image having 640×480 pixels is obtained has been described.

However, a case in which pixels of which the vertical and horizontal lengths are different are used as the pixels that form the display section 140 may be considered. For example, a case in which pixels of which the horizontal length of one pixel is 1/3 of the vertical length are used as the pixels that form the display section 140, and the vertical pixel count of the display section 140 is 480 pixels will be considered. In this case, in order to generate an image having a horizontal-to-vertical ratio of 4:3, it is necessary to perform resolution conversion so that image data having 1920×240 pixels are obtained.

Moreover, when the horizontal length of one pixel of an imaging device is different from the vertical length, in order to obtain image data having a desired horizontal-to-vertical ratio, it is necessary to consider the vertical and horizontal lengths of each pixel similarly to the case of the display section 140.

[Operation Example of Mobile Phone Unit]

Figure 96:
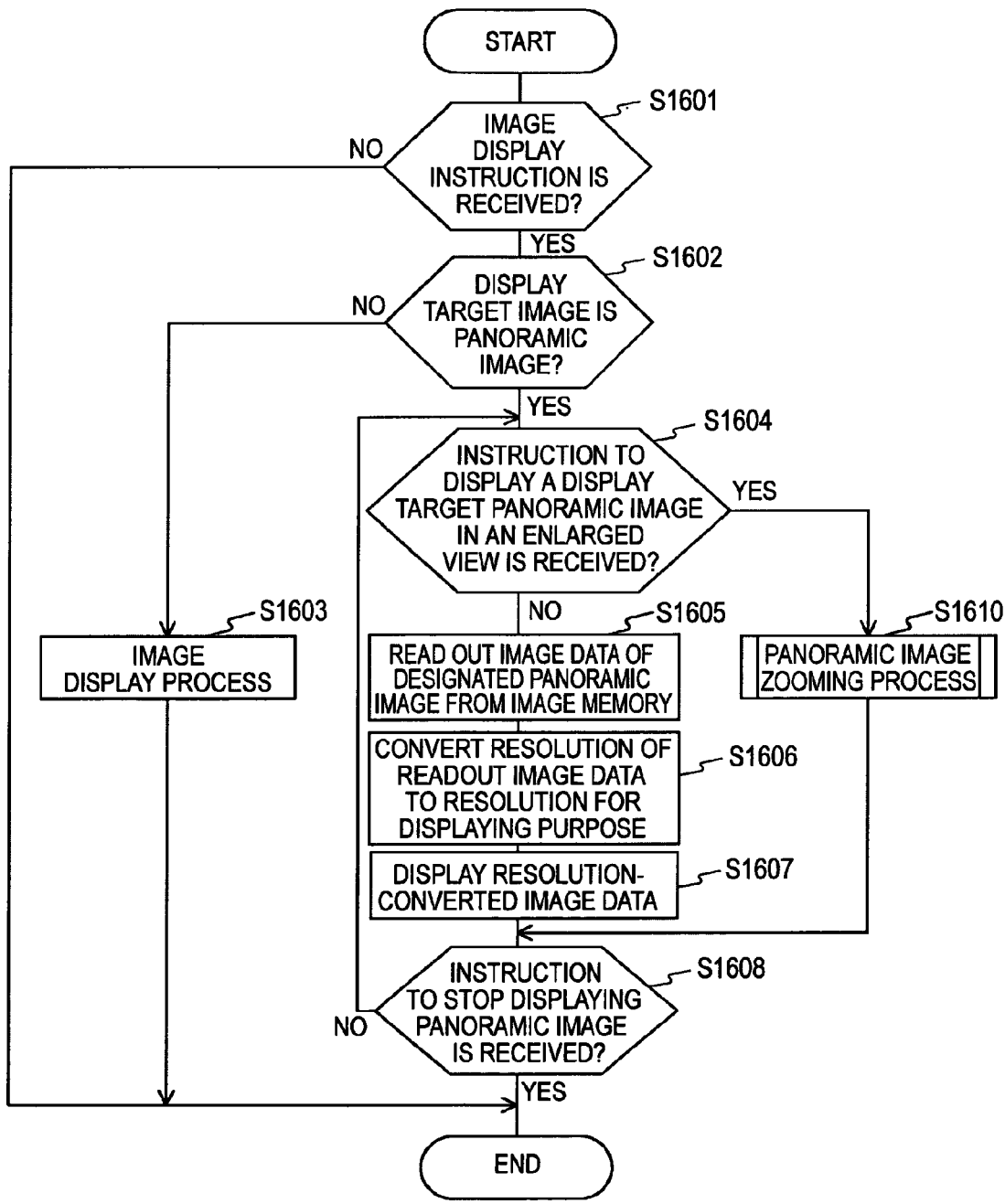
FIG. 96 is a flowchart showing an example of the processing procedures of an image display process by the mobile phone unit 100 according to the second embodiment of the present invention.

FIG. 96 is a flowchart showing an example of the processing procedures of an image display process by the mobile phone unit 100 according to the second embodiment of the present invention. In this example, a case of reproducing image files (captured images) stored in the recording medium 180 based on the user operation will be described as an example. Moreover, an example of changing a control amount relating to the respective operations (the moving operation or the display magnification changing operation) of the zooming target region in accordance with whether or not a display target captured image is a panoramic image will be described.

First, it is determined whether or not an image display instruction is received (step S1601), and when the image display instruction is not received, the operation of the image display process ends. On the other hand, when the image display instruction is received (step S1601: Yes), it is determined whether or not a display target image is a panoramic image (step S1602). When the display target image is not a panoramic image (step S1602: No), an image display process is performed (step S1603). For example, the whole image is displayed or a specific region of the image is displayed in an enlarged view in accordance with the user operation.

When the display target image is a panoramic image (step S1602: Yes), it is determined whether or not an image zooming instruction to display a display target panoramic image in an enlarged view is received (step S1604). When the image zooming instruction is received (step S1604), image data of the display target panoramic image are read out from the image memory 170 (step S1605), and the resolution of the readout image data is converted to a resolution for a recording purpose (step S1606). Then, the resolution-converted image data (captured images) are displayed on the display section 140 (step S1607).

Subsequently, it is determined whether or not an instruction to stop displaying the panoramic image is received (step S1608), when the display stop instruction is received, the operation of the image display process ends. On the other hand, when the instruction to stop displaying the panoramic image is not received (step S1608: No), the flow returns to step S1604.

When the image zooming instruction to display the display target panoramic image in an enlarged view is received (step S1604: Yes), a panoramic image zooming process is performed (step S1610). The panoramic image zooming process will be described in detail with reference to FIG. 97.

FIG. 97 is a flowchart showing an example of the panoramic image zooming process (the processing procedures of step S1610 shown in FIG. 96) among the processing procedures of the image display process by the mobile phone unit 100 according to the second embodiment of the present invention.

First, information (zooming target region information) on a specific region in the panoramic image is obtained (step S1611). As the zooming target region information, for example, the information (for example, information on captured images shown in FIG. 75C) recorded in the image file to be displayed is obtained based on the setting content set in the setting screen 1300 shown in FIG. 91A.

Subsequently, information (display magnification) on the magnification ratio for displaying the image included in a specific region is obtained (step S1612). As the display magnification information, for example, the setting content (magnification ratio) set in the setting screen 1310 shown in FIG. 91B is obtained. Although in this example, a magnification ratio designated by the user is used, a magnification ratio set in advance may be used.

Subsequently, the image data to be displayed are read out from the image memory 170 based on the obtained zooming target region information and display magnification information (step S1613), and the resolution of the readout image data is converted to a resolution for a display purpose (step S1614). Then, the resolution-converted image data (captured images) are displayed on the display section 140 (step S1615).

Subsequently, it is determined whether or not an operation of moving the zooming target region is received (step S1616). When the operation of moving the zooming target region is received (step S1616: Yes), a control amount corresponding to the moving operation is determined, and new zooming target region information is obtained based on the determined control amount (step S1617). The control amount determined in this step is set to be larger than the control amount determined based on the moving operation in step S1603 (see FIG. 96).

Moreover, when the operation of moving the zooming target region is not received (step S1616: No), it is determined whether or not a display magnification changing operation is received (step S1618). When the display magnification changing operation is received (step S1618), a control amount corresponding to the changing operation is determined, and new display magnification information is obtained based on the determined control amount (step S1619). The control amount determined in this step is set to be larger than the control amount determined based on the moving operation in step S1603 (see FIG. 96).

When the display magnification changing operation is not received (step S1618: No), it is determined whether or not an instruction to stop displaying the panoramic image in an enlarged view is received (step S1620). When the instruction to stop displaying the panoramic image is received (step S1620: Yes), the operation of the panoramic image zooming process ends. When the instruction to stop displaying the panoramic image is not received, the flow returns to step S1616.

Although in this example, an operation example of the enlarged image based on an image display instruction has been described, the same can be applied to the case of displaying a postview image at the time of photographing. For example, as described in the first embodiment of the present invention, when the captured image is a panoramic image, the panoramic image and the enlarged image of the specific region thereof can be displayed in a correlated manner. Moreover, the control amount when the respective operations (the moving operation or the display magnification changing operation) are performed for the enlarged image is made larger than that for the captured images other than the panoramic images. In this way, according to the second embodiment of the present invention, it is possible to diminish an operation load concerning captured images.

In the respective embodiments of the present invention, an example in which a plurality of images generated by multinocular photography are combined in the horizontal direction to generate an image (panoramic image) that is long in the horizontal direction has been described. However, the embodiments of the present invention can be applied to a case in which a plurality of images generated by multinocular photography are combined in the vertical direction to generate an image (panoramic image) that is long in the vertical direction.

The respective embodiments of the present invention have been mainly described by way of an example of displaying a face image including the face detected by the face detection section 282 as an enlarged image. However, the present invention can be similarly applied, for example, to a case of displaying a region detected as a focusing target region by the focusing operation of the AF control section 281 as the enlarged image.

3. Modification

Modification of Mobile Phone Unit

In this example, a modification of a mobile phone unit having a plurality of imaging systems will be described.

FIGS. 98A to 98D and FIGS. 99A to 99C are diagrams showing a modification of the mobile phone unit 100 according to the embodiment of the present invention.

Figure 98A:
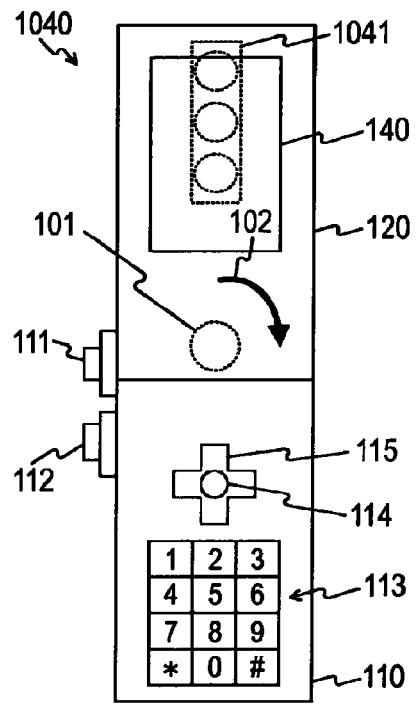
FIGS. 98A to 98D are diagrams showing a modification of the mobile phone unit 100 according to the embodiment of the present invention.
Figure 98B:
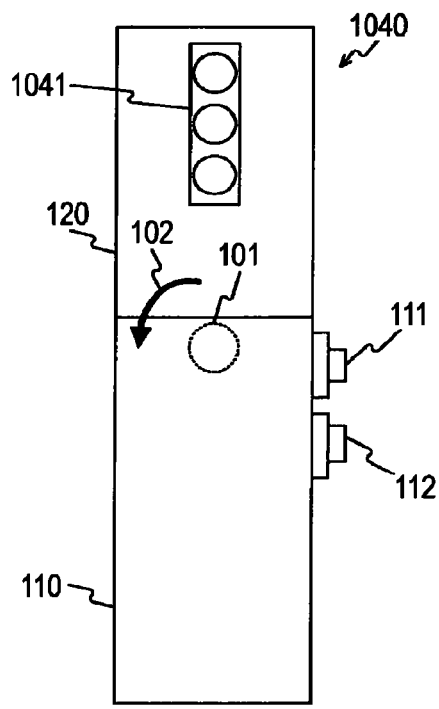
Figure 98C:
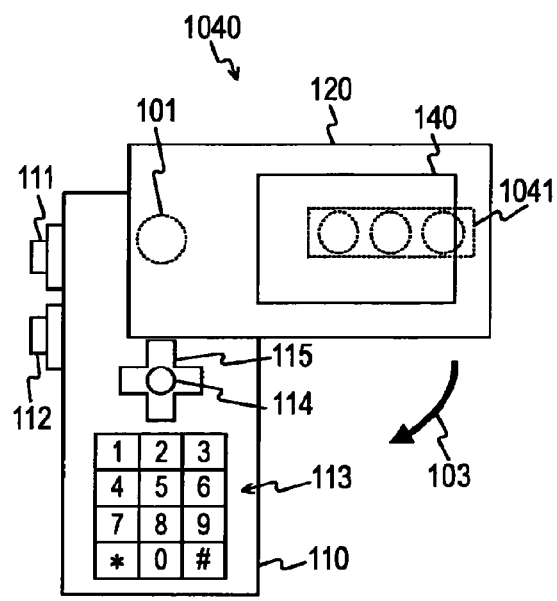
Figure 98D:
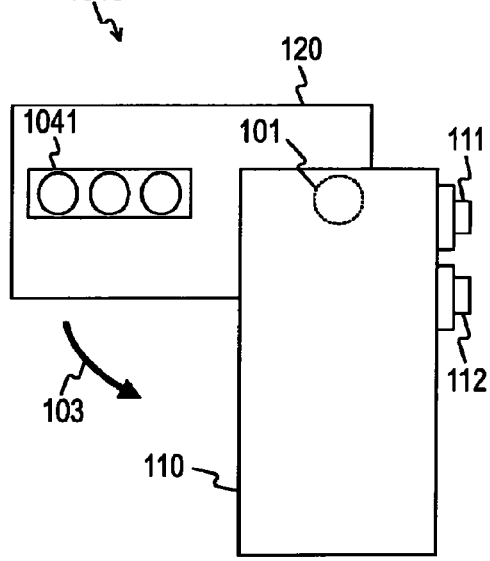

FIGS. 98A to 98D show a mobile phone unit 1040 in which a display section and an imaging section are provided in the same casing. FIG. 98A shows a front surface side in one state of using the mobile phone unit 1040 and FIG. 98B shows a rear surface side in the same state. FIG. 98C shows a front surface side in another state of using the mobile phone unit 1040 and FIG. 98D shows a rear surface side in the same state.

The mobile phone unit 1040 includes a first casing 110 and a second casing 120. The second casing 120 includes a display section 140 and an imaging section 1041. The mobile phone unit 1040 is approximately the same as the mobile phone unit 100 except that the display section and the imaging section are provided in the same casing. Therefore, the same portions as those of the mobile phone unit 100 will be denoted by the same reference numerals, and description thereof will be omitted.

The imaging section 1041 is approximately the same as the imaging section 130 provided in the mobile phone unit 100 except that the arrangement position is different. That is, in the imaging section 1041, three imaging systems are arranged in accordance with a predetermined rule, an imaging device at the center is disposed in the vertical state, and the imaging devices on the left and right sides are disposed in the horizontal state.

Figure 99A:
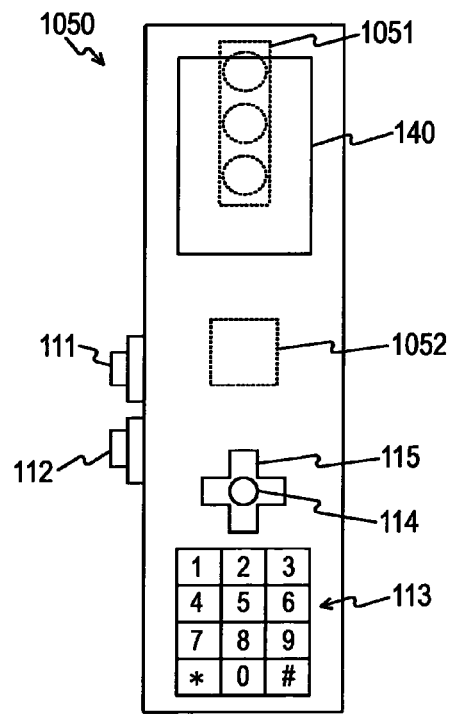
FIGS. 99A to 99C are diagrams showing a modification of the mobile phone unit 100 according to the embodiment of the present invention.
Figure 99B:
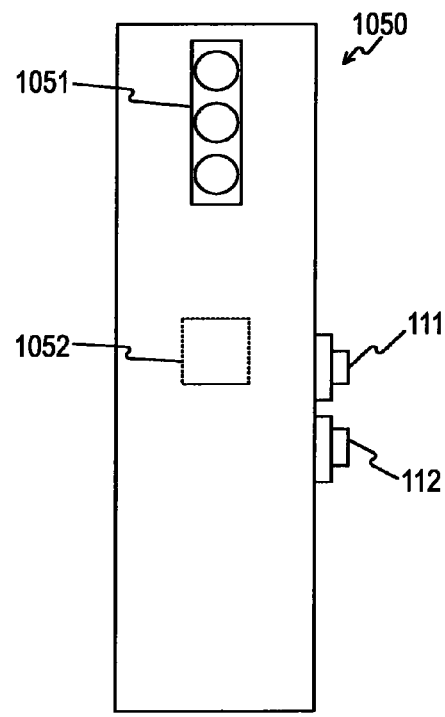
Figure 99C:
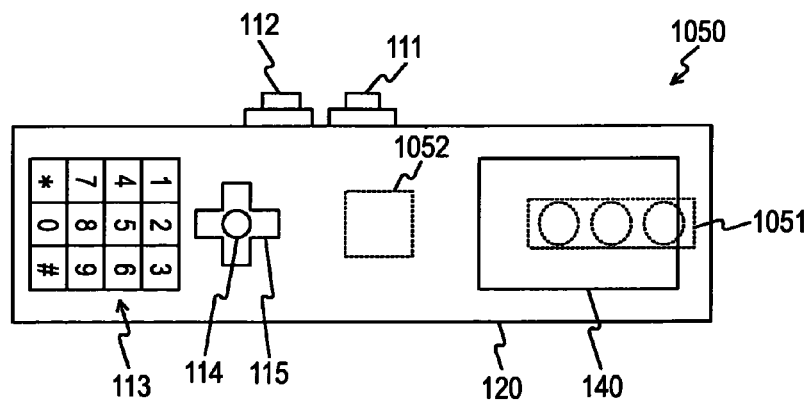

FIGS. 99A to 99C show a mobile phone unit 1050 which is made up of one casing. FIG. 99A shows a front surface side in one state of using the mobile phone unit 1050 and FIG. 99B shows a rear surface side in the same state. FIG. 99C shows a front surface side in another state of using the mobile phone unit 1050.

The mobile phone unit 1050 is made up of one casing, and includes a display section 140, an imaging section 1051, and an attitude detection section 1052. The mobile phone unit 1050 is approximately the same as the mobile phone unit 100 except that it is made up of one casing, that the attitude detection section 1052 is provided instead of the rotation state detection section 150, and that the position where the imaging section is disposed is different. Therefore, the same portions as those of the mobile phone unit 100 will be denoted by the same reference numerals, and description thereof will be omitted.

The imaging section 1051 is approximately the same as the imaging section 130 provided in the mobile phone unit 100 except that the arrangement position is different. That is, in the imaging section 1051, three imaging systems are arranged in accordance with a predetermined rule, an imaging device at the center is disposed in the vertical state, and the imaging devices on the left and right sides are disposed in the horizontal state.

The attitude detection section 1052 is incorporated into the mobile phone unit 1050 in place of the rotation state detection section 150 and is configured to detect acceleration, motion, tilt, and the like applied to the mobile phone unit 1050. For example, the attitude detection section 1052 is realized by a gyro sensor, a tilt sensor, a gravitation sensor, and the like. The respective kinds of detected information are output to the imaging control section 201 as the attitude information. The imaging control section 201 detects whether the mobile phone unit 1050 is in the horizontal state or the vertical state based on the detected attitude information. Moreover, the imaging operation is controlled based on the detected state. For example, the same imaging control as the control performed in accordance with whether the second casing of the mobile phone unit 100 is in the horizontal state or the vertical state can be performed. Moreover, the imaging control of changing the imaging range in accordance with the operation input using a predetermined operation member may be performed. As the operation input, an operation input using an operation button or a touch panel, for example, can be considered.

In this way, both the first and second embodiment of the present invention can be applied to the respective aspects of the mobile phone unit having a plurality of imaging systems. Next, an imaging apparatus such as a digital still camera or a digital video camera will be described as an example.

[External Configuration Example of Imaging Apparatus]

Figure 100A:
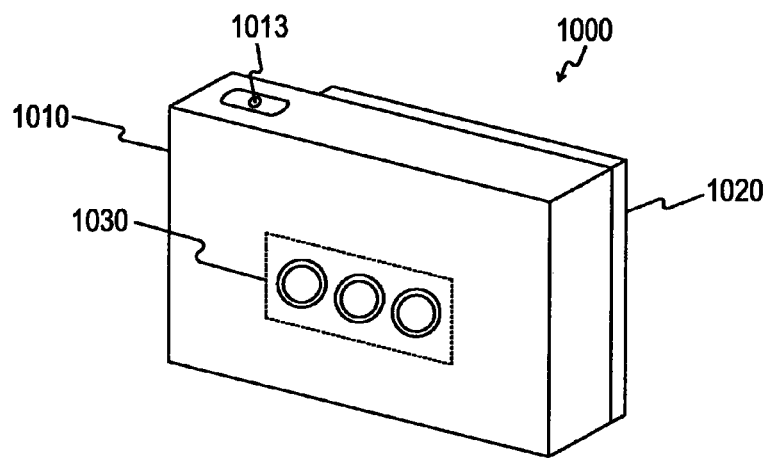
FIGS. 100A to 100C are diagrams showing an external configuration of an imaging apparatus 1000 according to the modification of the embodiment of the present invention.
Figure 100B:
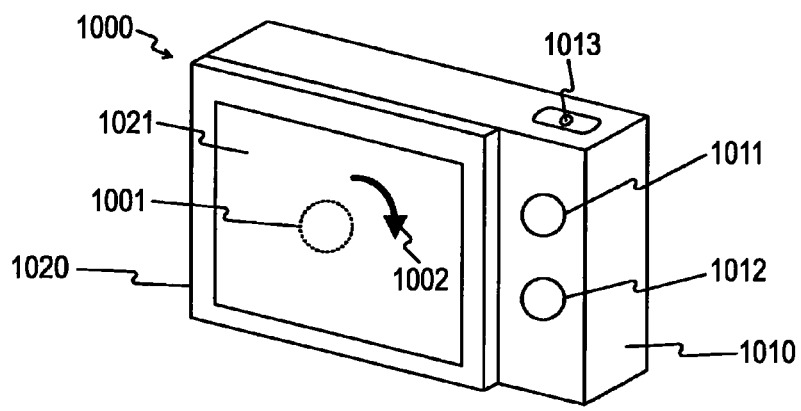
Figure 100C:
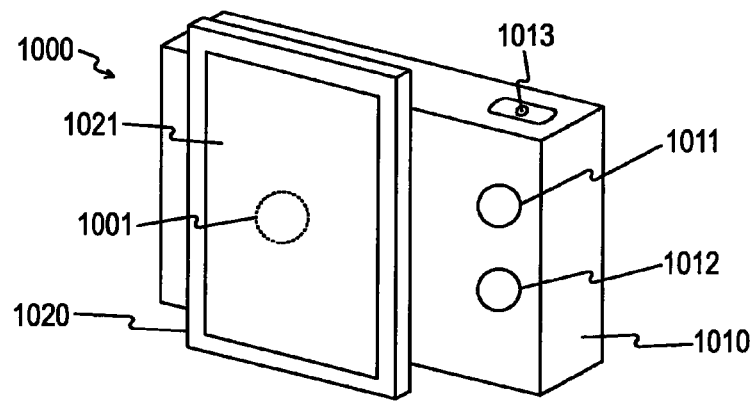

FIGS. 100A to 100C are diagrams showing an external configuration of an imaging apparatus 1000 according to the modification of the embodiment of the present invention. FIG. 100A shows a perspective view on the front surface side (subject side) of the imaging apparatus 1000, and FIGS. 100B and 100C show perspective views on the rear surface side (photographer side) of the imaging apparatus 1000. The imaging apparatus 1000 has a configuration in which a first casing 1010 and a second casing 1020 are connected so as to be rotatable about a pivot member 1001. The imaging apparatus 1000 is realized, for example, by a digital still camera having three imaging systems. FIGS. 100A to 100C show a simplified view of the imaging apparatus 1000 in order to make the description easily understood, and the illustration of a power switch and the like provided on the outer side surfaces of the imaging apparatus 1000 is omitted.

The first casing 1010 includes an imaging range changeover switch 1011, a still-image/video changeover switch 1012, a shutter button 1013, and an imaging section 1030. Since the imaging range changeover switch 1011, the still-image/video changeover switch 1012, and the imaging section 1030 are approximately the same as the imaging range changeover switch 111, the still-image/video changeover switch 112, and the imaging section 130 shown in FIGS. 1A to 1D and other drawings, description thereof will be omitted.

The shutter button 1013 is an operation member that instructs to start recording images. For example, when a still-image imaging mode is set, the shutter button 1013 is pressed when recording image data generated by the imaging section 1030 in a recording medium as still-image files.

The second casing 1020 includes a display section 1021. Since the display section 1021 is approximately the same as the display section 140 shown in FIGS. 1A to 1D, description thereof will be omitted. Moreover, in the imaging apparatus 1000, the first and second casings 1010 and 1020 are rotatably connected. That is, the second casing 1020 can be rotated with respect to the first casing 1010 about the pivot member 1001 (depicted by dotted line). With this configuration, a relative positional relation of the second casing 1020 to the first casing 1010 can be changed. For example, FIG. 100C shows a state in which the second casing 1020 is rotated by 90° in the direction of the arrow 1002 shown in FIG. 100B. Similarly to the first embodiment of the present invention, the imaging operation is controlled based on whether the second casing 1020 is in the horizontal state or the vertical state.

In the modifications above, an example in which three imaging systems are arranged in accordance with a predetermined rule, an imaging device at the center is disposed in the vertical state, and the imaging devices on the left and right sides are disposed in the horizontal state has been described. However, as shown in FIGS. 70A to 70C, three imaging systems may be arranged in accordance with a predetermined rule, and the respective imaging devices may be disposed in the horizontal state.

Moreover, although in the respective embodiments of the present invention, the mobile phone unit and imaging apparatus having three imaging systems have been described as an example, the embodiments of the present invention can be applied to a mobile phone unit and imaging apparatus having two or four or more imaging systems, for example. That is, the respective embodiments of the present invention can be applied by configuring the two or four or more imaging systems so as to be arranged in accordance with a predetermined rule. Moreover, as described below, the embodiments of the present invention can be applied to a mobile phone unit and imaging apparatus having one imaging system.

[Generation Example of Panoramic Image by Swing Method]

Figure 101A:
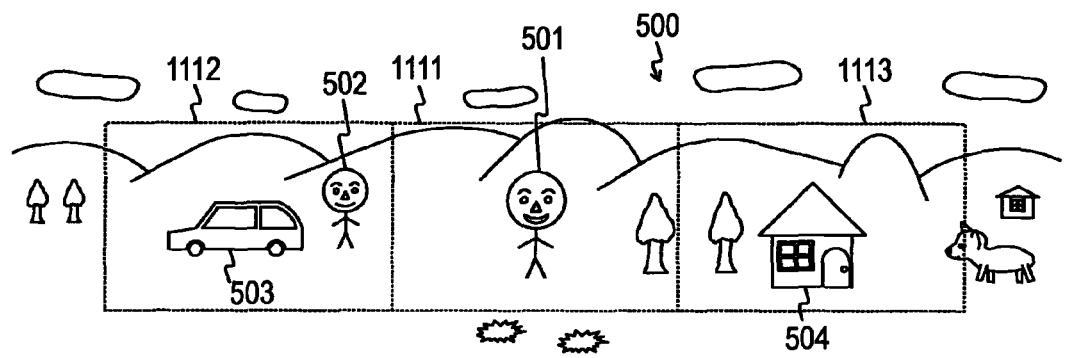
FIGS. 101A to 101C are diagrams schematically showing a plurality of captured images that form a panoramic image generated by an imaging apparatus 1600 and the state of an imaging operation of the imaging apparatus 1600 when generating these captured images according to the modification of the embodiment of the present invention.
Figure 101B:
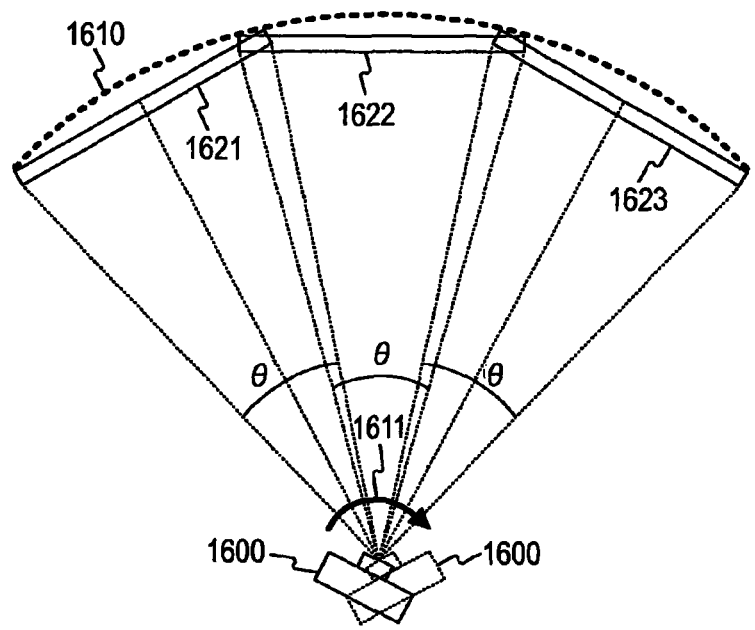
Figure 101C:
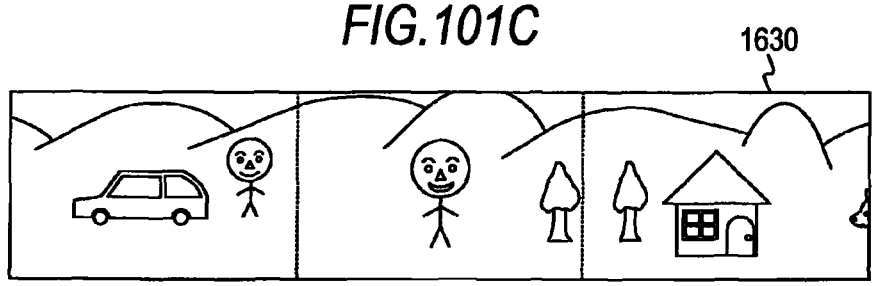

In the respective embodiments of the present invention, the case of combining image data generated by a plurality of imaging devices arranged in accordance with a predetermined rule to generate a panoramic image and displaying the panoramic image has been described as an example. However, the present invention can be similarly applied, for example, to a case of displaying a panoramic image generated by an operation (a so-called panning operation) of moving an imaging apparatus in the horizontal direction about an imaging position. An example of generating panoramic images in this manner is shown in FIGS. 101A to 101C. Moreover, the present invention can be similarly applied, for example, to a case of displaying a panoramic image generated by performing an imaging operation while moving the imaging apparatus in a specific direction so that the optical axis direction is perpendicular to the specific direction.

FIGS. 101A to 101O are diagrams schematically showing a plurality of captured images that form a panoramic image generated by an imaging apparatus 1600 and the state of an imaging operation of the imaging apparatus 1600 when generating these captured images according to the modification of the embodiment of the present invention. FIG. 101A shows imaging ranges 1111 to 1113 when generating a panoramic image using the imaging apparatus 1600. Since the example shown in FIG. 101A is the same as the example shown in FIG. 71A, description thereof will be omitted. Although the imaging ranges 1111 to 1113 include mutually overlapping ranges, in this example, in order to make the description easily understood, the overlapping ranges are not illustrated.

In FIG. 101B, the captured images corresponding to the imaging ranges 1111 to 1113 shown in FIG. 101A are arranged on an imaginary circle (a dot-line circle 1610), and the positional relationship between the captured images as viewed from top is schematically illustrated by rectangles 1621 to 1623. The angles of view of the three captured images generated in the imaging state shown in FIG. 101B are depicted as θ. It is assumed that these three captured images are captured image which are generated by performing the imaging operation so that the same subject is included in at least a partial region in the horizontal direction.

The three captured images corresponding to the imaging ranges 1111 to 1113 are generated, for example, by performing an imaging operation (a so-called panning operation) while moving the imaging apparatus 1600 in the horizontal direction (the direction indicated by arrow 1611) about the position of the imaging apparatus 1600. For example, the photographer performs the imaging operation of panoramic images by panning the imaging apparatus 1600 while pressing the shutter button (this operation is called swing panorama).

FIG. 101C shows a panoramic image 1630 generated by the imaging operation shown in FIG. 101B. As shown in FIG. 101B, three captured images are generated by the panning operation of the imaging apparatus 1600. The movement amount between the adjacent captured images and the moving direction (namely, a relative displacement between the adjacent captured images) are detected for the generated three captured images. Then, the three captured images are combined so that the mutual overlapping regions are overlapped onto each other based on the detected movement amount and moving direction (the movement amount and moving direction between the adjacent captured images), whereby the panoramic image 1630 is generated. Moreover, the panoramic image 1630 may be generated by performing a trimming process on the combined image formed by the three captured images.

Moreover, in the embodiments of the present invention, although the face of a person is described as an example of an object of a specific target object to be detected, the embodiments of the present invention can be applied to other objects other than the face of the person. For example, specific target objects such as animals (for example, dogs, cats, horses, and cows) of various kinds such as mammals, reptiles, or fish; automobiles; or airplanes may be used as an object to be detected. Moreover, the embodiments of the present invention can be applied to an image processing apparatus such as a personal computer, a navigation system, a portable media player, which displays images on a display section (an internal or external display device).

The embodiments of the present invention are shown as an example for implementing the present invention. As mentioned in the embodiments of the present invention, the matters in the embodiments of the present invention have corresponding relations to the invention specifying matters in the claims. Similarly, the invention specifying matters in the claims have corresponding relations to the matters in the embodiments of the present invention having the same names as the invention specifying matters. However, the present invention is not limited to the embodiments, and various modifications can be made in the range without departing from the subject matter of the present invention.

In addition, the processing procedures described in the embodiments of the present invention may be grasped as the methods including the series of procedures. Moreover, the series of procedures may be grasped as the programs for making a computer execute the series of the procedures, or a recording medium storing the programs. As the recording medium, a CD (compact disc), an MD (MiniDisc), a DVD (digital versatile disc), a memory card, a blu-ray disc (the registered trademark), and the like may be used.

The present application contains subject matter related to that disclosed in Japanese Priority Patent Application JP 2010-074089 filed in the Japan Patent Office on Mar. 29, 2010, the entire contents of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An imaging apparatus comprising:
   an image generation section that generates at least one of a first captured image having a predetermined size and a second captured image having an aspect ratio different from that of the first captured image;
   a recording control section that, when an instruction operation to record the generated captured image is received, records the generated captured image based on the instruction operation; and
   a display control section that, when a captured image to be displayed at the time of displaying the recorded captured image on a display section is the second captured image, displays the second captured image and an enlarged image of a specific region in the second captured image on the display section in a correlated manner,
   wherein the display control section displays the captured image, which is recorded by a recording process after the recording control section finishes an operation of recording captured images, on the display section as the captured image to be displayed,
   wherein when the captured image to be displayed is the first captured image, and a predetermined operation is received after the first captured image is displayed on the display section, the display control section displays the first captured image and an enlarged image of a specific region in the first captured image on the display section in a correlated manner,
   wherein the display control section sets a magnification ratio of the enlarged image of the specific region in the second captured image displayed on the display section when the captured image to be displayed is the second captured image, so as to be larger than a magnification ratio of the enlarged image of the specific region in the first captured image displayed on the display section when the captured image to be displayed is the first captured image.

2. The imaging apparatus according to claim 1, wherein, when the captured image to be displayed is the second captured image, the display control section sequentially displays the second captured image and the enlarged image of the specific region in the second captured image on the display section in a predetermined order.

3. The imaging apparatus according to claim 1, wherein, when the captured image to be displayed is the second captured image, the display control section displays the second captured image and the enlarged image of the specific region in the second captured image on the display section at the same time.

4. The imaging apparatus according to claim 1, further comprising
   an operation receiving section that receives a designation operation to designate the specific region in the second captured image displayed on the display section,
   wherein, when the captured image to be displayed is the second captured image, the display control section displays the second captured image on the display section and then enlarges the image of the designated specific region to be displayed on the display section as the enlarged image.

5. The imaging apparatus according to claim 1, wherein the specific region in the second captured image is a region in which a specific target object in the second captured image is included.

6. The imaging apparatus according to claim 1, wherein the specific region in the second captured image is a region in which a subject corresponding to a focusing position of the second captured image is included.

7. The imaging apparatus according to claim 1, wherein, when the captured image to be displayed is the first captured image, the display control section displays only the first captured image on the display section.

8. The imaging apparatus according to claim 1, wherein the image generation section generates the first captured image using one imaging device and generates the second captured image by combining a plurality of captured images generated using a plurality of imaging devices.

9. The imaging apparatus according to claim 1, wherein an aspect ratio of the first captured image is same as an aspect ratio of a display region of the display section.

10. An image processing apparatus comprising:
- an operation receiving section that receives an instruction operation to display a desired captured image on a display section with respect to a first captured image having a predetermined size or a second captured image having an aspect ratio different from that of the first captured image; and
- a display control section that, when a captured image to be displayed on the display section based on the instruction operation is the second captured image, displays the second captured image and an enlarged image of a specific region in the second captured image on the display section in a correlated manner,
- wherein when the captured image to be displayed on the display section based on the instruction operation is the first captured image, the display control section displays the first captured image and an enlarged image of a specific region in the first captured image on the display section in a correlated manner,
- wherein the display control section sets a magnification ratio of the enlarged image of the specific region in the second captured image displayed on the display section when the captured image to be displayed is the second captured image, so as to be larger than a magnification ratio of the enlarged image of the specific region in the first captured image displayed on the display section when the captured image to be displayed is the first captured image.

11. An image processing method comprising:
- generating at least one of a first captured image having a predetermined size and a second captured image having an aspect ratio different from that of the first captured image;
- upon receiving an instruction operation to record the generated captured image, recording the generated captured image based on the instruction operation; and
- when a captured image to be displayed at the time of displaying the recorded captured image on a display section is the second captured image, displaying the second captured image and an enlarged image of a specific region in the second captured image on the display section in a correlated manner, and when a captured image to be displayed at the time of displaying the recorded captured image on the display section is the first captured image, displaying the first captured image and an enlarged image of a specific region in the first captured image on the display section in a correlated manner,
- wherein a magnification ratio of the enlarged image of the specific region in the second captured image displayed on the display section when the captured image to be displayed is the second captured image, is larger than a magnification ratio of the enlarged image of the specific region in the first captured image displayed on the display section when the captured image to be displayed is the first captured image.

12. A non-transitory computer readable medium storing a program for controlling an information processing apparatus, the program being executable to perform operations comprising:
- generating at least one of a first captured image having a predetermined size and a second captured image having an aspect ratio different from that of the first captured image;
- upon receiving an instruction operation to record the generated captured image, recording the generated captured image based on the instruction operation; and
- when a captured image to be displayed at the time of displaying the recorded captured image on a display section is the second captured image, displaying the second captured image and an enlarged image of a specific region in the second captured image on the display section in a correlated manner, and when a captured image to be displayed at the time of displaying the recorded captured image on the display section is the first captured image, displaying the first captured image and an enlarged image of a specific region in the first captured image on the display section in a correlated manner,
- wherein a magnification ratio of the enlarged image of the specific region in the second captured image displayed on the display section when the captured image to be displayed is the second captured image, is larger than a magnification ratio of the enlarged image of the specific region in the first captured image displayed on the display section when the captured image to be displayed is the first captured image.

* * * * *